(12) United States Patent
Fujisaki

(10) Patent No.: US 8,320,958 B1
(45) Date of Patent: *Nov. 27, 2012

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,571

(22) Filed: Sep. 6, 2011

Related U.S. Application Data

(63) Continuation of application No. 10/710,600, filed on Jul. 23, 2004, now Pat. No. 8,090,402.

(60) Provisional application No. 60/481,426, filed on Sep. 26, 2003.

(51) Int. Cl.
*H04M 1/00* (2006.01)

(52) U.S. Cl. .................. 455/556.1; 455/414.1; 455/555; 455/566; 455/466

(58) Field of Classification Search .................. 455/550, 455/517, 567, 566
See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoischi et al. | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,404,579 A | 4/1995 | Obayashi et al. | |
| 5,405,152 A | 4/1995 | Katanics et al. | |
| 5,414,461 A | 5/1995 | Kishi et al. | |
| 5,418,837 A | 5/1995 | Johansson et al. | |
| 5,438,357 A | 8/1995 | McNelley | |
| 5,442,453 A | 8/1995 | Takagi et al. | |
| 5,446,904 A | 8/1995 | Belt et al. | |
| 5,479,476 A | 12/1995 | Finke-Anlauff | |
| 5,530,472 A | 6/1996 | Bregman et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,550,754 A | 8/1996 | McNelley et al. | |
| 5,559,554 A | 9/1996 | Uekane et al. | |
| 5,625,675 A | 4/1997 | Katsumaru et al. | |
| 5,629,741 A | 5/1997 | Hopper | |
| 5,648,768 A | 7/1997 | Bouve | |
| 5,675,630 A | 10/1997 | Beatty | |
| 5,687,331 A | 11/1997 | Volk et al. | |
| 5,732,383 A | 3/1998 | Foladare et al. | |
| 5,758,280 A | 5/1998 | Kimura | |
| 5,772,586 A | 6/1998 | Heinonen et al. | |
| 5,778,304 A | 7/1998 | Grube et al. | |
| 5,786,846 A | 7/1998 | Hiroaki | |
| 5,802,460 A | 9/1998 | Parvulescu et al. | |
| 5,805,672 A | 9/1998 | Barkat et al. | |
| 5,812,930 A | 9/1998 | Zavrel | |
| 5,825,408 A | 10/1998 | Yuyama et al. | |

(Continued)

OTHER PUBLICATIONS

Audiovox, "POcket PC Phone User Manual", published on Mar. 19, 2004.
Gamespot, "Super Mario Bros. 3", Feb. 12, 1990, <http://www.gamespot.com/nes/action/supermariobros3/index.html?tag=tabs%3Bsummary>.

*Primary Examiner* — David Q Nguyen

(57) ABSTRACT

The communication device comprising a voice communicating implementer, a camera image displaying implementer, a calculating implementer, a bold font displaying implementer, a start up software implementer, a stereo audio data output implementer, a device vibration implementer, a photo quality setting implementer, a multiple language implementer, a caller's information displaying implementer, an icon displaying implementer, a software updating implementer, and an OCR implementer.

18 Claims, 1 Drawing Sheet

U.S. PATENT DOCUMENTS

| | | | |
|---|---|---|---|
| 5,844,824 A | 12/1998 | Newman et al. |
| 5,902,349 A | 5/1999 | Endo et al. |
| 5,903,706 A | 5/1999 | Wakabayashi et al. |
| 5,916,024 A | 6/1999 | Von Kohorn |
| 5,918,180 A | 6/1999 | Dimino |
| 5,959,661 A | 9/1999 | Isono |
| 6,009,336 A | 12/1999 | Harris et al. |
| 6,011,973 A | 1/2000 | Valentine et al. |
| 6,034,715 A | 3/2000 | Ishida et al. |
| 6,043,752 A | 3/2000 | Hisada et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt et al. |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,223,029 B1 | 4/2001 | Stenman et al. |
| 6,225,944 B1 | 5/2001 | Hayes |
| 6,236,832 B1 | 5/2001 | Ito |
| 6,243,039 B1 | 6/2001 | Elliot |
| 6,249,720 B1 | 6/2001 | Kubota et al. |
| 6,253,075 B1 | 6/2001 | Beghtol et al. |
| 6,265,988 B1 | 7/2001 | LeMense et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,292,747 B1 | 9/2001 | Amro et al. |
| 6,311,077 B1 | 10/2001 | Bien |
| 6,332,122 B1 | 12/2001 | Ortega et al. |
| 6,333,684 B1 | 12/2001 | Kang |
| 6,366,651 B1 | 4/2002 | Griffith et al. |
| 6,366,782 B1 | 4/2002 | Fumarolo et al. |
| 6,374,221 B1 | 4/2002 | Haimi-Cohen |
| 6,385,465 B1 | 5/2002 | Yoshioka |
| 6,385,466 B1 | 5/2002 | Hirai et al. |
| 6,385,541 B1 | 5/2002 | Blumberg et al. |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,411,822 B1 | 6/2002 | Kraft |
| 6,415,138 B2 | 7/2002 | Sirola et al. |
| 6,421,470 B1 | 7/2002 | Nozaki et al. |
| 6,421,602 B1 | 7/2002 | Bullock et al. |
| 6,430,498 B1 | 8/2002 | Maruyama et al. |
| 6,438,380 B1 | 8/2002 | Bi et al. |
| 6,442,404 B1 | 8/2002 | Sakajiri |
| 6,445,802 B1 | 9/2002 | Dan |
| 6,477,387 B1 | 11/2002 | Jackson et al. |
| 6,486,867 B1 | 11/2002 | Kopp et al. |
| 6,487,422 B1 | 11/2002 | Lee |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer |
| 6,529,742 B1 | 3/2003 | Yang |
| 6,532,035 B1 | 3/2003 | Saari et al. |
| 6,538,558 B2 | 3/2003 | Sakazume et al. |
| 6,542,750 B2 | 4/2003 | Hendrey et al. |
| 6,542,814 B2 | 4/2003 | Polidi et al. |
| 6,549,215 B2 | 4/2003 | Jouppi |
| 6,553,309 B2 | 4/2003 | Uchida et al. |
| 6,553,310 B1 | 4/2003 | Lopke |
| 6,567,745 B2 | 5/2003 | Fuchs et al. |
| 6,567,984 B1 | 5/2003 | Allport |
| 6,600,975 B2 | 7/2003 | Moriguchi et al. |
| 6,606,504 B1 | 8/2003 | Mooney et al. |
| 6,611,753 B1 | 8/2003 | Millington |
| 6,615,186 B1 | 9/2003 | Kolls |
| 6,618,704 B2 | 9/2003 | Kanevsky et al. |
| 6,622,018 B1 | 9/2003 | Erekson |
| 6,630,958 B2 | 10/2003 | Tanaka et al. |
| 6,631,271 B1 | 10/2003 | Logan |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,681,120 B1 | 1/2004 | Kim |
| 6,687,515 B1 | 2/2004 | Kosaka |
| 6,690,932 B1 | 2/2004 | Barnier et al. |
| 6,701,148 B1 | 3/2004 | Wilson et al. |
| 6,707,942 B1 | 3/2004 | Cortopassi et al. |
| 6,711,399 B1 | 3/2004 | Renault |
| 6,725,022 B1 | 4/2004 | Clayton et al. |
| 6,728,531 B1 | 4/2004 | Lee et al. |
| 6,728,533 B2 | 4/2004 | Ishii |
| 6,738,643 B1 | 5/2004 | Harris |
| 6,738,711 B2 | 5/2004 | Ohmura et al. |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,819,939 B2 | 11/2004 | Masamura |
| 6,820,055 B2 | 11/2004 | Saindon et al. |
| 6,836,654 B2 | 12/2004 | Decotignie |
| 6,850,209 B2 | 2/2005 | Mankins et al. |
| 6,865,372 B2 | 3/2005 | Mauney et al. |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,256 B2 | 5/2005 | Harma et al. |
| 6,895,259 B1 | 5/2005 | Blank nee Keller et al. |
| 6,898,321 B1 | 5/2005 | Knee et al. |
| 6,898,765 B2 | 5/2005 | Matthews, III et al. |
| 6,901,383 B1 | 5/2005 | Ricketts et al. |
| 6,904,298 B2 | 6/2005 | Arai et al. |
| 6,912,544 B1 | 6/2005 | Weiner |
| 6,922,212 B2 | 7/2005 | Nakakubo et al. |
| 6,922,630 B2 | 7/2005 | Maruyama et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,968,184 B2 | 11/2005 | Criss et al. |
| 6,968,206 B1 | 11/2005 | Whitsey-Anderson |
| 6,970,703 B2 | 11/2005 | Fuchs et al. |
| 6,992,699 B1 | 1/2006 | Vance et al. |
| 6,999,757 B2 | 2/2006 | Bates et al. |
| 6,999,802 B2 | 2/2006 | Kim |
| 7,003,598 B2 | 2/2006 | Kavanagh et al. |
| 7,007,239 B1 | 2/2006 | Hawkins et al. |
| 7,012,999 B2 | 3/2006 | Ruckart |
| 7,019,770 B1 | 3/2006 | Katz |
| 7,028,077 B2 | 4/2006 | Toshimitsu et al. |
| 7,035,666 B2 | 4/2006 | Silberfenig et al. |
| 7,058,356 B2 | 6/2006 | Slotznick |
| 7,076,052 B2 | 7/2006 | Yoshimura |
| 7,081,832 B2 | 7/2006 | Nelson et al. |
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |
| 7,117,152 B1 | 10/2006 | Mukherji et al. |
| 7,117,504 B2 | 10/2006 | Smith et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |

| | | |
|---|---|---|
| 7,130,630 B1 | 10/2006 | Enzmann et al. |
| 7,139,555 B2 | 11/2006 | Apfel |
| 7,142,810 B2 | 11/2006 | Oesterling |
| 7,142,890 B2 | 11/2006 | Irimajiri et al. |
| 7,146,179 B2 | 12/2006 | Parulski et al. |
| 7,190,880 B2 | 3/2007 | Cookson et al. |
| 7,218,916 B2 | 5/2007 | Nonami |
| 7,224,851 B2 | 5/2007 | Kinjo |
| 7,224,987 B1 | 5/2007 | Bhela et al. |
| 7,233,781 B2 | 6/2007 | Hunter et al. |
| 7,233,795 B1 | 6/2007 | Ryden |
| 7,239,742 B2 | 7/2007 | Ohtani et al. |
| 7,251,255 B1 | 7/2007 | Young |
| 7,254,408 B2 | 8/2007 | Kim |
| 7,260,416 B2 | 8/2007 | Shippee |
| 7,266,186 B1 | 9/2007 | Henderson |
| 7,274,952 B2 | 9/2007 | Hayashi |
| 7,277,711 B2 | 10/2007 | Nyu |
| 7,321,783 B2 | 1/2008 | Kim et al. |
| 7,346,373 B2 | 3/2008 | Kim |
| 7,372,447 B1 | 5/2008 | Jacobsen et al. |
| 7,383,067 B2 | 6/2008 | Phillips et al. |
| 7,426,264 B1 | 9/2008 | Henderson |
| 7,433,845 B1 | 10/2008 | Flitcroft et al. |
| 7,444,168 B2 | 10/2008 | Nakagawa et al. |
| 7,450,709 B2 | 11/2008 | Gonzalez et al. |
| 7,489,768 B1 | 2/2009 | Strietzel |
| 7,532,879 B1 | 5/2009 | Fujisaki |
| 7,551,899 B1 | 6/2009 | Nicolas et al. |
| 7,593,712 B2 | 9/2009 | Moton, Jr. et al. |
| 7,657,252 B2 | 2/2010 | Futami |
| 7,707,592 B2 | 4/2010 | Wesslen et al. |
| 7,769,364 B2 | 8/2010 | Logan et al. |
| 7,787,857 B2 | 8/2010 | Peterman |
| 7,787,887 B2 | 8/2010 | Gupta et al. |
| 7,853,295 B1 | 12/2010 | Fujisaki |
| 7,853,297 B1 | 12/2010 | Fujisaki |
| 7,873,349 B1 | 1/2011 | Smith et al. |
| 7,899,410 B2 | 3/2011 | Rakshani et al. |
| 7,941,141 B2 | 5/2011 | Shoykhet et al. |
| 7,953,439 B2 | 5/2011 | Rofougaran |
| 2001/0000249 A1 | 4/2001 | Oba et al. |
| 2001/0005826 A1 | 6/2001 | Shibuya |
| 2001/0011293 A1 | 8/2001 | Murakami et al. |
| 2001/0029425 A1 | 10/2001 | Myr |
| 2001/0035829 A1 | 11/2001 | Yu et al. |
| 2001/0037191 A1 | 11/2001 | Furuta et al. |
| 2001/0041590 A1 | 11/2001 | Silberfenig et al. |
| 2001/0048364 A1 | 12/2001 | Kalthoff et al. |
| 2001/0049470 A1 | 12/2001 | Mault et al. |
| 2002/0002044 A1 | 1/2002 | Naruse et al. |
| 2002/0002705 A1 | 1/2002 | Byrnes et al. |
| 2002/0004701 A1 | 1/2002 | Nakano |
| 2002/0006804 A1 | 1/2002 | Mukai et al. |
| 2002/0009978 A1 | 1/2002 | Dukach et al. |
| 2002/0016724 A1 | 2/2002 | Yang et al. |
| 2002/0019225 A1 | 2/2002 | Miyashita |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi et al. |
| 2002/0036231 A1 | 3/2002 | Monaghan et al. |
| 2002/0036642 A1 | 3/2002 | Kwon et al. |
| 2002/0037738 A1* | 3/2002 | Wycherley et al. ........... 455/550 |
| 2002/0038219 A1 | 3/2002 | Yanay et al. |
| 2002/0039914 A1 | 4/2002 | Hama et al. |
| 2002/0041262 A1 | 4/2002 | Mukai et al. |
| 2002/0047787 A1 | 4/2002 | Mikkola et al. |
| 2002/0049630 A1 | 4/2002 | Furuta et al. |
| 2002/0049742 A1 | 4/2002 | Chan et al. |
| 2002/0052754 A1 | 5/2002 | Joyce et al. |
| 2002/0055350 A1 | 5/2002 | Gupte et al. |
| 2002/0055872 A1 | 5/2002 | LaBrie et al. |
| 2002/0058497 A1 | 5/2002 | Jeong |
| 2002/0058531 A1 | 5/2002 | Terasaki et al. |
| 2002/0061767 A1 | 5/2002 | Sladen et al. |
| 2002/0065037 A1 | 5/2002 | Messina et al. |
| 2002/0065604 A1 | 5/2002 | Sekiyama |
| 2002/0066115 A1 | 5/2002 | Wendelrup |
| 2002/0068585 A1 | 6/2002 | Chan et al. |
| 2002/0068599 A1 | 6/2002 | Rodriguez et al. |
| 2002/0072395 A1 | 6/2002 | Miramontes |
| 2002/0077808 A1* | 6/2002 | Liu et al. ........................ 704/10 |
| 2002/0082059 A1 | 6/2002 | Nariai et al. |
| 2002/0085700 A1 | 7/2002 | Metcalf |
| 2002/0094806 A1 | 7/2002 | Kamimura |
| 2002/0098857 A1 | 7/2002 | Ishii |
| 2002/0102960 A1 | 8/2002 | Lechner |
| 2002/0103872 A1 | 8/2002 | Watanabe |
| 2002/0104095 A1 | 8/2002 | Nguyen et al. |
| 2002/0110246 A1 | 8/2002 | Gosior et al. |
| 2002/0115469 A1 | 8/2002 | Rekimoto et al. |
| 2002/0120589 A1 | 8/2002 | Aoki |
| 2002/0120718 A1 | 8/2002 | Lee |
| 2002/0123336 A1 | 9/2002 | Kamada |
| 2002/0127997 A1 | 9/2002 | Karlstedt et al. |
| 2002/0128000 A1 | 9/2002 | do Nascimento |
| 2002/0133342 A1 | 9/2002 | McKenna |
| 2002/0137470 A1 | 9/2002 | Baron et al. |
| 2002/0137503 A1 | 9/2002 | Roderique |
| 2002/0137526 A1 | 9/2002 | Shinohara |
| 2002/0141086 A1 | 10/2002 | Lang et al. |
| 2002/0142763 A1 | 10/2002 | Kolsky |
| 2002/0147645 A1 | 10/2002 | Alao et al. |
| 2002/0151326 A1 | 10/2002 | Awada et al. |
| 2002/0151327 A1 | 10/2002 | Levitt |
| 2002/0154632 A1 | 10/2002 | Wang et al. |
| 2002/0164975 A1 | 11/2002 | Lu |
| 2002/0165850 A1 | 11/2002 | Roberts et al. |
| 2002/0168959 A1 | 11/2002 | Noguchi et al. |
| 2002/0173344 A1 | 11/2002 | Cupps et al. |
| 2002/0177407 A1 | 11/2002 | Mitsumoto |
| 2002/0178009 A1 | 11/2002 | Firman |
| 2002/0178225 A1 | 11/2002 | Madenberg et al. |
| 2002/0183045 A1 | 12/2002 | Emmerson et al. |
| 2002/0191951 A1 | 12/2002 | Sodeyama et al. |
| 2002/0196378 A1 | 12/2002 | Slobodin et al. |
| 2002/0198813 A1 | 12/2002 | Patterson, Jr. et al. |
| 2002/0198936 A1 | 12/2002 | McIntyre et al. |
| 2003/0003967 A1 | 1/2003 | Ito |
| 2003/0005056 A1 | 1/2003 | Yamamoto et al. |
| 2003/0006879 A1 | 1/2003 | Kang et al. |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0016189 A1 | 1/2003 | Abe et al. |
| 2003/0017857 A1 | 1/2003 | Kitson et al. |
| 2003/0018744 A1 | 1/2003 | Johanson et al. |
| 2003/0032389 A1 | 2/2003 | Kim et al. |
| 2003/0032406 A1 | 2/2003 | Minear et al. |
| 2003/0033214 A1 | 2/2003 | Mikkelsen et al. |
| 2003/0038800 A1 | 2/2003 | Kawahara |
| 2003/0045301 A1 | 3/2003 | Wollrab |
| 2003/0045311 A1 | 3/2003 | Larikka et al. |
| 2003/0045329 A1 | 3/2003 | Kinoshita |
| 2003/0045996 A1 | 3/2003 | Yamazaki et al. |
| 2003/0050776 A1 | 3/2003 | Blair |
| 2003/0052964 A1 | 3/2003 | Priestman et al. |
| 2003/0055994 A1 | 3/2003 | Herrmann et al. |
| 2003/0061606 A1 | 3/2003 | Hartwig et al. |
| 2003/0063580 A1 | 4/2003 | Pond |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1* | 4/2003 | Oshima et al. ............... 717/171 |
| 2003/0073432 A1 | 4/2003 | Meade, II |
| 2003/0083055 A1 | 5/2003 | Riordan et al. |
| 2003/0084104 A1* | 5/2003 | Salem et al. ................. 709/205 |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0100326 A1 | 5/2003 | Grube et al. |
| 2003/0107580 A1 | 6/2003 | Egawa et al. |
| 2003/0109251 A1 | 6/2003 | Fujito et al. |
| 2003/0110450 A1 | 6/2003 | Sakai |
| 2003/0114191 A1 | 6/2003 | Nishimura |

| Publication No. | Date | Inventor |
|---|---|---|
| 2003/0117316 A1 | 6/2003 | Tischer |
| 2003/0117376 A1 | 6/2003 | Ghulam |
| 2003/0119485 A1 | 6/2003 | Ogasawara |
| 2003/0119562 A1* | 6/2003 | Kokubo ................. 455/566 |
| 2003/0120784 A1 | 6/2003 | Johnson et al. |
| 2003/0122779 A1 | 7/2003 | Martin et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0144024 A1 | 7/2003 | Luo |
| 2003/0148772 A1 | 8/2003 | Ben-Ari |
| 2003/0153310 A1 | 8/2003 | Ishii |
| 2003/0153355 A1 | 8/2003 | Warren |
| 2003/0153364 A1 | 8/2003 | Osann, Jr. |
| 2003/0155413 A1 | 8/2003 | Kovesdi et al. |
| 2003/0156208 A1 | 8/2003 | Obradovich |
| 2003/0157929 A1 | 8/2003 | Janssen et al. |
| 2003/0166399 A1 | 9/2003 | Tokkonen et al. |
| 2003/0169329 A1 | 9/2003 | Parker et al. |
| 2003/0171113 A1 | 9/2003 | Choi |
| 2003/0174685 A1 | 9/2003 | Hasebe |
| 2003/0181201 A1 | 9/2003 | Bomze et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |
| 2003/0236866 A1 | 12/2003 | Light |
| 2004/0003307 A1 | 1/2004 | Tsuji |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0072595 A1 | 4/2004 | Anson et al. |
| 2004/0082321 A1 | 4/2004 | Kontianinen |
| 2004/0087326 A1* | 5/2004 | Dunko et al. ................. 455/517 |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0137893 A1 | 7/2004 | Muthuswamy et al. |
| 2004/0137983 A1 | 7/2004 | Kerr et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0189827 A1 | 9/2004 | Kim et al. |
| 2004/0198374 A1 | 10/2004 | Bajikar |
| 2004/0203490 A1 | 10/2004 | Kaplan |
| 2004/0203520 A1 | 10/2004 | Schirtzinger et al. |
| 2004/0203577 A1 | 10/2004 | Forman et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0204821 A1 | 10/2004 | Tu |
| 2004/0204848 A1 | 10/2004 | Matsuo et al. |
| 2004/0209649 A1 | 10/2004 | Lord |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0222988 A1 | 11/2004 | Donnelly |
| 2004/0235520 A1 | 11/2004 | Cadiz et al. |
| 2004/0242240 A1 | 12/2004 | Lin |
| 2004/0242269 A1 | 12/2004 | Fadell |
| 2004/0248586 A1 | 12/2004 | Patel et al. |
| 2004/0252197 A1 | 12/2004 | Fraley et al. |
| 2004/0257208 A1 | 12/2004 | Huang et al. |
| 2005/0004749 A1 | 1/2005 | Park |
| 2005/0020301 A1 | 1/2005 | Lee |
| 2005/0026629 A1 | 2/2005 | Contractor |
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0090768 A1 | 4/2005 | Brattesani et al. |
| 2005/0097038 A1 | 5/2005 | Yu et al. |
| 2005/0107119 A1 | 5/2005 | Lee et al. |
| 2005/0113080 A1 | 5/2005 | Nishimura |
| 2005/0120225 A1 | 6/2005 | Kirsch et al. |
| 2005/0136949 A1 | 6/2005 | Barnes et al. |
| 2005/0144560 A1 | 6/2005 | Gruen et al. |
| 2005/0151877 A1 | 7/2005 | Fisher |
| 2005/0153681 A1 | 7/2005 | Hanson |
| 2005/0153745 A1 | 7/2005 | Smethers |
| 2005/0159189 A1 | 7/2005 | Iyer |
| 2005/0164684 A1 | 7/2005 | Chen et al. |
| 2005/0165871 A1 | 7/2005 | Barrs, II et al. |
| 2005/0166242 A1 | 7/2005 | Matsumoto et al. |
| 2005/0186954 A1 | 8/2005 | Kenney |
| 2005/0191969 A1 | 9/2005 | Mousseau |
| 2005/0235312 A1 | 10/2005 | Karaoguz et al. |
| 2005/0261945 A1 | 11/2005 | Mougin et al. |
| 2005/0272504 A1 | 12/2005 | Eguchi et al. |
| 2005/0282582 A1 | 12/2005 | Slotznick |
| 2006/0003813 A1 | 1/2006 | Seligmann et al. |
| 2006/0015819 A1 | 1/2006 | Hawkins et al. |
| 2006/0031407 A1 | 2/2006 | Dispensa et al. |
| 2006/0033809 A1 | 2/2006 | Robinson |
| 2006/0041923 A1 | 2/2006 | McQuaide, Jr. |
| 2006/0052100 A1 | 3/2006 | Almgren |
| 2006/0059038 A1 | 3/2006 | Iuchi et al. |
| 2006/0073820 A1 | 4/2006 | Craswell et al. |
| 2006/0114100 A1 | 6/2006 | Ghabra et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0167677 A1* | 7/2006 | Bitzer ................. 704/9 |
| 2006/0206913 A1 | 9/2006 | Jerding et al. |
| 2006/0229114 A2 | 10/2006 | Kim |
| 2006/0234693 A1 | 10/2006 | Isidore et al. |
| 2006/0234758 A1 | 10/2006 | Parupudi et al. |
| 2006/0284732 A1 | 12/2006 | Brock-Fisher |
| 2007/0015550 A1 | 1/2007 | Kayanuma |
| 2007/0037605 A1* | 2/2007 | Logan ................. 455/567 |
| 2007/0050832 A1 | 3/2007 | Wright et al. |
| 2007/0061845 A1 | 3/2007 | Barnes, Jr. |
| 2007/0109262 A1 | 5/2007 | Oshima et al. |
| 2007/0135145 A1 | 6/2007 | Lee et al. |
| 2007/0135150 A1 | 6/2007 | Ushiki et al. |
| 2007/0142047 A1 | 6/2007 | Heeschen |
| 2007/0190944 A1 | 8/2007 | Doan et al. |
| 2007/0204014 A1 | 8/2007 | Greer et al. |
| 2007/0216760 A1 | 9/2007 | Kondo et al. |
| 2007/0260456 A1 | 11/2007 | Proux et al. |
| 2007/0262848 A1 | 11/2007 | Berstis et al. |
| 2007/0293240 A1 | 12/2007 | Drennan |
| 2008/0014917 A1 | 1/2008 | Rhoads et al. |
| 2008/0016526 A1 | 1/2008 | Asmussen |
| 2008/0016534 A1 | 1/2008 | Ortiz et al. |
| 2008/0021728 A1 | 1/2008 | Khoo |
| 2008/0058005 A1 | 3/2008 | Zicker et al. |
| 2008/0151696 A1 | 6/2008 | Giroud et al. |
| 2008/0176545 A1 | 7/2008 | Dicke et al. |
| 2008/0242271 A1 | 10/2008 | Schmidt et al. |
| 2008/0242283 A1 | 10/2008 | Ruckart |
| 2008/0250459 A1 | 10/2008 | Roman |
| 2008/0299989 A1 | 12/2008 | King et al. |
| 2009/0047972 A1 | 2/2009 | Chawla |
| 2009/0124243 A1 | 5/2009 | Routley et al. |

| | | | | | |
|---|---|---|---|---|---|
| 2009/0153490 A1 | 6/2009 | Nymark et al. | 2010/0062740 A1 | 3/2010 | Ellis et al. |
| 2009/0186628 A1 | 7/2009 | Yonker et al. | 2010/0099457 A1 | 4/2010 | Kim |
| 2009/0197641 A1 | 8/2009 | Rofougaran et al. | 2010/0145700 A1 | 6/2010 | Kennewick et al. |
| 2009/0221330 A1 | 9/2009 | Tomimori | 2011/0136508 A1 | 6/2011 | Fomukong et al. |
| 2009/0290369 A1 | 11/2009 | Schofield et al. | | | |
| 2010/0030557 A1 | 2/2010 | Molloy et al. | | | |

* cited by examiner

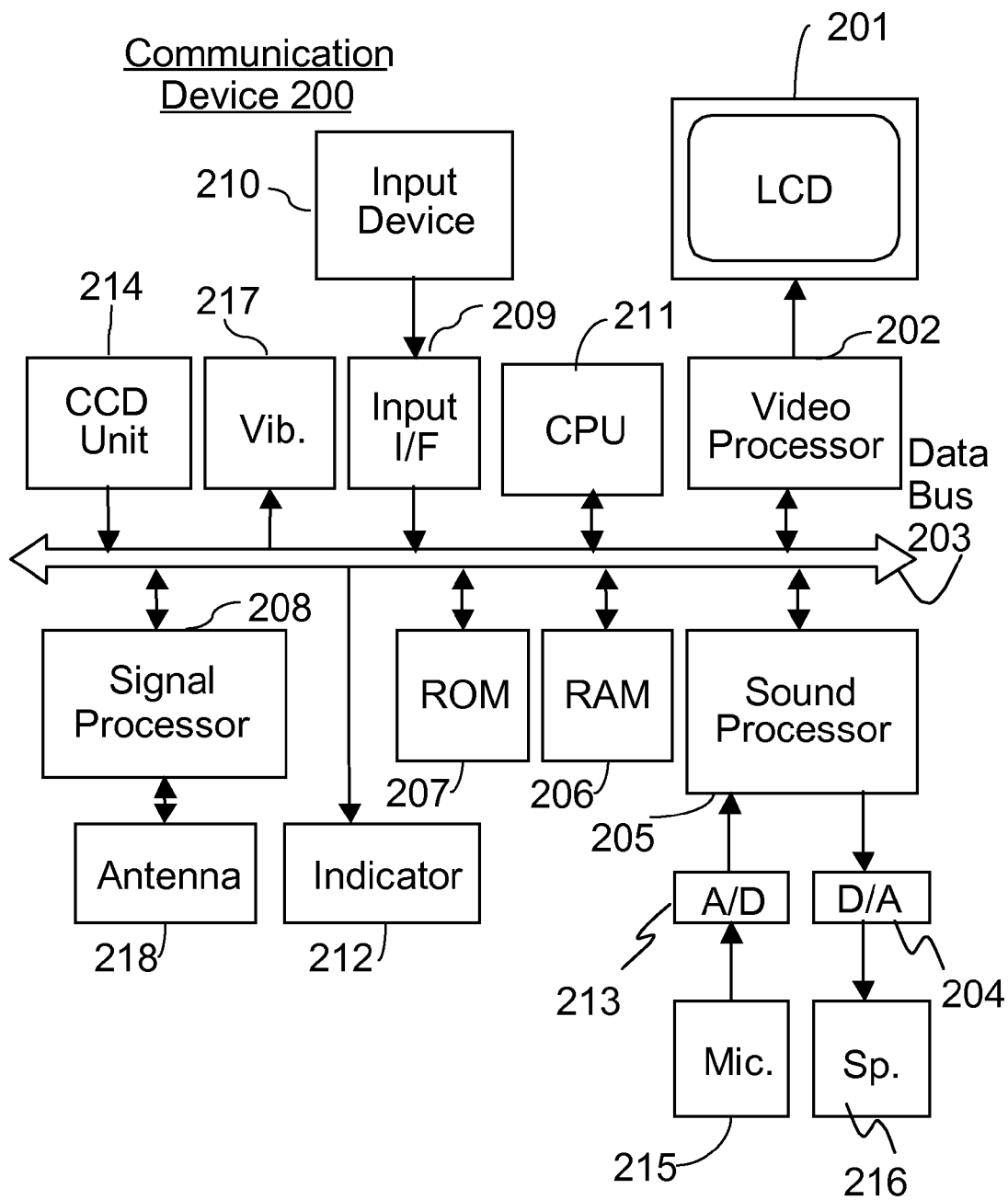

COMMUNICATION DEVICE

CROSS REFERENCE TO RELATED APPLICATIONS

This application is a continuation of U.S. Ser. No. 10/710,600 filed 2004 Jul. 23, now U.S. Pat. No. 8,090,402, which claims the benefit of U.S. Provisional Application No. 60/481,426, filed 2003 Sep. 26, all of which are hereby incorporated herein by reference in their entirety.

BACKGROUND OF INVENTION

The invention relates to communication device and more particularly to the communication device which is capable to communicate with another communication device in a wireless fashion.

U.S. Patent Publication No. 20030119562 is introduced as a prior art of the present invention of which the summary is the following: "There are provided a task display switching method, a portable apparatus and a portable communications apparatus which, when a plurality of application software are activated and processed in parallel, make it possible to switch a display between each of the application software with ease. According to the task display switching method, the portable apparatus and the portable communications apparatus of the present invention, in a portable apparatus capable of processing a plurality of tasks in parallel and of displaying a plurality of display regions for displaying data, an icon associated with a task displayed on a first display region is generated automatically or manually, and the generated icon is displayed in a second display region. When any icon thus generated is selected from a plurality of icons displayed on the second display region, the task associated with the selected icon is restored and displayed in the first display region." However, the foregoing prior art does not disclose the communication device comprising a voice communicating implementer, a camera image displaying implementer, a calculating implementer, a bold font displaying implementer, a start up software implementer, a stereo audio data output implementer, a device vibration implementer, a photo quality setting implementer, a multiple language implementer, a caller's information displaying implementer, an icon displaying implementer, a software updating implementer, and an OCR implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior art.

(Blank)

The present invention introduces the communication device comprising a voice communicating implementer, a camera image displaying implementer, a calculating implementer, a bold font displaying implementer, a start up software implementer, a stereo audio data output implementer, a device vibration implementer, a photo quality setting implementer, a multiple language implementer, a caller's information displaying implementer, an icon displaying implementer, a software updating implementer, and an OCR implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. In this embodiment, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format.

Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

Paragraph [0024]—This Paragraph [0024] illustrate(s) the elements of Communication Device 200. The elements of Communication Device 200 described in this Paragraph [0024] is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this Paragraph [0024] in this specification.

Paragraph [0025]—This Paragraph [0025] illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

Paragraph [0026]—<<3D Video Game Function>>

Paragraph [0027]—This Paragraph [0027] through Paragraph [0035] illustrate the video game function of Communication Device 200 (FIG. 1).

Paragraph [0028]—In this embodiment, Host H includes Host Game Data Storage Area Ha. In Host Game Data Storage Area Ha, a plurality of game data are stored for downloading purposes. Games G1, G2, G3, and G4 are stored in Host Game Data Storage Area Ha in the example illustrated in Paragraph [0027].

Paragraph [0029]—This Paragraph [0029] illustrates the sequence to initiate the game function. First of all a list of modes is displayed on LCD 201 (FIG. 1) (S1). When an input signal is input by utilizing Input Device 210 (FIG. 1) or via voice recognition system to select a specific mode (S2), the selected mode is activated. In the present example described in Paragraph [0029], the communication mode is activated (S3a) when the communication mode is selected in the previous step, the game download mode is activated (S3b) when the game download mode is selected in the previous step, and the game play mode is activated (S3c) when game play mode is selected in the previous step. The modes displayed on LCD 201 in S1 which are selected and activated in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4). Here, communication mode is a mode which enables Communication Device 200 to communicate (i.e., send and/or receive audio data, text data, image data, video data, and/or other types of data in a wireless fashion via Antenna 218) in a wireless fashion with other Communication Devices 200. The same meaning applies hereinafter.

Paragraph [0030]—This Paragraph [0030] illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform game download mode is stored in Game DL Data Storage Area 2061b, and the data to activate (as described in S3c of the previous paragraph) and to perform game play mode is stored in 2061c.

Paragraph [0031]—This Paragraph [0031] illustrates the method of activating and deactivating the game mode by utilizing the voice recognition system explained hereinbefore. The voice recognition system is turned on, in the first place (S1), and the game mode is activated by utilizing the voice recognition system (S2). When utilizing the game mode is over, it is deactivated by utilizing the voice recognition system, and the system is turned off thereafter (S3).

Paragraph [0032]—This Paragraph [0032] illustrates the sequence of downloading a game data, i.e., a game software program, from Host H (Paragraph [0027]). In this embodiment, a list of game data is displayed on LCD 201 (FIG. 1) (S1). When an input signal is input from Input Device 210 or by the voice recognition system to select a specific game data (S2), the selected game data is downloaded to Communication Device 200 and is stored in Game DL Data Storage Area 2061*b* (Paragraph [0030]) (S3). The downloaded game data is decompressed thereafter by CPU 211 (FIG. 1).

Paragraph [0033]—This Paragraph [0033] illustrates the data stored in Game Play Data Storage Area 2061*c* (Paragraph [0030]). The decompressed game data are allocated to the predetermined areas, i.e., Game Software Storage Area 2061*d*, 3D Object Data Storage Area 2061*e*, Texture Data Storage Area 2061*f*, and Game Process Data Storage Area 2061*g*. Here, Game Software Storage Area 2061*d* stores a series of software program to perform the game function of Communication Device 200. 3D Object Data Storage Area 2061*e* stores the three-dimensional data of the three-dimensional objects displayed on LCD 201 (FIG. 1), such as the shape of each three-dimensional object in a polygon form (or in a wire frame form), and the three-dimensional data of all parts (components) of each three-dimensional object. Texture Data Storage Area 2061*f* stores a plurality of data of textures which are 'pasted' on each three-dimensional object (or on each part thereof) when such three-dimensional object is displayed on LCD 201. Game Process Data Storage Area 2061*g* stores a plurality of data necessary to process the game software program, such as the strength and speed of each three-dimensional object, the layout of the background displayed on LCD 201, the weather described in the game, the property of each shadow displayed adjacent to the three-dimensional object, the movement of the objects which are controllable by the user of Communication Device 200, and the movement of the objects which are not controllable by the user of Communication Device 200.

Paragraph [0034]—This Paragraph [0034] illustrates the sequence of the game software program stored in Game Software Storage Area 2061*d* (Paragraph [0033]). When the game mode is started by voice recognition system as described in S1 and S2 of Paragraph [0031], the game initiation process is initiated by CPU 211 (FIG. 1) (S1). Here, CPU 211 reads, by following the instructions written in the game software program stored in Game Software Storage Area 2061*d*, all the address data stored in 3D Object Data Storage Area 2061*e*, Texture Data Storage Area 2061*f*, and Game Process Data Storage Area 2061*g* to promptly retrieve the required data to process the game when necessary. During the game initiation process, an initiation screen is displayed on LCD 201. Once the game is started, CPU 211 checks the status of the input signal from Input Device 210 (FIG. 1) or by the voice recognition system. If an input signal is detected (S2), a response to such input signal is processed by CPU 211 by retrieving data from Game Process Data Storage Area 2061*g* (Paragraph [0033]) (S3). For example, if the input signal instructs to move forward the three-dimensional object, CPU 211 calculates the next action of its body parts (e.g., pushing forward its right leg) by retrieving data from Game Process Data Storage Area 2061*g* (Paragraph [0033]). CPU 211 also processes with the three-dimensional objects which are irrelevant to the input signal input from Input Device 210 by retrieving data from Game Process Data Storage Area 2061*g*, for example the background objects displayed on LCD 201 including, clouds, pedestrians, buildings, traffic lights, and bridges (S4). CPU 211 also calculates the three-dimensional data of each three-dimensional object and the three-dimensional data of all parts thereof in the three-dimensional game space by retrieving data from three-dimensional object Data Storage Area 2061*e* (S4). CPU 211 then retrieves the designated textures from Texture Data Storage Area 2061*f* (Paragraph [0033]) and 'pastes' them to the three-dimensional objects (S4). The three-dimensional objects with textures 'pasted' are displayed on LCD 201 (S5). The sequence of S2 through S5 is repeated until the game is over (S6), and the game termination process, i.e., a process to terminate the game mode is initiated thereafter (S7).

Paragraph [0035]—This Paragraph [0035] illustrates the process to allocate Input Device 210 (FIG. 1) to perform the game function. In this embodiment, when the game initiation process is initiated as explained in S1 of Paragraph [0034], the key allocation process is initiated simultaneously. As the result of the key allocation process, Input Device 210 normally utilized for communication purposes, including keypad and buttons, is allocated as input means for performing the game function. In the example described in Paragraph [0035], Key #1 is assigned for instructing CPU 211 to move up the three-dimensional object, Key #2 is assigned for instructing CPU 211 to move down the three-dimensional object, Key #3 is assigned for instructing CPU 211 to move left the three-dimensional object, Key #4 is assigned for instructing CPU 211 to move right the three-dimensional object, Key #5 is assigned for instructing CPU 211 to make the three-dimensional object to jump, and Key #6 is assigned for instructing CPU 211 to make the three-dimensional object to dash, and all the foregoing data are stored in Key Allocation Data Storage Area 2061*h*.

Paragraph [0036]—<<Auto Time Adjust Function>>

Paragraph [0037]—Paragraph [0038] through Paragraph [0040] illustrate the automatic time adjust function, i.e., a function which automatically adjusts the clock of Communication Device 200.

Paragraph [0038]—This Paragraph [0038] illustrates the data stored in RAM 206 (FIG. 1). In this embodiment, RAM 206 includes Auto Time Adjust Software Storage Area 2069*a*, Current Time Data Storage Area 2069*b*, and Auto Time Data Storage Area 2069*c*. Auto Time Adjust Software Storage Area 2069*a* stores software program to implement the present function which is explained in details hereinafter, Current Time Data Storage Area 2069*b* stores the data which represents the current time, and Auto Time Data Storage Area 2069*c* is a working area assigned for implementing the present function.

Paragraph [0039]—This Paragraph [0039] illustrates a software program stored in Auto Time Adjust Software Storage Area 2069*a* (Paragraph [0038]). First of all, Communication Device 200 is connected to Network NT (e.g., the Internet) via Antenna 218 (FIG. 1) (S1). CPU 211 (FIG. 1) then retrieves an atomic clock data from Network NT (S2) and the current time data from Current Time Data Storage Area 2069*b* (Paragraph [0038]), and compares both data. If the difference between both data is not within the predetermined value X (S3), CPU 211 adjusts the current time data (S4). The method to adjust the current data can be either simply overwrite the data stored in Current Time Data Storage Area 2069*b* with the atomic clock data retrieved from Network NT or calculate the difference of the two data and add or subtract the difference to or from the current time data stored in Current Time Data Storage Area 2069*b* by utilizing Auto Time Data Storage Area 2069*c* (Paragraph [0038]) as a working area.

Paragraph [0040]—This Paragraph [0040] illustrates another software program stored in Auto Time Adjust Software Storage Area 2069*a* (Paragraph [0038]). When the power of Communication Device 200 is turned on (S1), CPU 211 (FIG. 1) stores a predetermined timer value in Auto Time Data Storage Area 2069*c* (Paragraph [0038]) (S2). The timer value is decremented periodically (S3). When the timer value equals to zero (S4), the automatic timer adjust function is activated (S5) and CPU 211 performs the sequence described in Paragraph [0039], and the sequence of S2 through S4 is repeated thereafter.

Paragraph [0041]—<<Video/Photo Mode>>

Paragraph [0042]—This Paragraph [0042] illustrates the details of CCD Unit 214 (FIG. 1). In this embodiment, CCD Unit 214 is mounted on Rotator 291 (not shown) which is rotatably connected to the side of Communication Device 200. Indicator 212 (FIG. 1) is attached to the surface of CCD Unit 214.

Paragraph [0043]—This Paragraph [0043] illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in Paragraph [0029], and the video/photo mode is activated (S3c) when the video/photo mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Paragraph [0044]—This Paragraph [0044] illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described in Paragraph [0030], and the data to activate (as described in S3c of the previous paragraph) and to perform the video/photo mode is stored in Video/Photo Data Storage Area 20610a.

Paragraph [0045]—This Paragraph [0045] illustrates the software programs and data stored in Video/Photo Data Storage Area 20610a (Paragraph [0044]). In this embodiment, Video/Photo Data Storage Area 20610a includes Video/Photo Software Storage Area 20610b, Video Data Storage Area 20610c, Audio Data Storage Area 20610d, Photo Data Storage Area 20610e, Photo Sound Data Storage Area 20610f, and Indicator Data Storage Area 20610g. Video/Photo Software Storage Area 20610b stores the software programs described in Paragraph through Paragraph [0055], Paragraph [0058], Paragraph [0058], Paragraph [0063] through Paragraph [0065], Paragraph [0067], and Paragraph [0069]. Video Data Storage Area 20610c stores the data described in Paragraph [0046]. Audio Data Storage Area 20610d stores the data described in Paragraph [0047]. Photo Data Storage Area 20610e stores the data described in Paragraph [0048]. Photo Sound Data Storage Area 20610f stores a sound data (preferably a wave data) producing a sound similar to the one when a conventional camera is activated. Indicator Data Storage Area 20610g stores the data described in Paragraph [0049]. Video Data Storage Area 20610c and Audio Data Storage Area 20610d primarily stores the similar data stored in Area 267 (not shown) and Area 268 (not shown), respectively.

Paragraph [0046]—This Paragraph [0046] illustrates the data stored in Video Data Storage Area 20610c (Paragraph [0045]). Video Data Storage Area 20610c stores a plurality of video data which goes through the process described in Paragraph [0053] hereinafter. In the present example, six video data, i.e., Video #1, Video #2, Video #3, Video #4, Video #5, and Video #6, are currently stored in Video Data Storage Area 20610c. Message Data Storage Area (MS2a, MS3a) 20610h is also included in Video Data Storage Area 20610c, which stores the text data of MS2a ('REC') and MS3a ('STOP').

Paragraph [0047]—This Paragraph [0047] illustrates the data stored in Audio Data Storage Area 20610d (Paragraph [0045]). Audio Data Storage Area 20610d stores a plurality of audio data which goes through the process described in Paragraph [0053] hereinafter. In the present example, six audio data, i.e., Audio #1, Audio #2, Audio #3, Audio #4, Audio #5, and Audio #6 are currently stored in Audio Data Storage Area 20610d. Each audio data stored in Audio Data Storage Area 20610d corresponds to the video data stored in Video Data Storage Area 20610c (Paragraph [0046]). Namely, Video #1 corresponds to Audio #1, Video #2 corresponds to Audio #2, Video #3 corresponds to Audio #3, Video #4 corresponds to Audio #4, Video #5 corresponds to Audio #5, and Video #6 corresponds to Audio #6.

Paragraph [0048]—This Paragraph [0048] illustrates the data stored in Photo Data Storage Area 20610e (Paragraph [0045]). Photo Data Storage Area 20610e stores a plurality of photo data which goes through the process described in Paragraph [0067] hereinafter. In the present example, six photo data, i.e., Photo #1, Photo #2, Photo #3, Photo #4, Photo #5, and Photo #6 are currently stored in Photo Data Storage Area 20610e. Message Data Storage Area (MS4a) 20610i is also included in Photo Data Storage Area 20610e, which stores the text data of MS4a ('SHOT').

Paragraph [0049]—This Paragraph [0049] illustrates the data stored in Indicator Data Storage Area 20610g (Paragraph [0045]). Indicator Data Storage Area 20610g stores the data regarding the color of Indicator 212 (FIG. 1 and Paragraph [0042]) when Communication Device 200 is in a video mode or a photo mode. According to the data described in Paragraph [0049], Indicator 212 emits red light when Communication Device 200 is in the video mode and green light when Communication Device 200 is in the photo mode.

Paragraph [0050]—This Paragraph [0050] illustrates another example of the data stored in Indicator Data Storage Area 20610g (Paragraph [0045]). According to the data described in Paragraph [0050], Indicator 212 emits a predetermined color, however, with a different pattern. Namely, the light emitted from Indicator 212 turns on and off when Communication Device 200 is in the video mode, whereas the light remains on when Communication Device 200 is in the photo mode.

Paragraph [0051]—This Paragraph [0051] illustrates the software program stored in Video/Photo Software Storage Area 20610b (Paragraph [0045]). In this embodiment, CPU 211 (FIG. 1) displays a list of the selectable modes, i.e., the video mode and the photo mode (S1). One of the modes is selected by utilizing Input Device 210 (FIG. 1) or via voice recognition system (S2).

Paragraph [0052]—This Paragraph [0052] illustrates the software program stored in Video/Photo Software Storage Area 20610b (Paragraph [0045]). When the video mode is selected in S2 in Paragraph [0051], the video mode is initiated and CPU 211 (FIG. 1) is ready to capture and store the video data in one of the areas of Video Data Storage Area 20610c (Paragraph [0046]) (S1). Next, the video process is initiated which is described in details in Paragraph [0053] (S2a) until a specific signal is input by utilizing Input Device 210 (FIG. 1) or via voice recognition system (S3). The indicator process is activated simultaneously which is described in details in Paragraph [0054] hereinafter (S2*b*).

Paragraph [0053]—This Paragraph [0053] illustrates the video process of Communication Device 200, i.e., S2*a* of Paragraph [0052]. In this embodiment, the video data input from CCD Unit 214 (FIG. 1 and Paragraph [0042]) (S1*a*) is converted from analog data to digital data (S2*a*) and is processed by Video Processor 202 (FIG. 1) (S3*a*). The processed video data is stored in Video Data Storage Area 20610*c* (Paragraph [0046]) (S4*a*) and is displayed on LCD 201 (FIG. 1) (S5*a*). In this embodiment, the audio data input from Microphone 215 (FIG. 1) (S1*b*) is converted from analog data to digital data by A/D 213 (FIG. 1) (S2*b*) and is processed by Sound Processor 205 (FIG. 1) (S3*b*). The processed audio data is stored in Audio Data Storage Area 20610*d* (Paragraph [0047]) (S4*b*) and is transferred to Sound Processor 205 and is output from Speaker 216 (FIG. 1) via D/A 204 (FIG. 1) (S5*b*). The sequences of S1*a* through S5*a* and S1*b* through S5*b* are continued until a specific signal indicating to stop such sequence is input from Input Device 210 (FIG. 1) or by the voice recognition system (S6).

Paragraph [0054]—This Paragraph [0054] illustrates the indicator process of Communication Device 200, i.e., S2*b* of Paragraph [0052]. In this embodiment, CPU 211 (FIG. 1) scans the video mode section of Indicator Data Storage Area 20610*g* (Paragraph [0049]) and retrieves the indicator data therefrom (S1) and activates Indicator 212 (FIG. 1 and Paragraph [0042]) in accordance with the indicator data (S2). In the embodiment explained in Paragraph [0049], Indicator 212 emits red light while Communication Device 200 is in the video mode and Indicator 212 turns on and off in the embodiment explained in Paragraph [0050]. The sequences of S1 and S2 is continued until a specific signal indicating to stop such sequence is input from Input Device 210 (FIG. 1) or by the voice recognition system (S3).

Paragraph [0055]—This Paragraph [0055] illustrates the sequence to transfer the video data and the audio data via Antenna 218 (FIG. 1) in a wireless fashion. In this embodiment, CPU 211 (FIG. 1) initiates a dialing process (S1) until the line is connected to a host (not shown) (S2). As soon as the line is connected, CPU 211 reads the video data and the audio data stored in Video Data Storage Area 20610*c* (Paragraph [0046]) and Audio Data Storage Area 20610*d* (Paragraph [0047]) (S3) and transfers these data to Signal Processor 208 (FIG. 1) where these data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

Paragraph [0056]—This Paragraph [0056] illustrates the basic structure of the transferred data which is transferred from Communication Device 200 as described in S4 and S5 of Paragraph [0055]. Transferred Data 610*a* is primarily composed of Header 611*a*, Video Data 612*a*, Audio Data 613*a*, Relevant Data 614*a*, and Footer 615*a*. Video data 612*a* corresponds to the video data stored in Video Data Storage Area 20610*c* (Paragraph [0046]), and Audio Data 613*a* corresponds to the audio data stored in Audio Data Storage Area 20610*d* (Paragraph [0047]). Relevant Data 614*a* includes various types of data, such as the identification numbers of Device A (i.e., the transferor device) and Device B (i.e., the transferee device), a location data which represents the location of Device A, an email data transferred from Device A to Device B, etc. Header 611*a* and Footer 615*a* represent the beginning and the end of Transferred Data 610*a* respectively.

Paragraph [0057]—This Paragraph [0057] illustrates the data contained in RAM 206 (FIG. 1) of Device B (i.e., the transferee device). As illustrated in Paragraph [0057], RAM 206 includes Area 269*a* which stores video data, Area 270*a* which stores audio data, and Area 266*a* which is a work area utilized for the process explained hereinafter.

Paragraph [0058]—This Paragraph [0058] illustrates the software program stored in Device B. In this embodiment and Paragraph [0058], CPU 211 (FIG. 1) of Device B initiates a dialing process (S1) until Device B is connected to a host (not shown) (S2). Transferred Data 610*a* is received by Antenna 218 (FIG. 1) of Device B (S3) and is converted by Signal Processor 208 (FIG. 1) into data readable by CPU 211 (S4). Video data and audio data are retrieved from Transferred Data 610*a* and stored into Area 269*a* (Paragraph [0057]) and Area 270*a* (Paragraph [0057]) of RAM 206 respectively (S5). The video data stored in Area 269*a* is processed by Video Processor 202 (FIG. 1) (S6*a*). The processed video data is converted into an analog data (S7*a*) and displayed on LCD 201 (FIG. 1) (S8*a*). S7*a* may not be necessary depending on the type of LCD 201 used. The audio data stored in Area 270*a* is processed by Sound Processor 205 (FIG. 1) (S6*b*). The processed audio data is converted into analog data by D/A 204 (FIG. 1) (S7*b*) and output from Speaker 216 (FIG. 1) (S8*b*). The sequences of S6*a* through S8*a* and S6*b* through S8*b* are continued until a specific signal indicating to stop such sequence is input by utilizing Input Device 210 (FIG. 1) or via the voice recognition system (S9).

Paragraph [0059]—In this embodiment, Message MS1*a* is shown at the upper right corner of LCD 201 (FIG. 1) indicating that a new email has arrived while video/photo mode is implemented.

Paragraph [0060]—This Paragraph [0060] illustrates the data stored in Email Data Calculating Area 206*c* (not shown) and Email Data Storage Area 206*d* (not shown) in order to implement the incoming message function. Email Data Calculating Area 206*c* includes Incoming Message Calculating Area 206*k* which stores a software program described in Paragraph [0061] hereinafter, and Email Data Storage Area 206*d* includes Message Data Storage Area (MS1*a*) 206*ma* which stores the text data of MS1*a* (in the present example, the text data 'Email').

Paragraph [0061]—This Paragraph [0061] illustrates the software program stored in Incoming Message Calculating Area 206*k* (Paragraph [0060]). First of all, CPU 211 (FIG. 1) checks whether a new incoming message has arrived by scanning Email Data Storage Area 206*d* (Paragraph [0060]) (S1). If a new message has arrived (S2), CPU 211 retrieves the text data (MS1*a*) from Message Data Storage Area (MS1*a*) 206*ma* and displays on LCD 201 (FIG. 1) for a specified period of time (S3). The software program is executed periodically with a fixed interval.

Paragraph [0062]—In this embodiment, Message MS2*a* is shown on LCD 201 (FIG. 1) when the video recording function is implemented, and Message MS3*a* is shown when the implementation of the video recording function has been terminated.

Paragraph [0063]—This Paragraph [0063] illustrates the software program stored in Video/Photo Software Storage Area 20610*b* (Paragraph [0045]) to display messages MS2*a* and MS3*a* on LCD 201 (FIG. 1). When a start recording signal has been input by utilizing Input Device 210 (FIG. 1) or via voice recognition system, CPU 211 (FIG. 1) initiates the recording process, i.e., the process described in Paragraph [0053] hereinbefore (S1). During the recording process, the text data of Message MS2a is retrieved from Message Data Storage Area (MS2a, MS3a) 20610h (Paragraph [0046]) and displayed at the upper right corner of LCD 201 (FIG. 1) indicating that the video recording function is in process (S2). If the stop recording signal is input by utilizing Input Device 210 (FIG. 1) or via voice recognition system indicating to stop the video recording process (S3), CPU 211 stops the video recording process (S4), and retrieves the text data of Message MS3a from Message Data Storage Area (MS2a, MS3a) 20610h and displays at the upper right corner of LCD 201 for a specified period of time (S5). Since Video Data Storage Area 20610c and Audio Data Storage Area 20610d are divided into several sectors as stated above, a plurality of software program described in Paragraph [0063] can be activated to record and store a plurality of video data and the corresponding audio data simultaneously.

Paragraph [0064]—This Paragraph [0064] illustrates the software program stored in Video/Photo Software Storage Area 20610b (Paragraph [0045]) to playback the recorded video data and the corresponding audio data. First, a video data is selected and playback signal is input by utilizing Input Device 210 (FIG. 1) or via voice recognition system (S1). Once these signals are received, CPU 211 (FIG. 1) initiates the playback process of the recorded video data, i.e., CPU 211 retrieves the selected video data from Video Data Storage Area 20610c (Paragraph [0046]) and the corresponding audio data from Audio Data Storage Area 20610d (Paragraph [0047]), and Video Processor 202 (FIG. 1) processes the channel data to be displayed on LCD 201 (FIG. 1) (S2). This playback process continues until a stop playback signal is input by utilizing Input Device 210 or via voice recognition system (S3). When a stop playback signal is input by utilizing Input Device 210 or via voice recognition system, CPU 211 stops the foregoing process, and retrieves the text data of Message MS3a from Message Data Storage Area (MS2a, MS3a) 20610h (Paragraph [0046]) and displays at the upper right corner of LCD 201 for a specified period of time (S4).

Paragraph [0065]—This Paragraph [0065] illustrates the software program stored in Video/Photo Software Storage Area 20610b (Paragraph [0045]). When the photo mode is selected in S2 in Paragraph [0051], the photo mode is initiated and CPU 211 (FIG. 1) is ready to capture and store the photo data in one of the areas of Photo Data Storage Area 20610e (Paragraph [0048]) (S1). Next, the photo process is initiated which is described in details in Paragraph [0067] (S2a) until a specific signal is input by utilizing Input Device 210 (FIG. 1) or via voice recognition system (S3). The indicator process is activated simultaneously which is described in details in Paragraph [0069] hereinafter (S2b).

Paragraph [0066]—In this embodiment, Message MS4a is shown on LCD 201 (FIG. 1) when a photo is taken with Communication Device 200.

Paragraph [0067]—This Paragraph [0067] illustrates the software program stored in Video/Photo Software Storage Area 20610b (Paragraph [0045]) to implement the photo mode. When a start recording signal has been input by utilizing Input Device 210 (FIG. 1) or via voice recognition system (S1), CPU 211 (FIG. 1) initiates the recording process, i.e., retrieves an image data input from CCD Unit 214 (FIG. 1), which is currently displayed on LCD 201 (FIG. 1), and stores in one of the sectors of Photo Data Storage Area 20610e (Paragraph [0048]), for example Photo #1 described in Paragraph [0048] (S2). CPU 211 retrieves the text data of Message MS4a from Message Data Storage Area (MS4a) 20610i (Paragraph [0048]) and displays at the upper right corner of LCD 201 (FIG. 1) for a specific period of time indicating that a photo data has been taken and stored (S3). Then CPU 211 retrieves the photo data which is just stored in Photo Data Storage Area 20610e, and Video Processor 202 (FIG. 1) processes the photo data to be displayed on LCD 201 (FIG. 1) for a specific period of time (S4). Since Photo Data Storage Area 20610e is divided into several sectors as stated above, S1 from S4 can be repeated to record and store a plurality of image data.

Paragraph [0068]—This Paragraph [0068] illustrates the software program stored in Video/Photo Software Storage Area 20610b (Paragraph [0045]) to display the recorded photo data. First, a photo data is selected by utilizing Input Device 210 (FIG. 1) or via voice recognition system (S1). When this signal is received, CPU 211 (FIG. 1) initiates the display process of the recorded photo data, i.e., CPU 211 retrieves the selected photo data from Photo Data Storage Area 20610e, for example Photo #1 described in Paragraph [0048], and Video Processor 202 (FIG. 1) processes the selected photo data to be displayed on LCD 201 (FIG. 1) (S2). The photo data is displayed until a close signal is input by utilizing Input Device 210 or via voice recognition system (S3). When a close signal is input by utilizing Input Device 210 or via voice recognition system, CPU 211 terminates to display the photo data (S4).

Paragraph [0069]—This Paragraph [0069] illustrates the software program stored in Video/Photo Software Storage Area 20610b (Paragraph [0045]) which implements the indicator process of Communication Device 200, i.e., S2b of Paragraph [0065]. In this embodiment, CPU 211 (FIG. 1) scans the photo mode section of Indicator Data Storage Area 20610g (Paragraph [0049]) and retrieves an indicator data therefrom (S1) and activate Indicator 212 (FIG. 1 and Paragraph [0042]) in accordance with the indicator data (S2). In the embodiment explained in Paragraph [0049], Indicator 212 emits green light while Communication Device 200 is in the photo mode and Indicator 212 remains to be on in the embodiment explained in Paragraph [0050]. The sequence of S1 through S2 is continued until a specific signal indicating to stop such sequence is input from Input Device 210 (FIG. 1) or by the voice recognition system (S3).

Paragraph [0070]—<<Calculator Function>>

Paragraph [0071]—Paragraph [0072] through Paragraph [0075] illustrate the calculator function of Communication Device 200. Communication Device 200 can be utilized as a calculator to perform mathematical calculation by implementing the present function.

Paragraph [0072]—This Paragraph [0072] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in Paragraph [0029], and the calculator function is activated (S3c) when the calculator function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Paragraph [0073]—This Paragraph [0073] illustrates the data stored in RAM 206 (FIG. 1). In this embodiment, the data to activate (as described in S3*a* of the previous paragraph) and to perform the communication mode is stored in Communication Data Storage Area 2061*a*, the data to activate (as described in S3*b* of the previous paragraph) and to perform the game download mode and the game play mode are stored in Game DL/Play Data Storage Area 2061*b*/2061*c* of which the details are described in Paragraph [0030], and the data to activate (as described in S3*c* of the previous paragraph) and to perform the calculator function is stored in Calculator Information Storage Area 20615*a*.

Paragraph [0074]—This Paragraph [0074] illustrates the data stored in Calculator Information Storage Area 20615*a* (Paragraph [0073]). In this embodiment, Calculator Information Storage Area 20615*a* includes Calculator Software Storage Area 20615*b* and Calculator Data Storages Area 20615*c*. Calculator Software Storage Area 20615*b* stores the software programs to implement the present function, such as the one explained in Paragraph [0075], and Calculator Data Storage Area 20615*c* stores a plurality of data necessary to execute the software programs stored in Calculator Software Storage Area 20615*b* and to implement the present function.

Paragraph [0075]—This Paragraph [0075] illustrates the software program stored in Calculator Storage Area 20615*b* (Paragraph [0074]). In this embodiment, one or more of numeric data are input by utilizing Input Device 210 (FIG. 1) or via voice recognition system as well as the arithmetic operators (e.g., '+', '−', and '×'), which are temporarily stored in Calculator Data Storage Area 20615*c* (S1). By utilizing the data stored in Calculator Data Storage Area 20615*c*, CPU 211 (FIG. 1) performs the calculation by executing the software program stored in Calculator Software Storage Area 20615*b* (Paragraph [0074]) (S2). The result of the calculation is displayed on LCD 201 (FIG. 1) thereafter (S3).

Paragraph [0076]—<<Spreadsheet Function>>

Paragraph [0077]—Paragraph [0078] through Paragraph [0081] illustrate the spreadsheet function of Communication Device 200. Here, the spreadsheet is composed of a plurality of cells which are aligned in matrix. In other words, the spreadsheet is divided into a plurality of rows and columns in which alphanumeric data is capable to be input. Microsoft Excel is the typical example of the spreadsheet.

Paragraph [0078]—This Paragraph [0078] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in Paragraph [0029], and the spreadsheet function is activated (S3*c*) when the spreadsheet function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Paragraph [0079]—This Paragraph [0079] illustrates the data stored in RAM 206 (FIG. 1). In this embodiment, the data to activate (as described in S1*a* of the previous paragraph) and to perform the communication mode is stored in Communication Data Storage Area 2061*a*, the data to activate (as described in S1*b* of the previous paragraph) and to perform the game download mode and the game play mode are stored in Game DL/Play Data Storage Area 2061*b*/2061*c* of which the details are described in Paragraph [0030], and the data to activate (as described in S3*c* of the previous paragraph) and to perform the spreadsheet function is stored in Spreadsheet Information Storage Area 20616*a*.

Paragraph [0080]—This Paragraph [0080] illustrates the data stored in Spreadsheet Information Storage Area 20616*a* (Paragraph [0079]). In this embodiment, Spreadsheet Information Storage Area 20616*a* includes Spreadsheet Software Storage Area 20616*b* and Spreadsheet Data Storage Area 20616*c*. Spreadsheet Software Storage Area 20616*b* stores the software programs to implement the present function, such as the one explained in Paragraph [0081], and Spreadsheet Data Storage Area 20616*c* stores a plurality of data necessary to execute the software programs stored in Spreadsheet Software Storage Area 20616*b* and to implement the present function.

Paragraph [0081]—This Paragraph [0081] illustrates the software program stored in Spreadsheet Software Storage Area 20616*b* (Paragraph [0080]). In this embodiment, a certain cell of a plurality of cells displayed on LCD 201 (FIG. 1) is selected by utilizing Input Device 210 (FIG. 1) or via voice recognition system. The selected cell is highlighted by a certain manner, and CPU 211 (FIG. 1) stores the location of the selected cell in Spreadsheet Data Storage Area 20616*c* (Paragraph [0080]) (S1). One or more of alphanumeric data are input by utilizing Input Device 210 or via voice recognition system into the cell selected in S1, and CPU 211 stores the alphanumeric data in Spreadsheet Data Storage Area 20616*c* (S2). CPU 211 displays the alphanumeric data on LCD 201 thereafter (S3). The sequence of S1 through S3 can be repeated for a numerous amount of times and saved and closed thereafter.

Paragraph [0082]—<<Word Processing Function>>

Paragraph [0083]—Paragraph [0084] through Paragraph [0097] illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected paragraphs.

Paragraph [0084]—This Paragraph [0084] illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in Paragraph [0029], and the word processing function is activated (S3c) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Paragraph [0085]—This Paragraph [0085] illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described in Paragraph [0030], and the data to activate (as described in S3c of the previous paragraph) and to perform the word processing function is stored in Word Processing Information Storage Area 20617a.

Paragraph [0086]—This Paragraph [0086] illustrates the data stored in Word Processing Information Storage Area 20617a (Paragraph [0085]). In this embodiment, Word Processing Information Storage Area 20617a includes Word Processing Software Storage Area 20617b and Word Processing Data Storage Area 20617c. Word processing Software Storage Area 20617b stores the software programs described in Paragraph [0087] hereinafter, and Word Processing Data Storage Area 20617c stores a plurality of data described in Paragraph [0088] hereinafter.

Paragraph [0087]—This Paragraph [0087] illustrates the software programs stored in Word Processing Software Storage Area 20617b (Paragraph [0086]). In this embodiment, Word Processing Software Storage Area 20617b stores Alphanumeric Data Input Software 20617b1, Bold Formatting Software 20617b2, Italic Formatting Software 20617b3, Image Pasting Software 20617b4, Font Formatting Software 20617b5, Spell Check Software 20617b6, Underlining Software 20617b7, Page Numbering Software 20617b8, and Bullets And Numbering Software 20617b9. Alphanumeric Data Input Software 20617b1 inputs to a document a series of alphanumeric data in accordance to the input signals produced by utilizing Input Device 210 (FIG. 1) or via voice recognition system. Bold Formatting Software 20617b2 implements the bold formatting function which makes the selected alphanumeric data bold of which the sequence is described in Paragraph [0090]. Italic Formatting Software 20617b3 implements the italic formatting function which makes the selected alphanumeric data italic of which the sequence is described in Paragraph [0091]. Image Pasting Software 20617b4 implements the image pasting function which pastes the selected image to a document to the selected location of which the sequence is described in Paragraph [0092]. Font Formatting Software 20617b5 implements the font formatting function which changes the selected alphanumeric data to the selected font of which the sequence is described in Paragraph [0093]. Spell Check Software 20617b6 implements the spell check function which fixes spelling and grammatical errors of the alphanumeric data in a document of which the sequence is described in Paragraph [0094]. Underlining Software 20617b7 implements the underlining function which adds the selected underlines to the selected alphanumeric data of which the sequence is described in Paragraph [0095]. Page Numbering Software 20617b8 implements the page numbering function which adds page numbers at the selected location to each page of a document of which the sequence is described in Paragraph [0096]. Bullets And Numbering Software 20617b9 implements the bullets and numbering function which adds the selected type of bullets and numbers to the selected paragraphs of which the sequence is described in Paragraph [0097].

Paragraph [0088]—This Paragraph [0088] illustrates the data stored in Word Processing Data Storage Area 20617c (Paragraph [0086]). In this embodiment, Word Processing Data Storage Area 20617c includes Alphanumeric Data Storage Area 20617c1, Bold Formatting Data Storage Area 20617c2, Italic Formatting Data Storage Area 20617c3, Image Data Storage Area 20617c4, Font Formatting Data Storage Area 20617c5, Spell Check Data Storage Area 20617c6, Underlining Data Storage Area 20617c7, Page Numbering Data Storage Area 20617c8, and Bullets And Numbering Data Storage Area 20617c9. Alphanumeric Data Storage Area 20617c1 stores the basic text and numeric data which are not decorated by bold and/or italic (the default font may be courier new). Bold Formatting Data Storage Area 20617c2 stores the text and numeric data which are decorated by bold. Italic Formatting Data Storage Area 20617c3 stores the text and numeric data which are decorated by italic. Image Data Storage Area 20617c4 stores the data representing the location of the image data pasted in a document and the image data itself. Font Formatting Data Storage Area 20617c5 stores a plurality of types of fonts, such as anal, century, courier new, tahoma, and times new roman, of all text and numeric data stored in Alphanumeric Data Storage Area 20617c1. Spell check Data Storage Area 20617c6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617c7 stores a plurality of data representing underlines of different types. Page Numbering Data Storage Area 20617c8 stores the data representing the location of page numbers to be displayed in a document and the page number of each page of a document. Bullets And Numbering Data Storage Area 20617c9 stores a plurality of data representing different types of bullets and numbering and the location which they are added.

Paragraph [0089]—This Paragraph [0089] illustrates the sequence of the software program stored in Alphanumeric Data Input Software 20617b1. In this embodiment, a plurality of alphanumeric data is input by utilizing Input Device 210 (FIG. 1) or via voice recognition system (S1). The corresponding alphanufneric data is retrieved from Alphanumeric Data Storage Area 20617c1 (Paragraph [0088]) (S2), and the document including the alphanumeric data retrieved in S2 is displayed on LCD 201 (FIG. 1) (S3).

Paragraph [0090]—This Paragraph [0090] illustrates the sequence of the software program stored in Bold Formatting Software 20617b2. In this embodiment, one or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617c2 (Paragraph [0088]) (S3), and replaces the alphanumeric data selected in S1 with the bold formatting data retrieved in S3 (S4). The document with the replaced bold formatting data is displayed on LCD 201 thereafter (S5).

Paragraph [0091]—This Paragraph [0091] illustrates the sequence of the software program stored in Italic Formatting Software 20617b3. In this embodiment, one or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617c3 (Paragraph [0088]) (S3), and replaces the alphanumeric data selected in S1 with the italic formatting data retrieved in S3 (S4). The document with the replaced italic formatting data is displayed on LCD 201 thereafter (S5).

Paragraph [0092]—This Paragraph [0092] illustrates the sequence of the software program stored in Image Pasting Software 20617b4. In this embodiment, the image to be pasted is selected by utilizing Input Device 210 (FIG. 1) or via voice recognition system (S1). Here, the image may be of any type, such as JPEG, GIF, and TIFF. Next the location in a document where the image is to be pasted is selected by utilizing Input Device 210 or via voice recognition system (S2). The data representing the location is stored in Image Pasting Data Storage Area 20617c4 (Paragraph [0088]). The image is pasted at the location selected in S2 and the image is stored in Image Pasting Data Storage Area 20617c4 (S3). The document with the pasted image is displayed on LCD 201 (FIG. 1) thereafter (S4).

Paragraph [0093]—This Paragraph [0093] illustrates the sequence of the software program stored in Font Formatting Software 20617b5. In this embodiment, one or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617c5 (Paragraph [0088]) (S3), and replaces the alphanumeric data selected in S1 with the font formatting data retrieved in S3 (S4). The document with the replaced font formatting data is displayed on LCD 201 thereafter (S5).

Paragraph [0094]—This Paragraph [0094] illustrates the sequence of the software program stored in Spell Check Software 20617b6. In this embodiment, CPU 211 (FIG. 1) scans all alphanumeric data in a document (S1). CPU 211 then compares the alphanumeric data with the spell check data stored in Spell Check Data Storage Area 20617c6 (Paragraph [0088]), i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4).

Paragraph [0095]—This Paragraph [0095] illustrates the sequence of the software program stored in Underlining Software 20617b7. In this embodiment, one or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617c7 (Paragraph [0088]) (S3), and adds to the alphanumeric data selected in S1 (S4). The document with underlines added to the selected alphanumeric data is displayed on LCD 201 thereafter (S5).

Paragraph [0096]—This Paragraph [0096] illustrates the sequence of the software program stored in Page Numbering Software 20617b8. In this embodiment, a page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617c8 (Paragraph [0088]), and adds the page number to each page of a document at the selected location (S3). The document with page numbers is displayed on LCD 201 thereafter (S4).

Paragraph [0097]—This Paragraph [0097] illustrates the sequence of the software program stored in Bullets And Numbering Software 20617b9. In this embodiment, a paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the paragraph selected in S1 and the type of the bullets and/or numbering in Bullets And Numbering Data Storage Area 20617c9 (Paragraph [0088]), and adds the bullets and/or numbering to the selected paragraph of a document (S3). The document with the bullets and/or numbering is displayed on LCD 201 thereafter (S4).

Paragraph [0098]—<<Start Up Software Function>>

Paragraph [0099]—Paragraph [0100] through Paragraph [0109] illustrate the start up software program function which enables Communication Device 200 to automatically activate (or start up) the registered software programs when the power is on.

Paragraph [0100]—This Paragraph [0100] illustrates the overall sequence of the present function. In this embodiment, the user of Communication Device 200 presses the power button of Communication Device 200 (S1). Then the predetermined software programs automatically activate (or start up) without having any instructions from the user of Communication Device 200 (S2).

Paragraph [0101]—This Paragraph [0101] illustrates the storage area included RAM 206 (FIG. 1). In this embodiment, RAM 206 includes Start Up Information Storage Area 20621a which is described in Paragraph [0102] hereinafter.

Paragraph [0102]—This Paragraph [0102] illustrates the storage areas included in Start Up Information Storage Area 20621a (Paragraph [0101]). In this embodiment, Start Up Information Storage Area 20621a includes Start Up Software Storage Area 20621b and Start Up Data Storage Area 20621c. Start Up Software Storage Area 20621b stores the software programs necessary to implement the present function, such as the ones described in Paragraph [0103] hereinafter. Start Up Data Storage Area 20621c stores the data necessary to implement the present function, such as the ones described in Paragraph [0105] hereinafter.

Paragraph [0103]—This Paragraph [0103] illustrates the software programs stored in Start Up Software Storage Area 20621b (Paragraph [0102]). In this embodiment, Start Up Software Storage Area 20621b stores Power On Detecting Software 2062 1b1, Start Up Data Storage Area Scanning Software 20621b2, and Start Up Software Activating Software 20621*b*3. Power On Detecting Software 20621*b*1 detects whether the power of Communication Device 200 is on of which the sequence is described in Paragraph [0106] hereinafter, Start Up Data Storage Area Scanning Software 20621*b*2 identifies the software programs which are automatically activated of which the sequence is described in Paragraph [0107] hereinafter, and Start Up Software Activating Software 20621*b*3 activates the identified software programs identified by Start Up Data Storage Area Scanning Software 20621*b*2 of which the sequence is described in Paragraph [0108] hereinafter.

Paragraph [0104]—This Paragraph [0104] illustrates the storage area included in Start Up Data Storage Area 20621*c* (Paragraph [0102]). In this embodiment, Start Up Data Storage Area 20621*c* includes Start Up Software Index Storage Area 20621*c*1. Here, Start Up Software Index Storage Area 20621*c*1 stores the software program indexes, wherein a software program index is an unique information assigned to each software program as an identifier (e.g., title of a software program) of which the details are explained in Paragraph [0105] hereinafter.

Paragraph [0105]—This Paragraph [0105] illustrates the data stored in Start Up Software Index Storage Area 20621*c*1 (Paragraph [0104]). In this embodiment, Start Up Software Index Storage Area 20621*c*1 stores the software program indexes of the software programs which are automatically activated by the present function. Here, the software programs may be any software programs explained in this specification, and the storage areas where these software programs are stored are explained in the relevant paragraphs thereto. Three software program indexes, i.e., Start Up Software Index 20621*c*1*a*, Start Up Software Index 20621*c*1*b*, and Start Up Software Index 20621*c*1*c*, are stored in Start Up Software Index Storage Area 20621*c*1 in the present example. The software program indexes can be created and store in Start Up Software Index Storage Area 20621*c*1 manually by utilizing input device 210 (FIG. 1) or via voice recognition system.

Paragraph [0106]—This Paragraph [0106] illustrates the sequence of Power On Detecting Software 20621*b*1 stored in Start Up Software Storage Area 20621*b* (Paragraph [0103]). In this embodiment, CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621*b*2 (Paragraph [0103]) of which the sequence is explained in Paragraph [0107] hereinafter.

Paragraph [0107]—This Paragraph [0107] illustrates the sequence of Start Up Data Storage Area Scanning Software 20621*b*2 stored in Start Up Software Storage Area 20621*b* (Paragraph [0103]). In this embodiment, CPU 211 (FIG. 1) scans Start Up Software Index Storage Area 20621*c*1 (Paragraph [0105]) (S1), and identifies the software programs which are automatically activated (S2). CPU 211 activates Start Up Software Activating Software 20621*b*3 (Paragraph [0103]) thereafter of which the sequence is explained in Paragraph [0108] hereinafter (S3).

Paragraph [0108]—This Paragraph [0108] illustrates the sequence of Start Up Software Activating Software 20621*b*3 stored in Start Up Software Storage Area 20621*b* (Paragraph [0103]). In this embodiment, CPU 211 (FIG. 1) activates the software programs of which the software program indexes are identified in S2 of Paragraph [0107] hereinbefore (S1).

Paragraph [0109]—This Paragraph [0109] illustrates another embodiment wherein the three software programs stored in Start Up Software Storage Area 20621*b* (Paragraph [0103]) (i.e., Power On Detecting Software 20621*b*1, Start Up Data Storage Area Scanning Software 20621*b*2, Start Up Software Activating Software 20621*b*3) is integrated into one software program stored therein. In this embodiment, CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621*c*1 (Paragraph [0104]) (S3), and identifies the software programs which are automatically activated (S4). CPU 211 activates the software programs thereafter of which the software program indexes are identified in S4 (S5).

Paragraph [0110]—As another embodiment, the software programs per se (not the software program indexes as described in Paragraph [0105]) may be stored in a specific storage area which are activated by the present function.

Paragraph [0111]—As another embodiment, the present function may be implemented at the time the user of Communication Device 200 logs on instead of at the time the Communication Device 200 is powered as described in S2 of Paragraph [0106].

Paragraph [0112]—<<Stereo Audio Data Output Function>>

Paragraph [0113]—Paragraph [0114] through Paragraph [0126] illustrate the stereo audio data output function which enables Communication Device 200 to output audio data from Speakers 216L and 216R (not shown) in a stereo fashion.

Paragraph [0114]—This Paragraph [0114] illustrates the storage area included in Host Data Storage Area H00*c* of Host H (Paragraph [0025]). In this embodiment, Host Data Storage Area H00*c* includes Stereo Audio Information Storage Area H22*a*. Stereo Audio Information Storage Area H22*a* stores the software programs and data necessary to implement the present function as described in details hereinafter.

Paragraph [0115]—This Paragraph [0115] illustrates the storage areas included in Stereo Audio Information Storage Area H22*a* (Paragraph [0114]). In this embodiment, Stereo Audio Information Storage Area H22*a* includes Stereo Audio Software Storage Area H22*b* and Stereo Audio Data Storage Area H22*c*. Stereo Audio Software Storage Area H22*b* stores the software programs necessary to implement the present function, such as the one described in Paragraph [0118] hereinafter. Stereo Audio Data Storage Area H22*c* stores the data necessary to implement the present function, such as the ones described in Paragraph [0116] hereinafter.

Paragraph [0116]—This Paragraph [0116] illustrates the stereo audio data stored in Stereo Audio Data Storage Area H22*c* (Paragraph [0115]). A plurality of stereo audio data are stored in Stereo Audio Data Storage Area H22*c*. In the example described in Paragraph [0116], three stereo audio data, i.e., Stereo Audio Data H22*c*1, Stereo Audio Data H22*c*2, and Stereo Audio Data H22*c*3 are stored therein.

Paragraph [0117]—This Paragraph [0117] illustrates the components of the stereo audio data stored in Stereo Audio Data Storage Area H22*c* (Paragraph [0116]). This Paragraph describes the components of Stereo Audio Data H22*c*1 (Paragraph [0116]) as an example. In this embodiment, Stereo Audio Data H22*c*1 includes Left Speaker Audio Data H22*c*1L, Right Speaker Audio Data H22*c*1R, and Stereo Audio Data Output Timing Data H22*c*1T. Left Speaker Audio Data H22*c*1L is an audio data which is designed to be output from Speaker 216L (not shown). Right Speaker Audio Data H22*c*1R is an audio data which is designed to be output from Speaker 216R (not shown). Stereo Audio Data Output Timing Data H22c1T is a timing data which is utilized to synchronize the output of both Left Speaker Audio Data H22c1L and Right Speaker Audio Data H22c1R from Speaker 216R and Speaker 216L respectively.

Paragraph [0118]—This Paragraph [0118] illustrates the sequence of the software program stored in Stereo Audio Software Storage Area H22b (Paragraph [0115]). In this embodiment, the software program stored in Stereo Audio Software Storage Area H22b extracts one of the stereo audio data stored in Stereo Audio Data Storage Area H22c (Paragraph [0116]) and creates Transferred Stereo Audio Data TSAD for purposes of transferring the extracted stereo audio data to Communication Device 200 (S1).

Paragraph [0119]—This Paragraph [0119] illustrates the components of Transferred Stereo Audio Data TSAD created by the software program stored in Stereo Audio Software Storage Area H22b (Paragraph [0118]). In this embodiment, Transferred Stereo Audio Data TSAD is composed of Header TSAD1, Com Device ID TSAD2, Host ID TSAD3, Transferred Stereo Audio Data TSAD4, and Footer TSAD5. Corn Device ID TSAD2 indicates the identification of Communication Device 200, Host ID TSAD3 indicates the identification of Host H (Paragraph [0025]), and Transferred Stereo Audio Data TSAD4 is the stereo audio data extracted in the manner described in Paragraph [0118]. Header TSAD1 and Footer TSAD5 indicate the beginning and the end of Transferred Stereo Audio Data TSAD.

Paragraph [0120]—This Paragraph [0120] illustrates the storage area included in RAM 206 (FIG. 1) of Communication Device 200 (Paragraph [0025]). In this embodiment, RAM 206 includes Stereo Audio Information Storage Area 20622a. Stereo Audio Information Storage Area 20622a stores the software programs and data necessary to implement the present function as described in details hereinafter.

Paragraph [0121]—This Paragraph [0121] illustrates the storage areas included in Stereo Audio Information Storage Area 20622a (Paragraph [0120]). In this embodiment, Stereo Audio Information Storage Area 20622a includes Stereo Audio Software Storage Area 20622b and Stereo Audio Data Storage Area 20622c. Stereo Audio Software Storage Area 20622b stores the software programs necessary to implement the present function, such as the ones described in Paragraph [0125] and Paragraph [0126] hereinafter. Stereo Audio Data Storage Area 20622c stores the data necessary to implement the present function, such as the ones described in Paragraph [0122] hereinafter.

Paragraph [0122]—This Paragraph [0122] illustrates the stereo audio data stored in Stereo Audio Data Storage Area 20622c (Paragraph [0121]). A plurality of stereo audio data are stored in Stereo Audio Data Storage Area 20622c. In the example described in Paragraph [0122], three stereo audio data, i.e., Stereo Audio Data 20622c1, Stereo Audio Data 20622c2, and Stereo Audio Data 20622c3 are stored therein.

Paragraph [0123]—This Paragraph [0123] illustrates the components of the stereo audio data stored in Stereo Audio Data Storage Area 20622c (Paragraph [0122]). Paragraph describes the components of Stereo Audio Data 20622c1 (Paragraph [0122]) as an example. In this embodiment, Stereo Audio Data 20622c1 includes Left Speaker Audio Data 20622c1L, Right Speaker Audio Data 20622c1R, and Stereo Audio Data Output Timing Data 20622c1T. Left Speaker Audio Data 20622c1L is an audio data which is designed to be output from Speaker 216L (not shown). Right Speaker Audio Data 20622c1R is an audio data which is designed to be output from Speaker 216R (not shown). Stereo Audio Data Output Timing Data 20622c1T is a timing data which is utilized to synchronize the output of both Left Speaker Audio Data 20622c1L and Right Speaker Audio Data 20622c1R from Speaker 216R and Speaker 216L respectively.

Paragraph [0124]—The downloaded stereo audio data are stored in specific area(s) of Stereo Audio Data Storage Area 20622c (Paragraph [0122]).

Paragraph [0125]—This Paragraph [0125] illustrates the sequence of selecting and preparing to output the stereo audio data from Speakers 216L and 216R (not shown) in a stereo fashion. In this embodiment, a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622c1 is selected (Paragraph [0122]) in S2, CPU 211 (FIG. 1) retrieves Left Speaker Audio Data 20622c1L (S3), Right Speaker Audio Data 20622c1R (S4), and Stereo Audio Data Output Timing Data 20622c1T from Stereo Audio Data Storage Area 20622c (Paragraph [0122]) (S5).

Paragraph [0126]—This Paragraph [0126] illustrates the sequence of outputting the stereo audio data from Speakers 216L and 216R (not shown) in a stereo fashion. In this embodiment, the user of Communication Device 200 inputs a specific signal to output the stereo audio data by utilizing Input Device 210 (FIG. 1) or via voice recognition system (S1). Assuming Audio Data 20622c1 (Paragraph [0122]) is selected in S2 of Paragraph [0125], CPU 211 outputs Left Speaker Audio Data 20622c1L (Paragraph [0123]) and Right Speaker Audio Data 20622c1R (Paragraph [0123]) from Speakers 216L and 216R respectively in a stereo fashion in accordance with Stereo Audio Data Output Timing Data 20622c1T (Paragraph [0123]) (S2).

Paragraph [0127]—<<Stereo Visual Data Output Function>>

Paragraph [0128]—Paragraph [0129] through Paragraph [0141] illustrate the stereo visual data output function which enables Communication Device 200 to output visual data from LCDs 201L and 201R (not shown) in a stereo fashion.

Paragraph [0129]—This Paragraph [0129] illustrates the storage area included in Host Data Storage Area H00c (not shown) of Host H (Paragraph [0025]). In this embodiment, Host Data Storage Area H00c includes Stereo Visual Information Storage Area H23a. Stereo Visual Information Storage Area H23a stores the software programs and data necessary to implement the present function as described in details hereinafter.

Paragraph [0130]—This Paragraph [0130] illustrates the storage areas included in Stereo Visual Information Storage Area H23a (Paragraph [0129]). In this embodiment, Stereo Visual Information Storage Area H23a includes Stereo Visual Software Storage Area H23b and Stereo Visual Data Storage Area H23c. Stereo Visual Software Storage Area H23b stores the software programs necessary to implement the present function, such as the one described in Paragraph [0133] hereinafter. Stereo Visual Data Storage Area H23c stores the data necessary to implement the present function, such as the ones described in Paragraph [0131] hereinafter.

Paragraph [0131]—This Paragraph [0131] illustrates the stereo visual data stored in Stereo Visual Data Storage Area H23c (Paragraph [0130]). A plurality of stereo visual data are stored in Stereo Visual Data Storage Area H23c. In the example described in Paragraph [0131], three stereo visual data, i.e., Stereo Visual Data H23c1, Stereo Visual Data H23c2, and Stereo Visual Data H23c3 are stored therein.

Paragraph [0132]—This Paragraph [0132] illustrates the components of the stereo visual data stored in Stereo Visual Data Storage Area H23c (Paragraph [0131]). Paragraph [0132] describes the components of Stereo Visual Data H23c1 (Paragraph [0131]) as an example. In this embodiment, Stereo Visual Data H23c1 includes Left LCD Visual Data H23c1L, Right LCD Visual Data H23c1R, and Stereo Visual Data Output Timing Data H23c1T. Left LCD Visual Data H23c1L is a visual data which is designed to be output from LCD 201L (not shown). Right LCD Visual Data H23c1R is a visual data which is designed to be output from LCD 201R (not shown). Stereo Visual Data Output Timing Data H23c1T is a timing data which is utilized to synchronize the output of both Left LCD Visual Data H23c1L and Right LCD Visual Data H23c1R from LCD 201R and LCD 201L respectively.

Paragraph [0133]—This Paragraph [0133] illustrates the sequence of the software program stored in Stereo Visual Software Storage Area H23b (Paragraph [0130]). In this embodiment, the software program stored in Stereo Visual Software Storage Area H23b extracts one of the stereo visual data stored in Stereo Visual Data Storage Area H23c (Paragraph [0131]) and creates Transferred Stereo Visual Data TSVD for purposes of transferring the extracted stereo visual data to Communication Device 200 (S1).

Paragraph [0134]—This Paragraph [0134] illustrates the components of Transferred Stereo Visual Data TSVD created by the software program stored in Stereo Visual Software Storage Area H23b (Paragraph [0133]). In this embodiment, Transferred Stereo Visual Data TSVD is composed of Header TSVD1, Corn Device ID TSVD2, Host ID TSVD3, Transferred Stereo Visual Data TSVD4, and Footer TSVD5. Corn Device ID TSVD2 indicates the identification of Communication Device 200, Host ID TSVD3 indicates the identification of Host H (Paragraph [0025]), and Transferred Stereo Visual Data TSVD4 is the stereo visual data extracted in the manner described in Paragraph [0133]. Header TSVD1 and Footer TSVD5 indicate the beginning and the end of Transferred Stereo Visual Data TSVD.

Paragraph [0135]—This Paragraph [0135] illustrates the storage area included in RAM 206 (FIG. 1) of Communication Device 200 (Paragraph [0025]). In this embodiment, RAM 206 includes Stereo Visual Information Storage Area 20623a. Stereo Visual Information Storage Area 20623a stores the software programs and data necessary to implement the present function as described in details hereinafter.

Paragraph [0136]—This Paragraph [0136] illustrates the storage areas included in Stereo Visual Information Storage Area 20623a (Paragraph [0135]). In this embodiment, Stereo Visual Information Storage Area 20623a includes Stereo Visual Software Storage Area 20623b and Stereo Visual Data Storage Area 20623c. Stereo Visual Software Storage Area 20623b stores the software programs necessary to implement the present function, such as the ones described in Paragraph [0140] and Paragraph [0141] hereinafter. Stereo Visual Data Storage Area 20623c stores the data necessary to implement the present function, such as the ones described in Paragraph [0137] hereinafter.

Paragraph [0137]—This Paragraph [0137] illustrates the stereo visual data stored in Stereo Visual Data Storage Area 20623c (Paragraph [0136]). A plurality of stereo visual data are stored in Stereo Visual Data Storage Area 20623c. In the example described in Paragraph [0137], three stereo visual data, i.e., Stereo Visual Data 20623c1, Stereo Visual Data 20623c2, and Stereo Visual Data 20623c3 are stored therein.

Paragraph [0138]—This Paragraph [0138] illustrates the components of the stereo visual data stored in Stereo Visual Data Storage Area 20623c (Paragraph [0137]). Paragraph describes the components of Stereo Visual Data 20623c1 (Paragraph [0137]) as an example. In this embodiment, Stereo Visual Data 20623c1 includes Left LCD Visual Data 20623c1L, Right LCD Visual Data 20623c1R, and Stereo Visual Data Output Timing Data 20623c1T. Left LCD Visual Data 20623c1L is a visual data which is designed to be output from LCD 201L (not shown). Right LCD Visual Data 20623c1R is a visual data which is designed to be output from LCD 201R (not shown). Stereo Visual Data Output Timing Data 20623c1T is a timing data which is utilized to synchronize the output of both Left LCD Visual Data 20623c1L and Right LCD Visual Data 20623c1R from LCD 201R and LCD 201L respectively.

Paragraph [0139]—The downloaded stereo visual data are stored in specific area(s) of Stereo Visual Data Storage Area 20623c (Paragraph [0137]).

Paragraph [0140]—This Paragraph [0140] illustrates the sequence of selecting and preparing to output the stereo visual data from LCDs 201L and 201R (not shown) in a stereo fashion. In this embodiment, a list of stereo visual data is displayed on LCD 201 (FIG. 1) (S1). The user of Communication Device 200 selects one stereo visual data by utilizing Input Device 210 (FIG. 1) or via voice recognition system (S2). Assuming Stereo Visual Data 20623c1 is selected (Paragraph [0137]) in S2, CPU 211 (FIG. 1) retrieves Left LCD Visual Data 20623c1L (S3), Right LCD Visual Data 20623c1R (S4), and Stereo Visual Data Output Timing Data 20623c1T from Stereo Visual Data Storage Area 20623c (Paragraph [0137]) (S5).

Paragraph [0141]—This Paragraph [0141] illustrates the sequence of outputting the stereo visual data from LCDs 201L and 201R (not shown) in a stereo fashion. In this embodiment, the user of Communication Device 200 inputs a specific signal to output the stereo visual data by utilizing Input Device 210 (FIG. 1) or via voice recognition system (S1). Assuming Visual Data 20623c1 (Paragraph [0137]) is selected in S2 of Paragraph [0140], CPU 211 outputs Left LCD Visual Data 20623c1L (Paragraph [0138]) and Right LCD Visual Data 20623c1R (Paragraph [0138]) from LCDs 201L and 201R respectively in a stereo fashion in accordance with Stereo Visual Data Output Timing Data 20623c1T (Paragraph [0138]) (S2).

Paragraph [0142]—<<SOS Calling Function>>

Paragraph [0143]—Paragraph [0144] through Paragraph [0156] illustrate the SOS calling function which enables Communication Device 200 to notify the police department the current location of Communication Device 200 and the personal information of the user of Communication Device 200 when a 911 call is dialed from Communication Device 200.

Paragraph [0144]—This Paragraph [0144] illustrates the storage area included in Host Information Storage Area H00a (Paragraph [0025]). In this embodiment, Host Information Storage Area H00a includes SOS Calling Information Storage Area H29a of which the data stored therein are described in Paragraph [0145].

Paragraph [0145]—This Paragraph [0145] illustrates the storage areas included in SOS Calling Information Storage Area H29a (Paragraph [0144]). In this embodiment, SOS Calling Information Storage Area H29a includes SOS Calling Data Storage Area H29b and SOS Calling Software Storage Area H29c. SOS Calling Data Storage Area H29b stores the data necessary to implement the present function, such as the ones described in Paragraph [0146] and Paragraph [0147]. SOS Calling Software Storage Area H29c stores the software programs necessary to implement the present function, such as the ones described in Paragraph [0155] and Paragraph [0156].

Paragraph [0146]—This Paragraph [0146] illustrates the storage area included in SOS Calling Data Storage Area H29b (Paragraph [0145]). In this embodiment, SOS Calling Data Storage Area H29*b* includes Police Department Location Data Storage Area H29*b*1 of which the data stored therein are described in Paragraph [0147].

Paragraph [0147]—This Paragraph [0147] illustrates the data stored in Police Department Location Data Storage Area H29*b*1 (Paragraph [0146]). As illustrated in Paragraph [0147], Police Department Location Data Storage Area H29*b*1 includes three columns, i.e., Police Dept ID, Location Data, and Phone #. Police Dept ID represents the identification of a police department (e.g., NYPD). Location Data represents the geographical location data (in x, y, z format) of the police department of the corresponding Police Dept ID. Phone # represents the phone number of the police department of the corresponding Police Dept ID. In the example described in Paragraph [0147], H29PD #1 is an identification of the police department of which the geographical location is H29LD #1 and of which the phone number is H29PN #1; H29PD #2 is an identification of the police department of which the geographical location is H29LD #2 and of which the phone number is H29PN #2; H29PD #3 is an identification of the police department of which the geographical location is H29LD #3 and of which the phone number is H29PN #3; and H29PD #4 is an identification of the police department of which the geographical location is H29LD #4 and of which the phone number is H29PN #4.

Paragraph [0148]—The data and/or the software programs necessary to implement the present function on the side of Communication Device 200 as described hereinafter may be downloaded from Host H (Paragraph [0025]) to Communication Device 200.

Paragraph [0149]—This Paragraph [0149] illustrates the storage area included in RAM 206 (FIG. 1) of Communication Device 200. In this embodiment, RAM 206 includes SOS Calling Information Storage Area 20629*a* of which the details are described in Paragraph [0150].

Paragraph [0150]—This Paragraph [0150] illustrates the storage areas included in SOS Calling Information Storage Area 20629*a* (Paragraph [0149]). In this embodiment, SOS Calling Information Storage Area 20629*a* includes SOS Calling Data Storage Area 20629*b* and SOS Calling Software Storage Area 20629*c*. SOS Calling Data Storage Area 20629*b* includes data necessary to implement the present function, such as the ones described in Paragraph [0151] and Paragraph [0152]. SOS Calling Software Storage Area 20629*c* stores the software programs necessary to implement the present function, such as the one described in Paragraph [0153].

Paragraph [0151]—This Paragraph [0151] illustrates storage areas included in SOS Calling Data Storage Area 20629*b* (Paragraph [0150]). In this embodiment, SOS Calling Data Storage Area 20629*b* includes GPS Data Storage Area 20629*b*1 and User Data Storage Area 20629*b*2. GPS Data Storage Area 20629*b*1 stores the data regarding the current geographical location produced by the method so-called GPS as described hereinbefore. User Data Storage Area 20629*b*2 stores the data regarding the personal information of the user of Communication Device 200 as described in Paragraph [0152].

Paragraph [0152]—This Paragraph [0152] illustrates the data stored in User Data Storage Area 20629*b*2 (Paragraph [0151]). In this embodiment, User Data Storage Area 20629*b*2 includes User Data 20629UD which includes data regarding the personal information of the user of Communication Device 200. In the example described in Paragraph [0152], User Data 20629UD comprises Name, Age, Sex, Race, Blood Type, Home Address, and SSN. Name represents the name of the user of Communication Device 200; Age represents the age of the user of Communication Device 200; Sex represents the sex of the user of Communication Device 200; Race represents the race of the user of Communication Device 200; Blood Type represents the blood type of the user of Communication Device 200; Home Address represents the home address of the user of Communication Device 200; and SSN represents the social security number of the user of Communication Device 200.

Paragraph [0153]—This Paragraph [0153] illustrates the software program stored in SOS Calling Software Storage Area 20629*c* (Paragraph [0150]). In this embodiment, when the user of Communication Device 200 inputs 911 by utilizing Input Device 210 (FIG. 1) or via voice recognition system (S1), CPU 211 (FIG. 1) calculates the GPS data, i.e., the current geographical location data by utilizing the method so-called GPS as described hereinbefore (S2), and stores the GPS data in GPS Data Storage Area 20629*b*1 (Paragraph [0151]) (S3). CPU 211 then retrieves User Data 20629UD from User Data Storage Area 20629*b*2 (Paragraph [0152]) and the GPS data from GPS Data Storage Area 20629*b*1 (Paragraph [0151]) (S4), and composes SOS Data 20629SOS therefrom (S5), which is sent thereafter to Host H (Paragraph [0025]) (S6).

Paragraph [0154]—This Paragraph [0154] illustrates the elements of SOS Data 20629SOS (Paragraph [0153]). In this embodiment, SOS Data 20629SOS comprises Connection Request 20629CR, GPS Data 20629GD, and User Data 20629UD. Connection Request 20629CR represents a request to Host H (Paragraph [0025]) to forward the 911 call to a police department. GPS Data 20629GD is a data retrieved from GPS Data Storage Area 20629*b*1 (Paragraph [0152]) as described in S4 of Paragraph [0153]. User Data 20629UD is a data retrieved from User Data Storage Area 20629*b*2 (Paragraph [0152]) as described in S4 of Paragraph [0153].

Paragraph [0155]—This Paragraph [0155] illustrates the software program stored in SOS Calling Software Storage Area H29*c* (Paragraph [0145]) of Host H (Paragraph [0025]). In this embodiment, Host H periodically checks the incoming call (S1). If the incoming call is SOS Data 20629SOS (Paragraph [0154]) (S2), Host H initiates the SOS calling process as described in Paragraph [0156] (S3).

Paragraph [0156]—This Paragraph [0156] illustrates the software program stored in SOS Calling Software Storage Area H29*c* (Paragraph [0145]) of Host H (Paragraph [0025]). In this embodiment, Host H retrieves GPS Data 20629GD from SOS Data 20629SOS (Paragraph [0154]) (S1), and selects the closest police department by comparing GPS Data 20629GD and the data stored in column Location Data of Police Department Location Data Storage Area H29*b*1 (Paragraph [0147]) of Host H (S2). Host H then retrieves the corresponding phone number stored in column Phone # and connects the line between the corresponding police department and Communication Device 200 in order to initiate a voice communication therebetween (S3). Host H forwards to the police department thereafter GPS Data 20629GD and User Data 20629UD retrieved in S1 (S4).

Paragraph [0157]—As another embodiment, User Data 20629UD stored in User Data Storage Area 20629*b*2 (Paragraph [0152]) may be stored in SOS Calling Data Storage Area H29*b* (Paragraph [0145]) of Host H (Paragraph [0025]). In this embodiment, SOS Data 20629SOS (Paragraph [0153]) primarily comprises Connection Request 20629CR and GPS Data 20629GD, and User Data 20629UD is retrieved from SOS Calling Data Storage Area H29*b* of Host H, which is sent to the police department in S4 of Paragraph [0156].

Paragraph [0158]—<<Game Vibrating Function>>

Paragraph [0159]—Paragraph [0160] through Paragraph [0162] illustrate the game vibrating function which vibrates Communication Device 200 when a predetermined condition is met while Communication Device 200 is executing a video game software program.

Paragraph [0160]—This Paragraph [0160] illustrates another embodiment of the software program stored in Game Software Storage Area 2061*d* (Paragraph [0033]) to implement the shooting video game function (not shown). When hit program is initiated (i.e., when User Controlled Object UCO (not shown) is hit by CPU Fired Bullet CFB (not shown)), CPU 211 (FIG. 1), first of all, activates Vibrator 217 (FIG. 1) (S1). Then CPU 211 displays an explosion image on LCD 201 (FIG. 1) by reading the three-dimensional data of CPU Fired Bullet CFB from 3D Object Data Storage Area 2061*e* (Paragraph [0033]) and by 'pasting' the relevant textures thereto stored in Texture Data Storage Area 2061*f* (Paragraph [0033]) (S2). Next, CPU 211 erases the image of User Controlled Object UCO from LCD 201 (S3), and also the explosion image (S4), and CPU 211 deactivates Vibrator 217 thereafter (S5).

Paragraph [0161]—This Paragraph [0161] illustrates another embodiment of the software program stored in Game Software Storage Area 2061*d* (Paragraph [0033]) to implement the driving game function (not shown). In this embodiment, CPU 211 (FIG. 1) performs the user controlled car process (S1), the CPU controlled car process for all CPU Controlled Car CCCs (not shown) displayed on LCD 201 (FIG. 1) (S2), the street image process (S3), and the background image process (S4). Further, CPU 211 performs the vibrator controlling process which is described in Paragraph [0162] (S5).

Paragraph [0162]—This Paragraph [0162] illustrates the vibrator controlling process described in S5 of Paragraph [0161]. In this embodiment, CPU 211 (FIG. 1) periodically checks the position of User Controlled Car UCC (not shown) (S1). If User Controlled Car UCC is off the street or driving on a street of a bad condition (S2), CPU 211 activates Vibrator 217 (FIG. 1) (S3). For purposes of implementing the present function to driving video game, CPU 211 periodically checks the position of User Controlled Car UCC. CPU 211 also periodically checks the street condition by retrieving the data regarding the street condition from Street Parameter Storage Area 2061*g*2 (not shown).

Paragraph [0163]—<<Digital Camera Function>>

Paragraph [0164]—Paragraph [0165] through Paragraph [0184] illustrate the digital camera function which enables Communication Device 200 to take digital photos by utilizing CCD Unit 214 (FIG. 1).

Paragraph [0165]—This Paragraph [0165] illustrates the storage area included in RAM 206 (FIG. 1). In this embodiment, RAM 206 includes Digital Camera Information Storage Area 20646*a* of which the data and the software programs stored therein are described in Paragraph [0167].

Paragraph [0166]—The data and software programs stored in Digital Camera Information Storage Area 20646*a* (Paragraph [0165]) may be downloaded from Host H (Paragraph [0025]).

Paragraph [0167]—This Paragraph [0167] illustrates the storage areas included in Digital Camera Information Storage Area 20646*a* (Paragraph [0165]). In this embodiment, Digital Camera Information Storage Area 20646*a* includes Digital Camera Data Storage Area 20646*b* and Digital Camera Software Storage Area 20646*c*. Digital Camera Data Storage Area 20646*b* stores the data necessary to implement the present function, such as the ones described in Paragraph through Paragraph [0170]. Digital Camera Software Storage Area 20646*c* stores the software programs necessary to implement the present function, such as the ones described in Paragraph [0171].

Paragraph [0168]—This Paragraph [0168] illustrates the storage areas included in Digital Camera Data Storage Area 20646*b* (Paragraph [0167]). In this embodiment, Digital Camera Data Storage Area 20646*b* includes Photo Data Storage Area 20646*b*1 and Digital Camera Function Data Storage Area 20646*b*2. Photo Data Storage Area 20646*b*1 stores the data described in Paragraph [0169]. Digital Camera Function Data Storage Area 20646*b*2 stores the data stored in Paragraph [0170].

Paragraph [0169]—This Paragraph [0169] illustrates the data stored in Photo Data Storage Area 20646*b*1 (Paragraph [0168]). In this embodiment, Photo Data Storage Area 20646*b*1 comprises two columns, i.e., 'Photo ID' and 'Photo Data'. Column 'Photo ID' stores the identifications of the photo data, and column 'Photo Data' stores a plurality of photo data taken by implementing the present function. In this embodiment, Photo Data Storage Area 20646*b*1 stores the following data: 'Photo ID' Photo #1 of which the 'Photo Data' is 46PD1; 'Photo ID' Photo #2 of which the 'Photo Data' is 46PD2; 'Photo ID' Photo #3 of which the 'Photo Data' is 46PD3; 'Photo ID' Photo #4 of which the 'Photo Data' is 46PD4; and 'Photo ID' Photo #5 of which the 'Photo Data' is 46PD5.

Paragraph [0170]—This Paragraph [0170] illustrates the storage areas included in Digital Camera Function Data Storage Area 20646*b*2 (Paragraph [0168]). In this embodiment, Digital Camera Function Data Storage Area 20646*b*2 includes Quality Data Storage Area 20646*b*2*a*, Multiple Photo Shooting Number Data Storage Area 20646*b*2*b*, and Strobe Data Storage Area 20646*b*2*c*. Quality Data Storage Area 20646*b*2*a* stores the data selected in S2 of Paragraph [0173]. Multiple Photo Shooting Number Data Storage Area 20646*b*2*b* stores the data selected in S2 of Paragraph [0174]. Strobe Data Storage Area 20646*b*2*c* stores the data selected in S2 of Paragraph [0175].

Paragraph [0171]—This Paragraph [0171] illustrates the software programs stored in Digital Camera Software Storage Area 20646*c* (Paragraph [0167]). In this embodiment, Digital Camera Software Storage Area 20646*c* stores Quality Selecting Software 20646*c*1, Multiple Photo Shooting Software 20646*c*2, Trimming Software 20646*c*3, Digital Zooming Software 20646*c*4, Strobe Software 20646*c*5, Digital Camera Function Selecting Software 20646*c*6, Multiple Photo Shooting Number Selecting Software 20646*c*7, Strobe On/Off Selecting Software 20646*c*8, Photo Data Shooting Software 20646*c*9, and Multiple Photo Shooting Software 20646*c*1*o*. Quality Selecting Software 20646*c*1 is the software program described in Paragraph [0173]. Multiple Photo Shooting Software 20646*c*2 is the software program described in Paragraph [0177]. Trimming Software 20646*c*3 is the software program described in Paragraph [0184]. Digital Zooming Software 20646*c*4 is the software program described in Paragraph [0181]. Strobe Software 20646*c*5 is the software program described in Paragraph [0178]. Digital Camera Function Selecting Software 20646*c*6 is the software program described in Paragraph [0172]. Multiple Photo Shooting Number Selecting Software 20646*c*7 is the software program described in Paragraph [0174]. Strobe On/Off Selecting Software 20646*c*8 is the software program described in Paragraph [0175]. Photo Data Shooting Software 20646*c*9 is the software program described in Paragraph [0176].

Paragraph [0172]—This Paragraph [0172] illustrates Digital Camera Function Selecting Software 20646*c*6 stored in Digital Camera Software Storage Area 20646c (Paragraph [0171]) which administers the overall flow of displaying the functions and selecting the option for each function. In this embodiment, a list of functions is displayed on LCD 201 (FIG. 1) (S1). The items displayed on LCD 201 are 'Quality', 'Multiple Photo', and 'Strobe'. A function is selected by utilizing Input Device 210 (FIG. 1) or via voice recognition system (S2), and the relevant software program is activated thereafter (S3). In the present embodiment, Quality Selecting Software 20646c1 described in Paragraph [0173] is activated when 'Quality' displayed on LCD 201 is selected in S2. Multiple Photo Shooting Number Selecting Software 20646c7 described in Paragraph [0174] is activated when 'Multiple Photo' is selected in S2. Strobe On/Off Selecting Software 20646c8 described in Paragraph [0175] is activated when 'Strobe' is selected in S2.

Paragraph [0173]—This Paragraph [0173] illustrates Quality Selecting Software 20646c1 stored in Digital Camera Software Storage Area 20646c (Paragraph [0171]) which selects the quality of the photo data taken by implementing the present function. In this embodiment, a list of options is displayed on LCD 201 (FIG. 1) (S1). The options displayed on LCD 201 are 'High', 'STD', and 'Low' in the present embodiment. One of the options is selected by utilizing Input Device 210 (FIG. 1) or via voice recognition system (S2). The resolution of the photo data taken is high if 'High' is selected; the resolution of the photo taken is standard if 'STD' is selected; and the resolution of the photo taken is low if 'Low' is selected. The selected option is stored as the quality data in Quality Data Storage Area 20646b2a (Paragraph [0170]) (S3).

Paragraph [0174]—This Paragraph [0174] illustrates Multiple Photo Shooting Number Selecting Software 20646c7 stored in Digital Camera Software Storage Area 20646c (Paragraph [0171]) which selects the number of photos taken by a single photo shooting signal. In this embodiment, a list of options is displayed on LCD 201 (FIG. 1) (S1). The options displayed on LCD 201 are figures from '1' through '10'. Only one photo is taken by a photo shooting signal if '1' is selected; two photos are taken by a photo shooting signal if '2' is selected; three photos are taken by a photo shooting signal if '3' is selected; four photos are taken by a photo shooting signal if '4' is selected; five photos are taken by a photo shooting signal if '5' is selected; six photos are taken by a photo shooting signal if '6' is selected; seven photos are taken by a photo shooting signal if '7' is selected; eight photos are taken by a photo shooting signal if '8' is selected; nine photos are taken by a photo shooting signal if '9' is selected; and ten photos are taken by a photo shooting signal if '10' is selected. A digit from '1' through '10' is selected by utilizing Input Device 210 (FIG. 1) or via voice recognition system (S2). The selected digital is stored as the multiple photo shooting number data in Multiple Photo Shooting Number Data Storage Area 20646b2b (Paragraph [0170]) (S3).

Paragraph [0175]—This Paragraph [0175] illustrates Strobe On/Off Selecting Software 20646c8 stored in Digital Camera Software Storage Area 20646c (Paragraph [0171]) which selects Flash Light Unit 220 (not shown) to be activated or not when a photo is taken. In this embodiment, a list of options is displayed on LCD 201 (FIG. 1) (S1). The options displayed on LCD 201 are 'On' and 'Off'. Flash Light Unit 220 is activated at the time photo is taken if 'On' is selected; and Flash Light Unit 220 is not activated at the time photo is taken if 'Off' is selected. One of the two options is selected by utilizing Input Device 210 (FIG. 1) or via voice recognition system (S2). The selected option is stored as the strobe data in Strobe Data Storage Area 20646b2c (Paragraph [0170]) (S3).

Paragraph [0176]—This Paragraph [0176] illustrates Photo Data Shooting Software 20646c9 stored in Digital Camera Software Storage Area 20646c (Paragraph [0171]) which takes photo(s) in accordance with the options selected in Paragraph [0173]. In this embodiment, a photo shooting signal is input by utilizing Input Device 210 (FIG. 1) or via voice recognition system (S1). Here, the photo shooting signal indicates CPU 211 (FIG. 1) to input photo data to CCD Unit 214 (FIG. 1) and store the data in Photo Data Storage Area 20646b1 (Paragraph [0169]). CPU 211 then retrieves the quality data from Quality Data Storage Area 20646b2a (Paragraph [0170]) (S2). The photo data is input via CCD Unit 214 (S3), and the data is stored in Photo Data Storage Area 20646b1 (Paragraph [0169]) with new photo ID in accordance with the quality data retrieved in S2 (S4).

Paragraph [0177]—This Paragraph [0177] illustrates Multiple Photo Shooting Software 20646c2 stored in Digital Camera Software Storage Area 20646c (Paragraph [0171]) which takes photo(s) in accordance with the options selected in Paragraph [0174]. In this embodiment, a photo shooting signal is input by utilizing Input Device 210 (FIG. 1) or via voice recognition system (S1). CPU 211 (FIG. 1) retrieves the multiple photo shooting number data from Multiple Photo Shooting Number Data Storage Area 20646b2b (Paragraph [0170]) (S2). CPU 211 then takes photos in accordance with the multiple photo shooting number data retrieved in S2 (S3). Namely, only one photo is taken by a photo shooting signal if the multiple photo shooting number data retrieved in S2 is '1'; two photos are taken by a photo shooting signal if the multiple photo shooting number data retrieved in S2 is '2'; three photos are taken by a photo shooting signal if the multiple photo shooting number data retrieved in S2 is '3'; four photos are taken by a photo shooting signal if the multiple photo shooting number data retrieved in S2 is '4'; five photos are taken by a photo shooting signal if the multiple photo shooting number data retrieved in S2 is '5'; six photos are taken by a photo shooting signal if the multiple photo shooting number data retrieved in S2 is '6'; seven photos are taken by a photo shooting signal if the multiple photo shooting number data retrieved in S2 is '7'; eight photos are taken by a photo shooting signal if the multiple photo shooting number data retrieved in S2 is '8'; nine photos are taken by a photo shooting signal if the multiple photo shooting number data retrieved in S2 is '9'; and ten photos are taken by a photo shooting signal if the multiple photo shooting number data retrieved in S2 is '10'.

Paragraph [0178]—This Paragraph [0178] illustrates Strobe Software 20646c5 stored in Digital Camera Software Storage Area 20646c (Paragraph [0171]) which takes photo(s) in accordance with the options selected in Paragraph [0175]. In this embodiment, a photo shooting signal is input by utilizing Input Device 210 (FIG. 1) or via voice recognition system (S1). CPU 211 (FIG. 1) retrieves the strobe data from Strobe Data Storage Area 20646b2c (Paragraph [0170]) (S2). If the strobe data is 'On' (S3), CPU 211 activates Flash Light Unit 220 (not shown) each time a photo is taken (S4). In other words, Strobe Software 20646c5 is harmonized with Multiple Photo Shooting Software 20646c2 described in Paragraph [0177]. Namely, Flash Light Unit 220 is activated for one time if one photo is taken by a single photo shooting signal. Flash Light Unit 220 is activated for two times if two photos are taken by a single photo shooting signal. Flash Light Unit 220 is activated for three times if three photos are taken by a single photo shooting signal. Flash Light Unit 220 is activated for four times if four photos are taken by a single photo shooting signal. Flash Light Unit 220 is activated for five times if five photos are taken by a single photo shooting signal. Flash Light Unit 220 is activated for six times if six photos are taken by a single photo shooting signal. Flash Light Unit 220 is activated for seven times if seven photos are taken by a single photo shooting signal. Flash Light Unit 220 is activated for eight times if eight photos are taken by a single photo shooting signal. Flash Light Unit 220 is activated for nine times if nine photos are taken by a single photo shooting signal. Flash Light Unit 220 is activated for ten times if ten photos are taken by a single photo shooting signal.

Paragraph [0179]—This Paragraph [0179] illustrates one embodiment of the zooming function which zooms the photo data stored in Photo Data Storage Area 20646b1 (Paragraph [0169]). In this embodiment, a certain photo selected by the user of Communication Device 200 is displayed on LCD 201 (FIG. 1). Assuming that the user intends to zoom Object 206460bj, the object displayed on LCD 201, to a larger size. The user selects Area 46ARa which includes Object 206460bj by utilizing Input Device 210 (FIG. 1) or via voice recognition system, and the selected area is zoomed to fit the size of LCD 201. The zoomed photo is replaced with the original photo.

Paragraph [0180]—This Paragraph [0180] illustrates the operation performed in RAM 206 (FIG. 1) to implement the zooming function described in Paragraph [0179]. A certain photo data selected by the user of Communication Device 200 is stored in Area 20646ARa of RAM 206. Here, the size of the photo data is as same as that of Area 20646ARa. In this embodiment, Display Area 20646DA is the area which is displayed on LCD 201 (FIG. 1). Area 46ARa is the area which is selected by the user of Communication Device 200. Object 206460bj is the object included in the photo data. Area 46ARa which includes Object 206460bj is selected by utilizing Input Device 210 (FIG. 1) or via voice recognition system, and the photo data stored in Area 20646ARa is zoomed to the size in which the size of Area 46ARa equals to that of Display Area 20646DA. The zoomed photo data is replaced with the original photo data and stored in Photo Data Storage Area 20646b1 (Paragraph [0169]). The portion of the photo data which does not fit Area 20646ARa is cropped.

Paragraph [0181]—This Paragraph [0181] illustrates Digital Zooming Software 20646c4 stored in Digital Camera Software Storage Area 20646c (Paragraph [0171]) which implements the operation described in Paragraph [0180]. In this embodiment, CPU 211 (FIG. 1) displays a list of the photo IDs representing the photo data stored in Photo Data Storage Area 20646b1 (Paragraph [0169]) as well as the thumbnails (S1). A certain photo data is selected by utilizing Input Device 210 (FIG. 1) or via voice recognition system (S2), and the selected photo data is displayed on LCD 201 (FIG. 1) as described in Paragraph [0179] (S3). Area 46ARa described in Paragraph [0179] is selected by utilizing Input Device 210 or via voice recognition system (S4). When a zooming signal is input by utilizing Input Device 210 or via voice recognition system (S5), CPU 211 (FIG. 1) implements the process described in Paragraph [0180] and replaces the original photo data with the zoomed photo data, which is stored in Photo Data Storage Area 20646b1 (Paragraph [0169]) (S6).

Paragraph [0182]—This Paragraph [0182] illustrates one embodiment of the trimming function which trims the photo data stored in Photo Data Storage Area 20646b1 (Paragraph [0169]) and thereby moves the selected object to the center of the photo data. In this embodiment, a certain photo selected by the user of Communication Device 200 is displayed on LCD 201 (FIG. 1). Point 20646PTa adjacent to Object 206460bj is selected by utilizing Input Device 210 (FIG. 1) or via voice recognition system, and the photo is centered at Point 20646PTa. The trimmed photo is replaced with the original photo.

Paragraph [0183]—This Paragraph [0183] illustrates the operation performed in RAM 206 (FIG. 1) to implement the trimming function described in Paragraph [0182]. In this embodiment, Display Area 20646DA is the portion of the photo data which is displayed on LCD 201 (FIG. 1). Object 206460bj is the object included in the photo data. Point 20646PTa is the point selected by the user of Communication Device 200 adjacent to Object 206460bj which is centered by the present function. In this embodiment, a certain photo data selected by the user of Communication Device 200 is stored in Area 20646ARb of RAM 206. Here, the size of the photo data is as same as that of Area 20646ARb. Point 20646PTa is selected by utilizing Input Device 210 (FIG. 1) or via voice recognition system, and the photo data is centered at Point 20646PTa by sliding the entire photo data to the right. The trimmed photo data is replaced with the original photo data and stored in Photo Data Storage Area 20646b1 (Paragraph [0169]). The portion of the photo data which does not ft Area 20646ARa is cropped.

Paragraph [0184]—This Paragraph [0184] illustrates Trimming Software 20646c3 stored in Digital Camera Software Storage Area 20646c (Paragraph [0171]) which implements the operation described in Paragraph [0183]. In this embodiment, CPU 211 (FIG. 1) displays a list of the photo IDs representing the photo data stored in Photo Data Storage Area 20646b1 (Paragraph [0169]) as well as the thumbnails (S1). A certain photo data is selected by utilizing Input Device 210 (FIG. 1) or via voice recognition system (S2), and the selected photo data is displayed on LCD 201 (FIG. 1) as described in Paragraph [0182] (S3). Point 20646PTa described in Paragraph [0182] is selected by utilizing Input Device 210 or via voice recognition system (S4). When a trimming signal is input by utilizing Input Device 210 or via voice recognition system (S5), CPU 211 (FIG. 1) centers the photo data at Point 20646PTa (not shown) and replaces the original photo data with the trimmed photo data, which is stored in Photo Data Storage Area 20646b1 (Paragraph [0169]) (S6).

Paragraph [0185]—<<Multiple Window Displaying Function>>

Paragraph [0186]—Paragraph [0187] through Paragraph [0200] illustrate the multiple window displaying function which displays a plurality of windows on LCD 201 (FIG. 1) of Communication Device 200.

Paragraph [0187]—This Paragraph [0187] illustrates the concept of the present function. In this embodiment, the display area of LCD 201 (FIG. 1) is primarily composed of two display areas, i.e., Windows Display Area 20148WDA and Task Bar 20148TB. Windows Display Area 20148WDA is the display area where a plurality of windows are displayed. Task Bar 20148TB is the display area located on the lower part of LCD 201 (FIG. 1) where the icons corresponding to the windows displayed in Windows Display Area 20148WDA are displayed. In this embodiment, two windows area displayed in Windows Display Area 20148WDA, i.e., Window A and Window B. In this embodiment, Window A is displayed on top of Window B which means that Window A has priority over Window B. Two icons, i.e., Icon A which corresponds to Window A and Icon B are which corresponds to Window B are displayed in Task Bar 20148TB.

Paragraph [0188]—This Paragraph [0188] illustrates the storage area included in RAM 206 (FIG. 1). In this embodiment, RAM 206 includes Multiple Window Displaying Information Storage Area 20648*a* of which the data and the software programs stored therein are described in Paragraph [0190].

Paragraph [0189]—The data and/or the software programs stored in Multiple Window Displaying Information Storage Area 20648*a* (Paragraph [0188]) may be downloaded from Host H (Paragraph [0025]).

Paragraph [0190]—This Paragraph [0190] illustrates the storage areas included in Multiple Window Displaying Information Storage Area 20648*a* (Paragraph [0188]). In this embodiment, Multiple Window Displaying Information Storage Area 20648*a* includes Multiple Window Displaying Data Storage Area 20648*b* and Multiple Window Displaying Software Storage Area 20648*c*. Multiple Window Displaying Data Storage Area 20648*b* stores the data necessary to implement the present function, such as the ones described in Paragraph [0191] through Paragraph [0193]. Multiple Window Displaying Software Storage Area 20648*c* stores the software programs necessary to implement the present function, such as the ones described in Paragraph [0195].

Paragraph [0191]—This Paragraph [0191] illustrates the storage area included in Multiple Window Displaying Data Storage Area 20648*b* (Paragraph [0190]). In this embodiment, Multiple Window Displaying Data Storage Area 20648*b* includes Window Data Storage Area 20648*b*1 which is further explained in Paragraph [0192] and Paragraph [0193].

Paragraph [0192]—This Paragraph [0192] illustrates the method to identify the location and the size of each window display in Windows Display Area 20148WDA (Paragraph [0187]). In this embodiment, Base Point 20148BP is the point of the upper-left corner of Windows Display Area 20148WDA (Paragraph [0187]). Reference Point 20148RP is the point of the upper-left corner of each window displayed in Windows Display Area 20148WDA. The location of Reference Point 20148RP in Windows Display Area 20148WDA is identified based on the distance from Base Point 20148BP in 'x cm, y cm' format. The size of each window is identified by the width and the height in centimeters.

Paragraph [0193]—This Paragraph [0193] illustrates the data stored in Window Data Storage Area 20648*b*1 (Paragraph [0191]). In this embodiment, Window Data Storage Area 20648*b*1 comprises six columns, i.e., 'Window ID', 'Reference Point Data', 'Width Data', 'Height Data', 'Priority Data', and 'Icon ID'. Column 'Window ID' stores the identifications of the window data. Column 'Reference Point Data' stores Reference Point 20148RP (Paragraph [0192]) of each window displayed in Windows Display Area 20148WDA (Paragraph [0192]). Column 'Width Data' stores the width of each window in centimeters. Column 'Height Data' stores the height of each window in centimeters. Column 'Priority Data' stores the priority of each window displayed in Windows Display Area 20148WDA. Column 'Icon ID' stores the identifications of the icons displayed in Task Bar 20148TB (Paragraph [0187]). In this embodiment, the following data area stored in Window Data Storage Area 20648*b*1: the 'Window ID' 'Window #1' of which the 'Reference Point Data', the 'Width Data', the 'Height Data', the 'Priority Data', and the 'Icon ID' are '2 cm, 3 cm', '5 cm', '2 cm', 'Priority #4', and 'Icon #1'; the 'Window ID' 'Window #2' of which the 'Reference Point Data', the 'Width Data', the 'Height Data', the 'Priority Data', and the 'Icon ID' are '1 cm, 2 cm', '4 cm', '4 cm', 'Priority #3', and Icon #2; the 'Window ID' 'Window #3' of which the 'Reference Point Data', the 'Width Data', the 'Height Data', the 'Priority Data', and the 'Icon ID' are '1 cm, 2 cm', '5 cm', '6 cm', 'Priority #2', and Icon #3; and the 'Window ID' 'Window #4' of which the 'Reference Point Data', the 'Width Data', the 'Height Data', the 'Priority Data', and the 'Icon ID' are '2 cm, 3 cm', '4 cm', '5 cm', 'Priority #1', and 'Icon #4'.

Paragraph [0194]—Referring to the Priority Data', 'Window #4' has the highest priority over the rest of the windows in being displayed in Windows Display Area 20148WDA (i.e., 'Priority #1'), 'Window #3' has the priority over 'Window #2' and 'Window #1' in being displayed in Windows Display Area 20148WDA (i.e., 'Priority #2'), 'Window #2' has the priority over 'Window #1' in being displayed in Windows Display Area 20148WDA (i.e., 'Priority #3'), and 'Window #1' has the lowest priority over the rest of the windows in being displayed in Windows Display Area 20148WDA (i.e., 'Priority #4').

Paragraph [0195]—This Paragraph [0195] illustrates the software programs stored in Multiple Window Displaying Software Storage Area 20648*c* (Paragraph [0190]). In this embodiment, Multiple Window Displaying Software Storage Area 20648*c* stores Window Generating Software 20648*c*1, Window Closing Software 20648*c*2, Window Size Changing Software 20648*c*3, Window Size Minimizing Software 20648*c*4, and Window Size Restoring Software 20648*c*5. Window Generating Software 20648*c*1 is the software program described in Paragraph [0196]. Window Closing Software 20648*c*2 is the software program described in Paragraph [0197]. Window Size Changing Software 20648*c*3 is the software program described in Paragraph [0198]. Window Size Minimizing Software 20648*c*4 is the software program described in Paragraph [0199]. Window Size Restoring Software 20648*c*5 is the software program described in Paragraph [0200].

Paragraph [0196]—This Paragraph [0196] illustrates Window Opening Software 20648*c*1 stored in Multiple Window Displaying Software Storage Area 20648*c* (Paragraph [0195]) which opens a new window in Windows Display Area 20148WDA (Paragraph [0187]) when a new software program (e.g., MS Word, MS Excel, MS Access, calculator, back-up software program, Windows Explorer, Outlook Express, image viewer, and Internet Explorer) is executed. In this embodiment, when a software program is executed (S1), CPU 211 (FIG. 1) generates a new window data (S2). The size (i.e., the width and the height thereof) may be of the default settings. CPU 211 adds a new Window ID in Window Data Storage Area 20648*b*1 (Paragraph [0193]) for the new window data (S3). CPU 211 further sets the highest 'Priority Data' (i.e., 'Priority #1') for the new window (S4), and stores the new window data generated in S2 as well as the 'Priority Data' set in S4 in Window Data Storage Area 20648*b*1 (S5). CPU 211 updates the 'Priority Data' of the other windows accordingly, i.e., the 'Priority Data' of the other windows are shifted to the one rank lower one and stores the updated 'Priority Data' in Window Data Storage Area 20648*b*1 (S6). CPU 211 displays the new window in Windows Display Area 20148WDA (Paragraph [0187]) (S7) and the new icon on Task Bar 20148TB (Paragraph [0187]) (S8).

Paragraph [0197]—This Paragraph [0197] illustrates Window Closing Software 20648*c*2 stored in Multiple Window Displaying Software Storage Area 20648*c* (Paragraph [0195]) which closes the window displayed in Windows Display Area 20148WDA (Paragraph [0187]) when the corresponding software program is terminated. In this embodiment, when a software program is terminated (S1), CPU 211 (FIG. 1) deletes the corresponding window data from Window Data Storage Area 20648*b*1 (Paragraph [0193]) (S2). CPU 211 then closes the corresponding window displayed on Windows Display Area 20148WDA (Paragraph [0187]) (S3) and erases the corresponding icon from Task Bar 20148TB (Paragraph [0187]) (S4). CPU 211 updates the 'Priority Data' of the other windows accordingly, i.e., the 'Priority Data' of the other windows are shifted to the one rank higher one and stores the updated 'Priority Data' in Window Data Storage Area 20648b1 (S5).

Paragraph [0198]—This Paragraph [0198] illustrates Window Size Changing Software 20648c3 stored in Multiple Window Displaying Software Storage Area 20648c (Paragraph [0195]) which changes the size of the window displayed in Windows Display Area 20148WDA (Paragraph [0187]). In this embodiment, a certain window is selected by utilizing Input Device 210 (FIG. 1) or via voice recognition system (S1). A window size changing signal which indicates to change the size of the window displayed in Windows Display Area 20148WDA is input in the same manner (S2). CPU 211 (FIG. 1), by identifying the information contained in the window size changing signal, updates and stores the renewed window data (with new 'Reference Point Data', 'Width Data', and 'Height Data') in Window Data Storage Area 20648b1 (Paragraph [0193]) (S3). The window with the renewed size is displayed in Windows Display Area 20148WDA thereafter (S4).

Paragraph [0199]—This Paragraph [0199] illustrates Window Size Minimizing Software 20648c4 stored in Multiple Window Displaying Software Storage Area 20648c (Paragraph [0195]) which minimizes the size of the window to zero displayed in Windows Display Area 20148WDA (Paragraph [0187]). In this embodiment, a certain window is selected by utilizing Input Device 210 (FIG. 1) or via voice recognition system (S1). A window size minimizing signal which indicates to minimize the size of the window displayed in Windows Display Area 20148WDA is input in the same manner (S2). The window data of the corresponding window remains unchanged except the 'Priority Data'. The 'Priority Data' of the minimized window is shifted to the lowest one (S3). CPU 211 (FIG. 1) updates the 'Priority Data' of the other windows accordingly, i.e., the 'Priority Data' of the other windows are shifted to the one rank higher one and stores the updated 'Priority Data' in Window Data Storage Area 20648b1 (Paragraph [0193]) (S4). The size of the window displayed in Windows Display Area 20148WDA is minimized thereafter (S5).

Paragraph [0200]—This Paragraph [0200] illustrates Window Size Restoring Software 20648c5 stored in Multiple Window Displaying Software Storage Area 20648c (Paragraph [0195]) which restores the size of the window minimized by Window Size Minimizing Software 20648c4 (Paragraph [0199]) to its original size. In this embodiment, a certain window is selected by utilizing Input Device 210 (FIG. 1) or via voice recognition system (S1). A window size restoring signal which indicates to restore the size of the window displayed in Windows Display Area 20148WDA is input in the same manner (S2). CPU 211 (FIG. 1), by identifying the information contained in the window size restoring signal, retrieves the window data (i.e., 'Reference Point Data', 'Width Data', and 'Height Data') from Window Data Storage Area 20648b1 (Paragraph [0193]) (S3). CPU 211 sets the highest 'Priority Data' (i.e., 'Priority #1') for the restored window (S4), and stores the data in Window Data Storage Area 20648b1 (S4). CPU 211 further updates the 'Priority Data' of the other windows accordingly, i.e., the 'Priority Data' of the other windows are shifted to the one rank lower one and stores the updated 'Priority Data' in Window Data Storage Area 20648b1 (S5). The window size is restored thereafter (S6).

Paragraph [0201]—<<Mouse Pointer Displaying Function>>

Paragraph [0202]—Paragraph [0203] through Paragraph [0231] illustrate the mouse pointer displaying function which displays on LCD 201 (FIG. 1) of Communication Device 200 a mouse pointer which is manipulated by the user of Communication Device 200. The mouse pointer is primarily utilized to select, open, close, drag & drop files, and its image is similar to the one displayed on ordinary personal computers.

Paragraph [0203]—This Paragraph [0203] illustrates the storage area included in RAM 206 (FIG. 1). In this embodiment, RAM 206 includes Mouse Pointer Displaying Information Storage Area 20649a of which the data and the software programs stored therein are described in Paragraph [0205].

Paragraph [0204]—The data and/or the software programs stored in Mouse Pointer Displaying Information Storage Area 20649a (Paragraph [0203]) may be downloaded from Host H (Paragraph [0025]).

Paragraph [0205]—This Paragraph [0205] illustrates the storage areas included in Mouse Pointer Displaying Information Storage Area 20649a (Paragraph [0203]). In this embodiment, Mouse Pointer Displaying Information Storage Area 20649a includes Mouse Pointer Displaying Data Storage Area 20649b and Mouse Pointer Displaying Software Storage Area 20649c. Mouse Pointer Displaying Data Storage Area 20649b stores the data necessary to implement the present function, such as the ones described in Paragraph [0206] through Paragraph [0208]. Mouse Pointer Displaying Software Storage Area 20649c stores the software programs necessary to implement the present function, such as the ones described in Paragraph [0209].

Paragraph [0206]—This Paragraph [0206] illustrates the storage areas included in Mouse Pointer Displaying Data Storage Area 20649b (Paragraph [0205]). In this embodiment, Mouse Pointer Displaying Data Storage Area 20649b includes Mouse Pointer Image Data Storage Area 20649b1 and Current Pointer Data Storage Area 20649b2. Mouse Pointer Image Data Storage Area 20649b1 stores the data described in Paragraph [0207]. Current Pointer Data Storage Area 20649b2 stores the data described in Paragraph [0208].

Paragraph [0207]—This Paragraph [0207] illustrates the data stored in Mouse Pointer Image Data Storage Area 20649b1 (Paragraph [0206]). In this embodiment, Mouse Pointer Image Data Storage Area 20649b1 comprises two columns, i.e., 'Pointer ID' and 'Pointer Image Data'. Column 'Pointer ID' stores the pointer IDs, i.e., the identifications of the pointer image data stored in column 'Pointer Image Data', and column 'Pointer Image Data' stores the pointer image data designed to be displayed on LCD 201 (FIG. 1). The pointer image data stored in column 'Pointer Image Data' in the present example are the following: Pointer Image Data #1 which is a small white arrow, Pointer Image Data #2 which is a large white arrow, Pointer Image Data #3 which is a small black arrow, and Pointer Image Data #4 which is a large black arrow. Pointer #1 is the identification of Pointer Image Data #1, Pointer #2 is the identification of Pointer Image Data #2, Pointer #3 is the identification of Pointer Image Data #3, and Pointer #4 is the identification of Pointer Image Data #4.

Paragraph [0208]—This Paragraph [0208] illustrates the data stored in Current Pointer Data Storage Area 20649b2 (Paragraph [0206]). In this embodiment, Current Pointer Data Storage Area 20649b2 comprises two columns, i.e., 'Selected Pointer ID' and 'Current Location Data'. 'Selected Pointer ID' stores the pointer IDs of the pointer image data selected in S3 of Paragraph [0210]. Column 'Current Location Data' stores the current location data which represents the location of the mouse pointer displayed on LCD 201 (FIG. 1). The current location data is stored in (x cm, y cm) format wherein 'x cm' represents the distance from the base point located on the upper left corner (not shown) of LCD 201 on x axis in centimeters, and 'y cm' represents the distance from the base point on y axis in centimeters. In this embodiment, the pointer ID 'Pointer #1' is stored in column 'Selected Pointer ID' and the current location data (2 cm, 3 cm) is stored in column 'Current Location Data'. In this embodiment, Pointer Image Data #1 (i.e., a small white arrow) of which the pointer ID is 'Pointer #1' is displayed on LCD 201 at the location of 2 cm from the base point on x axis and 3 cm from the base point on y axis.

Paragraph [0209]—This Paragraph [0209] illustrates the software programs stored in Mouse Pointer Displaying Software Storage Area 20649c (Paragraph [0205]). In this embodiment, Mouse Pointer Displaying Software Storage Area 20649c stores Mouse Pointer Image Data Selecting Software 20649c1, Mouse Pointer Moving Software 20649c2, Mouse Pointer Displaying Software 20649c3, VRS Pointer Moving Signal Producing Software 20649c4, Keypad Pointer Moving Signal Producing Software 20649c5, Joystick Pointer Moving Signal Producing Software 20649c6, and ETS Pointer Moving Signal Producing Software 20649c7. Mouse Pointer Image Data Selecting Software 20649c1 is the software program described in Paragraph [0210]. Mouse Pointer Moving Software 20649c2 is the software program described in Paragraph [0211]. Mouse Pointer Displaying Software 20649c3 is the software program described in Paragraph [0212]. VRS Pointer Moving Signal Producing Software 20649c4 is the software program described in Paragraph [0214] through Paragraph [0217]. Keypad Pointer Moving Signal Producing Software 20649c5 is the software program described in Paragraph [0218] through Paragraph [0221]. Joystick Pointer Moving Signal Producing Software 20649c6 is the software program described in Paragraph [0222] through Paragraph [0225]. ETS Pointer Moving Signal Producing Software 20649c7 is the software program described in Paragraph [0226] through Paragraph [0230].

Paragraph [0210]—This Paragraph [0210] illustrates Mouse Pointer Image Data Selecting Software 20649c1 stored in Mouse Pointer Displaying Software Storage Area 20649c (Paragraph [0209]) which selects the mouse pointer image data from a list displayed on LCD 201 (FIG. 1). In this embodiment, CPU 211 (FIG. 1) retrieves all pointer image data from Mouse Pointer Image Data Storage Area 20649b1 (Paragraph [0207]) (S1) and displays a list thereof on LCD 201 (S2). A mouse pointer image data is selected from the list by utilizing Input Device 210 (FIG. 1) or via voice recognition system (S3), and CPU 211 stores the corresponding pointer ID in column 'Selected Pointer ID' of Current Pointer Data Storage Area 20649b2 (Paragraph [0208]) (S4).

Paragraph [0211]—This Paragraph [0211] illustrates Mouse Pointer Moving Software 20649c2 stored in Mouse Pointer Displaying Software Storage Area 20649c (Paragraph [0209]) which updates the current location data stored in Current Pointer Data Storage Area 20649b2 (Paragraph [0208]) when mouse pointer moving signal is input. In this embodiment, a mouse pointer moving signal indicating to move the mouse pointer displayed on LCD 201 (FIG. 1) to a new location is input by the method described hereinafter (S1). CPU 211 (FIG. 1) then calculates the new location where the mouse pointer is to be displayed (S2), and stores the new current location data in 'Current Location Data' of Current Pointer Data Storage Area 20649b2 (Paragraph [0208]) (S3).

Paragraph [0212]—This Paragraph [0212] illustrates Mouse Pointer Displaying Software 20649c3 stored in Mouse Pointer Displaying Software Storage Area 20649c (Paragraph [0209]) which displays the mouse pointer on LCD 201 (FIG. 1). In this embodiment, CPU 211 (FIG. 1) retrieves the pointer ID from column 'Selected Pointer ID' of Current Pointer Data Storage Area 20649b2 (Paragraph [0208]) (S1). CPU 211 then retrieves the corresponding pointer image data from Mouse Pointer Image Data Storage Area 20649b1 (Paragraph [0207]) (S2). CPU 211 further retrieves the current location data from column 'Current Location Data' of Current Pointer Data Storage Area 20649b2 (Paragraph [0208]) (S3). Based on the data retrieved in S1 through S3, CPU 211 displays the pointer image data on LCD 201 in accordance with the current location data (S4).

Paragraph [0213]—The software programs described in Paragraph [0211] and Paragraph [0212] are repeated periodically, preferably sixty times every second.

Paragraph [0214]—This Paragraph [0214] illustrates VRS Pointer Moving Signal Producing Software 20649c4 stored in Mouse Pointer Displaying Software Storage Area 20649c (Paragraph [0209]) which produces the mouse pointer moving signal described in S1 of Paragraph indicating to move up the mouse pointer by utilizing the voice recognition system described hereinbefore. In this embodiment, a voice command 'move up' is input via Microphone 215 (FIG. 1) (S1). In response to the voice command, CPU 211 (FIG. 1) produces the mouse pointer moving signal indicating to move up the mouse pointer (S2).

Paragraph [0215]—This Paragraph [0215] illustrates VRS Pointer Moving Signal Producing Software 20649c4 stored in Mouse Pointer Displaying Software Storage Area 20649c (Paragraph [0209]) which produces the mouse pointer moving signal described in S1 of Paragraph indicating to move down the mouse pointer by utilizing the voice recognition system described hereinbefore. In this embodiment, a voice command 'move down' is input via Microphone 215 (FIG. 1) (S1). In response to the voice command, CPU 211 (FIG. 1) produces the mouse pointer moving signal indicating to move down the mouse pointer (S2).

Paragraph [0216]—This Paragraph [0216] illustrates VRS Pointer Moving Signal Producing Software 20649c4 stored in Mouse Pointer Displaying Software Storage Area 20649c (Paragraph [0209]) which produces the mouse pointer moving signal described in S1 of Paragraph indicating to move left the mouse pointer by utilizing the voice recognition system described hereinbefore. In this embodiment, a voice command 'move left' is input via Microphone 215 (FIG. 1) (S1). In response to the voice command, CPU 211 (FIG. 1) produces the mouse pointer moving signal indicating to move left the mouse pointer (S2).

Paragraph [0217]—This Paragraph [0217] illustrates VRS Pointer Moving Signal Producing Software 20649c4 stored in Mouse Pointer Displaying Software Storage Area 20649c (Paragraph [0209]) which produces the mouse pointer moving signal described in S1 of Paragraph indicating to move right the mouse pointer by utilizing the voice recognition system described hereinbefore. In this embodiment, a voice command 'move right' is input via Microphone 215 (FIG. 1) (S1). In response to the voice command, CPU 211 (FIG. 1) produces the mouse pointer moving signal indicating to move right the mouse pointer (S2).

Paragraph [0218]—This Paragraph [0218] illustrates Keypad Pointer Moving Signal Producing Software 20649c5 stored in Mouse Pointer Displaying Software Storage Area 20649c (Paragraph [0209]) which produces the mouse pointer moving signal described in S1 of Paragraph indicating to move up the mouse pointer by utilizing the keypad, i.e., Numeric Data Input Device 21000a (not shown). In this embodiment, numeric data '8' is input via keypad, i.e., Numeric Data Input Device 21000*a* (not shown) (S1). In response to the input numeric data, CPU 211 (FIG. 1) produces the mouse pointer moving signal indicating to move up the mouse pointer (S2).

Paragraph [0219]—This Paragraph [0219] illustrates Keypad Pointer Moving Signal Producing Software 20649*c*5 stored in Mouse Pointer Displaying Software Storage Area 20649*c* (Paragraph [0209]) which produces the mouse pointer moving signal described in S1 of Paragraph indicating to move down the mouse pointer by utilizing the keypad, i.e., Numeric Data Input Device 21000*a* (not shown). In this embodiment, numeric data '2' is input via keypad, i.e., Numeric Data Input Device 21000*a* (not shown) (S1). In response to the input numeric data, CPU 211 (FIG. 1) produces the mouse pointer moving signal indicating to move down the mouse pointer (S2).

Paragraph [0220]—This Paragraph [0220] illustrates Keypad Pointer Moving Signal Producing Software 20649*c*5 stored in Mouse Pointer Displaying Software Storage Area 20649*c* (Paragraph [0209]) which produces the mouse pointer moving signal described in S1 of Paragraph indicating to move left the mouse pointer by utilizing the keypad, i.e., Numeric Data Input Device 21000*a* (not shown). In this embodiment, numeric data '4' is input via keypad, i.e., Numeric Data Input Device 21000*a* (not shown) (S1). In response to the input numeric data, CPU 211 (FIG. 1) produces the mouse pointer moving signal indicating to move left the mouse pointer (S2).

Paragraph [0221]—This Paragraph [0221] illustrates Keypad Pointer Moving Signal Producing Software 20649*c*5 stored in Mouse Pointer Displaying Software Storage Area 20649*c* (Paragraph [0209]) which produces the mouse pointer moving signal described in S1 of Paragraph indicating to move right the mouse pointer by utilizing the keypad, i.e., Numeric Data Input Device 21000*a* (not shown). In this embodiment, numeric data '6' is input via keypad, i.e., Numeric Data Input Device 21000*a* (not shown) (S1). In response to the input numeric data, CPU 211 (FIG. 1) produces the mouse pointer moving signal indicating to move right the mouse pointer (S2).

Paragraph [0222]—This Paragraph [0222] illustrates Joystick Pointer Moving Signal Producing Software 20649*c*6 stored in Mouse Pointer Displaying Software Storage Area 20649*c* (Paragraph [0209]) which produces the mouse pointer moving signal described in S1 of Paragraph indicating to move up the mouse pointer by utilizing Joystick 21000*d* (not shown). In this embodiment, Joystick 21000*d* is shifted up (S1). In response thereto, CPU 211 (FIG. 1) produces the mouse pointer moving signal indicating to move up the mouse pointer (S2).

Paragraph [0223]—This Paragraph [0223] illustrates Joystick Pointer Moving Signal Producing Software 20649*c*6 stored in Mouse Pointer Displaying Software Storage Area 20649*c* (Paragraph [0209]) which produces the mouse pointer moving signal described in S1 of Paragraph indicating to move down the mouse pointer by utilizing Joystick 21000*d* (not shown). In this embodiment, Joystick 21000*d* is shifted down (S1). In response thereto, CPU 211 (FIG. 1) produces the mouse pointer moving signal indicating to move down the mouse pointer (S2).

Paragraph [0224]—This Paragraph [0224] illustrates Joystick Pointer Moving Signal Producing Software 20649*c*6 stored in Mouse Pointer Displaying Software Storage Area 20649*c* (Paragraph [0209]) which produces the mouse pointer moving signal described in S1 of Paragraph indicating to move left the mouse pointer by utilizing Joystick 21000*d* (not shown). In this embodiment, Joystick 21000*d* is shifted left (S1). In response thereto, CPU 211 (FIG. 1) produces the mouse pointer moving signal indicating to move left the mouse pointer (S2).

Paragraph [0225]—This Paragraph [0225] illustrates Joystick Pointer Moving Signal Producing Software 20649*c*6 stored in Mouse Pointer Displaying Software Storage Area 20649*c* (Paragraph [0209]) which produces the mouse pointer moving signal described in S1 of Paragraph indicating to move right the mouse pointer by utilizing Joystick 21000*d* (not shown). In this embodiment, Joystick 21000*d* is shifted right (S1). In response thereto, CPU 211 (FIG. 1) produces the mouse pointer moving signal indicating to move right the mouse pointer (S2).

Paragraph [0226]—This Paragraph [0226] illustrates ETS Pointer Moving Signal Producing Software 20649*c*7 stored in Mouse Pointer Displaying Software Storage Area 20649*c* (Paragraph [0209]) which produces the mouse pointer moving signal described in S1 of Paragraph indicating to move up the mouse pointer by utilizing the eye tracking system. Here, the eye tracking system is a system to move the mouse pointer displayed on LCD 201 (FIG. 1) by utilizing the eye of the user of Communication Device 200. By utilizing this system, CPU 211 (FIG. 1) periodically monitors the movement of the eyes of the user of Communication Device 200, and the mouse pointer automatically moves to the location at which he/she is currently gazing. The mechanism of the eye tracking system is introduced in the following inventions and the references cited thereof: U.S. Pat. No. 6,459,446; U.S. Pat. No. 6,394,602; U.S. Pat. No. 6,381,339; U.S. Pat. No. 6,373,961; U.S. Pat. No. 6,359,601; U.S. Pat. No. 5,926,251; U.S. Pat. No. 5,861,940; U.S. Pat. No. 5,859,686; U.S. Pat. No. 5,638,176; U.S. Pat. No. 5,635,947; U.S. Pat. No. 5,583,335; U.S. Pat. No. 5,491,492; U.S. Pat. No. 5,481,622; U.S. Pat. No. 5,430,505; U.S. Pat. No. 5,410,376; U.S. Pat. No. 5,345,281; U.S. Pat. No. 5,331,149; U.S. Pat. No. 5,270,748; U.S. Pat. No. 5,231,674; and U.S. Pat. No. 4,376,309. The eye tracking system may be implemented by utilizing CCD Unit 214 (FIG. 1) or an eye tracking unit may be installed in Communication Device 200 to implement the system. For the avoidance of doubt, the eye tracking system may be implemented by either a hardware unit or a software program.

Paragraph [0227]—In this embodiment, the user of Communication Device 200 rolls up his/her eyes, which is detected by the eye tracking system (S1). CPU 211 (FIG. 1), in response thereto, produces the mouse pointer moving signal indicating to move up the mouse pointer (S2).

Paragraph [0228]—This Paragraph [0228] illustrates ETS Pointer Moving Signal Producing Software 20649*c*7 stored in Mouse Pointer Displaying Software Storage Area 20649*c* (Paragraph [0209]) which produces the mouse pointer moving signal described in S1 of Paragraph indicating to move down the mouse pointer by utilizing the eye tracking system. In this embodiment, the user of Communication Device 200 rolls down his/her eyes, which is detected by the eye tracking system (S1). CPU 211 (FIG. 1), in response thereto, produces the mouse pointer moving signal indicating to move down the mouse pointer (S2).

Paragraph [0229]—This Paragraph [0229] illustrates ETS Pointer Moving Signal Producing Software 20649*c*7 stored in Mouse Pointer Displaying Software Storage Area 20649*c* (Paragraph [0209]) which produces the mouse pointer moving signal described in S1 of Paragraph indicating to move left the mouse pointer by utilizing the eye tracking system. In this embodiment, the user of Communication Device 200 rolls left his/her eyes, which is detected by the eye tracking system (S1). CPU 211 (FIG. 1), in response thereto, produces the mouse pointer moving signal indicating to move left the mouse pointer (S2).

Paragraph [0230]—This Paragraph [0230] illustrates ETS Pointer Moving Signal Producing Software 20649c7 stored in Mouse Pointer Displaying Software Storage Area 20649c (Paragraph [0209]) which produces the mouse pointer moving signal described in S1 of Paragraph indicating to move right the mouse pointer by utilizing the eye tracking system. In this embodiment, the user of Communication Device 200 rolls right his/her eyes, which is detected by the eye tracking system (S1). CPU 211 (FIG. 1), in response thereto, produces the mouse pointer moving signal indicating to move right the mouse pointer (S2).

Paragraph [0231]—This Paragraph [0231] illustrates a different embodiment of Mouse Pointer Moving Software 20649c2 stored in Mouse Pointer Displaying Software Storage Area 20649c (Paragraph [0209]) which is executed in combination of eye tracking system explained hereinbefore. In this embodiment, CPU 211 (FIG. 1), by utilizing the eye tracking system, determines the location on LCD 201 (FIG. 1) at which the user of Communication Device 200 is currently gazing (S1). CPU 211 then determines the new location where the mouse pointer is to be displayed (S2), and stores the new and updated current location data in 'Current Location Data' of Current Pointer Data Storage Area 20649b2 (Paragraph [0208]) (S3).

Paragraph [0232]—<<Multiple Language Displaying Function>>

Paragraph [0233]—Paragraph [0234] through Paragraph [0264] illustrate the multiple language displaying function wherein a language is selected from a plurality of languages, such as English, Japanese, French, and German, which is utilized to operate Communication Device 200.

Paragraph [0234]—This Paragraph [0234] illustrates the storage area included in RAM 206 (FIG. 1). In this embodiment, RAM 206 includes Multiple Language Displaying Info Storage Area 20654a of which the data and the software programs stored therein are described in Paragraph [0236].

Paragraph [0235]—The data and/or the software programs stored in Multiple Language Displaying Info Storage Area 20654a (Paragraph [0234]) may be downloaded from Host H (Paragraph [0025]).

Paragraph [0236]—This Paragraph [0236] illustrates the storage areas included in Multiple Language Displaying Info Storage Area 20654a (Paragraph [0234]). In this embodiment, Multiple Language Displaying Info Storage Area 20654a includes Multiple Language Displaying Data Storage Area 20654b and Multiple Language Displaying Software Storage Area 20654c. Multiple Language Displaying Data Storage Area 20654b stores the data necessary to implement the present function, such as the ones described in Paragraph [0237] through Paragraph [0245]. Multiple Language Displaying Software Storage Area 20654c stores the software programs necessary to implement the present function, such as the ones described in Paragraph [0246].

Paragraph [0237]—This Paragraph [0237] illustrates the storage areas included in Multiple Language Displaying Data Storage Area 20654b (Paragraph [0236]). In this embodiment, Multiple Language Displaying Data Storage Area 20654b includes Language Tables Storage Area 20654b1, Language Type Data Storage Area 20654b2, Language Item Data Storage Area 20654b3, and Selected Language Table ID Storage Area 20654b4. Language Tables Storage Area 20654b1 stores the data described in Paragraph [0238]. Language Type Data Storage Area 20654b2 stores the data described in Paragraph [0244]. Language Item Data Storage Area 20654b3 stores the data described in Paragraph [0245]. Selected Language Table ID Storage Area 20654b4 stores the language table ID selected in S4s of Paragraph [0248] and Paragraph [0257].

Paragraph [0238]—This Paragraph [0238] illustrates the storage areas included in Language Tables Storage Area 20654b1 (Paragraph [0237]). In this embodiment, Language Tables Storage Area 20654b1 includes Language Table#1 Storage Area 20654b1a, Language Table#2 Storage Area 20654b1b, Language Table#3 Storage Area 20654b1c, and Language Table#4 Storage Area 20654b1d. Language Table#1 Storage Area 20654b1a stores the data described in Paragraph [0239]. Language Table#2 Storage Area 20654b1b stores the data described in Paragraph [0241]. Language Table#3 Storage Area 20654b1c stores the data described in Paragraph [0242]. Language Table#4 Storage Area 20654b1d stores the data described in Paragraph [0243].

Paragraph [0239]—This Paragraph [0239] illustrates the data stored in Language Table#1 Storage Area 20654b1a (Paragraph [0238]). In this embodiment, Language Table#1 Storage Area 20654b1a comprises two columns, i.e., 'Language Item ID' and 'Language Text Data'. Column 'Language Item ID' stores the language item IDs, and each language item ID represents the identification of the corresponding language text data.

Paragraph [0240]—Column 'Language Text Data' stores the language text data, and each language text data represents the English text data displayed on LCD 201 (FIG. 1). In this embodiment, Language Table#1 Storage Area 20654b1a stores the following data: the language item ID 'Language Item#1' and the corresponding language text data 'Open file'; the language item ID 'Language Item#2' and the corresponding language text data 'Close file'; the language item ID 'Language Item#3' and the corresponding language text data 'Delete'; the language item ID 'Language Item#4' and the corresponding language text data 'Copy'; the language item ID 'Language Item#5' and the corresponding language text data 'Cut'; the language item ID 'Language Item#6' and the corresponding language text data Paste; the language item ID 'Language Item#7' and the corresponding language text data 'Insert'; the language item ID 'Language Item#8' and the corresponding language text data 'File'; the language item ID 'Language Item#9' and the corresponding language text data 'Edit'; the language item ID 'Language Item#10' and the corresponding language text data 'View'; the language item ID 'Language Item#11' and the corresponding language text data 'Format'; the language item ID 'Language Item#12' and the corresponding language text data Tools; the language item ID 'Language Item#13' and the corresponding language text data 'Window'; the language item ID 'Language Item#14' and the corresponding language text data 'Help'; the language item ID 'Language Item#15' and the corresponding language text data 'My Network'; the language item ID 'Language Item#16' and the corresponding language text data 'Trash'; the language item ID 'Language Item#17' and the corresponding language text data 'Local Disk'; the language item ID 'Language Item#18' and the corresponding language text data 'Save'; the language item ID 'Language Item#19' and the corresponding language text data 'Yes'; the language item ID 'Language Item#20' and the corresponding language text data 'No'; and the language item ID 'Language Item#21' and the corresponding language text data 'Cancel'.

Paragraph [0241]—This Paragraph [0241] illustrates the data stored in Language Table#1 Storage Area 20654b1b (Paragraph [0238]). In this embodiment, Language Table#1 Storage Area 20654b1b comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the Japanese text data displayed on LCD 201 (FIG. 1). In this embodiment, Language Table#1 Storage Area 20654b1 b stores the following data: the language item ID 'Language Item#1' and the corresponding language text data meaning 'Open file' in Japanese; the language item ID 'Language Item#2' and the corresponding language text data meaning 'Close file' in Japanese; the language item ID 'Language Item#3' and the corresponding language text data meaning 'Delete' in Japanese; the language item ID 'Language Item#4' and the corresponding language text data meaning 'Copy' in Japanese; the language item ID 'Language Item#5' and the corresponding language text data meaning 'Cut' in Japanese; the language item ID 'Language Item#6' and the corresponding language text data meaning 'Paste' in Japanese; the language item ID 'Language Item#7' and the corresponding language text data meaning 'Insert' in Japanese; the language item ID 'Language Item#8' and the corresponding language text data meaning 'File' in Japanese; the language item ID 'Language Item#9' and the corresponding language text data meaning 'Edit' in Japanese; the language item ID 'Language Item#10' and the corresponding language text data meaning 'View' in Japanese; the language item ID 'Language Item#11' and the corresponding language text data meaning 'Format' in Japanese; the language item ID 'Language Item#12' and the corresponding language text data meaning 'Tools' in Japanese; the language item ID 'Language Item#13' and the corresponding language text data meaning 'Window' in Japanese; the language item ID 'Language Item#14' and the corresponding language text data meaning 'Help' in Japanese; the language item ID 'Language Item#15' and the corresponding language text data meaning 'My Network' in Japanese; the language item ID 'Language Item#16' and the corresponding language text data meaning 'Trash' in Japanese; the language item ID 'Language Item#17' and the corresponding language text data meaning 'Local Disk' in Japanese; the language item ID 'Language Item#18' and the corresponding language text data meaning 'Save' in Japanese; the language item ID 'Language Item#19' and the corresponding language text data meaning 'Yes' in Japanese; the language item ID 'Language Item#20' and the corresponding language text data meaning 'No' in Japanese; and the language item ID 'Language Item#21' and the corresponding language text data meaning 'Cancel' in Japanese.

Paragraph [0242]—This Paragraph [0242] illustrates the data stored in Language Table#1 Storage Area 20654b1c (Paragraph [0238]). In this embodiment, Language Table#1 Storage Area 20654b1c comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the French text data displayed on LCD 201 (FIG. 1). In this embodiment, Language Table#1 Storage Area 20654b1c stores the following data: the language item ID 'Language Item#1' and the corresponding language text data 'French#1' meaning 'Open file' in French; the language item ID 'Language Item#2' and the corresponding language text data 'French#2' meaning 'Close file' in French; the language item ID 'Language Item#3' and the corresponding language text data 'French#3' meaning 'Delete' in French; the language item ID 'Language Item#4' and the corresponding language text data 'French#4' meaning 'Copy' in French; the language item ID 'Language Item#5' and the corresponding language text data 'French#5' meaning 'Cut' in French; the language item ID 'Language Item#6' and the corresponding language text data 'French#6' meaning 'Paste' in French; the language item ID 'Language Item#7' and the corresponding language text data 'French#7' meaning 'Insert' in French; the language item ID 'Language Item#8' and the corresponding language text data 'French#8' meaning 'File' in French; the language item ID 'Language Item#9' and the corresponding language text data 'French#9' meaning 'Edit' in French; the language item ID 'Language Item#10' and the corresponding language text data 'French#10' meaning 'View' in French; the language item ID 'Language Item#11' and the corresponding language text data 'French#11' meaning 'Format' in French; the language item ID 'Language Item#12' and the corresponding language text data 'Trench#12' meaning 'Tools' in French; the language item ID 'Language Item#13' and the corresponding language text data 'French#13' meaning 'Window' in French; the language item ID 'Language Item#14' and the corresponding language text data 'French#14' meaning 'Help' in French; the language item ID 'Language Item#15' and the corresponding language text data 'French#15' meaning 'My Network' in French; the language item ID 'Language Item#16' and the corresponding language text data 'French#16' meaning 'Trash' in French; the language item ID 'Language Item#17' and the corresponding language text data 'French#17' meaning 'Local Disk' in French; the language item ID 'Language Item#18' and the corresponding language text data 'French#18' meaning 'Save' in French; the language item ID 'Language Item#19' and the corresponding language text data 'French#19' meaning 'Yes' in French; the language item ID 'Language Item#20' and the corresponding language text data 'French#20' meaning 'No' in French; and the language item ID 'Language Item#21' and the corresponding language text data 'French#21' meaning 'Cancel' in French.

Paragraph [0243]—This Paragraph [0243] illustrates the data stored in Language Table#1 Storage Area 20654b1d (Paragraph [0238]). In this embodiment, Language Table#1 Storage Area 20654b1d comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the German text data displayed on LCD 201 (FIG. 1). In this embodiment, Language Table#1 Storage Area 20654b1d stores the following data: the language item ID 'Language Item#1' and the corresponding language text data 'German#1' meaning 'Open file' in German; the language item ID 'Language Item#2' and the corresponding language text data 'German#2' meaning 'Close file' in German; the language item ID 'Language Item#3' and the corresponding language text data 'German#3' meaning 'Delete' in German; the language item ID 'Language Item#4' and the corresponding language text data 'German#4' meaning 'Copy' in German; the language item ID 'Language Item#5' and the corresponding language text data 'German#5' meaning 'Cut' in German; the language item ID 'Language Item#6' and the corresponding language text data 'German#6' meaning 'Paste' in German; the language item ID 'Language Item#7' and the corresponding language text data 'German#7' meaning 'Insert' in German; the language item ID 'Language Item#8' and the corresponding language text data 'German#8' meaning 'File' in German; the language item ID 'Language Item#9' and the corresponding language text data 'German#9' meaning 'Edit' in German; the language item ID 'Language Item#10' and the corresponding language text data 'German#10' meaning 'View' in German; the language item ID 'Language Item#11' and the corresponding language text data 'German#11' meaning 'Format' in German; the language item ID 'Language Item#12' and the corresponding language text data 'German#12' meaning 'Tools' in German; the language item ID 'Language Item#13' and the corresponding language text data 'German#13' meaning 'Window' in German; the language item ID 'Language Item#14' and the corresponding language text data 'German#14' meaning 'Help' in German; the language item ID 'Language Item#15' and the corresponding language text data 'German#15' meaning 'My Network' in German; the language item ID 'Language Item#16' and the corresponding language text data 'German#16' meaning 'Trash' in German; the language item ID 'Language Item#17' and the corresponding language text data 'German#17' meaning 'Local Disk' in German; the language item ID 'Language Item#18' and the corresponding language text data 'German#18' meaning 'Save' in German; the language item ID 'Language Item#19' and the corresponding language text data 'German#19' meaning 'Yes' in German; the language item ID 'Language Item#20' and the corresponding language text data 'German#20' meaning 'No' in German; and the language item ID 'Language Item#21' and the corresponding language text data 'German#21' meaning 'Cancel' in German.

Paragraph [0244]—This Paragraph [0244] illustrates data stored in Language Type Data Storage Area 20654b2 (Paragraph [0237]). In this embodiment, Language Type Data Storage Area 20654b2 comprises two columns, i.e., 'Language Table ID' and 'Language Type Data'. Column 'Language Table ID' stores the language table ID, and each language table ID represents the identification of the storage areas included in Language Tables Storage Area 20654b1 (Paragraph [0238]). Column 'Language Type Data' stores the language type data, and each language type data represents the type of the language utilized in the language table of the corresponding language table ID. In this embodiment, Language Type Data Storage Area 20654b2 stores the following data: the language table ID 'Language Table#1' and the corresponding language type data 'English'; the language table ID 'Language Table#2' and the corresponding language type data 'Japanese'; the language table ID 'Language Table#3' and the corresponding language type data 'French'; and the language table ID 'Language Table#4' and the corresponding language type data 'German'. Here, the language table ID 'Language Table#1' is an identification of Language Table#1 Storage Area 20654b1a (Paragraph [0239]); the language table ID 'Language Table#2' is an identification of Language Table#2 Storage Area 20654b 1b (Paragraph [0241]); the language table ID 'Language Table#3' is an identification of Language Table#3 Storage Area 20654b1c (Paragraph [0242]); and the language table ID 'Language Table#4' is an identification of Language Table#4 Storage Area 20654b1d (Paragraph [0243]).

Paragraph [0245]—This Paragraph [0245] illustrates the data stored in Language Item Data Storage Area 20654b3 (Paragraph [0237]). In this embodiment, Language Item Data Storage Area 20654b3 comprises two columns, i.e., 'Language Item ID' and 'Language Item Data'. Column 'Language Item ID' stores the language item IDs, and each language item ID represents the identification of the corresponding language item data. Column 'Language Item Data' stores the language item data, and each language item data represents the content and/or the meaning of the language text data displayed on LCD 201 (FIG. 1). In this embodiment, Language Item Data Storage Area 20654b3 stores the following data: the language item ID 'Language Item#1' and the corresponding language item data 'Open file'; the language item ID 'Language Item#2' and the corresponding language item data 'Close file'; the language item ID 'Language Item#3' and the corresponding language item data 'Delete'; the language item ID 'Language Item#4' and the corresponding language item data 'Copy'; the language item ID 'Language Item#5' and the corresponding language item data 'Cut'; the language item ID 'Language Item#6' and the corresponding language item data 'Paste'; the language item ID 'Language Item#7' and the corresponding language item data 'Insert'; the language item ID 'Language Item#8' and the corresponding language item data 'File'; the language item ID 'Language Item#9' and the corresponding language item data 'Edit'; the language item ID 'Language Item#10' and the corresponding language item data 'View'; the language item ID 'Language Item#11' and the corresponding language item data 'Format'; the language item ID 'Language Item#12' and the corresponding language item data 'Tools'; the language item ID 'Language Item#13' and the corresponding language item data 'Window'; the language item ID 'Language Item#14' and the corresponding language item data 'Help'; the language item ID 'Language Item#15' and the corresponding language item data 'My Network'; the language item ID 'Language Item#16' and the corresponding language item data 'Trash'; the language item ID Language Item#17' and the corresponding language item data 'Local Disk'; the language item ID 'Language Item#18' and the corresponding language item data 'Save'; the language item ID 'Language Item#19' and the corresponding language item data 'Yes'; the language item ID 'Language Item#20' and the corresponding language item data 'No'; and the language item ID 'Language Item#21' and the corresponding language item data 'Cancel'. Primarily, the data stored in column 'Language Item Data' are same as the ones stored in column 'Language Text Data' of Language Table#1 Storage Area 20654b1a (Paragraph [0239]).

Paragraph [0246]—This Paragraph [0246] illustrates the software program stored in Multiple Language Displaying Software Storage Area 20654c (Paragraph [0236]). In this embodiment, Multiple Language Displaying Software Storage Area 20654c stores Language Selecting Software 20654c1, Selected Language Displaying Software 20654c2, Language Text Data Displaying Software For Word Processor 20654c3a, Language Text Data Displaying Software For Word Processor 20654c3b, and Language Text Data Displaying Software For Explorer 20654c4. Language Selecting Software 20654c1 is the software program described in Paragraph [0248] and Paragraph [0257]. Selected Language Displaying Software 20654c2 is the software program described in Paragraph [0249] and Paragraph [0258]. Language Text Data Displaying Software For Word Processor 20654c3a is the software program described in Paragraph [0250] and Paragraph [0259]. Language Text Data Displaying Software For Word Processor 20654c3b is the software program described in Paragraph [0253] and Paragraph [0261]. Language Text Data Displaying Software For Explorer 20654c4 is the software program described in Paragraph [0254] and Paragraph [0263].

Paragraph [0247]—<<Multiple Language Displaying Function—Utilizing English>>

Paragraph [0248]—Paragraph [0248] illustrates Language Selecting Software 20654c1 stored in Multiple Language Displaying Software Storage Area 20654c (Paragraph [0246]) which selects the language utilized to operate Communication Device 200 from a plurality of languages. In this embodiment, CPU 211 (FIG. 1) of Communication Device 200 retrieves the language type data from Language Type Data Storage Area 20654b2 (Paragraph [0244]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'English' is selected in S3. CPU 211 then identifies the language table ID corresponding to the language type data in Language Type Data Storage Area 20654b2 (Paragraph [0244]), and stores the language table ID (Language Table#1) in Selected Language Table ID Storage Area 20654b4 (Paragraph [0237]) (S4).

Paragraph [0249]—This Paragraph [0249] illustrates Selected Language Displaying Software 20654c2 stored in Multiple Language Displaying Software Storage Area 20654c (Paragraph [0246]) which displays and operates with the language selected in S3 of Paragraph (i.e., English). In this embodiment, when Communication Device 200 is powered on (S1), CPU 211 (FIG. 1) of Communication Device 200 retrieves the selected language table ID (Language Table#1) from Selected Language Table ID Storage Area 20654b4 (Paragraph [0237]) (S2). CPU 211 then identifies the storage area corresponding to the language table ID selected in S2 (Language Table#1 Storage Area 20654b1a (Paragraph [0239])) in Language Tables Storage Area 20654b1 (Paragraph [0238]) (S3). Language text data displaying process is initiated thereafter of which the details are described hereinafter (S4).

Paragraph [0250]—This Paragraph [0250] illustrates Language Text Data Displaying Software For Word Processor 20654c3a stored in Multiple Language Displaying Software Storage Area 20654c (Paragraph [0246]) which displays the language text data at the time a word processor, such as MS Word and WordPerfect is executed. In this embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#1 Storage Area 20654b1a (Paragraph [0239]) and displays the corresponding language text data 'File' at the predetermined location in the word processor (S2). CPU 211 identifies the language item ID 'Language Item#9' in Language Table#1 Storage Area 20654b1a (Paragraph [0239]) and displays the corresponding language text data 'Edit' at the predetermined location in the word processor (S3). CPU 211 identifies the language item ID 'Language Item#10' in Language Table#1 Storage Area 20654b1a (Paragraph [0239]) and displays the corresponding language text data 'View' at the predetermined location in the word processor (S4). CPU 211 identifies the language item ID 'Language Item#11' in Language Table#1 Storage Area 20654b1a (Paragraph [0239]) and displays the corresponding language text data 'Format' at the predetermined location in the word processor (S5). CPU 211 identifies the language item ID 'Language Item#12' in Language Table#1 Storage Area 20654b1a (Paragraph [0239]) and displays the corresponding language text data 'Tools' at the predetermined location in the word processor (S6). CPU 211 identifies the language item ID 'Language Item#13' in Language Table#1 Storage Area 20654b1a (Paragraph [0239]) and displays the corresponding language text data 'Window' at the predetermined location in the word processor (S7). CPU 211 identifies the language item ID 'Language Item#14' in Language Table#1 Storage Area 20654b1a (Paragraph [0239]) and displays the corresponding language text data 'Help' at the predetermined location in the word processor (S8). Alphanumeric data is input to the word processor by utilizing Input Device 210 (FIG. 1) or via voice recognition system thereafter (S9).

Paragraph [0251]—This Paragraph [0251] illustrates the data displayed on LCD 201 (FIG. 1) of Communication Device 200 at the time Language Text Data Displaying Software For Word Processor 20654c3a (Paragraph [0250]) is implemented. In this embodiment, the word processor described in Paragraph [0250] is primarily composed of Menu Bar 20154MB and Alphanumeric Data Input Area 20154ADIA wherein the language text data described in S2 through S8 of Paragraph [0250] are displayed on Menu Bar 20154MB and alphanumeric data are input in Alphanumeric Data Input Area 20154ADIA. In this embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

Paragraph [0252]—This Paragraph [0253] illustrates Language Text Data Displaying Software For Word Processor 20654c3b stored in Multiple Language Displaying Software Storage Area 20654c (Paragraph [0246]) which displays a prompt on LCD 201 (FIG. 1) at the time a word processor is closed. In this embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#1 Storage Area 20654b1a (Paragraph [0239]) and displays the corresponding language text data 'Save' at the predetermined location in the word processor (S2). CPU 211 identifies the language item ID 'Language Item#19' in Language Table#1 Storage Area 20654b1a (Paragraph [0239]) and displays the corresponding language text data 'Yes' at the predetermined location in the word processor (S3). CPU 211 identifies the language item ID 'Language Item#20' in Language Table#1 Storage Area 20654b1a (Paragraph [0239]) and displays the corresponding language text data 'No' at the predetermined location in the word processor (S4). CPU 211 identifies the language item ID 'Language Item#21' in Language Table#1 Storage Area 20654b1a (Paragraph [0239]) and displays the corresponding language text data 'Cancel' at the predetermined location in the word processor (S5). The save signal indicating to save the alphanumeric data input in S9 of Paragraph [0250] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0253]—This Paragraph [0253] illustrates the data displayed on LCD 201 (FIG. 1) of Communication Device 200 at the time Language Text Data Displaying Software For Word Processor 20654c3b (Paragraph [0253]) is implemented. In this embodiment, Prompt 20154Pr is displayed on LCD 201 (FIG. 1) at the time Language Text Data Displaying Software For Word Processor 20654c3a (Paragraph [0250]) is closed. In this embodiment, Prompt 20154Pr is primarily composed of 20154PrS, 20154PrY, 20154PrN, and 20154PrC. In this embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

Paragraph [0254]—This Paragraph [0254] illustrates Language Text Data Displaying Software For Explorer 20654c4 stored in Multiple Language Displaying Software Storage Area 20654c (Paragraph [0246]) which displays the language text data at the time a Windows Explorer like software program which displays folders and/or directories and the structures thereof is executed. In this embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the steps of S2 through S4 are implemented. Namely, CPU 211 identifies the language item ID 'Language Item#15' in Language Table#1 Storage Area 20654b1a (Paragraph [0239]) and displays the corresponding language text data 'My Network' at the predetermined location in the Windows Explorer like software program (S2). CPU 211 identifies the language item ID 'Language Item#16' in Language Table#1 Storage Area 20654b1a (Paragraph [0239]) and displays the corresponding language text data 'Trash' at the predetermined location in the Windows Explorer like software program (S3). CPU 211 identifies the language item ID 'Language Item#17' in Language Table#1 Storage Area 20654b1a (Paragraph [0239]) and displays the corresponding language text data 'Local Disk' at the predetermined location in the Windows Explorer like software program (S4).

Paragraph [0255]—This Paragraph [0255] illustrates the data displayed on LCD 201 (FIG. 1) of Communication Device 200 at the time Language Text Data Displaying Software For Explorer 20654c4 (Paragraph [0254]) is executed. In this embodiment, 20154LD, 20154MN, and 20154Tr are displayed on LCD 201 (FIG. 1) at the time Language Text Data Displaying Software For Explorer 20654c4 is executed. In this embodiment, 20154LD is the language text data processed in S4 of the previous paragraph; 20154MN is the language text data processed in S2 of the previous paragraph; and 20154Tr is the language text data processed in S3 of the previous paragraph.

Paragraph [0256]—<<Multiple Language Displaying Function—Utilizing Japanese>>

Paragraph [0257]—Paragraph [0257] illustrates Language Selecting Software 20654c1 stored in Multiple Language Displaying Software Storage Area 20654c (Paragraph [0246]) which selects the language utilized to operate Communication Device 200 from a plurality of languages. In this embodiment, CPU 211 (FIG. 1) of Communication Device 200 retrieves the language type data from Language Type Data Storage Area 20654b2 (Paragraph [0244]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'Japanese' is selected in S3. CPU 211 then identifies the language table ID corresponding to the language type data in Language Type Data Storage Area 20654b2 (Paragraph [0244]), and stores the language table ID (Language Table#2) in Selected Language Table ID Storage Area 20654b4 (Paragraph [0237]) (S4).

Paragraph [0258]—This Paragraph [0258] illustrates Selected Language Displaying Software 20654c2 stored in Multiple Language Displaying Software Storage Area 20654c (Paragraph [0246]) which displays and operates with the language selected in S3 of Paragraph (i.e., Japanese). In this embodiment, when Communication Device 200 is powered on (S1), CPU 211 (FIG. 1) of Communication Device 200 retrieves the selected language table ID (Language Table#2) from Selected Language Table ID Storage Area 20654b4 (Paragraph [0237]) (S2). CPU 211 then identifies the storage area corresponding to the language table ID selected in S2 (Language Table#2 Storage Area 20654b1b (Paragraph [0241])) in Language Tables Storage Area 20654b1 (Paragraph [0238]) (S3). Language text data displaying process is initiated thereafter of which the details are described hereinafter (S4).

Paragraph [0259]—This Paragraph [0259] illustrates Language Text Data Displaying Software For Word Processor 20654c3a stored in Multiple Language Displaying Software Storage Area 20654c (Paragraph [0246]) which displays the language text data at the time a word processor, such as MS Word and WordPerfect is executed. In this embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#2 Storage Area 20654b1b (Paragraph [0241]) and displays the corresponding language text data indicating 'File' in Japanese at the predetermined location in the word processor (S2). CPU 211 identifies the language item ID 'Language Item#9' in Language Table#2 Storage Area 20654b1b (Paragraph [0241]) and displays the corresponding language text data indicating 'Edit' in Japanese at the predetermined location in the word processor (S3). CPU 211 identifies the language item ID 'Language Item#10' in Language Table#2 Storage Area 20654b1b (Paragraph [0241]) and displays the corresponding language text data indicating 'View' in Japanese at the predetermined location in the word processor (S4). CPU 211 identifies the language item ID 'Language Item#11' in Language Table#2 Storage Area 20654b1b (Paragraph [0241]) and displays the corresponding language text data indicating 'Format' in Japanese at the predetermined location in the word processor (S5). CPU 211 identifies the language item ID 'Language Item#12' in Language Table#2 Storage Area 20654b1b (Paragraph [0241]) and displays the corresponding language text data indicating 'Tools' in Japanese at the predetermined location in the word processor (S6). CPU 211 identifies the language item ID 'Language Item#13' in Language Table#2 Storage Area 20654b1b (Paragraph [0241]) and displays the corresponding language text data indicating 'Window' in Japanese at the predetermined location in the word processor (S7). CPU 211 identifies the language item ID 'Language Item#14' in Language Table#2 Storage Area 20654b1b (Paragraph [0241]) and displays the corresponding language text data indicating 'Help' in Japanese at the predetermined location in the word processor (S8). Alphanumeric data is input to the word processor by utilizing Input Device 210 (FIG. 1) or via voice recognition system thereafter (S9).

Paragraph [0260]—This Paragraph [0260] illustrates the data displayed on LCD 201 (FIG. 1) of Communication Device 200 at the time Language Text Data Displaying Software For Word Processor 20654c3a (Paragraph [0259]) is implemented. In this embodiment, the word processor described in Paragraph [0259] is primarily composed of Menu Bar 20154MB and Alphanumeric Data Input Area 20154ADIA wherein the language text data described in S2 through S8 of Paragraph [0259] are displayed on Menu Bar 20154MB and alphanumeric data are input in Alphanumeric Data Input Area 20154ADIA. In this embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

Paragraph [0261]—This Paragraph [0261] illustrates Language Text Data Displaying Software For Word Processor 20654c3b stored in Multiple Language Displaying Software Storage Area 20654c (Paragraph [0246]) which displays a prompt on LCD 201 (FIG. 1) at the time a word processor is closed. In this embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#2 Storage Area 20654b1b (Paragraph [0241]) and displays the corresponding language text data indicating 'Save' in Japanese at the predetermined location in the word processor (S2). CPU 211 identifies the language item ID 'Language Item#19' in Language Table#2 Storage Area 20654b1b (Paragraph [0241]) and displays the corresponding language text data indicating 'Yes' in Japanese at the predetermined location in the word processor (S3). CPU 211 identifies the language item ID 'Language Item#20' in Language Table#2 Storage Area 20654b1b (Paragraph [0241]) and displays the corresponding language text data indicating 'No' in Japanese at the predetermined location in the word processor (S4). CPU 211 identifies the language item ID 'Language Item#21' in Language Table#2 Storage Area 20654b1b (Paragraph [0241]) and displays the corresponding language text data indicating 'Cancel' in Japanese at the predetermined location in the word processor (S5). The save signal indicating to save the alphanumeric data input in S9 of Paragraph is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0262]—This Paragraph [0262] illustrates the data displayed on LCD 201 (FIG. 1) of Communication Device 200 at the time Language Text Data Displaying Software For Word Processor 20654c3b (Paragraph [0261]) is implemented. In this embodiment, Prompt 20154Pr is displayed on LCD 201 (FIG. 1) at the time Language Text Data Displaying Software For Word Processor 20654c3a (Paragraph [0259]) is closed. In this embodiment, Prompt 20154Pr is primarily composed of 20154PrS, 20154PrY, 20154PrN, and 20154PrC. In this embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

Paragraph [0263]—This Paragraph [0263] illustrates Language Text Data Displaying Software For Explorer 20654c4 stored in Multiple Language Displaying Software Storage Area 20654c (Paragraph [0246]) which displays the language text data at the time a Windows Explorer like software program which displays folders and/or directories and the structures thereof is executed. In this embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#2 Storage Area 20654b1b (Paragraph [0241]) and displays the corresponding language text data indicating 'My Network' in Japanese at the predetermined location in the Windows Explorer like software program (S2). CPU 211 identifies the language item ID 'Language Item#16' in Language Table#2 Storage Area 20654b1b (Paragraph [0241]) and displays the corresponding language text data indicating 'Trash' in Japanese at the predetermined location in the Windows Explorer like software program (S3). CPU 211 identifies the language item ID 'Language Item#17' in Language Table#2 Storage Area 20654b1b (Paragraph [0241]) and displays the corresponding language text data indicating 'Local Disk' in Japanese at the predetermined location in the Windows Explorer like software program (S4).

Paragraph [0264]—This Paragraph [0264] illustrates the data displayed on LCD 201 (FIG. 1) of Communication Device 200 at the time Language Text Data Displaying Software For Explorer 20654c4 (Paragraph [0263]) is executed. In this embodiment, 20154LD, 20154MN, and 20154Tr are displayed on LCD 201 (FIG. 1) at the time Language Text Data Displaying Software For Explorer 20654c4 is executed. In this embodiment, 20154LD is the language text data processed in S4 of the previous paragraph; 20154MN is the language text data processed in S2 of the previous paragraph; and 20154Tr is the language text data processed in S3 of the previous paragraph.

Paragraph [0265]—<<Caller's Information Displaying Function>>

Paragraph [0266]—Paragraph [0270] through Paragraph [0315] illustrate the Caller's Information displaying function which displays the Information regarding the caller (e.g., name, phone number, email address, and home address, etc.) on LCD 201 (FIG. 1) when Communication Device 200 is utilized as a 'TV phone'.

Paragraph [0267]—Paragraph [0270] through Paragraph [0277] illustrate the data and software programs stored in RAM 206 (FIG. 1) of Caller's Device, a Communication Device 200, utilized by the caller.

Paragraph [0268]—Paragraph [0278] through Paragraph [0285] illustrate the data and software programs stored in RAM 206 (FIG. 1) of Callee's Device, a Communication Device 200, utilized by the callee.

Paragraph [0269]—Paragraph [0286] through Paragraph [0289] illustrate the data and software programs stored in Host H (Paragraph [0025]).

Paragraph [0270]—This Paragraph [0270] illustrates the storage area included in RAM 206 (FIG. 1) of Caller's Device. In this embodiment, RAM 206 of Caller's Device includes Caller's Information Displaying Information Storage Area 20655a of which the data and the software programs stored therein are described in Paragraph [0271].

Paragraph [0271]—This Paragraph [0271] illustrates the storage areas included in Caller's Information Displaying Information Storage Area 20655a (Paragraph [0270]). In this embodiment, Caller's Information Displaying Information Storage Area 20655a includes Caller's Information Displaying Data Storage Area 20655b and Caller's Information Displaying Software Storage Area 20655c. Caller's Information Displaying Data Storage Area 20655b stores the data necessary to implement the present function on the side of Caller's Device, such as the ones described in Paragraph [0272] through Paragraph [0276]. Caller's Information Displaying Software Storage Area 20655c stores the software programs necessary to implement the present function on the side of Caller's Device, such as the ones described in Paragraph [0277].

Paragraph [0272]—This Paragraph [0272] illustrates the storage areas included in Caller's Information Displaying Data Storage Area 20655b. In this embodiment, Caller's Information Displaying Data Storage Area 20655b includes Caller's Audiovisual Data Storage Area 20655b1, Callee's Audiovisual Data Storage Area 20655b2, Caller's Personal Data Storage Area 20655b3, Callee's Personal Data Storage Area 20655b4, Caller's Calculated GPS Data Storage Area 20655b5, Callee's Calculated GPS Data Storage Area 20655b6, Caller's Map Data Storage Area 20655b7, Callee's Map Data Storage Area 20655b8, and Work Area 20655b9. Caller's Audiovisual Data Storage Area 20655b1 stores the data described in Paragraph [0273]. Callee's Audiovisual Data Storage Area 20655b2 stores the data described in Paragraph [0274]. Caller's Personal Data Storage Area 20655b3 stores the data described in Paragraph [0275]. Callee's Personal Data Storage Area 20655b4 stores the data described in Paragraph [0276]. Caller's Calculated GPS Data Storage Area 20655b5 stores the caller's calculated GPS data which represents the current geographic location of Caller's Device in (x, y, z) format. Callee's Calculated GPS Data Storage Area 20655b6 stores the callee's calculated GPS data which represents the current geographic location of Callee's Device in (x, y, z) format. Caller's Map Data Storage Area 20655b7 stores the map data representing the surrounding area of the location indicated by the caller's calculated GPS data. Callee's Map Data Storage Area 20655b8 stores the map data representing the surrounding area of the location indicated by the callee's calculated GPS data. Work Area 20655b9 is a storage area utilized to perform calculation and to temporarily store data.

Paragraph [0273]—This Paragraph [0273] illustrates the storage areas included in Caller's Audiovisual Data Storage Area 20655b1 (Paragraph [0272]). In this embodiment, Caller's Audiovisual Data Storage Area 20655b1 includes Caller's Audio Data Storage Area 20655b1a and Caller's Visual Data Storage Area 20655b1b. Caller's Audio Data Storage Area 20655b1a stores the caller's audio data which represents the audio data input via Microphone 215 (FIG. 1) of Caller's Device. Caller's Visual Data Storage Area 20655b1b stores the caller's visual data which represents the visual data input via CCD Unit 214 (FIG. 1) of Caller's Device.

Paragraph [0274]—This Paragraph [0274] illustrates the storage areas included in Callee's Audiovisual Data Storage Area 20655b2 (Paragraph [0272]). In this embodiment, Callee's Audiovisual Data Storage Area 20655b2 includes Callee's Audio Data Storage Area 20655b2a and Callee's Visual Data Storage Area 20655b2b. Callee's Audio Data Storage Area 20655b2a stores the callee's audio data which represents the audio data sent from Callee's Device. Callee's Visual Data Storage Area 20655b2b stores the callee's visual data which represents the visual data sent from Callee's Device.

Paragraph [0275]—This Paragraph [0275] illustrates the data stored in Caller's Personal Data Storage Area 20655b3 (Paragraph [0272]). In this embodiment, Caller's Personal Data Storage Area 20655b3 comprises two columns, i.e., 'Caller's Personal Data' and 'Permitted Caller's Personal Data Flag'. Column 'Caller's Personal Data' stores the caller's personal data which represent the personal data of the caller. Column 'Permitted Caller's Personal Data Flag' stores the permitted caller's personal data flag and each permitted caller's personal data flag represents whether the corresponding caller's personal data is permitted to be displayed on Callee's Device. The permitted caller's personal data flag is represented by either '1' or '0' wherein '1' indicates that the corresponding caller's personal data is permitted to be displayed on Callee's Device, and '0' indicates that the corresponding caller's personal data is not permitted to be displayed on Callee's Device. In this embodiment, Caller's Personal Data Storage Area 20655b3 stores the following data: the caller's name and the corresponding permitted caller's personal data flag '1'; the caller's phone number and the corresponding permitted caller's personal data flag '1'; the caller's email address and the corresponding permitted caller's personal data flag '1'; the caller's home address and the corresponding permitted caller's personal data flag '1'; the caller's business address and the corresponding permitted caller's personal data flag '0'; the caller's title and the corresponding permitted caller's personal data flag '0'; the caller's hobby and the corresponding permitted caller's personal data flag '0'; the caller's blood type and the corresponding permitted caller's personal data flag '0'; the caller's gender and the corresponding permitted caller's personal data flag '0'; the caller's age and the corresponding permitted caller's personal data flag '0'; and caller's date of birth and the corresponding permitted caller's personal data flag '0'.

Paragraph [0276]—This Paragraph [0276] illustrates the data stored in Callee's Personal Data Storage Area 20655b4 (Paragraph [0272]). In this embodiment, Callee's Personal Data Storage Area 20655b4 stores the callee's personal data which represent the personal data of the callee which are displayed on LCD 201 (FIG. 1) of Caller's Device. In this embodiment, Callee's Personal Data Storage Area 20655b4 stores the callee's name and phone number.

Paragraph [0277]—This Paragraph [0277] illustrates the software programs stored in Caller's Information Displaying Software Storage Area 20655c (Paragraph [0271]). In this embodiment, Caller's Information Displaying Software Storage Area 20655c stores Permitted Caller's Personal Data Selecting Software 20655c1, Dialing Software 20655c2, Caller's Device Pin-pointing Software 20655c3, Map Data Sending/Receiving Software 20655c4, Caller's Audiovisual Data Collecting Software 20655c5, Caller's Information Sending/Receiving Software 20655c6, Callee's Information Sending/Receiving Software 20655c6a, Permitted Callee's Personal Data Displaying Software 20655c7, Map Displaying Software 20655c8, Callee's Audio Data Outputting Software 20655c9, and Callee's Visual Data Displaying Software 20655c10. Permitted Caller's Personal Data Selecting Software 20655c1 is the software program described in Paragraph [0291]. Dialing Software 20655c2 is the software program described in Paragraph [0292]. Caller's Device Pin-pointing Software 20655c3 is the software program described in Paragraph [0293] and Paragraph [0294]. Map Data Sending/Receiving Software 20655c4 is the software program described in Paragraph [0295]. Caller's Audiovisual Data Collecting Software 20655c5 is the software program described in Paragraph [0296]. Caller's Information Sending/Receiving Software 20655c6 is the software program described in Paragraph [0297]. Callee's Information Sending/Receiving Software 20655c6a is the software program described in Paragraph [0311]. Permitted Callee's Personal Data Displaying Software 20655c7 is the software program described in Paragraph [0312]. Map Displaying Software 20655c8 is the software program described in Paragraph [0313]. Callee's Audio Data Outputting Software 20655c9 is the software program described in Paragraph [0314]. Callee's Visual Data Displaying Software 20655c10 is the software program described in Paragraph [0315].

Paragraph [0278]—This Paragraph [0278] illustrates the storage area included in RAM 206A (FIG. 1) of Callee's Device. In this embodiment, RAM 206A of Callee's Device includes Callee's Information Displaying Information Storage Area 20655aA of which the data and the software programs stored therein are described in Paragraph [0279].

Paragraph [0279]—This Paragraph [0279] illustrates the storage areas included in Callee's Information Displaying Information Storage Area 20655aA (Paragraph [0278]). In this embodiment, Callee's Information Displaying Information Storage Area 20655aA includes Callee's Information Displaying Data Storage Area 20655bA and Callee's Information Displaying Software Storage Area 20655cA. Callee's Information Displaying Data Storage Area 20655bA stores the data necessary to implement the present function on the side of Callee's Device, such as the ones described in Paragraph [0280] through Paragraph [0284]. Callee's Information Displaying Software Storage Area 20655cA stores the software programs necessary to implement the present function on the side of Callee's Device, such as the ones described in Paragraph [0285].

Paragraph [0280]—This Paragraph [0280] illustrates the storage areas included in Callee's Information Displaying Data Storage Area 20655bA. In this embodiment, Callee's Information Displaying Data Storage Area 20655bA includes Caller's Audiovisual Data Storage Area 20655b1A, Callee's Audiovisual Data Storage Area 20655b2A, Caller's Personal Data Storage Area 20655b3A, Callee's Personal Data Storage Area 20655b4A, Caller's Calculated GPS Data Storage Area 20655b5A, Callee's Calculated GPS Data Storage Area 20655b6A, Caller's Map Data Storage Area 20655b7A, Callee's Map Data Storage Area 20655b8A, and Work Area 20655b9A. Caller's Audiovisual Data Storage Area 20655b1A stores the data described in Paragraph [0281]. Callee's Audiovisual Data Storage Area 20655b2A stores the data described in Paragraph [0282]. Caller's Personal Data Storage Area 20655b3A stores the data described in Paragraph [0283]. Callee's Personal Data Storage Area 20655b4A stores the data described in Paragraph [0284]. Caller's Calculated GPS Data Storage Area 20655b5A stores the caller's calculated GPS data which represents the current geographic location of Caller's Device in (x, y, z) format. Callee's Calculated GPS Data Storage Area 20655b6A stores the callee's calculated GPS data which represents the current geographic location of Callee's Device in (x, y, z) format. Caller's Map Data Storage Area 20655b7A stores the map data representing the surrounding area of the location indicated by the caller's calculated GPS data. Callee's Map Data Storage Area 20655b8A stores the map data representing the surrounding area of the location indicated by the callee's calculated GPS data. Work Area 20655b9A is a storage area utilized to perform calculation and to temporarily store data.

Paragraph [0281]—This Paragraph [0281] illustrates the storage areas included in Caller's Audiovisual Data Storage Area 20655b1A (Paragraph [0280]). In this embodiment, Caller's Audiovisual Data Storage Area 20655b1A includes Caller's Audio Data Storage Area 20655b1aA and Caller's Visual Data Storage Area 20655b1bA. Caller's Audio Data Storage Area 20655b1aA stores the caller's audio data which represents the audio data sent from Caller's Device in a wireless fashion. Caller's Visual Data Storage Area 20655b1bA stores the caller's visual data which represents the visual data input sent from Caller's Device in a wireless fashion.

Paragraph [0282]—This Paragraph [0282] illustrates the storage areas included in Callee's Audiovisual Data Storage Area 20655b2A (Paragraph [0280]). In this embodiment, Callee's Audiovisual Data Storage Area 20655b2A includes Callee's Audio Data Storage Area 20655b2aA and Callee's Visual Data Storage Area 20655b2bA. Callee's Audio Data Storage Area 20655b2aA stores the callee's audio data which represents the audio data input via Microphone 215 (FIG. 1) of Callee's Device. Callee's Visual Data Storage Area 20655b2bA stores the callee's visual data which represents the visual data input via CCD Unit 214 (FIG. 1) of Callee's Device.

Paragraph [0283]—This Paragraph [0283] illustrates the data stored in Caller's Personal Data Storage Area 20655b3A (Paragraph [0280]). In this embodiment, Caller's Personal Data Storage Area 20655b3A stores the caller's personal data which represent the personal data of the caller which are displayed on LCD 201 (FIG. 1) of Caller's Device. In this embodiment, Caller's Personal Data Storage Area 20655b3A stores the caller's name, phone number, email address, and home address.

Paragraph [0284]—This Paragraph [0284] illustrates the data stored in Callee's Personal Data Storage Area 20655b4A (Paragraph [0280]). In this embodiment, Callee's Personal Data Storage Area 20655b4A comprises two columns, i.e., 'Callee's Personal Data' and Permitted Callee's Personal Data Flag'. Column 'Callee's Personal Data' stores the callee's personal data which represent the personal data of the callee. Column 'Permitted Callee's Personal Data Flag' stores the permitted callee's personal data flag and each permitted callee's personal data flag represents whether the corresponding callee's personal data is permitted to be displayed on Caller's Device. The permitted callee's personal data flag is represented by either '1' or '0' wherein '1' indicates that the corresponding callee's personal data is permitted to be displayed on Caller's Device, and '0' indicates that the corresponding callee's personal data is not permitted to be displayed on Caller's Device. In this embodiment, Callee's Personal Data Storage Area 20655b4A stores the following data: callee's name and the corresponding permitted callee's personal data flag '1'; the callee's phone number and the corresponding permitted callee's personal data flag '1'; the callee's email address and the corresponding permitted caller's personal data flag '0'; the callee's home address and the corresponding permitted callee's personal data flag '0'; the callee's business address and the corresponding permitted callee's personal data flag '0'; the callee's title and the corresponding permitted callee's personal data flag '0'; the callee's hobby and the corresponding permitted callee's personal data flag '0'; the callee's blood type and the corresponding permitted callee's personal data flag '0'; the callee's gender and the corresponding permitted callee's personal data flag '0'; the callee's age and the corresponding permitted callee's personal data flag '0'; and callee's date of birth and the corresponding permitted callee's personal data flag '0'.

Paragraph [0285]—This Paragraph [0285] illustrates the software programs stored in Callee's Information Displaying Software Storage Area 20655cA (Paragraph [0279]). In this embodiment, Callee's Information Displaying Software Storage Area 20655cA stores Permitted Callee's Personal Data Selecting Software 20655c1A, Dialing Software 20655c2A, Callee's Device Pin-pointing Software 20655c3A, Map Data Sending/Receiving Software 20655c4A, Callee's Audiovisual Data Collecting Software 20655c5A, Callee's Information Sending/Receiving Software 20655c6A, Caller's Information Sending/Receiving Software 20655c6aA, Permitted Caller's Personal Data Displaying Software 20655c7A, Map Displaying Software 20655c8A, Caller's Audio Data Outputting Software 20655c9A, and Caller's Visual Data Displaying Software 20655c10A. Permitted Callee's Personal Data Selecting Software 20655c1A is the software program described in Paragraph [0304]. Dialing Software 20655c2A is the software program described in Paragraph [0305]. Callee's Device Pin-pointing Software 20655c3A is the software program described in Paragraph [0306] and Paragraph [0307]. Map Data Sending/Receiving Software 20655c4A is the software program described in Paragraph [0308]. Callee's Audiovisual Data Collecting Software 20655c5A is the software program described in Paragraph [0309]. Callee's Information Sending/Receiving Software 20655c6A is the software program described in Paragraph [0310]. Caller's Information Sending/Receiving Software 20655c6aA is the software program described in Paragraph [0298]. Permitted Caller's Personal Data Displaying Software 20655c7A is the software program described in Paragraph [0299]. Map Displaying Software 20655c8A is the software program described in Paragraph [0300]. Caller's Audio Data Outputting Software 20655c9A is the software program described in Paragraph [0301]. Caller's Visual Data Displaying Software 20655c10A is the software program described in Paragraph [0302].

Paragraph [0286]—This Paragraph [0286] illustrates the storage area included in Host H (Paragraph [0025]). In this embodiment, Host H includes Caller/Callee Information Storage Area H55a of which the data and the software programs stored therein are described hereinafter.

Paragraph [0287]—This Paragraph [0287] illustrates the storage areas included in Caller/Callee Information Storage Area H55a. In this embodiment, Caller/Callee Information Storage Area H55a includes Caller/Callee Data Storage Area H55b and Caller/Callee Software Storage Area H55c. Caller/Callee Data Storage Area H55b stores the data necessary to implement the present function on the side of Host H (Paragraph [0025]), such as the ones described in Paragraph [0288]. Caller/Callee Software Storage Area H55c stores the software programs necessary to implement the present function on the side of Host H, such as the ones described in Paragraph [0289].

Paragraph [0288]—This Paragraph [0288] illustrates the storage areas included in Caller/Callee Data Storage Area H55b. In this embodiment, Caller/Callee Data Storage Area H55b includes Caller's Information Storage Area H55b1, Callee's Information Storage Area H55b2, Map Data Storage Area H55b3, Work Area h55b4, Caller's Calculated GPS Data Storage Area H55b5, and Callee's Calculated GPS Data Storage Area H55b6. Caller's Information Storage Area H55b1 stores the Caller's Information received Caller's Device. Callee's Information Storage Area H55b2 stores the Callee's Information received Callee's Device. Map Data Storage Area H55b3 stores the map data received from Caller's Device and Callee's Device. Work Area H55b4 is a storage area utilized to perform calculation and to temporarily store data. Caller's Calculated GPS Data Storage Area H55b5 stores the caller's calculated GPS data. Callee's Calculated GPS Data Storage Area H55b6 stores the callee's calculated GPS data.

Paragraph [0289]—This Paragraph [0289] illustrates the software programs stored in Caller/Callee Software Storage Area H55c (Paragraph [0289]). In this embodiment, Caller/Callee Software Storage Area H55c stores Dialing Software H55c2, Caller's Device Pin-pointing Software H55c3, Callee's Device Pin-pointing Software H55c3a, Map Data Sending/Receiving Software H55c4, Caller's Information Sending/Receiving Software H55c6, and Callee's Information Sending/Receiving Software H55c6a. Dialing Software H55c2 is the software program described in Paragraph [0292] and Paragraph [0305]. Caller's Device Pin-pointing Software H55c3 is the software program described in Paragraph [0293]. Callee's Device Pin-pointing Software H55c3a is the software program described in Paragraph [0306]. Map Data Sending/Receiving Software H55c4 is the software program described in Paragraph [0295] and Paragraph [0308]. Caller's Information Sending/Receiving Software H55c6 is the software program described in Paragraph [0297]. Callee's Information Sending/Receiving Software H55c6a is the software program described in Paragraph [0310] and Paragraph [0311].

Paragraph [0290]—Paragraph [0291] through Paragraph [0302] primarily illustrate the sequence to output the Caller's Information (which is defined hereinafter) from Callee's Device.

Paragraph [0291]—This Paragraph [0291] illustrates Permitted Caller's Personal Data Selecting Software 20655c1 stored in Caller's Information Displaying Software Storage Area 20655c (Paragraph [0277]) of Caller's Device, which selects the permitted caller's personal data to be displayed on LCD 201 (FIG. 1) of Callee's Device. In this embodiment, CPU 211 (FIG. 1) of Caller's Device retrieves all of the caller's personal data from Caller's Personal Data Storage Area 20655b3 (Paragraph [0275]) (S1). CPU 211 then displays a list of caller's personal data on LCD 201 (FIG. 1) (S2). The caller selects, by utilizing Input Device 210 (FIG. 1) or via voice recognition system, the caller's personal data permitted to be displayed on Callee's Device (S3). The permitted caller's personal data flag of the data selected in S3 is registered as '1' (S4).

Paragraph [0292]—This Paragraph [0292] illustrates Dialing Software H55c2 stored in Caller/Callee Software Storage Area H55c (Paragraph [0289]) of Host H (Paragraph [0025]), Dialing Software 20655c2 stored in Caller's Information Displaying Software Storage Area 20655c (Paragraph [0277]) of Caller's Device, and Dialing Software 20655c2A stored in Callee's Information Displaying Software Storage Area 20655cA (Paragraph [0285]) of Callee's Device, which enables to connect between Caller's Device and Callee's Device via Host H (Paragraph [0025]) in a wireless fashion. In this embodiment, a connection is established between Caller's Device and Host H (S1). Next, a connection is established between Host H and Callee's Device (S2). As a result, Caller's Device and Callee's Device are able to exchange audiovisual data, text data, and various types of data with each other. The connection is maintained until Caller's Device, Host H, or Callee's Device terminates the connection.

Paragraph [0293]—This Paragraph [0293] illustrates Caller's Device Pin-pointing Software H55c3 (Paragraph [0289]) stored in Caller/Callee Software Storage Area H55c (Paragraph [0289]) of Host H (Paragraph [0025]) and Caller's Device Pin-pointing Software 20655c3 stored in Caller's Information Displaying Software Storage Area 20655c (Paragraph [0277]) of Caller's Device, which identifies the current geographic location of Caller's Device. In this embodiment, CPU 211 (FIG. 1) of Caller's Device collects the GPS raw data from the near base stations (S1). CPU 211 sends the raw GPS data to Host H (S2). Upon receiving the raw GPS data (S3), Host H produces the caller's calculated GPS data by referring to the raw GPS data (S4). Host H stores the caller's calculated GPS data in Caller's Calculated GPS Data Storage Area H55b5 (Paragraph [0288]) (S5). Host H then retrieves the caller's calculated GPS data from Caller's Calculated GPS Data Storage Area H55b5 (Paragraph [0288]) (S6), and sends the data to Caller's Device (S7). Upon receiving the caller's calculated GPS data from Host H (S8), CPU 211 stores the data in Caller's Calculated GPS Data Storage Area 20655b5 (Paragraph [0272]) (S9). Here, the GPS raw data are the primitive data utilized to produce the caller's calculated GPS data, and the caller's calculated GPS data is the data representing the location of Caller's Device in (x, y, z) format. The sequence described in the present paragraph is repeated periodically.

Paragraph [0294]—This Paragraph [0294] illustrates another embodiment of the sequence described in Paragraph [0293] in which the entire process is performed solely by Caller's Device Pin-pointing Software 20655c3 stored in Caller's Information Displaying Software Storage Area 20655c (Paragraph [0277]) of Caller's Device. In this embodiment, CPU 211 (FIG. 1) of Caller's Device collects the raw GPS data from the near base stations (S1). CPU 211 then produces the caller's calculated GPS data by referring to the raw GPS data (S2), and stores the caller's calculated GPS data in Caller's Calculated GPS Data Storage Area 20655b5 (Paragraph [0272]) (S3). The sequence described in the present paragraph is repeated periodically.

Paragraph [0295]—This Paragraph [0295] illustrates Map Data Sending/Receiving Software H55c4 stored in Caller/Callee Software Storage Area H55c (Paragraph [0289]) of Host H (Paragraph [0025]) and Map Data Sending/Receiving Software 20655c4 stored in Caller's Information Displaying Software Storage Area 20655c (Paragraph [0277]) of Caller's Device, which sends and receives the map data. In this embodiment, CPU 211 (FIG. 1) of Caller's Device retrieves the caller's calculated GPS data from Caller's Calculated GPS Data Storage Area 20655b5 (Paragraph [0272]) (S1), and sends the data to Host H (S2). Upon receiving the calculated GPS data from Caller's Device (S3), Host H identifies the map data in Map Data Storage Area H55b3 (Paragraph [0288]) (S4). Here, the map data represents the surrounding area of the location indicated by the caller's calculated GPS data. Host H retrieves the map data from Map Data Storage Area H55b3 (Paragraph [0288]) (S5), and sends the data to Caller's Device (S6). Upon receiving the map data from Host H (S7), Caller's Device stores the data in Caller's Map Data Storage Area 20655b7 (Paragraph [0272]) (S8). The sequence described in the present paragraph is repeated periodically.

Paragraph [0296]—This Paragraph [0296] illustrates Caller's Audiovisual Data Collecting Software 20655c5 stored in Caller's Information Displaying Software Storage Area 20655c (Paragraph [0277]) of Caller's Device, which collects the audiovisual data of the caller to be sent to Callee's Device via Antenna 218 (FIG. 1) thereof. CPU 211 (FIG. 1) of Caller's Device retrieves the caller's audiovisual data from CCD Unit 214 and Microphone 215 (S1). CPU 211 then stores the caller's audio data in Caller's Audio Data Storage Area 20655b1a (Paragraph [0273]) (S2), and the caller's visual data in Caller's Visual Data Storage Area 20655b1b (Paragraph [0273]) (S3). The sequence described in the present paragraph is repeated periodically.

Paragraph [0297]—This Paragraph [0297] illustrates Caller's Information Sending/Receiving Software H55c6 stored in Caller/Callee Software Storage Area H55c (Paragraph [0289]) of Host H (Paragraph [0025]) and Caller's Information Sending/Receiving Software 20655c6 stored in Caller's Information Displaying Software Storage Area 20655c (Paragraph [0277]) of Caller's Device, which sends and receives the Caller's Information (which is defined hereinafter) between Caller's Device and Host H. In this embodiment, CPU 211 (FIG. 1) of Caller's Device retrieves the permitted caller's personal data from Caller's Personal Data Storage Area 20655b3 (Paragraph [0275]) (S1). CPU 211 retrieves the caller's calculated GPS data from Caller's Calculated GPS Data Storage Area 20655b5 (Paragraph [0272]) (S2). CPU 211 retrieves the map data from Caller's Map Data Storage Area 20655b7 (Paragraph [0272]) (S3). CPU 211 retrieves the caller's audio data from Caller's Audio Data Storage Area 20655b1a (Paragraph [0273]) (S4). CPU 211 retrieves the caller's visual data from Caller's Visual Data Storage Area 20655b1b (Paragraph [0273]) (S5). CPU 211 then sends the data retrieved in S1 through S5 (collectively defined as the 'Caller's Information' hereinafter) to Host H (S6). Upon receiving the Caller's Information from Caller's Device (S7), Host H stores the Caller's Information in Caller's Information Storage Area H55b1 (Paragraph [0288]) (S8). The sequence described in the present paragraph is repeated periodically.

Paragraph [0298]—This Paragraph [0298] illustrates Caller's Information Sending/Receiving Software H55c6 stored in Caller/Callee Software Storage Area H55c (Paragraph [0289]) of Host H (Paragraph [0025]) and Caller's Information Sending/Receiving Software 20655c6aA (Paragraph [0285]) stored in Caller's Information Displaying Software Storage Area 20655c (Paragraph [0277]) of Caller's Device, which sends and receives the Caller's Information between Host H and Callee's Device. In this embodiment, Host H retrieves the Caller's Information from Caller's Information Storage Area H55b1 (Paragraph [0288]) (S1), and sends the Caller's Information to Callee's Device (S2). CPU 211 (FIG. 1) of Callee's Device receives the Caller's Information from Host H (S3). CPU 211 stores the permitted caller's personal data in Caller's Personal Data Storage Area 20655b3A (Paragraph [0283]) (S4). CPU 211 stores the caller's calculated GPS data in Caller's Calculated GPS Data Storage Area 20655b5A (Paragraph [0280]) (S5). CPU 211 stores the map data in Caller's Map Data Storage Area 20655b7A (Paragraph [0280]) (S6). CPU 211 stores the caller's audio data in Caller's Audio Data Storage Area 20655b1aA (Paragraph [0281]) (S7). CPU 211 stores the caller's visual data in Caller's Visual Data Storage Area 20655b1bA (Paragraph [0281]) (S8). The sequence described in the present paragraph is repeated periodically.

Paragraph [0299]—This Paragraph [0299] illustrates Permitted Caller's Personal Data Displaying Software 20655c7A stored in Callee's Information Displaying Software Storage Area 20655cA (Paragraph [0285]) of Callee's Device, which displays the permitted caller's personal data on LCD 201 (FIG. 1) of Callee's Device. In this embodiment, CPU 211 (FIG. 1) of Callee's Device retrieves the permitted caller's personal data from Caller's Personal Data Storage Area 20655b3A (Paragraph [0283]) (S1). CPU 211 then displays the permitted caller's personal data on LCD 201 (FIG. 1) (S2). The sequence described in the present paragraph is repeated periodically.

Paragraph [0300]—This Paragraph [0300] illustrates Map Displaying Software 20655c8A stored in Callee's Information Displaying Software Storage Area 20655cA (Paragraph

[0285]) of Callee's Device, which displays the map representing the surrounding area of the location indicated by the caller's calculated GPS data. In this embodiment, CPU 211 (FIG. 1) of Callee's Device retrieves the caller's calculated GPS data from Caller's Calculated GPS Data Storage Area 20655*b*5A (Paragraph [0280]) (S1). CPU 211 then retrieves the map data from Caller's Map Data Storage Area 20655*b*7A (Paragraph [0280]) (S2), and arranges on the map data the caller's current location icon in accordance with the caller's calculated GPS data (S3). Here, the caller's current location icon is an icon which represents the location of Caller's Device in the map data. The map with the caller's current location icon is displayed on LCD 201 (FIG. 1) (S4). The sequence described in the present paragraph is repeated periodically.

Paragraph [0301]—This Paragraph [0301] illustrates Caller's Audio Data Outputting Software 20655*c*9A stored in Caller's Information Displaying Software Storage Area 20655*c* (Paragraph [0277]) of Caller's Device, which outputs the caller's audio data from Speaker 216 (FIG. 1) of Callee's Device. In this embodiment, CPU 211 (FIG. 1) of Callee's Device retrieves the caller's audio data from Caller's Audio Data Storage Area 20655*b*1*a*A (Paragraph [0281]) (S1). CPU 211 then outputs the caller's audio data from Speaker 216 (FIG. 1) (S2). The sequence described in the present paragraph is repeated periodically.

Paragraph [0302]—This Paragraph [0302] illustrates Caller's Visual Data Displaying Software 20655*c*10A stored in Callee's Information Displaying Software Storage Area 20655*c*A (Paragraph [0285]) of Callee's Device, which displays the caller's visual data on LCD 201 (FIG. 1) of Callee's Device. In this embodiment, CPU 211 (FIG. 1) of Callee's Device retrieves the caller's visual data from Caller's Visual Data Storage Area 20655*b*1*b*A (Paragraph [0281]) (S1). CPU 211 then displays the caller's visual data on LCD 201 (FIG. 1) (S2). The sequence described in the present paragraph is repeated periodically.

Paragraph [0303]—Paragraph [0304] through Paragraph [0315] primarily illustrate the sequence to output the Callee's Information (which is defined hereinafter) from Caller's Device.

Paragraph [0304]—This Paragraph [0304] illustrates Permitted Callee's Personal Data Selecting Software 20655*c*1A stored in Callee's Information Displaying Software Storage Area 20655*c*A (Paragraph [0285]) of Callee's Device, which selects the permitted callee's personal data to be displayed on LCD 201 (FIG. 1) of Caller's Device. In this embodiment, CPU 211 (FIG. 1) of Callee's Device retrieves all of the callee's personal data from Callee's Personal Data Storage Area 20655*b*4A (Paragraph [0284]) (S1). CPU 211 then displays a list of callee's personal data on LCD 201 (FIG. 1) (S2). The callee selects, by utilizing Input Device 210 (FIG. 1) or via voice recognition system, the callee's personal data permitted to be displayed on Caller's Device (S3). The permitted callee's personal data flag of the data selected in S3 is registered as '1' (S4).

Paragraph [0305]—This Paragraph [0305] illustrates Dialing Software H55*c*2 stored in Caller/Callee Software Storage Area H55*c* (Paragraph [0289]) of Host H (Paragraph [0025]), Dialing Software 20655*c*2A stored in Callee's Information Displaying Software Storage Area 20655*c*A (Paragraph [0285]) of Callee's Device, and Dialing Software 20655*c*2 stored in Caller's Information Displaying Software Storage Area 20655*c* (Paragraph [0277]) of Caller's Device, which enables to connect between Callee's Device and Caller's Device via Host H (Paragraph [0025]) in a wireless fashion. In this embodiment, a connection is established between Callee's Device and Host H (S1). Next, a connection is established between Host H and Caller's Device (S2). As a result, Callee's Device and Caller's Device are able to exchange audiovisual data, text data, and various types of data with each other. The sequence described in the present paragraph is not necessarily implemented if the connection between Caller's Device and Callee's Device is established as described in Paragraph [0292]. The sequence described in the present paragraph may be implemented if the connection is accidentally terminated by Callee's Device and the connection process is initiated by Callee's Device.

Paragraph [0306]—This Paragraph [0306] illustrates Callee's Device Pin-pointing Software H55*c*3*a* stored in Caller/Callee Software Storage Area H55*c* (Paragraph [0289]) of Host H (Paragraph [0025]) and Callee's Device Pin-pointing Software 20655*c*3A stored in Callee's Information Displaying Software Storage Area 20655*c*A of Callee's Device, which identifies the current geographic location of Callee's Device. In this embodiment, CPU 211 (FIG. 1) of Callee's Device collects the GPS raw data from the near base stations (S1). CPU 211 sends the raw GPS data to Host H (S2). Upon receiving the raw GPS data (S3), Host H produces the callee's calculated GPS data by referring to the raw GPS data (S4). Host H stores the callee's calculated GPS data in Callee's Calculated GPS Data Storage Area H55*b*6 (Paragraph [0288]) (S5). Host H then retrieves the callee's calculated GPS data from Callee's Calculated GPS Data Storage Area H55*b*6 (Paragraph [0288]) (S6), and sends the data to Callee's Device (S7). Upon receiving the callee's calculated GPS data from Host H (S8), CPU 211 stores the data in Callee's Calculated GPS Data Storage Area 20655*b*6A (Paragraph [0280]) (S9). Here, the GPS raw data are the primitive data utilized to produce the callee's calculated GPS data, and the callee's calculated GPS data is the data representing the location of Callee's Device in (x, y, z) format. The sequence described in the present paragraph is repeated periodically.

Paragraph [0307]—This Paragraph [0307] illustrates another embodiment of the sequence described in Paragraph [0306] in which the entire process is performed solely by Callee's Device Pin-pointing Software 20655*c*3A stored in Callee's Information Displaying Software Storage Area 20655*c*A (Paragraph [0285]) of Callee's Device. In this embodiment, CPU 211 (FIG. 1) of Callee's Device collects the raw GPS data from the near base stations (S1). CPU 211 then produces the callee's calculated GPS data by referring to the raw GPS data (S2), and stores the callee's calculated GPS data in Callee's Calculated GPS Data Storage Area 20655*b*6A (Paragraph [0280]) (S3). The sequence described in the present paragraph is repeated periodically.

Paragraph [0308]—This Paragraph [0308] illustrates Map Data Sending/Receiving Software H55*c*4 stored in Caller/Callee Software Storage Area H55*c* (Paragraph [0289]) of Host H (Paragraph [0025]) and Map Data Sending/Receiving Software 20655*c*4A stored in Callee's Information Displaying Software Storage Area 20655*c*A (Paragraph [0285]) of Callee's Device, which sends and receives the map data. In this embodiment, CPU 211 (FIG. 1) of Callee's Device retrieves the callee's calculated GPS data from Callee's Calculated GPS Data Storage Area 20655*b*6A (Paragraph [0280]) (S1), and sends the data to Host H (S2). Upon receiving the calculated GPS data from Callee's Device (S3), Host H identifies the map data in Map Data Storage Area H55*b*3 (Paragraph [0288]) (S4). Here, the map data represents the surrounding area of the location indicated by the callee's calculated GPS data. Host H retrieves the map data from Map Data Storage Area H55*b*3 (Paragraph [0288]) (S5), and sends the data to Callee's Device (S6). Upon receiving the map data from Host H (S7), Callee's Device stores the data in Callee's Map Data Storage Area 20655*b*8A (Paragraph [0280]) (S8). The sequence described in the present paragraph is repeated periodically.

Paragraph [0309]—This Paragraph [0309] illustrates Callee's Audiovisual Data Collecting Software 20655*c*5A stored in Callee's Information Displaying Software Storage Area 20655*c*A (Paragraph [0285]) of Callee's Device, which collects the audiovisual data of the callee to be sent to Caller's Device via Antenna 218 (FIG. 1) thereof. CPU 211 (FIG. 1) of Callee's Device retrieves the callee's audiovisual data from CCD Unit 214 and Microphone 215 (S1). CPU 211 then stores the callee's audio data in Callee's Audio Data Storage Area 20655*b*2*a*A (Paragraph [0282]) (S2), and the callee's visual data in Callee's Visual Data Storage Area 20655*b*2*b*A (Paragraph [0282]) (S3). The sequence described in the present paragraph is repeated periodically.

Paragraph [0310]—This Paragraph [0310] illustrates Callee's Information Sending/Receiving Software H55*c*6*a* (Paragraph [0289]) stored in Caller/Callee Software Storage Area H55*c* (Paragraph [0289]) of Host H (Paragraph [0025]) and Callee's Information Sending/Receiving Software 20655*c*6A (Paragraph [0285]) stored in Callee's Information Displaying Software Storage Area 20655*c*A of Callee's Device, which sends and receives the Callee's Information (which is defined hereinafter) between Callee's Device and Host H. In this embodiment, CPU 211 (FIG. 1) of Callee's Device retrieves the permitted callee's personal data from Callee's Personal Data Storage Area 20655*b*4A (Paragraph [0284]) (S1). CPU 211 retrieves the callee's calculated GPS data from Callee's Calculated GPS Data Storage Area 20655*b*6A (Paragraph [0280]) (S2). CPU 211 retrieves the map data from Callee's Map Data Storage Area 20655*b*8A (Paragraph [0280]) (S3). CPU 211 retrieves the callee's audio data from Callee's Audio Data Storage Area 20655*b*2*a*A (Paragraph [0282]) (S4). CPU 211 retrieves the callee's visual data from Callee's Visual Data Storage Area 20655*b*2*b*A (Paragraph [0282]) (S5). CPU 211 then sends the data retrieved in S1 through S5 (collectively defined as the 'Callee's Information' hereinafter) to Host H (S6). Upon receiving the Callee's Information from Callee's Device (S7), Host H stores the Callee's Information in Callee's Information Storage Area H55*b*2 (Paragraph [0288]) (S8). The sequence described in the present paragraph is repeated periodically.

Paragraph [0311]—This Paragraph [0311] illustrates Callee's Information Sending/Receiving Software H55*c*6*a* stored in Caller/Callee Software Storage Area H55*c* (Paragraph [0289]) of Host H (Paragraph [0025]) and Callee's Information Sending/Receiving Software 20655*c*6*a* stored in Caller's Information Displaying Software Storage Area 20655*c* (Paragraph [0277]) of Caller's Device, which sends and receives the Callee's Information between Host H and Caller's Device. In this embodiment, Host H retrieves the Callee's Information from Callee's Information Storage Area H55*b*2 (Paragraph [0288]) (S1), and sends the Callee's Information to Caller's Device (S2). CPU 211 (FIG. 1) of Caller's Device receives the Callee's Information from Host H (S3). CPU 211 stores the permitted callee's personal data in Callee's Personal Data Storage Area 20655*b*4 (Paragraph [0276]) (S4). CPU 211 stores the callee's calculated GPS data in Callee's Calculated GPS Data Storage Area 20655*b*6 (Paragraph [0272]) (S5). CPU 211 stores the map data in Callee's Map Data Storage Area 20655*b*8 (Paragraph [0272]) (S6). CPU 211 stores the callee's audio data in Callee's Audio Data Storage Area 20655*b*2*a* (Paragraph [0274]) (S7). CPU 211 stores the callee's visual data in Callee's Visual Data Storage Area 20655*b*2*b* (Paragraph [0274]) (S8). The sequence described in the present paragraph is repeated periodically.

Paragraph [0312]—This Paragraph [0312] illustrates Permitted Callee's Personal Data Displaying Software 20655*c*7 stored in Caller's Information Displaying Software Storage Area 20655*c* (Paragraph [0277]) of Caller's Device, which displays the permitted callee's personal data on LCD 201 (FIG. 1) of Caller's Device. In this embodiment, CPU 211 (FIG. 1) of Caller's Device retrieves the permitted callee's personal data from Callee's Personal Data Storage Area 20655*b*4 (Paragraph [0276]) (S1). CPU 211 then displays the permitted callee's personal data on LCD 201 (FIG. 1) (S2). The sequence described in the present paragraph is repeated periodically.

Paragraph [0313]—This Paragraph [0313] illustrates Map Displaying Software 20655*c*8 stored in Caller's Information Displaying Software Storage Area 20655*c* (Paragraph [0277]) of Caller's Device, which displays the map representing the surrounding area of the location indicated by the callee's calculated GPS data. In this embodiment, CPU 211 (FIG. 1) of Caller's Device retrieves the callee's calculated GPS data from Callee's Calculated GPS Data Storage Area 20655*b*6 (Paragraph [0272]) (S1). CPU 211 then retrieves the map data from Callee's Map Data Storage Area 20655*b*8 (Paragraph [0272]) (S2), and arranges on the map data the callee's current location icon in accordance with the callee's calculated GPS data (S3). Here, the callee's current location icon is an icon which represents the location of Callee's Device in the map data. The map with the callee's current location icon is displayed on LCD 201 (FIG. 1) (S4). The sequence described in the present paragraph is repeated periodically.

Paragraph [0314]—This Paragraph [0314] illustrates Callee's Audio Data Outputting Software 20655*c*9 stored in Caller's Information Displaying Software Storage Area 20655*c* (Paragraph [0277]) of Caller's Device, which outputs the callee's audio data from Speaker 216 (FIG. 1) of Caller's Device. In this embodiment, CPU 211 (FIG. 1) of Caller's Device retrieves the callee's audio data from Callee's Audio Data Storage Area 20655*b*2*a* (Paragraph [0274]) (S1). CPU 211 then outputs the caller's audio data from Speaker 216 (FIG. 1) (S2). The sequence described in the present paragraph is repeated periodically.

Paragraph [0315]—This Paragraph [0315] illustrates Callee's Visual Data Displaying Software 20655*c*10 stored in Caller's Information Displaying Software Storage Area 20655*c* (Paragraph [0277]) of Caller's Device, which displays the callee's visual data on LCD 201 (FIG. 1) of Caller's Device. In this embodiment, CPU 211 (FIG. 1) of Caller's Device retrieves the callee's visual data from Callee's Visual Data Storage Area 20655*b*2*b* (Paragraph [0274]) (S1). CPU 211 then displays the callee's visual data on LCD 201 (FIG. 1) (S2). The sequence described in the present paragraph is repeated periodically.

Paragraph [0316]—<<Shortcut Icon Displaying Function>>

Paragraph [0317]—Paragraph [0318] through Paragraph [0330] illustrate the shortcut icon displaying function which displays one or more of shortcut icons on LCD 201 (FIG. 1) of Communication Device 200. The user of Communication Device 200 can execute the software programs in a convenient manner by selecting (e.g., clicking or double clicking) the shortcut icons. The foregoing software programs may be any software programs described in this specification.

Paragraph [0318]—This Paragraph [0318] illustrates the shortcut icons displayed on LCD 201 (FIG. 1) of Communication Device 200 by implementing the present function. In this embodiment, three shortcut icons are displayed on LCD 201 (FIG. 1), i.e., Shortcut Icon#1, Shortcut Icon#2, and Shortcut Icon#3. The user of Communication Device 200 can execute the software programs by selecting (e.g., clicking or double clicking) one of the shortcut icons. For example, assume that Shortcut Icon#1 represents MS Word 97. By selecting (e.g., clicking or double clicking) Shortcut Icon#1, the user can execute MS Word 97 installed in Communication Device 200 or Host H. Three shortcut icons are illustrated in the present paragraph, however, only for purposes of simplifying the explanation of the present function. Therefore, as many shortcut icons equivalent to the number of the software programs described in this specification may be displayed on LCD 201, and the corresponding software programs may be executed by implementing the present function.

Paragraph [0319]—Paragraph [0319] illustrates the storage area included in RAM 206 (FIG. 1). In this embodiment, RAM 206 includes Shortcut Icon Displaying Information Storage Area 20659*a* of which the data and the software programs stored therein are described in Paragraph [0320].

Paragraph [0320]—This Paragraph [0320] illustrates the storage areas included in Shortcut Icon Displaying Information Storage Area 20659*a* (Paragraph [0319]). In this embodiment, Shortcut Icon Displaying Information Storage Area 20659*a* includes Shortcut Icon Displaying Data Storage Area 20659*b* and Shortcut Icon Displaying Software Storage Area 20659*c*. Shortcut Icon Displaying Data Storage Area 20659*b* stores the data necessary to implement the present function, such as the ones described in Paragraph [0322]. Shortcut Icon Displaying Software Storage Area 20659*c* stores the software programs necessary to implement the present function, such as the ones described in Paragraph [0328].

Paragraph [0321]—The data and/or the software programs stored in Shortcut Icon Displaying Software Storage Area 20659*c* (Paragraph [0320]) may be downloaded from Host H (Paragraph [0025]).

Paragraph [0322]—This Paragraph [0322] illustrates the storage areas included in Shortcut Icon Displaying Data Storage Area 20659*b* (Paragraph [0320]). In this embodiment, Shortcut Icon Displaying Data Storage Area 20659*b* includes Shortcut Icon Image Data Storage Area 20659*b*1, Shortcut Icon Location Data Storage Area 20659*b*2, Shortcut Icon Link Data Storage Area 20659*b*3, and Selected Shortcut Icon Data Storage Area 20659*b*4. Shortcut Icon Image Data Storage Area 20659*b*1 stores the data described in Paragraph [0323]. Shortcut Icon Location Data Storage Area 20659*b*2 stores the data described in Paragraph [0324]. Shortcut Icon Link Data Storage Area 20659*b*3 stores the data described in Paragraph [0325]. Selected Shortcut Icon Data Storage Area 20659*b*4 stores the data described in Paragraph [0326].

Paragraph [0323]—This Paragraph [0323] illustrates the data stored in Shortcut Icon Image Data Storage Area 20659*b*1 (Paragraph [0322]). In this embodiment, Shortcut Icon Image Data Storage Area 20659*b*1 comprises two columns, i.e., 'Shortcut Icon ID' and 'Shortcut Icon Image Data'. Column 'Shortcut Icon ID' stores the shortcut icon IDs, and each shortcut icon ID is the identification of the corresponding shortcut icon image data stored in column 'Shortcut Icon Image Data'. Column 'Shortcut Icon Image Data' stores the shortcut icon image data, and each shortcut icon image data is the image data of the shortcut icon displayed on LCD 201 (FIG. 1) as described in Paragraph [0318]. In this embodiment, Shortcut Icon Image Data Storage Area 20659*b*1 stores the following data: the shortcut icon ID 'Shortcut Icon#1' and the corresponding shortcut icon image data 'Shortcut Icon Image Data#1'; the shortcut icon ID 'Shortcut Icon#2' and the corresponding shortcut icon image data 'Shortcut Icon Image Data#2'; the shortcut icon ID 'Shortcut Icon#3' and the corresponding shortcut icon image data 'Shortcut Icon Image Data#3'; and the shortcut icon ID 'Shortcut Icon#4' and the corresponding shortcut icon image data 'Shortcut Icon Image Data#4'.

Paragraph [0324]—This Paragraph [0324] illustrates the data stored in Shortcut Icon Location Data Storage Area 20659*b*2 (Paragraph [0322]). In this embodiment, Shortcut Icon Location Data Storage Area 20659*b*2 comprises two columns, i.e., 'Shortcut Icon ID' and 'Shortcut Icon Location Data'. Column 'Shortcut Icon ID' stores the shortcut icon IDs described hereinbefore. Column 'Shortcut Icon Location Data' stores the shortcut icon location data, and each shortcut icon location data indicates the location displayed on LCD 201 (FIG. 1) in (x,y) format of the shortcut icon image data of the corresponding shortcut icon ID. In this embodiment, Shortcut Icon Location Data Storage Area 20659*b*2 stores the following data: the shortcut icon ID 'Shortcut Icon#1' and the corresponding shortcut icon location data 'Shortcut Icon Location Data#1'; the shortcut icon ID 'Shortcut Icon#2' and the corresponding shortcut icon location data 'Shortcut Icon Location Data#2'; the shortcut icon ID 'Shortcut Icon#3' and the corresponding shortcut icon location data 'Shortcut Icon Location Data#3'; and the shortcut icon ID 'Shortcut Icon#4' and the corresponding shortcut icon location data 'Shortcut Icon Location Data#4'.

Paragraph [0325]—This Paragraph [0325] illustrates the data stored in Shortcut Icon Link Data Storage Area 20659*b*3 (Paragraph [0322]). In this embodiment, Shortcut Icon Link Data Storage Area 20659*b*3 comprises two columns, i.e., 'Shortcut Icon ID' and 'Shortcut Icon Link Data'. Column 'Shortcut Icon ID' stores the shortcut icon IDs described hereinbefore. Column 'Shortcut Icon Link Data' stores the shortcut icon link data, and each shortcut icon link data represents the location in Communication Device 200 of the software program stored therein represented by the shortcut icon of the corresponding shortcut icon ID. In this embodiment, Shortcut Icon Link Data Storage Area 20659*b*3 stores the following data: the shortcut icon 'ID' Shortcut 'Icon#1' and the corresponding shortcut icon link data 'Shortcut Icon Link Data#1'; the shortcut icon ID 'Shortcut Icon#2' and the corresponding shortcut icon link data 'Shortcut Icon Link Data#2'; the shortcut icon ID 'Shortcut Icon#3' and the corresponding shortcut icon link data 'Shortcut Icon Link Data#3'; and the shortcut icon ID 'Shortcut Icon#4' and the corresponding shortcut icon link data 'Shortcut Icon Link Data#4'. The foregoing software program may be any software program described in this specification.

Paragraph [0326]—This Paragraph [0326] illustrates the data stored in Selected Shortcut Icon Data Storage Area 20659*b*4 (Paragraph [0322]). In this embodiment, Selected Shortcut Icon Data Storage Area 20659*b*4 stores one or more of shortcut icon IDs. Only the shortcut icon image data of the shortcut icon IDs stored in Selected Shortcut Icon Data Storage Area 20659*b*4 are displayed on LCD 201 (FIG. 1). In this embodiment, Selected Shortcut Icon Data Storage Area 20659*b*4 stores the following data: the shortcut icon IDs 'Shortcut Icon#1', 'Shortcut Icon#2', and 'Shortcut Icon#3', which means that only the shortcut icon image data corresponding to 'Shortcut Icon#1', 'Shortcut Icon#2', and 'Shortcut Icon#3' are displayed on LCD 201.

Paragraph [0327]—This Paragraph [0328] illustrates the software programs stored in Shortcut Icon Displaying Software Storage Area 20659*c* (Paragraph [0320]). In this embodiment, Shortcut Icon Displaying Software Storage Area 20659*c* stores Shortcut Icon Displaying Software

20659*c*1, Software Executing Software 20659*c*2, Shortcut Icon Location Data Changing Software 20659*c*3, and Software Executing Software 20659*c*4. Shortcut Icon Displaying Software 20659*c*1 is the software program described in Paragraph [0328]. Software Executing Software 20659*c*2 is the software program described in Paragraph [0329]. Shortcut Icon Location Data Changing Software 20659*c*3 is the software program described in Paragraph [0330]. Software Executing Software 20659*c*4 is the software program described in Paragraph [0330].

Paragraph [0328]—This Paragraph [0328] illustrates Shortcut Icon Displaying Software 20659*c*1 stored in Shortcut Icon Displaying Software Storage Area 20659*c* of Communication Device 200, which displays the shortcut icon image data displayed on LCD 201 (FIG. 1) of Communication Device 200. In this embodiment, CPU 211 (FIG. 1) refers to the shortcut icon IDs stored in Selected Shortcut Icon Data Storage Area 20659*b*4 (Paragraph [0326]) to identify the shortcut icon image data to be displayed on LCD 201 (FIG. 1) (S1). CPU 211 then retrieves the shortcut icon image data of the corresponding shortcut icon IDs identified in S1 from Shortcut Icon Image Data Storage Area 20659*b*1 (Paragraph [0323]) (S2). CPU 211 further retrieves the shortcut icon location data of the corresponding shortcut icon IDs identified in S1 from Shortcut Icon Location Data Storage Area 20659*b*2 (Paragraph [0324]) (S3). CPU 211 displays on LCD 201 (FIG. 1) the shortcut icon image data thereafter (S4).

Paragraph [0329]—This Paragraph [0329] illustrates Software Executing Software 20659*c*2 stored in Shortcut Icon Displaying Software Storage Area 20659*c* of Communication Device 200, which executes the corresponding software program upon selecting the shortcut icon image data displayed on LCD 201 (FIG. 1) of Communication Device 200. In this embodiment, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659*b*3 (Paragraph [0325]) from the shortcut icon ID identified in S2 (S3), and executes the corresponding software program (S4).

Paragraph [0330]—This Paragraph [0330] illustrates Shortcut Icon Location Data Changing Software 20659*c*3 stored in Shortcut Icon Displaying Software Storage Area 20659*c* of Communication Device 200, which enables the user of Communication Device 200 to change the location of the shortcut icon image data displayed on LCD 201 (FIG. 1). In this embodiment, the user of Communication Device 200 selects the shortcut icon image data displayed on LCD 201 (S1). CPU 211 (FIG. 1) then identifies the shortcut icon ID of the shortcut icon image data selected in S1 (S2). The user moves the shortcut icon selected in S1 by utilizing Input Device 210 (FIG. 1) or via voice recognition system (S3). CPU 211 then identifies the new location thereof (S4), and updates the shortcut icon location data stored in Shortcut Icon Location Data Storage Area 20659*b*2 (Paragraph [0324]) (S5).

Paragraph [0331]—<<Task Tray Icon Displaying Function>>

Paragraph [0332]—Paragraph [0333] through Paragraph [0341] illustrate the task tray icon displaying function which displays one or more of task tray icons on LCD 201 (FIG. 1) of Communication Device 200. The user of Communication Device 200 can identify the software programs executed in background in a convenient manner. The foregoing software programs may be any software programs described in this specification.

Paragraph [0333]—This Paragraph [0333] illustrates the task tray icons displayed on LCD 201 (FIG. 1) of Communication Device 200 by implementing the present function. In this embodiment, Display Area 20160DA includes Task Tray Icons Display Area 20660DA1 which is displayed at the lower right portion of LCD 201. Three task tray icons are displayed Task Tray Icons Display Area 20660DA1, i.e., Task Tray Icon#1, Task Tray Icon#2, and Task Tray Icon#3, by which the user of Communication Device 200 can identify the software programs executed in background in a convenient manner, i.e., by observing Task Tray Icons Display Area 20660DA1. Three task tray icons are illustrated in the present paragraph, however, only for purposes of simplifying the explanation of the present function. Therefore, as many task tray icons equivalent to the number of the software programs described in this specification may be displayed in Task Tray Icons Display Area 20660DA1, and the corresponding software programs executed in background by implementing the present function.

Paragraph [0334]—This Paragraph [0334] illustrates the storage area included in RAM 206 (FIG. 1). In this embodiment, RAM 206 includes Task Tray Icon Displaying Information Storage Area 20660*a* of which the data and the software programs stored therein are described in Paragraph [0335].

Paragraph [0335]—This Paragraph [0335] illustrates the storage areas included in Task Tray Icon Displaying Information Storage Area 20660*a* (Paragraph [0334]). In this embodiment, Task Tray Icon Displaying Information Storage Area 20660*a* includes Task Tray Icon Displaying Data Storage Area 20660*b* and Task Tray Icon Displaying Software Storage Area 20660*c*. Task Tray Icon Displaying Data Storage Area 20660*b* stores the data necessary to implement the present function, such as the ones described in Paragraph [0336]. Task Tray Icon Displaying Software Storage Area 20660*c* stores the software programs necessary to implement the present function, such as the ones described in Paragraph [0340].

Paragraph [0336]—This Paragraph [0336] illustrates the storage areas included in Task Tray Icon Displaying Data Storage Area 20660*b* (Paragraph [0335]). In this embodiment, Task Tray Icon Displaying Data Storage Area 20660*b* includes Task Tray Icon Image Data Storage Area 20660*b*1, Task Tray Icon Link Data Storage Area 20660*b*3, and Selected Task Tray Icon Data Storage Area 20660*b*4. Task Tray Icon Image Data Storage Area 20660*b*1 stores the data described in Paragraph [0337]. Task Tray Icon Link Data Storage Area 20660*b*3 stores the data described in Paragraph [0338]. Selected Task Tray Icon Data Storage Area 20660*b*4 stores the data described in Paragraph [0339].

Paragraph [0337]—This Paragraph [0337] illustrates the data stored in Task Tray Icon Image Data Storage Area 20660*b*1 (Paragraph [0336]). In this embodiment, Task Tray Icon Image Data Storage Area 20660*b*1 comprises two columns, i.e., 'Task Tray Icon ID' and 'Task Tray Icon Image Data'. Column 'Task Tray Icon ID' stores the task tray icon IDs, and each task tray icon ID is the identification of the corresponding task tray icon image data stored in column 'Task Tray Icon Image Data'. Column 'Task Tray Icon Image Data' stores the task tray icon image data, and each task tray icon image data is the image data of the task tray icon displayed on LCD 201 (FIG. 1) as described in Paragraph [0333]. In this embodiment, Task Tray Icon Image Data Storage Area 20660*b*1 stores the following data: the task tray icon ID 'Task Tray Icon#1' and the corresponding task tray icon image data 'Task Tray Icon Image Data#1'; the task tray icon ID 'Task Tray Icon#2' and the corresponding task tray icon image data Task Tray Icon Image Data#2; the task tray icon ID 'Task Tray Icon#3' and the corresponding task tray icon image data 'Task Tray Icon Image Data#3'; and the task tray icon ID 'Task Tray Icon#4' and the corresponding task tray icon image data 'Task Tray Icon Image Data#4'.

Paragraph [0338]—This Paragraph [0338] illustrates the data stored in Task Tray Icon Link Data Storage Area 20660b3 (Paragraph [0336]). In this embodiment, Task Tray Icon Link Data Storage Area 20660b3 comprises two columns, i.e., 'Task Tray Icon ID' and 'Task Tray Icon Link Data'. Column 'Task Tray Icon ID' stores the task tray icon IDs described hereinbefore. Column 'Task Tray Icon Link Data' stores the task tray icon link data, and each task tray icon link data represents the location in Communication Device 200 of the software program stored therein represented by the task tray icon of the corresponding task tray icon ID. In this embodiment, Task Tray Icon Link Data Storage Area 20660b3 stores the following data: the task tray icon ID 'Task Tray Icon#1' and the corresponding task tray icon link data 'Task Tray Icon Link Data#1; the task tray icon ID 'Task Tray Icon#2' and the corresponding task tray icon link data 'Task Tray Icon Link Data#2; the task tray icon ID 'Task Tray Icon#3' and the corresponding task tray icon link data 'Task Tray Icon Link Data#3; and the task tray icon ID 'Task Tray Icon#4' and the corresponding task tray icon link data 'Task Tray Icon Link Data#4'. The foregoing software programs may be of any software programs described in this specification.

Paragraph [0339]—This Paragraph [0339] illustrates the data stored in Selected Task Tray Icon Data Storage Area 20660b4 (Paragraph [0336]). In this embodiment, Selected Task Tray Icon Data Storage Area 20660b4 stores one or more of task tray icon IDs. Only the task tray icon image data of the task tray icon IDs stored in Selected Task Tray Icon Data Storage Area 20660b4 are displayed in Task Tray Icons Display Area 20660DA1 (Paragraph [0333]). In this embodiment, Selected Task Tray Icon Data Storage Area 20660b4 stores the following data: the task tray icon IDs 'Task Tray Icon#1', 'Task Tray Icon#2', and 'Task Tray Icon#3', which means that only the task tray icon image data corresponding to 'Task Tray Icon#1', 'Task Tray Icon#2', and 'Task Tray Icon#3' are displayed in Task Tray Icons Display Area 20660DA1.

Paragraph [0340]—This Paragraph [0340] illustrates the software programs stored in Task Tray Icon Displaying Software Storage Area 20660c (Paragraph [0335]). In this embodiment, Task Tray Icon Displaying Software Storage Area 20660c stores Software Executing Software 20660c2 and Software Executing Software 20660c4. Software Executing Software 20660c2 is the software program described in Paragraph [0341]. Software Executing Software 20660c4 is the software program described in Paragraph [0341].

Paragraph [0341]—This Paragraph [0341] illustrates Software Executing Software 20660c2 stored in Task Tray Icon Displaying Software Storage Area 20660c of Communication Device 200, which executes the corresponding software program in background and displays the corresponding task tray icon image data on LCD 201 (FIG. 1) of Communication Device 200. In this embodiment, CPU 211 (FIG. 1) refers to Selected Task Tray Icon Data Storage Area 20660b4 (Paragraph [0339]) (S1) to identify the task tray IDs stored therein (S2). CPU 211 identifies the task tray icon link data stored in Task Tray Icon Link Data Storage Area 20660b3 (Paragraph [0338]) of the corresponding task tray icon IDs identified in S2 (S3), and executes the corresponding software program (S4). CPU 211 then retrieves the task tray icon image data of the corresponding task tray icon IDs identified in S2 from Task Tray Icon Image Data Storage Area 20660b1 (Paragraph [0337]) (S5). CPU 211 displays the task tray icon image data in Task Tray Icons Display Area 20660DA1 (Paragraph [0333]) thereafter (S6).

Paragraph [0342]—<<OS Updating Function>>

Paragraph [0343]—Paragraph [0344] through Paragraph [0404] illustrate the OS updating function which updates the operating system of Communication Device 200 in a wireless fashion. In other words, Communication Device 200 downloads the portion of the operating system of the latest version from Host H (Paragraph [0025]) via Antenna 218 (FIG. 1).

Paragraph [0344]—This Paragraph [0344] illustrates the storage areas included in RAM 206 (FIG. 1). In this embodiment, RAM 206 includes Operating System 20663OS of which the data stored therein are described in Paragraph [0345] and Paragraph [0345], and OS Updating Information Storage Area 20663a of which the data and the software programs stored therein are described in Paragraph [0346].

Paragraph [0345]—This Paragraph [0345] illustrates the data stored in Operating System 20663OS (Paragraph [0344]). In this embodiment, Operating System 20663OS includes Battery Controller 20663OSa, CCD Unit Controller 20663OSb, Flash Light Unit Controller 20663OSc, Indicator Controller 20663OSd, Input Device Controller 20663OSe, LCD Controller 20663OSf, LED Controller 20663OSg, Memory Card Interface Controller 20663OSh, Microphone Controller 20663OSi, Photometer Controller 20663OSj, RAM Controller 20663OSk, ROM Controller 20663OSl, Signal Processor Controller 20663OSm, Signal Processor Controller 20663OSn, Solar Panel Controller 20663OSo, Speaker Controller 20663OSp, Vibrator Controller 20663OSq, Video Processor Controller 20663OSr, Wireless Receiver Controller 20663OSs, Wireless Receiver Controller 20663OSt, Wireless Receiver Controller 20663OSu, Wireless Transmitter Controller 20663OSv, Wireless Transmitter Controller 20663OSw, and Wireless Transmitter Controller 20663OSx. Battery Controller 20663OSa is a controller which controls Battery 230 (not shown). CCD Unit Controller 20663OSb is a controller which controls CCD Unit 214 (not shown). Flash Light Unit Controller 20663OSc is a controller which controls Flash Light Unit 220 (not shown). Indicator Controller 20663OSd is a controller which controls Indicator 212 (not shown). Input Device Controller 20663OSe is a controller which controls Input Device 210 (not shown). LCD Controller 20663OSf is a controller which controls LCD 201 (not shown). LED Controller 20663OSg is a controller which controls LED 219 (not shown). Memory Card Interface Controller 20663OSh is a controller which controls Memory Card Interface 221 (not shown). Microphone Controller 20663OSi is a controller which controls Microphone 215 (not shown). Photometer Controller 20663OSj is a controller which controls Photometer 232 (not shown). RAM Controller 20663OSk is a controller which controls RAM 206 (not shown). ROM Controller 20663OSl is a controller which controls ROM 207 (not shown). Signal Processor Controller 20663OSm is a controller which controls Signal Processor 205 (not shown). Signal Processor Controller 20663OSn is a controller which controls Signal Processor 208 (not shown). Solar Panel Controller 20663OSo is a controller which controls Solar Panel 229 (not shown). Speaker Controller 20663OSp is a controller which controls Speaker 216L (not shown). Vibrator Controller 20663OSq is a controller which controls Vibrator 217 (not shown). Video Processor Controller 20663OSr is a controller which controls Video Processor 202 (not shown). Wireless Receiver Controller 20663OSs is a controller which controls Wireless Receiver 224 (not shown). Wireless Receiver Controller 20663OSt is a controller which controls Wireless Receiver 225 (not shown). Wireless Receiver Controller 20663OSu is a controller which controls Wireless Receiver 226 (not shown). Wireless Transmitter Controller 20663OSv is a controller which controls Wireless Transmitter 222 (not shown). Wireless Transmitter Controller 20663OSw is a controller which controls Wireless Transmitter 223 (not shown). Wireless Transmitter Controller 20663OSx is a controller which controls Wireless Transmitter 227 (not shown). For the avoidance of doubt, the data stored in Operating System 20663OS are illustrative, and other types of data, which are updated by implementing the present function, are also stored therein, such as DLLs, drivers, security implementing program.

Paragraph [0346]—This Paragraph [0346] illustrates the storage areas included in OS Updating Information Storage Area 20663a (Paragraph [0344]). In this embodiment, OS Updating Information Storage Area 20663a includes OS Updating Data Storage Area 20663b and OS Updating Software Storage Area 20663c. OS Updating Data Storage Area 20663b stores the data necessary to implement the present function on the side of Communication Device 200, such as the ones described in Paragraph [0348]. OS Updating Software Storage Area 20663c stores the software programs necessary to implement the present function on the side of Communication Device 200, such as the ones described in Paragraph [0350] and Paragraph [0350].

Paragraph [0347]—The data and/or the software programs stored in OS Updating Software Storage Area 20663c (Paragraph [0346]) may be downloaded from Host H (Paragraph [0025]).

Paragraph [0348]—This Paragraph [0348] illustrates the storage area included in OS Updating Data Storage Area 20663b (Paragraph [0346]). In this embodiment, OS Updating Data Storage Area 20663b includes OS Version Data Storage Area 20663b1. OS Version Data Storage Area 20663b1 stores the data described in Paragraph [0349] and Paragraph [0349].

Paragraph [0349]—This Paragraph [0349] illustrates the data stored in OS Version Data Storage Area 20663b1 (Paragraph [0348]). In this embodiment, OS Version Data Storage Area 20663b1 includes Battery Controller Version Data 20663b1a, CCD Unit Controller Version Data 20663b1b, Flash Light Unit Controller Version Data 20663b1c, Indicator Controller Version Data 20663b1d, Input Device Controller Version Data 20663b1e, LCD Controller Version Data 20663b1f, LED Controller Version Data 20663b1g, Memory Card Interface Controller Version Data 20663b1h, Microphone Controller Version Data 20663b1i, Photometer Controller Version Data 20663b1j, RAM Controller Version Data 20663b1k, ROM Controller Version Data 20663b1l, Signal Processor Controller Version Data 20663b1m, Signal Processor Controller Version Data 20663b1n, Solar Panel Controller Version Data 20663b1o, Speaker Controller Version Data 20663b1p, Vibrator Controller Version Data 20663b1q, Video Processor Controller Version Data 20663b1r, Wireless Receiver Controller Version Data 20663b1s, Wireless Receiver Controller Version Data 20663b1t, Wireless Receiver Controller Version Data 20663b1u, Wireless Transmitter Controller Version Data 20663b1v, Wireless Transmitter Controller Version Data 20663b1w, and Wireless Transmitter Controller Version Data 20663b1x. Battery Controller Version Data 20663b1a is the version data representing the current version of Battery Controller 20663OSa (Paragraph [0345]). CCD Unit Controller Version Data 20663b1b is the version data representing the current version of CCD Unit Controller 20663OSb (Paragraph [0345]). Flash Light Unit Controller Version Data 20663b1c is the version data representing the current version of Flash Light Unit Controller 20663OSc (Paragraph [0345]). Indicator Controller Version Data 20663b1d is the version data representing the current version of Indicator Controller 20663OSd (Paragraph [0345]). Input Device Controller Version Data 20663b1e is the version data representing the current version of Input Device Controller 20663OSe (Paragraph [0345]). LCD Controller Version Data 20663b1f is the version data representing the current version of LCD Controller 20663OSf (Paragraph [0345]). LED Controller Version Data 20663b1g is the version data representing the current version of LED Controller 20663OSg (Paragraph [0345]). Memory Card Interface Controller Version Data 20663b1h is the version data representing the current version of Memory Card Interface Controller 20663OSh (Paragraph [0345]). Microphone Controller Version Data 20663b1i is the version data representing the current version of Microphone Controller 20663OSi (Paragraph [0345]). Photometer Controller Version Data 20663b1j is the version data representing the current version of Photometer Controller 20663OSj (Paragraph [0345]). RAM Controller Version Data 20663b1k is the version data representing the current version of RAM Controller 20663OSk (Paragraph [0345]). ROM Controller Version Data 20663b1l is the version data representing the current version of ROM Controller 20663OSl (Paragraph [0345]). Signal Processor Controller Version Data 20663b1m is the version data representing the current version of Signal Processor Controller 20663OSm (Paragraph [0345]). Signal Processor Controller Version Data 20663b1n is the version data representing the current version of Signal Processor Controller 20663OSn (Paragraph [0345]). Solar Panel Controller Version Data 20663b1o is the version data representing the current version of Solar Panel Controller 20663OSo (Paragraph [0345]). Speaker Controller Version Data 20663b1p is the version data representing the current version of Speaker Controller 20663OSp (Paragraph [0345]). Vibrator Controller Version Data 20663b1q is the version data representing the current version of Vibrator Controller 20663OSq (Paragraph [0345]). Video Processor Controller Version Data 20663b1r is the version data representing the current version of Video Processor Controller 20663OSr (Paragraph [0345]). Wireless Receiver Controller Version Data 20663b1s is the version data representing the current version of Wireless Receiver Controller 20663OSs (Paragraph [0345]). Wireless Receiver Controller Version Data 20663b1t is the version data representing the current version of Wireless Receiver Controller 20663OSt (Paragraph [0345]). Wireless Receiver Controller Version Data 20663b1u is the version data representing the current version of Wireless Receiver Controller 20663OSu (Paragraph [0345]). Wireless Transmitter Controller Version Data 20663b1v is the version data representing the current version of Wireless Transmitter Controller 2066305v (Paragraph [0345]). Wireless Transmitter Controller Version Data 20663b1w is the version data representing the current version of Wireless Transmitter Controller 20663OSw (Paragraph [0345]). Wireless Transmitter Controller Version Data 20663b1x is the version data representing the current version of Wireless Transmitter Controller 20663OSx (Paragraph [0345]). Here, the version data is composed of numeric data, such as '1', '2', and '3', wherein '1' represents version '1.0', '2' represents version '2.0', and '3' represents version '3.0'.

Paragraph [0350]—This Paragraph [0350] illustrates the software programs stored in OS Updating Software Storage Area 20663c (Paragraph [0346]). In this embodiment, OS Updating Software Storage Area 20663*c* stores Battery Controller Updating Software 20663*c*1*a*, CCD Unit Controller Updating Software 20663*c*1*b*, Flash Light Unit Controller Updating Software 20663*c*1*c*, Indicator Controller Updating Software 20663*c*1*d*, Input Device Controller Updating Software 20663*c*1*e*, LCD Controller Updating Software 20663*c*1*f*, LED Controller Updating Software 20663*c*1*g*, Memory Card Interface Controller Updating Software 20663*c*1*h*, Microphone Controller Updating Software 20663*c*1*i*, Photometer Controller Updating Software 20663*c*1*j*, RAM Controller Updating Software 20663*c*1*k*, ROM Controller Updating Software 20663*c*1*l*, Signal Processor Controller Updating Software 20663*c*1*m*, Signal Processor Controller Updating Software 20663*c*1*n*, Solar Panel Controller Updating Software 20663*c*1*o*, Speaker Controller Updating Software 20663*c*1*p*, Vibrator Controller Updating Software 20663*c*1*q*, Video Processor Controller Updating Software 20663*c*1*r*, Wireless Receiver Controller Updating Software 20663*c*1*s*, Wireless Receiver Controller Updating Software 20663*c*1*t*, Wireless Receiver Controller Updating Software 20663*c*1*u*, Wireless Transmitter Controller Updating Software 20663*c*1*v*, Wireless Transmitter Controller Updating Software 20663*c*1*w*, and Wireless Transmitter Controller Updating Software 20663*cl* x. Battery Controller Updating Software 20663*c*1*a* is the software program described in Paragraph [0357] and Paragraph [0358]. CCD Unit Controller Updating Software 20663*c*1*b* is the software program described in Paragraph [0359] and Paragraph [0360]. Flash Light Unit Controller Updating Software 20663*c*1*c* is the software program described in Paragraph [0361] and Paragraph [0362]. Indicator Controller Updating Software 20663*c*1*d* is the software program described in Paragraph [0363] and Paragraph [0364]. Input Device Controller Updating Software 20663*c*1*e* is the software program described in Paragraph [0365] and Paragraph [0366]. LCD Controller Updating Software 20663*c*1*f* is the software program described in Paragraph [0367] and Paragraph [0368]. LED Controller Updating Software 20663*c*1*g* is the software program described in Paragraph [0369] and Paragraph [0370]. Memory Card Interface Controller Updating Software 20663*c*1*h* is the software program described in Paragraph [0371] and Paragraph [0372]. Microphone Controller Updating Software 20663*c*1*i* is the software program described in Paragraph [0373] and Paragraph [0374]. Photometer Controller Updating Software 20663*c*1*j* is the software program described in Paragraph [0375] and Paragraph [0376]. RAM Controller Updating Software 20663*c*1*k* is the software program described in Paragraph [0377] and Paragraph [0378]. ROM Controller Updating Software 20663*c*1*l* is the software program described in Paragraph [0379] and Paragraph [0380]. Signal Processor Controller Updating Software 20663*c*1*m* is the software program described in Paragraph [0381] and Paragraph [0382]. Signal Processor Controller Updating Software 20663*c*1*n* is the software program described in Paragraph [0383] and Paragraph [0384]. Solar Panel Controller Updating Software 20663*c*1*o* is the software program described in Paragraph and Paragraph [0386]. Speaker Controller Updating Software 20663*c*1*p* is the software program described in Paragraph [0387] and Paragraph [0388]. Vibrator Controller Updating Software 20663*c*1*q* is the software program described in Paragraph [0389] and Paragraph [0390]. Video Processor Controller Updating Software 20663*c*1*r* is the software program described in Paragraph [0391] and Paragraph [0392]. Wireless Receiver Controller Updating Software 20663*c*1*s* is the software program described in Paragraph [0393] and Paragraph [0394]. Wireless Receiver Controller Updating Software 20663*c*1*t* is the software program described in Paragraph and Paragraph [0396]. Wireless Receiver Controller Updating Software 20663*c*1*u* is the software program described in Paragraph [0397] and Paragraph [0398]. Wireless Transmitter Controller Updating Software 20663*c*1*v* is the software program described in Paragraph [0399] and Paragraph [0400]. Wireless Transmitter Controller Updating Software 20663*c*1*w* is the software program described in Paragraph [0401] and Paragraph [0402]. Wireless Transmitter Controller Updating Software 20663*c*1*x* is the software program described in Paragraph [0403] and Paragraph [0404].

Paragraph [0351]—This Paragraph [0351] illustrates the storage areas included in Host H (Paragraph [0025]). In this embodiment, Host H includes Operating System H63OS of which the data stored therein are described in Paragraph [0352] and Paragraph [0352], and OS Updating Information Storage Area H63*a* of which the data and the software programs stored therein are described in Paragraph [0353].

Paragraph [0352]—This Paragraph [0352] illustrates the data stored in Operating System H63OS (Paragraph [0351]). In this embodiment, Operating System H63OS includes Battery Controller H63OSa, CCD Unit Controller H63OSb, Flash Light Unit Controller H63OSc, Indicator Controller H63OSd, Input Device Controller H63OSe, LCD Controller H63OSf, LED Controller H63OSg, Memory Card Interface Controller H63OSh, Microphone Controller H63OSi, Photometer Controller H63OSj, RAM Controller H63OSk, ROM Controller H63OSl, Signal Processor Controller H63OSm, Signal Processor Controller H63OSn, Solar Panel Controller H63OSo, Speaker Controller H63OSp, Vibrator Controller H63OSq, Video Processor Controller H63OSr, Wireless Receiver Controller H63OSs, Wireless Receiver Controller H63OSt, Wireless Receiver Controller H63OSu, Wireless Transmitter Controller H63OSv, Wireless Transmitter Controller H63OSw, and Wireless Transmitter Controller H63OSx. Battery Controller H63OSa is the controller of the latest version which controls Battery 230 (not shown). CCD Unit Controller H63OSb is the controller of the latest version which controls CCD Unit 214 (not shown). Flash Light Unit Controller H63OSc is the controller of the latest version which controls Flash Light Unit 220 (not shown). Indicator Controller H63OSd is the controller of the latest version which controls Indicator 212 (not shown). Input Device Controller H63OSe is the controller of the latest version which controls Input Device 210 (not shown). LCD Controller H63OSf is the controller of the latest version which controls LCD 201 (not shown). LED Controller H63OSg is the controller of the latest version which controls LED 219 (not shown). Memory Card Interface Controller H63OSh is the controller of the latest version which controls Memory Card Interface 221 (not shown). Microphone Controller H63OSi is the controller of the latest version which controls Microphone 215 (not shown). Photometer Controller H63OSj is the controller of the latest version which controls Photometer 232 (not shown). RAM Controller H63OSk is the controller of the latest version which controls Host H (not shown). ROM Controller H63OSl is the controller of the latest version which controls ROM 207 (not shown). Signal Processor Controller H63OSm is the controller of the latest version which controls Signal Processor 205 (not shown). Signal Processor Controller H63OSn is the controller of the latest version which controls Signal Processor 208 (not shown). Solar Panel Controller H63OSo is the controller of the latest version which controls Solar Panel 229 (not shown). Speaker Controller H63OSp is the controller of the latest version which controls Speaker 216L (not shown). Vibrator Controller H63OSq is the controller of the latest version which controls Vibrator 217 (not shown). Video Processor Controller H63OSr is the controller of the latest version which controls Video Processor 202 (not shown). Wireless Receiver Controller H63OSs is the controller of the latest version which controls Wireless Receiver 224 (not shown). Wireless Receiver Controller H63OSt is the controller of the latest version which controls Wireless Receiver 225 (not shown). Wireless Receiver Controller H63OSu is the controller of the latest version which controls Wireless Receiver 226 (not shown). Wireless Transmitter Controller H63OSv is the controller of the latest version which controls Wireless Transmitter 222 (not shown). Wireless Transmitter Controller H63OSw is the controller of the latest version which controls Wireless Transmitter 223 (not shown). Wireless Transmitter Controller H63OSx is the controller of the latest version which controls Wireless Transmitter 227 (not shown). The data stored in Operating System Storage Area H63OS are updated periodically. For the avoidance of doubt, the data stored in Operating System H63OS are illustrative, and other types of data, which are utilized to update Operating System H63OS of Communication Device 200 by implementing the present function, are also stored therein, such as DLLs, drivers, security implementing program. The data stored in Operating System H63OS are updated periodically thereby the data are always of the latest version.

Paragraph [0353]—This Paragraph [0353] illustrates the storage areas included in OS Updating Information Storage Area H63a (Paragraph [0351]). In this embodiment, OS Updating Information Storage Area H63a includes OS Updating Data Storage Area H63b and OS Updating Software Storage Area H63c. OS Updating Data Storage Area H63b stores the data necessary to implement the present function on the side of Host H (Paragraph [0025]), such as the ones described in Paragraph [0354]. OS Updating Software Storage Area H63c stores the software programs necessary to implement the present function on the side of Host H, such as the ones described in Paragraph [0356] and Paragraph [0356].

Paragraph [0354]—This Paragraph [0354] illustrates the storage area included in OS Updating Data Storage Area H63b (Paragraph [0353]). In this embodiment, OS Updating Data Storage Area H63b includes OS Version Data Storage Area H63b1. OS Version Data Storage Area H63b1 stores the data described in Paragraph [0355] and Paragraph [0355].

Paragraph [0355]—This Paragraph [0355] illustrates the data stored in OS Version Data Storage Area H63b1 (Paragraph [0354]). In this embodiment, OS Version Data Storage Area H63b1 includes Battery Controller Version Data H63b1a, CCD Unit Controller Version Data H63b1b, Flash Light Unit Controller Version Data H63b1c, Indicator Controller Version Data H63b1d, Input Device Controller Version Data H63b1e, LCD Controller Version Data H63b1f, LED Controller Version Data H63b1g, Memory Card Interface Controller Version Data H63b1h, Microphone Controller Version Data H63b1i, Photometer Controller Version Data H63b1j, RAM Controller Version Data H63b1k, ROM Controller Version Data H63b1l, Signal Processor Controller Version Data H63b1m, Signal Processor Controller Version Data H63b1n, Solar Panel Controller Version Data H63b1o, Speaker Controller Version Data H63b1p, Vibrator Controller Version Data H63b1q, Video Processor Controller Version Data H63b1r, Wireless Receiver Controller Version Data H63b1s, Wireless Receiver Controller Version Data H63b1t, Wireless Receiver Controller Version Data H63b1u, Wireless Transmitter Controller Version Data H63b1v, Wireless Transmitter Controller Version Data H63b1w, and Wireless Transmitter Controller Version Data H63b1x. Battery Controller Version Data H63b1a is the version data representing the latest version of Battery Controller H63OSa (Paragraph [0352]). CCD Unit Controller Version Data H63b1b is the version data representing the latest version of CCD Unit Controller H63OSb (Paragraph [0352]). Flash Light Unit Controller Version Data H63b1c is the version data representing the latest version of Flash Light Unit Controller H63OSc (Paragraph [0352]). Indicator Controller Version Data H63b1d is the version data representing the latest version of Indicator Controller H63OSd (Paragraph [0352]). Input Device Controller Version Data H63b1e is the version data representing the latest version of Input Device Controller H63OSe (Paragraph [0352]). LCD Controller Version Data H63b1f is the version data representing the latest version of LCD Controller H63OSf (Paragraph [0352]). LED Controller Version Data H63b1g is the version data representing the latest version of LED Controller H63OSg (Paragraph [0352]). Memory Card Interface Controller Version Data H63b1h is the version data representing the latest version of Memory Card Interface Controller H63OSh (Paragraph [0352]). Microphone Controller Version Data H63b1i is the version data representing the latest version of Microphone Controller H63OSi (Paragraph [0352]). Photometer Controller Version Data H63b1j is the version data representing the latest version of Photometer Controller H63OSj (Paragraph [0352]). RAM Controller Version Data H63b1k is the version data representing the latest version of RAM Controller H63OSk (Paragraph [0352]). ROM Controller Version Data H63b1l is the version data representing the latest version of ROM Controller H63OSl (Paragraph [0352]). Signal Processor Controller Version Data H63b1m is the version data representing the latest version of Signal Processor Controller H63OSm (Paragraph [0352]). Signal Processor Controller Version Data H63b1n is the version data representing the latest version of Signal Processor Controller H63OSn (Paragraph [0352]). Solar Panel Controller Version Data H63b1o is the version data representing the latest version of Solar Panel Controller H63OSo (Paragraph [0352]). Speaker Controller Version Data H63b1p is the version data representing the latest version of Speaker Controller H63OSp (Paragraph [0352]). Vibrator Controller Version Data H63b1q is the version data representing the latest version of Vibrator Controller H63OSq (Paragraph [0352]). Video Processor Controller Version Data H63b1r is the version data representing the latest version of Video Processor Controller H63OSr (Paragraph [0352]). Wireless Receiver Controller Version Data H63b1s is the version data representing the latest version of Wireless Receiver Controller H63OSs (Paragraph [0352]). Wireless Receiver Controller Version Data H63b1t is the version data representing the latest version of Wireless Receiver Controller H63OSt (Paragraph [0352]). Wireless Receiver Controller Version Data H63b1u is the version data representing the latest version of Wireless Receiver Controller H63OSu (Paragraph [0352]). Wireless Transmitter Controller Version Data H63b1v is the version data representing the latest version of Wireless Transmitter Controller H63OSv (Paragraph [0352]). Wireless Transmitter Controller Version Data H63b1w is the version data representing the latest version of Wireless Transmitter Controller H63OSw (Paragraph [0352]). Wireless Transmitter Controller Version Data H63b1x is the version data representing the latest version of Wireless Transmitter Controller H63OSx (Paragraph [0352]). Here, the version data is composed of numeric data, such as '1', '2', and '3', wherein '1' represents version '1.0', '2' represents version '2.0', and '3' represents version '3.0'. The data stored in OS Version Data Storage Area H63b1 are updated periodically.

Paragraph [0356]—This Paragraph [0356] illustrates the software programs stored in OS Updating Software Storage Area H63c (Paragraph [0353]). In this embodiment, OS Updating Software Storage Area H63c stores Battery Controller Updating Software H63c1a, CCD Unit Controller Updating Software H63c1b, Flash Light Unit Controller Updating Software H63c1c, Indicator Controller Updating Software H63c1d, Input Device Controller Updating Software H63c1e, LCD Controller Updating Software H63c1f, LED Controller Updating Software H63c1g, Memory Card Interface Controller Updating Software H63c1h, Microphone Controller Updating Software H63c1i, Photometer Controller Updating Software H63c1j, RAM Controller Updating Software H63c1k, ROM Controller Updating Software H63c1l, Signal Processor Controller Updating Software H63c1m, Signal Processor Controller Updating Software H63c1n, Solar Panel Controller Updating Software H63c1o, Speaker Controller Updating Software H63c1p, Vibrator Controller Updating Software H63c1q, Video Processor Controller Updating Software H63c1r, Wireless Receiver Controller Updating Software H63c1s, Wireless Receiver Controller Updating Software H63c1t, Wireless Receiver Controller Updating Software H63c1u, Wireless Transmitter Controller Updating Software H63c1v, Wireless Transmitter Controller Updating Software H63c1w, and Wireless Transmitter Controller Updating Software H63c1x. Battery Controller Updating Software H63c1a is the software program described in Paragraph [0357] and Paragraph [0358]. CCD Unit Controller Updating Software H63c1b is the software program described in Paragraph [0359] and Paragraph [0360]. Flash Light Unit Controller Updating Software H63c1c is the software program described in Paragraph [0361] and Paragraph [0362]. Indicator Controller Updating Software H63c1d is the software program described in Paragraph [0363] and Paragraph [0364]. Input Device Controller Updating Software H63c1e is the software program described in Paragraph [0365] and Paragraph [0366]. LCD Controller Updating Software H63c1f is the software program described in Paragraph [0367] and Paragraph [0368]. LED Controller Updating Software H63c1g is the software program described in Paragraph [0369] and Paragraph [0370]. Memory Card Interface Controller Updating Software H63c1h is the software program described in Paragraph [0371] and Paragraph [0372]. Microphone Controller Updating Software H63c1i is the software program described in Paragraph [0373] and Paragraph [0374]. Photometer Controller Updating Software H63c1j is the software program described in Paragraph [0375] and Paragraph [0376]. RAM Controller Updating Software H63c1k is the software program described in Paragraph [0377] and Paragraph [0378]. ROM Controller Updating Software H63c1l is the software program described in Paragraph [0379] and Paragraph [0380]. Signal Processor Controller Updating Software H63c1m is the software program described in Paragraph [0381] and Paragraph [0382]. Signal Processor Controller Updating Software H63c1n is the software program described in Paragraph [0383] and Paragraph [0384]. Solar Panel Controller Updating Software H63c1o is the software program described in Paragraph [0385] and Paragraph [0386]. Speaker Controller Updating Software H63c1p is the software program described in Paragraph [0387] and Paragraph [0388]. Vibrator Controller Updating Software H63c1q is the software program described in Paragraph [0389] and Paragraph [0390]. Video Processor Controller Updating Software H63c1r is the software program described in Paragraph [0391] and Paragraph [0392]. Wireless Receiver Controller Updating Software H63c1s is the software program described in Paragraph [0393] and Paragraph [0394]. Wireless Receiver Controller Updating Software H63c1t is the software program described in Paragraph [0395] and Paragraph [0396]. Wireless Receiver Controller Updating Software H63c1u is the software program described in Paragraph [0397] and Paragraph [0398]. Wireless Transmitter Controller Updating Software H63c1v is the software program described in Paragraph [0399] and Paragraph [0400]. Wireless Transmitter Controller Updating Software H63c1w is the software program described in Paragraph [0401] and Paragraph [0402]. Wireless Transmitter Controller Updating Software H63c1x is the software program described in Paragraph [0403] and Paragraph [0404]. The foregoing software programs are automatically implemented periodically or implemented manually by utilizing Input Device 210 (FIG. 1) or via voice recognition system.

Paragraph [0357]—This Paragraph [0357] illustrates Battery Controller Updating Software H63c1a (Paragraph [0356]) of Host H (Paragraph [0025]) and Battery Controller Updating Software 20663c1a (Paragraph [0350]) of Communication Device 200, which update Battery Controller 20663OSa stored in Operating System 20663OS (Paragraph [0345]) of Communication Device 200. In this embodiment, CPU 211 (FIG. 1) of Communication Device 200 retrieves Battery Controller Version Data 20663b1a from OS Version Data Storage Area 20663b1 (Paragraph [0349]) and sends the data to Host H (S1). Upon receiving Battery Controller Version Data 20663b1a (Paragraph [0349]) from Communication Device 200 (S2), Host H compares Battery Controller Version Data 20663b1a (Paragraph [0349]) with Battery Controller Version Data H63b1a stored in OS Version Data Storage Area H63b1 (Paragraph [0355]) of Host H (S3). Assuming that Host H detects in S3 that Battery Controller Version Data 20663b1a of Communication Device 200 is of an old version. Host H retrieves Battery Controller H63OSa, which is of the latest version, from Operating System Storage Area H63OS (Paragraph [0352]), and sends the controller to Communication Device 200 (S4). Upon receiving Battery Controller H63OSa from Host H (S5), CPU 211 stores Battery Controller H63OSa as Battery Controller 20663OSa in Operating System 20663OS (Paragraph [0345]) (S6). The old version of Battery Controller 20663OSa (Paragraph [0345]) is deleted.

Paragraph [0358]—This Paragraph [0358] illustrates another embodiment of Battery Controller Updating Software H63c1a (Paragraph [0356]) of Host H (Paragraph [0025]) and Battery Controller Updating Software 20663c1a (Paragraph [0350]) of Communication Device 200, which update Battery Controller 20663OSa stored in Operating System 20663OS (Paragraph [0345]) of Communication Device 200. In this embodiment, CPU 211 (FIG. 1) of Communication Device 200 sends a Battery Controller Update Request, which is received by Host H (S1). Here, the Battery Controller Update Request is a request to send Battery Controller Version Data H63b1a (Paragraph [0355]) stored in Host H to Communication Device 200. In response to the request, Host H retrieves Battery Controller Version Data H63b1a from OS Version Data Storage Area H63b1 (Paragraph [0355]), and sends the data to Communication Device 200 (S2). Upon receiving Battery Controller Version Data H63b1a from Host H (S3), CPU 211 compares Battery Controller Version Data H63b1a with Battery Controller Version Data 20663b1a stored in OS Version Data Storage Area 20663b1 (Paragraph [0349]) of Communication Device 200 (S4). Assuming that CPU 211 detects in S4 that Battery Controller Version Data 20663*b*1*a* of Communication Device 200 is of an old version. CPU 211 sends a New Battery Controller Sending Request, which is received by Host H (S5). Here, the New Battery Controller Sending Request is a request to send Battery Controller H63OSa (Paragraph [0352]) stored in Host H to Communication Device 200. Host H retrieves Battery Controller H63OSa (Paragraph [0352]), which is of the latest version, from Operating System Storage Area H63OS (Paragraph [0352]), and sends the controller to Communication Device 200 (S6). Upon receiving Battery Controller H63OSa from Host H (S7), CPU 211 stores Battery Controller H63OSa as Battery Controller 20663OSa in Operating System 20663OS (Paragraph [0345]) (S8). The old version of Battery Controller 2066305*a* (Paragraph [0345]) is deleted.

Paragraph [0359]—This Paragraph [0359] illustrates CCD Unit Controller Updating Software H63*c*1*b* (Paragraph [0356]) of Host H (Paragraph [0025]) and CCD Unit Controller Updating Software 20663*c*1*b* (Paragraph [0350]) of Communication Device 200, which update CCD Unit Controller 20663OSb stored in Operating System 20663OS (Paragraph [0345]) of Communication Device 200. In this embodiment, CPU 211 (FIG. 1) of Communication Device 200 retrieves CCD Unit Controller Version Data 20663*b*1*b* from OS Version Data Storage Area 20663*b*1 (Paragraph [0349]) and sends the data to Host H (S1). Upon receiving CCD Unit Controller Version Data 20663*b*1*b* (Paragraph [0349]) from Communication Device 200 (S2), Host H compares CCD Unit Controller Version Data 20663*b*1*b* (Paragraph [0349]) with CCD Unit Controller Version Data H63*b*1*b* stored in OS Version Data Storage Area H63*b*1 (Paragraph [0355]) of Host H (S3). Assuming that Host H detects in S3 that CCD Unit Controller Version Data 20663*b*1*b* of Communication Device 200 is of an old version. Host H retrieves CCD Unit Controller H63OSb, which is of the latest version, from Operating System Storage Area H63OS (Paragraph [0352]), and sends the controller to Communication Device 200 (S4). Upon receiving CCD Unit Controller H63OSb from Host H (S5), CPU 211 stores CCD Unit Controller H63OSb as CCD Unit Controller 20663OSb in Operating System 20663OS (Paragraph [0345]) (S6). The old version of CCD Unit Controller 20663OSb (Paragraph [0345]) is deleted.

Paragraph [0360]—This Paragraph [0360] illustrates another embodiment of CCD Unit Controller Updating Software H63*c*1*b* (Paragraph [0356]) of Host H (Paragraph [0025]) and CCD Unit Controller Updating Software 20663*c*1*b* (Paragraph [0350]) of Communication Device 200, which update CCD Unit Controller 20663OSb stored in Operating System 20663OS (Paragraph [0345]) of Communication Device 200. In this embodiment, CPU 211 (FIG. 1) of Communication Device 200 sends a CCD Unit Controller Update Request, which is received by Host H (S1). Here, the CCD Unit Controller Update Request is a request to send CCD Unit Controller Version Data H63*b*1*b* (Paragraph [0355]) stored in Host H to Communication Device 200. In response to the request, Host H retrieves CCD Unit Controller Version Data H63*b*1*b* from OS Version Data Storage Area H63*b*1 (Paragraph [0355]), and sends the data to Communication Device 200 (S2). Upon receiving CCD Unit Controller Version Data H63*b*1*b* from Host H (S3), CPU 211 compares CCD Unit Controller Version Data H63*b*1*b* with CCD Unit Controller Version Data 20663*b*1*b* stored in OS Version Data Storage Area 20663*b*1 (Paragraph [0349]) of Communication Device 200 (S4). Assuming that CPU 211 detects in S4 that CCD Unit Controller Version Data 20663*b*1*b* of Communication Device 200 is of an old version. CPU 211 sends a New CCD Unit Controller Sending Request, which is received by Host H (S5). Here, the New CCD Unit Controller Sending Request is a request to send CCD Unit Controller H63OSb (Paragraph [0352]) stored in Host H to Communication Device 200. Host H retrieves CCD Unit Controller H63OSb (Paragraph [0352]), which is of the latest version, from Operating System Storage Area H63OS (Paragraph [0352]), and sends the controller to Communication Device 200 (S6). Upon receiving CCD Unit Controller H63OSb from Host H (S7), CPU 211 stores CCD Unit Controller H63OSb as CCD Unit Controller 20663OSb in Operating System 20663OS (Paragraph [0345]) (S8). The old version of CCD Unit Controller 20663OSb (Paragraph [0345]) is deleted.

Paragraph [0361]—This Paragraph [0361] illustrates Flash Light Unit Controller Updating Software H63*c*1*c* (Paragraph [0356]) of Host H (Paragraph [0025]) and Flash Light Unit Controller Updating Software 20663*c*1*c* (Paragraph [0350]) of Communication Device 200, which update Flash Light Unit Controller 20663OSc stored in Operating System 20663OS (Paragraph [0345]) of Communication Device 200. In this embodiment, CPU 211 (FIG. 1) of Communication Device 200 retrieves Flash Light Unit Controller Version Data 20663*b*1*c* from OS Version Data Storage Area 20663*b*1 (Paragraph [0349]) and sends the data to Host H (S1). Upon receiving Flash Light Unit Controller Version Data 20663*b*1*c* (Paragraph [0349]) from Communication Device 200 (S2), Host H compares Flash Light Unit Controller Version Data 20663*b*1*c* (Paragraph [0349]) with Flash Light Unit Controller Version Data H63*b*1*c* stored in OS Version Data Storage Area H63*b*1 (Paragraph [0355]) of Host H (S3). Assuming that Host H detects in S3 that Flash Light Unit Controller Version Data 20663*b*1*c* of Communication Device 200 is of an old version. Host H retrieves Flash Light Unit Controller H63OSc, which is of the latest version, from Operating System Storage Area H63OS (Paragraph [0352]), and sends the controller to Communication Device 200 (S4). Upon receiving Flash Light Unit Controller H63OSc from Host H (S5), CPU 211 stores Flash Light Unit Controller H63OSc as Flash Light Unit Controller 20663OSc in Operating System 20663OS (Paragraph [0345]) (S6). The old version of Flash Light Unit Controller 20663OSc (Paragraph [0345]) is deleted.

Paragraph [0362]—This Paragraph [0362] illustrates another embodiment of Flash Light Unit Controller Updating Software H63*c*1*c* (Paragraph [0356]) of Host H (Paragraph [0025]) and Flash Light Unit Controller Updating Software 20663*c*1*c* (Paragraph [0350]) of Communication Device 200, which update Flash Light Unit Controller 20663OSc stored in Operating System 20663OS (Paragraph [0345]) of Communication Device 200. In this embodiment, CPU 211 (FIG. 1) of Communication Device 200 sends a Flash Light Unit Controller Update Request, which is received by Host H (S1). Here, the Flash Light Unit Controller Update Request is a request to send Flash Light Unit Controller Version Data H63*b*1*c* (Paragraph [0355]) stored in Host H to Communication Device 200. In response to the request, Host H retrieves Flash Light Unit Controller Version Data H63*b*1*c* from OS Version Data Storage Area H63*b*1 (Paragraph [0355]), and sends the data to Communication Device 200 (S2). Upon receiving Flash Light Unit Controller Version Data H63*b*1*c* from Host H (S3), CPU 211 compares Flash Light Unit Controller Version Data H63*b*1*c* with Flash Light Unit Controller Version Data 20663*b*1*c* stored in OS Version Data Storage Area 20663*b*1 (Paragraph [0349]) of Communication Device 200 (S4). Assuming that CPU 211 detects in S4 that Flash Light Unit Controller Version Data 20663*b*1*c* of Communication Device 200 is of an old version. CPU 211 sends a New Flash Light Unit Controller Sending Request, which is received by Host H (S5). Here, the New Flash Light Unit Controller Sending Request is a request to send Flash Light Unit Controller H63OSc (Paragraph [0352]) stored in Host H to Communication Device 200. Host H retrieves Flash Light Unit Controller H63OSc (Paragraph [0352]), which is of the latest version, from Operating System Storage Area H63OS (Paragraph [0352]), and sends the controller to Communication Device 200 (S6). Upon receiving Flash Light Unit Controller H63OSc from Host H (S7), CPU 211 stores Flash Light Unit Controller H63OSc as Flash Light Unit Controller 20663OSc in Operating System 20663OS (Paragraph [0345]) (S8). The old version of Flash Light Unit Controller 20663OSc (Paragraph [0345]) is deleted.

Paragraph [0363]—This Paragraph [0363] illustrates Indicator Controller Updating Software H63c1d (Paragraph [0356]) of Host H (Paragraph [0025]) and Indicator Controller Updating Software 20663c1d (Paragraph [0350]) of Communication Device 200, which update Indicator Controller 20663OSd stored in Operating System 20663OS (Paragraph [0345]) of Communication Device 200. In this embodiment, CPU 211 (FIG. 1) of Communication Device 200 retrieves Indicator Controller Version Data 20663b1d from OS Version Data Storage Area 20663b1 (Paragraph [0349]) and sends the data to Host H (S1). Upon receiving Indicator Controller Version Data 20663b1d (Paragraph [0349]) from Communication Device 200 (S2), Host H compares Indicator Controller Version Data 20663b1d (Paragraph [0349]) with Indicator Controller Version Data H63b1d stored in OS Version Data Storage Area H63b1 (Paragraph [0355]) of Host H (S3). Assuming that Host H detects in S3 that Indicator Controller Version Data 20663b1d of Communication Device 200 is of an old version. Host H retrieves Indicator Controller H63OSd, which is of the latest version, from Operating System Storage Area H63OS (Paragraph [0352]), and sends the controller to Communication Device 200 (S4). Upon receiving Indicator Controller H63OSd from Host H (S5), CPU 211 stores Indicator Controller H63OSd as Indicator Controller 20663OSd in Operating System 20663OS (Paragraph [0345]) (S6). The old version of Indicator Controller 20663OSd (Paragraph [0345]) is deleted.

Paragraph [0364]—This Paragraph [0364] illustrates another embodiment of Indicator Controller Updating Software H63c1d (Paragraph [0356]) of Host H (Paragraph [0025]) and Indicator Controller Updating Software 20663c1d (Paragraph [0350]) of Communication Device 200, which update Indicator Controller 20663OSd stored in Operating System 20663OS (Paragraph [0345]) of Communication Device 200. In this embodiment, CPU 211 (FIG. 1) of Communication Device 200 sends a Indicator Controller Update Request, which is received by Host H (S1). Here, the Indicator Controller Update Request is a request to send Indicator Controller Version Data H63b1d (Paragraph [0355]) stored in Host H to Communication Device 200. In response to the request, Host H retrieves Indicator Controller Version Data H63b1d from OS Version Data Storage Area H63b1 (Paragraph [0355]), and sends the data to Communication Device 200 (S2). Upon receiving Indicator Controller Version Data H63b1d from Host H (S3), CPU 211 compares Indicator Controller Version Data H63b1d with Indicator Controller Version Data 20663b1d stored in OS Version Data Storage Area 20663b1 (Paragraph [0349]) of Communication Device 200 (S4). Assuming that CPU 211 detects in S4 that Indicator Controller Version Data 20663b1d of Communication Device 200 is of an old version. CPU 211 sends a New Indicator Controller Sending Request, which is received by Host H (S5). Here, the New Indicator Controller Sending Request is a request to send Indicator Controller H63OSd (Paragraph [0352]) stored in Host H to Communication Device 200. Host H retrieves Indicator Controller H63OSd (Paragraph [0352]), which is of the latest version, from Operating System Storage Area H63OS (Paragraph [0352]), and sends the controller to Communication Device 200 (S6). Upon receiving Indicator Controller H63OSd from Host H (S7), CPU 211 stores Indicator Controller H63OSd as Indicator Controller 20663OSd in Operating System 20663OS (Paragraph [0345]) (S8). The old version of Indicator Controller 20663OSd (Paragraph [0345]) is deleted.

Paragraph [0365]—This Paragraph [0365] illustrates Input Device Controller Updating Software H63c1e (Paragraph [0356]) of Host H (Paragraph [0025]) and Input Device Controller Updating Software 20663c1e (Paragraph [0350]) of Communication Device 200, which update Input Device Controller 20663OSe stored in Operating System 20663OS (Paragraph [0345]) of Communication Device 200. In this embodiment, CPU 211 (FIG. 1) of Communication Device 200 retrieves Input Device Controller Version Data 20663b1e from OS Version Data Storage Area 20663b1 (Paragraph [0349]) and sends the data to Host H (S1). Upon receiving Input Device Controller Version Data 20663b1e (Paragraph [0349]) from Communication Device 200 (S2), Host H compares Input Device Controller Version Data 20663b1e (Paragraph [0349]) with Input Device Controller Version Data H63b1e stored in OS Version Data Storage Area H63b1 (Paragraph [0355]) of Host H (S3). Assuming that Host H detects in S3 that Input Device Controller Version Data 20663b1e of Communication Device 200 is of an old version. Host H retrieves Input Device Controller H63OSe, which is of the latest version, from Operating System Storage Area H63OS (Paragraph [0352]), and sends the controller to Communication Device 200 (S4). Upon receiving Input Device Controller H63OSe from Host H (S5), CPU 211 stores Input Device Controller H63OSe as Input Device Controller 20663OSe in Operating System 20663OS (Paragraph [0345]) (S6). The old version of Input Device Controller 20663OSe (Paragraph [0345]) is deleted.

Paragraph [0366]—This Paragraph [0366] illustrates another embodiment of Input Device Controller Updating Software H63c1e (Paragraph [0356]) of Host H (Paragraph [0025]) and Input Device Controller Updating Software 20663c1e (Paragraph [0350]) of Communication Device 200, which update Input Device Controller 20663OSe stored in Operating System 20663OS (Paragraph [0345]) of Communication Device 200. In this embodiment, CPU 211 (FIG. 1) of Communication Device 200 sends a Input Device Controller Update Request, which is received by Host H (S1). Here, the Input Device Controller Update Request is a request to send Input Device Controller Version Data H63b1e (Paragraph [0355]) stored in Host H to Communication Device 200. In response to the request, Host H retrieves Input Device Controller Version Data H63b1e from OS Version Data Storage Area H63b1 (Paragraph [0355]), and sends the data to Communication Device 200 (S2). Upon receiving Input Device Controller Version Data H63b1e from Host H (S3), CPU 211 compares Input Device Controller Version Data H63b1e with Input Device Controller Version Data 20663b1e stored in OS Version Data Storage Area 20663b1 (Paragraph [0349]) of Communication Device 200 (S4). Assuming that CPU 211 detects in S4 that Input Device Controller Version Data 20663b1e of Communication Device 200 is of an old version. CPU 211 sends a New Input Device Controller Sending Request, which is received by Host H (S5). Here, the New Input Device Controller Sending Request is a request to send Input Device Controller H63OSe (Paragraph [0352]) stored in Host H to Communication Device 200. Host H retrieves Input Device Controller H63OSe (Paragraph [0352]), which is of the latest version, from Operating System Storage Area H63OS (Paragraph [0352]), and sends the controller to Communication Device 200 (S6). Upon receiving Input Device Controller H63OSe from Host H (S7), CPU 211 stores Input Device Controller H63OSe as Input Device Controller 20663OSe in Operating System 20663OS (Paragraph [0345]) (S8). The old version of Input Device Controller 20663OSe (Paragraph [0345]) is deleted.

Paragraph [0367]—This Paragraph [0367] illustrates LCD Controller Updating Software H63c1f (Paragraph [0356]) of Host H (Paragraph [0025]) and LCD Controller Updating Software 20663c1f (Paragraph [0350]) of Communication Device 200, which update LCD Controller 20663OSf stored in Operating System 20663OS (Paragraph [0345]) of Communication Device 200. In this embodiment, CPU 211 (FIG. 1) of Communication Device 200 retrieves LCD Controller Version Data 20663b1f from OS Version Data Storage Area 20663b1 (Paragraph [0349]) and sends the data to Host H (S1). Upon receiving LCD Controller Version Data 20663b1f (Paragraph [0349]) from Communication Device 200 (S2), Host H compares LCD Controller Version Data 20663b1f (Paragraph [0349]) with LCD Controller Version Data H63b1f stored in OS Version Data Storage Area H63b1 (Paragraph [0355]) of Host H (S3). Assuming that Host H detects in S3 that LCD Controller Version Data 20663b1f of Communication Device 200 is of an old version. Host H retrieves LCD Controller H63OSf, which is of the latest version, from Operating System Storage Area H63OS (Paragraph [0352]), and sends the controller to Communication Device 200 (S4). Upon receiving LCD Controller H63OSf from Host H (S5), CPU 211 stores LCD Controller H63OSf as LCD Controller 20663OSf in Operating System 20663OS (Paragraph [0345]) (S6). The old version of LCD Controller 20663OSf (Paragraph [0345]) is deleted.

Paragraph [0368]—This Paragraph [0368] illustrates another embodiment of LCD Controller Updating Software H63c1f (Paragraph [0356]) of Host H (Paragraph [0025]) and LCD Controller Updating Software 20663c1f (Paragraph [0350]) of Communication Device 200, which update LCD Controller 20663OSf stored in Operating System 20663OS (Paragraph [0345]) of Communication Device 200. In this embodiment, CPU 211 (FIG. 1) of Communication Device 200 sends a LCD Controller Update Request, which is received by Host H (S1). Here, the LCD Controller Update Request is a request to send LCD Controller Version Data H63b1f (Paragraph [0355]) stored in Host H to Communication Device 200. In response to the request, Host H retrieves LCD Controller Version Data H63b1f from OS Version Data Storage Area H63b1 (Paragraph [0355]), and sends the data to Communication Device 200 (S2). Upon receiving LCD Controller Version Data H63b1f from Host H (S3), CPU 211 compares LCD Controller Version Data H63b1f with LCD Controller Version Data 20663b1f stored in OS Version Data Storage Area 20663b1 (Paragraph [0349]) of Communication Device 200 (S4). Assuming that CPU 211 detects in S4 that LCD Controller Version Data 20663b1f of Communication Device 200 is of an old version. CPU 211 sends a New LCD Controller Sending Request, which is received by Host H (S5). Here, the New LCD Controller Sending Request is a request to send LCD Controller H63OSf (Paragraph [0352]) stored in Host H to Communication Device 200. Host H retrieves LCD Controller H63OSf (Paragraph [0352]), which is of the latest version, from Operating System Storage Area H63OS (Paragraph [0352]), and sends the controller to Communication Device 200 (S6). Upon receiving LCD Controller H63OSf from Host H (S7), CPU 211 stores LCD Controller H63OSf as LCD Controller 20663OSf in Operating System 20663OS (Paragraph [0345]) (S8). The old version of LCD Controller 20663OSf (Paragraph [0345]) is deleted.

Paragraph [0369]—This Paragraph [0369] illustrates LED Controller Updating Software H63c1g (Paragraph [0356]) of Host H (Paragraph [0025]) and LED Controller Updating Software 20663c1g (Paragraph [0350]) of Communication Device 200, which update LED Controller 20663OSg stored in Operating System 20663OS (Paragraph [0345]) of Communication Device 200. In this embodiment, CPU 211 (FIG. 1) of Communication Device 200 retrieves LED Controller Version Data 20663b1g from OS Version Data Storage Area 20663b1 (Paragraph [0349]) and sends the data to Host H (S1). Upon receiving LED Controller Version Data 20663b1g (Paragraph [0349]) from Communication Device 200 (S2), Host H compares LED Controller Version Data 20663b1g (Paragraph [0349]) with LED Controller Version Data H63b1g stored in OS Version Data Storage Area H63b1 (Paragraph [0355]) of Host H (S3). Assuming that Host H detects in S3 that LED Controller Version Data 20663b1g of Communication Device 200 is of an old version. Host H retrieves LED Controller H63OSg, which is of the latest version, from Operating System Storage Area H63OS (Paragraph [0352]), and sends the controller to Communication Device 200 (S4). Upon receiving LED Controller H63OSg from Host H (S5), CPU 211 stores LED Controller H63OSg as LED Controller 20663OSg in Operating System 20663OS (Paragraph [0345]) (S6). The old version of LED Controller 20663OSg (Paragraph [0345]) is deleted.

Paragraph [0370]—This Paragraph [0370] illustrates another embodiment of LED Controller Updating Software H63c1g (Paragraph [0356]) of Host H (Paragraph [0025]) and LED Controller Updating Software 20663c1g (Paragraph [0350]) of Communication Device 200, which update LED Controller 20663OSg stored in Operating System 20663OS (Paragraph [0345]) of Communication Device 200. In this embodiment, CPU 211 (FIG. 1) of Communication Device 200 sends a LED Controller Update Request, which is received by Host H (S1). Here, the LED Controller Update Request is a request to send LED Controller Version Data H63b1g (Paragraph [0355]) stored in Host H to Communication Device 200. In response to the request, Host H retrieves LED Controller Version Data H63b1g from OS Version Data Storage Area H63b1 (Paragraph [0355]), and sends the data to Communication Device 200 (S2). Upon receiving LED Controller Version Data H63b1g from Host H (S3), CPU 211 compares LED Controller Version Data H63b1g with LED Controller Version Data 20663b1g stored in OS Version Data Storage Area 20663b1 (Paragraph [0349]) of Communication Device 200 (S4). Assuming that CPU 211 detects in S4 that LED Controller Version Data 20663b1g of Communication Device 200 is of an old version. CPU 211 sends a New LED Controller Sending Request, which is received by Host H (S5). Here, the New LED Controller Sending Request is a request to send LED Controller H63OSg (Paragraph [0352]) stored in Host H to Communication Device 200. Host H retrieves LED Controller H63OSg (Paragraph [0352]), which is of the latest version, from Operating System Storage Area H63OS (Paragraph [0352]), and sends the controller to Communication Device 200 (S6). Upon receiving LED Controller H63OSg from Host H (S7), CPU 211 stores LED Controller H63OSg as LED Controller 20663OSg in Operating System 20663OS (Paragraph [0345]) (S8). The old version of LED Controller 20663OSg (Paragraph [0345]) is deleted.

Paragraph [0371]—This Paragraph [0371] illustrates Memory Card Interface Controller Updating Software H63c1h (Paragraph [0356]) of Host H (Paragraph [0025]) and Memory Card Interface Controller Updating Software 20663c1h (Paragraph [0350]) of Communication Device 200, which update Memory Card Interface Controller 20663OSh stored in Operating System 20663OS (Paragraph [0345]) of Communication Device 200. In this embodiment, CPU 211 (FIG. 1) of Communication Device 200 retrieves Memory Card Interface Controller Version Data 20663b1h from OS Version Data Storage Area 20663b1 (Paragraph [0349]) and sends the data to Host H (S1). Upon receiving Memory Card Interface Controller Version Data 20663b1h (Paragraph [0349]) from Communication Device 200 (S2), Host H compares Memory Card Interface Controller Version Data 20663b1h (Paragraph [0349]) with Memory Card Interface Controller Version Data H63b1h stored in OS Version Data Storage Area H63b1 (Paragraph [0355]) of Host H (S3). Assuming that Host H detects in S3 that Memory Card Interface Controller Version Data 20663b1h of Communication Device 200 is of an old version. Host H retrieves Memory Card Interface Controller H63OSh, which is of the latest version, from Operating System Storage Area H63OS (Paragraph [0352]), and sends the controller to Communication Device 200 (S4). Upon receiving Memory Card Interface Controller H63OSh from Host H (S5), CPU 211 stores Memory Card Interface Controller H63OSh as Memory Card Interface Controller 20663OSh in Operating System 20663OS (Paragraph [0345]) (S6). The old version of Memory Card Interface Controller 20663OSh (Paragraph [0345]) is deleted.

Paragraph [0372]—This Paragraph [0372] illustrates another embodiment of Memory Card Interface Controller Updating Software H63c1h (Paragraph [0356]) of Host H (Paragraph [0025]) and Memory Card Interface Controller Updating Software 20663c1h (Paragraph [0350]) of Communication Device 200, which update Memory Card Interface Controller 20663OSh stored in Operating System 20663OS (Paragraph [0345]) of Communication Device 200. In this embodiment, CPU 211 (FIG. 1) of Communication Device 200 sends a Memory Card Interface Controller Update Request, which is received by Host H (S1). Here, the Memory Card Interface Controller Update Request is a request to send Memory Card Interface Controller Version Data H63b1h (Paragraph [0355]) stored in Host H to Communication Device 200. In response to the request, Host H retrieves Memory Card Interface Controller Version Data H63b1h from OS Version Data Storage Area H63b1 (Paragraph [0355]), and sends the data to Communication Device 200 (S2). Upon receiving Memory Card Interface Controller Version Data H63b1h from Host H (S3), CPU 211 compares Memory Card Interface Controller Version Data H63b1h with Memory Card Interface Controller Version Data 20663b1h stored in OS Version Data Storage Area 20663b1 (Paragraph [0349]) of Communication Device 200 (S4). Assuming that CPU 211 detects in S4 that Memory Card Interface Controller Version Data 20663b1h of Communication Device 200 is of an old version. CPU 211 sends a New Memory Card Interface Controller Sending Request, which is received by Host H (S5). Here, the New Memory Card Interface Controller Sending Request is a request to send Memory Card Interface Controller H63OSh (Paragraph [0352]) stored in Host H to Communication Device 200. Host H retrieves Memory Card Interface Controller H63OSh (Paragraph [0352]), which is of the latest version, from Operating System Storage Area H63OS (Paragraph [0352]), and sends the controller to Communication Device 200 (S6). Upon receiving Memory Card Interface Controller H63OSh from Host H (S7), CPU 211 stores Memory Card Interface Controller H63OSh as Memory Card Interface Controller 20663OSh in Operating System 20663OS (Paragraph [0345]) (S8). The old version of Memory Card Interface Controller 20663OSh (Paragraph [0345]) is deleted.

Paragraph [0373]—This Paragraph [0373] illustrates Microphone Controller Updating Software H63c1i (Paragraph [0356]) of Host H (Paragraph [0025]) and Microphone Controller Updating Software 20663c1i (Paragraph [0350]) of Communication Device 200, which update Microphone Controller 20663OSi stored in Operating System 20663OS (Paragraph [0345]) of Communication Device 200. In this embodiment, CPU 211 (FIG. 1) of Communication Device 200 retrieves Microphone Controller Version Data 20663b1i from OS Version Data Storage Area 20663b1 (Paragraph [0349]) and sends the data to Host H (S1). Upon receiving Microphone Controller Version Data 20663b1i (Paragraph [0349]) from Communication Device 200 (S2), Host H compares Microphone Controller Version Data 20663b1i (Paragraph [0349]) with Microphone Controller Version Data H63b1i stored in OS Version Data Storage Area H63b1 (Paragraph [0355]) of Host H (S3). Assuming that Host H detects in S3 that Microphone Controller Version Data 20663b1i of Communication Device 200 is of an old version. Host H retrieves Microphone Controller H63OSi, which is of the latest version, from Operating System Storage Area H63O5 (Paragraph [0352]), and sends the controller to Communication Device 200 (S4). Upon receiving Microphone Controller H63OSi from Host H (S5), CPU 211 stores Microphone Controller H63OSi as Microphone Controller 20663OSi in Operating System 20663OS (Paragraph [0345]) (S6). The old version of Microphone Controller 20663OSi (Paragraph [0345]) is deleted.

Paragraph [0374]—This Paragraph [0374] illustrates another embodiment of Microphone Controller Updating Software H63c1i (Paragraph [0356]) of Host H (Paragraph [0025]) and Microphone Controller Updating Software 20663c1i (Paragraph [0350]) of Communication Device 200, which update Microphone Controller 20663OSi stored in Operating System 20663OS (Paragraph [0345]) of Communication Device 200. In this embodiment, CPU 211 (FIG. 1) of Communication Device 200 sends a Microphone Controller Update Request, which is received by Host H (S1). Here, the Microphone Controller Update Request is a request to send Microphone Controller Version Data H63b1i (Paragraph [0355]) stored in Host H to Communication Device 200. In response to the request, Host H retrieves Microphone Controller Version Data H63b1i from OS Version Data Storage Area H63b1 (Paragraph [0355]), and sends the data to Communication Device 200 (S2). Upon receiving Microphone Controller Version Data H63b1i from Host H (S3), CPU 211 compares Microphone Controller Version Data H63b1i with Microphone Controller Version Data 20663b1i stored in OS Version Data Storage Area 20663b1 (Paragraph [0349]) of Communication Device 200 (S4). Assuming that CPU 211 detects in S4 that Microphone Controller Version Data 20663b1i of Communication Device 200 is of an old version. CPU 211 sends a New Microphone Controller Sending Request, which is received by Host H (S5). Here, the New Microphone Controller Sending Request is a request to send Microphone Controller H63OSi (Paragraph [0352]) stored in Host H to Communication Device 200. Host H retrieves Microphone Controller H63OSi (Paragraph [0352]), which is of the latest version, from Operating System Storage Area H63OS (Paragraph [0352]), and sends the controller to Communication Device 200 (S6). Upon receiving Microphone Controller H63OSi from Host H (S7), CPU 211 stores Microphone Controller H63OSi as Microphone Controller 20663OSi in Operating System 20663OS (Paragraph [0345]) (S8). The old version of Microphone Controller 20663OSi (Paragraph [0345]) is deleted.

Paragraph [0375]—This Paragraph [0375] illustrates Photometer Controller Updating Software H63c1j (Paragraph [0356]) of Host H (Paragraph [0025]) and Photometer Controller Updating Software 20663c1j (Paragraph [0350]) of Communication Device 200, which update Photometer Controller 20663OSj stored in Operating System 20663OS (Paragraph [0345]) of Communication Device 200. In this embodiment, CPU 211 (FIG. 1) of Communication Device 200 retrieves Photometer Controller Version Data 20663b1j from OS Version Data Storage Area 20663b1 (Paragraph [0349]) and sends the data to Host H (S1). Upon receiving Photometer Controller Version Data 20663b1j (Paragraph [0349]) from Communication Device 200 (S2), Host H compares Photometer Controller Version Data 20663b1j (Paragraph [0349]) with Photometer Controller Version Data H63b1j stored in OS Version Data Storage Area H63b1 (Paragraph [0355]) of Host H (S3). Assuming that Host H detects in S3 that Photometer Controller Version Data 20663b1j of Communication Device 200 is of an old version. Host H retrieves Photometer Controller H63OSj, which is of the latest version, from Operating System Storage Area H63OS (Paragraph [0352]), and sends the controller to Communication Device 200 (S4). Upon receiving Photometer Controller H63OSj from Host H (S5), CPU 211 stores Photometer Controller H63OSj as Photometer Controller 206630Sj in Operating System 20663OS (Paragraph [0345]) (S6). The old version of Photometer Controller 20663OSj (Paragraph [0345]) is deleted.

Paragraph [0376]—This Paragraph [0376] illustrates another embodiment of Photometer Controller Updating Software H63c1j (Paragraph [0356]) of Host H (Paragraph [0025]) and Photometer Controller Updating Software 20663c1j (Paragraph [0350]) of Communication Device 200, which update Photometer Controller 20663OSj stored in Operating System 20663OS (Paragraph [0345]) of Communication Device 200. In this embodiment, CPU 211 (FIG. 1) of Communication Device 200 sends a Photometer Controller Update Request, which is received by Host H (S1). Here, the Photometer Controller Update Request is a request to send Photometer Controller Version Data H63b1j (Paragraph [0355]) stored in Host H to Communication Device 200. In response to the request, Host H retrieves Photometer Controller Version Data H63b1j from OS Version Data Storage Area H63b1 (Paragraph [0355]), and sends the data to Communication Device 200 (S2). Upon receiving Photometer Controller Version Data H63b1j from Host H (S3), CPU 211 compares Photometer Controller Version Data H63b1j with Photometer Controller Version Data 20663b1j stored in OS Version Data Storage Area 20663b1 (Paragraph [0349]) of Communication Device 200 (S4). Assuming that CPU 211 detects in S4 that Photometer Controller Version Data 20663b1j of Communication Device 200 is of an old version. CPU 211 sends a New Photometer Controller Sending Request, which is received by Host H (S5). Here, the New Photometer Controller Sending Request is a request to send Photometer Controller H63OSj (Paragraph [0352]) stored in Host H to Communication Device 200. Host H retrieves Photometer Controller H63OSj (Paragraph [0352]), which is of the latest version, from Operating System Storage Area H63OS (Paragraph [0352]), and sends the controller to Communication Device 200 (S6). Upon receiving Photometer Controller H63OSj from Host H (S7), CPU 211 stores Photometer Controller H63OSj as Photometer Controller 20663OSj in Operating System 20663OS (Paragraph [0345]) (S8). The old version of Photometer Controller 20663OSj (Paragraph [0345]) is deleted.

Paragraph [0377]—This Paragraph [0377] illustrates RAM Controller Updating Software H63c1k (Paragraph [0356]) of Host H (Paragraph [0025]) and RAM Controller Updating Software 20663c1k (Paragraph [0350]) of Communication Device 200, which update RAM Controller 20663OSk stored in Operating System 20663OS (Paragraph [0345]) of Communication Device 200. In this embodiment, CPU 211 (FIG. 1) of Communication Device 200 retrieves RAM Controller Version Data 20663b1k from OS Version Data Storage Area 20663b1 (Paragraph [0349]) and sends the data to Host H (S1). Upon receiving RAM Controller Version Data 20663b1k (Paragraph [0349]) from Communication Device 200 (S2), Host H compares RAM Controller Version Data 20663b1k (Paragraph [0349]) with RAM Controller Version Data H63b1k stored in OS Version Data Storage Area H63b1 (Paragraph [0355]) of Host H (S3). Assuming that Host H detects in S3 that RAM Controller Version Data 20663b1k of Communication Device 200 is of an old version. Host H retrieves RAM Controller H63OSk, which is of the latest version, from Operating System Storage Area H63OS (Paragraph [0352]), and sends the controller to Communication Device 200 (S4). Upon receiving RAM Controller H63OSk from Host H (S5), CPU 211 stores RAM Controller H63OSk as RAM Controller 20663OSk in Operating System 20663OS (Paragraph [0345]) (S6). The old version of RAM Controller 20663OSk (Paragraph [0345]) is deleted.

Paragraph [0378]—This Paragraph [0378] illustrates another embodiment of RAM Controller Updating Software H63c1k (Paragraph [0356]) of Host H (Paragraph [0025]) and RAM Controller Updating Software 20663c1k (Paragraph [0350]) of Communication Device 200, which update RAM Controller 20663OSk stored in Operating System 20663OS (Paragraph [0345]) of Communication Device 200. In this embodiment, CPU 211 (FIG. 1) of Communication Device 200 sends a RAM Controller Update Request, which is received by Host H (S1). Here, the RAM Controller Update Request is a request to send RAM Controller Version Data H63b1 k (Paragraph [0355]) stored in Host H to Communication Device 200. In response to the request, Host H retrieves RAM Controller Version Data H63b1k from OS Version Data Storage Area H63b1 (Paragraph [0355]), and sends the data to Communication Device 200 (S2). Upon receiving RAM Controller Version Data H63b1k from Host H (S3), CPU 211 compares RAM Controller Version Data H63b1k with RAM Controller Version Data 20663b1k stored in OS Version Data Storage Area 20663b1 (Paragraph [0349]) of Communication Device 200 (S4). Assuming that CPU 211 detects in S4 that RAM Controller Version Data 20663b1k of Communication Device 200 is of an old version. CPU 211 sends a New RAM Controller Sending Request, which is received by Host H (S5). Here, the New RAM Controller Sending Request is a request to send RAM Controller H63OSk (Paragraph [0352]) stored in Host H to Communication Device 200. Host H retrieves RAM Controller H63OSk (Paragraph [0352]), which is of the latest version, from Operating System Storage Area H63OS (Paragraph [0352]), and sends the controller to Communication Device 200 (S6). Upon receiving RAM Controller H63OSk from Host H (S7), CPU 211 stores RAM Controller H63OSk as RAM Controller 20663OSk in Operating System 20663OS (Paragraph [0345]) (S8). The old version of RAM Controller 20663OSk (Paragraph [0345]) is deleted.

Paragraph [0379]—This Paragraph [0379] illustrates ROM Controller Updating Software H63c1l (Paragraph

[0356]) of Host H (Paragraph [0025]) and ROM Controller Updating Software 20663c1*l* (Paragraph [0350]) of Communication Device 200, which update ROM Controller 20663OSl stored in Operating System 20663OS (Paragraph [0345]) of Communication Device 200. In this embodiment, CPU 211 (FIG. 1) of Communication Device 200 retrieves ROM Controller Version Data 20663*b*1*l* from OS Version Data Storage Area 20663*b*1 (Paragraph [0349]) and sends the data to Host H (S1). Upon receiving ROM Controller Version Data 20663*b*1*l* (Paragraph [0349]) from Communication Device 200 (S2), Host H compares ROM Controller Version Data 20663*b*1*l* (Paragraph [0349]) with ROM Controller Version Data H63*b*1*l* stored in OS Version Data Storage Area H63*b*1 (Paragraph [0355]) of Host H (S3). Assuming that Host H detects in S3 that ROM Controller Version Data 20663*b*1*l* of Communication Device 200 is of an old version. Host H retrieves ROM Controller H63OS1, which is of the latest version, from Operating System Storage Area H63OS (Paragraph [0352]), and sends the controller to Communication Device 200 (S4). Upon receiving ROM Controller H63OSl from Host H (S5), CPU 211 stores ROM Controller H63OSl as ROM Controller 20663OSl in Operating System 20663OS (Paragraph [0345]) (S6). The old version of ROM Controller 20663OSl (Paragraph [0345]) is deleted.

Paragraph [0380]—This Paragraph [0380] illustrates another embodiment of ROM Controller Updating Software H63*c*1*l* (Paragraph [0356]) of Host H (Paragraph [0025]) and ROM Controller Updating Software 20663*c*1*l* (Paragraph [0350]) of Communication Device 200, which update ROM Controller 20663OSl stored in Operating System 20663OS (Paragraph [0345]) of Communication Device 200. In this embodiment, CPU 211 (FIG. 1) of Communication Device 200 sends a ROM Controller Update Request, which is received by Host H (S1). Here, the ROM Controller Update Request is a request to send ROM Controller Version Data H63*b*1*l* (Paragraph [0355]) stored in Host H to Communication Device 200. In response to the request, Host H retrieves ROM Controller Version Data H63*b*1*l* from OS Version Data Storage Area H63*b*1 (Paragraph [0355]), and sends the data to Communication Device 200 (S2). Upon receiving ROM Controller Version Data H63*b*1*l* from Host H (S3), CPU 211 compares ROM Controller Version Data H63*b*1*l* with ROM Controller Version Data 20663*b*1*l* stored in OS Version Data Storage Area 20663*b*1 (Paragraph [0349]) of Communication Device 200 (S4). Assuming that CPU 211 detects in S4 that ROM Controller Version Data 20663*b*1*l* of Communication Device 200 is of an old version. CPU 211 sends a New ROM Controller Sending Request, which is received by Host H (S5). Here, the New ROM Controller Sending Request is a request to send ROM Controller H63OSl (Paragraph [0352]) stored in Host H to Communication Device 200. Host H retrieves ROM Controller H63OSl (Paragraph [0352]), which is of the latest version, from Operating System Storage Area H63OS (Paragraph [0352]), and sends the controller to Communication Device 200 (S6). Upon receiving ROM Controller H63OSl from Host H (S7), CPU 211 stores ROM Controller H63OSl as ROM Controller 20663OSl in Operating System 20663OS (Paragraph [0345]) (S8). The old version of ROM Controller 20663OSl (Paragraph [0345]) is deleted.

Paragraph [0381]—This Paragraph [0381] illustrates Signal Processor Controller Updating Software H63*c*1*m* (Paragraph [0356]) of Host H (Paragraph [0025]) and Signal Processor Controller Updating Software 20663*c*1*m* (Paragraph [0350]) of Communication Device 200, which update Signal Processor Controller 20663OSm stored in Operating System 20663OS (Paragraph [0345]) of Communication Device 200. In this embodiment, CPU 211 (FIG. 1) of Communication Device 200 retrieves Signal Processor Controller Version Data 20663*b*1*m* from OS Version Data Storage Area 20663*b*1 (Paragraph [0349]) and sends the data to Host H (S1). Upon receiving Signal Processor Controller Version Data 20663*b*1*m* (Paragraph [0349]) from Communication Device 200 (S2), Host H compares Signal Processor Controller Version Data 20663*b*1*m* (Paragraph [0349]) with Signal Processor Controller Version Data H63*b*1*m* stored in OS Version Data Storage Area H63*b*1 (Paragraph [0355]) of Host H (S3). Assuming that Host H detects in S3 that Signal Processor Controller Version Data 20663*b*1*m* of Communication Device 200 is of an old version. Host H retrieves Signal Processor Controller H63OSm, which is of the latest version, from Operating System Storage Area H63OS (Paragraph [0352]), and sends the controller to Communication Device 200 (S4). Upon receiving Signal Processor Controller H63OSm from Host H (S5), CPU 211 stores Signal Processor Controller H63OSm as Signal Processor Controller 20663OSm in Operating System 20663OS (Paragraph [0345]) (S6). The old version of Signal Processor Controller 20663OSm (Paragraph [0345]) is deleted.

Paragraph [0382]—This Paragraph [0382] illustrates another embodiment of Signal Processor Controller Updating Software H63*c*1*m* (Paragraph [0356]) of Host H (Paragraph [0025]) and Signal Processor Controller Updating Software 20663*c*1*m* (Paragraph [0350]) of Communication Device 200, which update Signal Processor Controller 20663OSm stored in Operating System 20663OS (Paragraph [0345]) of Communication Device 200. In this embodiment, CPU 211 (FIG. 1) of Communication Device 200 sends a Signal Processor Controller Update Request, which is received by Host H (S1). Here, the Signal Processor Controller Update Request is a request to send Signal Processor Controller Version Data H63*b*1*m* (Paragraph [0355]) stored in Host H to Communication Device 200. In response to the request, Host H retrieves Signal Processor Controller Version Data H63*b*1*m* from OS Version Data Storage Area H63*b*1 (Paragraph [0355]), and sends the data to Communication Device 200 (S2). Upon receiving Signal Processor Controller Version Data H63*b*1*m* from Host H (S3), CPU 211 compares Signal Processor Controller Version Data H63*b*1*m* with Signal Processor Controller Version Data 20663*b*1*m* stored in OS Version Data Storage Area 20663*b*1 (Paragraph [0349]) of Communication Device 200 (S4). Assuming that CPU 211 detects in S4 that Signal Processor Controller Version Data 20663*b*1*m* of Communication Device 200 is of an old version. CPU 211 sends a New Signal Processor Controller Sending Request, which is received by Host H (S5). Here, the New Signal Processor Controller Sending Request is a request to send Signal Processor Controller H63OSm (Paragraph [0352]) stored in Host H to Communication Device 200. Host H retrieves Signal Processor Controller H63OSm (Paragraph [0352]), which is of the latest version, from Operating System Storage Area H63OS (Paragraph [0352]), and sends the controller to Communication Device 200 (S6). Upon receiving Signal Processor Controller H63OSm from Host H (S7), CPU 211 stores Signal Processor Controller H63OSm as Signal Processor Controller 20663OSm in Operating System 20663OS (Paragraph [0345]) (S8). The old version of Signal Processor Controller 20663OSm (Paragraph [0345]) is deleted.

Paragraph [0383]—This Paragraph [0383] illustrates Signal Processor Controller Updating Software H63*c*1*n* (Paragraph [0356]) of Host H (Paragraph [0025]) and Signal Processor Controller Updating Software 20663*c*1*n* (Paragraph [0350]) of Communication Device 200, which update Signal Processor Controller 20663OSn stored in Operating System 20663OS (Paragraph [0345]) of Communication Device 200. In this embodiment, CPU 211 (FIG. 1) of Communication Device 200 retrieves Signal Processor Controller Version Data 20663$b1n$ from OS Version Data Storage Area 20663$b1$ (Paragraph [0349]) and sends the data to Host H (S1). Upon receiving Signal Processor Controller Version Data 20663$b1n$ (Paragraph [0349]) from Communication Device 200 (S2), Host H compares Signal Processor Controller Version Data 20663$b1n$ (Paragraph [0349]) with Signal Processor Controller Version Data H63$b1n$ stored in OS Version Data Storage Area H63$b1$ (Paragraph [0355]) of Host H (S3). Assuming that Host H detects in S3 that Signal Processor Controller Version Data 20663$b1n$ of Communication Device 200 is of an old version. Host H retrieves Signal Processor Controller H63OSn, which is of the latest version, from Operating System Storage Area H63OS (Paragraph [0352]), and sends the controller to Communication Device 200 (S4). Upon receiving Signal Processor Controller H63OSn from Host H (S5), CPU 211 stores Signal Processor Controller H63OSn as Signal Processor Controller 20663OSn in Operating System 20663OS (Paragraph [0345]) (S6). The old version of Signal Processor Controller 20663OSn (Paragraph [0345]) is deleted.

Paragraph [0384]—This Paragraph [0384] illustrates another embodiment of Signal Processor Controller Updating Software H63$c1n$ (Paragraph [0356]) of Host H (Paragraph [0025]) and Signal Processor Controller Updating Software 20663$c1n$ (Paragraph [0350]) of Communication Device 200, which update Signal Processor Controller 20663OSn stored in Operating System 20663OS (Paragraph [0345]) of Communication Device 200. In this embodiment, CPU 211 (FIG. 1) of Communication Device 200 sends a Signal Processor Controller Update Request, which is received by Host H (S1). Here, the Signal Processor Controller Update Request is a request to send Signal Processor Controller Version Data H63$b1n$ (Paragraph [0355]) stored in Host H to Communication Device 200. In response to the request, Host H retrieves Signal Processor Controller Version Data H63$b1n$ from OS Version Data Storage Area H63$b1$ (Paragraph [0355]), and sends the data to Communication Device 200 (S2). Upon receiving Signal Processor Controller Version Data H63$b1n$ from Host H (S3), CPU 211 compares Signal Processor Controller Version Data H63$b1n$ with Signal Processor Controller Version Data 20663$b1n$ stored in OS Version Data Storage Area 20663$bi$ (Paragraph [0349]) of Communication Device 200 (S4). Assuming that CPU 211 detects in S4 that Signal Processor Controller Version Data 20663$b1n$ of Communication Device 200 is of an old version. CPU 211 sends a New Signal Processor Controller Sending Request, which is received by Host H (S5). Here, the New Signal Processor Controller Sending Request is a request to send Signal Processor Controller H63OSn (Paragraph [0352]) stored in Host H to Communication Device 200. Host H retrieves Signal Processor Controller H63OSn (Paragraph [0352]), which is of the latest version, from Operating System Storage Area H63OS (Paragraph [0352]), and sends the controller to Communication Device 200 (S6). Upon receiving Signal Processor Controller H63OSn from Host H (S7), CPU 211 stores Signal Processor Controller H63OSn as Signal Processor Controller 20663OSn in Operating System 20663OS (Paragraph [0345]) (S8). The old version of Signal Processor Controller 20663OSn (Paragraph [0345]) is deleted.

Paragraph [0385]—This Paragraph [0385] illustrates Solar Panel Controller Updating Software H63$c1o$ (Paragraph [0356]) of Host H (Paragraph [0025]) and Solar Panel Controller Updating Software 20663$c1o$ (Paragraph [0350]) of Communication Device 200, which update Solar Panel Controller 20663OSo stored in Operating System 20663OS (Paragraph [0345]) of Communication Device 200. In this embodiment, CPU 211 (FIG. 1) of Communication Device 200 retrieves Solar Panel Controller Version Data 20663$b1o$ from OS Version Data Storage Area 20663$b1$ (Paragraph [0349]) and sends the data to Host H (S1). Upon receiving Solar Panel Controller Version Data 20663$b1o$ (Paragraph [0349]) from Communication Device 200 (S2), Host H compares Solar Panel Controller Version Data 20663$b1o$ (Paragraph [0349]) with Solar Panel Controller Version Data H63$b1o$ stored in OS Version Data Storage Area H63$b1$ (Paragraph [0355]) of Host H (S3). Assuming that Host H detects in S3 that Solar Panel Controller Version Data 20663$b1o$ of Communication Device 200 is of an old version. Host H retrieves Solar Panel Controller H63OSo, which is of the latest version, from Operating System Storage Area H63OS (Paragraph [0352]), and sends the controller to Communication Device 200 (S4). Upon receiving Solar Panel Controller H63OSo from Host H (S5), CPU 211 stores Solar Panel Controller H63OSo as Solar Panel Controller 20663OSo in Operating System 20663OS (Paragraph [0345]) (S6). The old version of Solar Panel Controller 20663OSo (Paragraph [0345]) is deleted.

Paragraph [0386]—This Paragraph [0386] illustrates another embodiment of Solar Panel Controller Updating Software H63$c1o$ (Paragraph [0356]) of Host H (Paragraph [0025]) and Solar Panel Controller Updating Software 20663$c1o$ (Paragraph [0350]) of Communication Device 200, which update Solar Panel Controller 20663OSo stored in Operating System 20663OS (Paragraph [0345]) of Communication Device 200. In this embodiment, CPU 211 (FIG. 1) of Communication Device 200 sends a Solar Panel Controller Update Request, which is received by Host H (S1). Here, the Solar Panel Controller Update Request is a request to send Solar Panel Controller Version Data H63$b1o$ (Paragraph [0355]) stored in Host H to Communication Device 200. In response to the request, Host H retrieves Solar Panel Controller Version Data H63$b1o$ from OS Version Data Storage Area H63$b1$ (Paragraph [0355]), and sends the data to Communication Device 200 (S2). Upon receiving Solar Panel Controller Version Data H63$b1o$ from Host H (S3), CPU 211 compares Solar Panel Controller Version Data H63$b1o$ with Solar Panel Controller Version Data 20663$b1o$ stored in OS Version Data Storage Area 20663$b1$ (Paragraph [0349]) of Communication Device 200 (S4). Assuming that CPU 211 detects in S4 that Solar Panel Controller Version Data 20663$b1o$ of Communication Device 200 is of an old version. CPU 211 sends a New Solar Panel Controller Sending Request, which is received by Host H (S5). Here, the New Solar Panel Controller Sending Request is a request to send Solar Panel Controller H63OSo (Paragraph [0352]) stored in Host H to Communication Device 200. Host H retrieves Solar Panel Controller H63OSo (Paragraph [0352]), which is of the latest version, from Operating System Storage Area H63OS (Paragraph [0352]), and sends the controller to Communication Device 200 (S6). Upon receiving Solar Panel Controller H63OSo from Host H (S7), CPU 211 stores Solar Panel Controller H63OSo as Solar Panel Controller 20663OSo in Operating System 20663OS (Paragraph [0345]) (S8). The old version of Solar Panel Controller 20663OSo (Paragraph [0345]) is deleted.

Paragraph [0387]—This Paragraph [0387] illustrates Speaker Controller Updating Software H63$c1p$ (Paragraph [0356]) of Host H (Paragraph [0025]) and Speaker Controller Updating Software 20663$c1p$ (Paragraph [0350]) of Communication Device 200, which update Speaker Controller 2066OSp stored in Operating System 20663OS (Paragraph [0345]) of Communication Device 200. In this embodiment, CPU 211 (FIG. 1) of Communication Device 200 retrieves Speaker Controller Version Data 20663b1p from OS Version Data Storage Area 20663b1 (Paragraph [0349]) and sends the data to Host H (S1). Upon receiving Speaker Controller Version Data 20663b1p (Paragraph [0349]) from Communication Device 200 (S2), Host H compares Speaker Controller Version Data 20663b1p (Paragraph [0349]) with Speaker Controller Version Data H63b1p stored in OS Version Data Storage Area H63b1 (Paragraph [0355]) of Host H (S3). Assuming that Host H detects in S3 that Speaker Controller Version Data 20663b1p of Communication Device 200 is of an old version. Host H retrieves Speaker Controller H63OSp, which is of the latest version, from Operating System Storage Area H63OS (Paragraph [0352]), and sends the controller to Communication Device 200 (S4). Upon receiving Speaker Controller H63OSp from Host H (S5), CPU 211 stores Speaker Controller H63OSp as Speaker Controller 20663OSp in Operating System 20663OS (Paragraph [0345]) (S6). The old version of Speaker Controller 20663OSp (Paragraph [0345]) is deleted.

Paragraph [0388]—This Paragraph [0388] illustrates another embodiment of Speaker Controller Updating Software H63c1p (Paragraph [0356]) of Host H (Paragraph [0025]) and Speaker Controller Updating Software 20663c1p (Paragraph [0350]) of Communication Device 200, which update Speaker Controller 20663OSp stored in Operating System 20663OS (Paragraph [0345]) of Communication Device 200. In this embodiment, CPU 211 (FIG. 1) of Communication Device 200 sends a Speaker Controller Update Request, which is received by Host H (S1). Here, the Speaker Controller Update Request is a request to send Speaker Controller Version Data H63b1p (Paragraph [0355]) stored in Host H to Communication Device 200. In response to the request, Host H retrieves Speaker Controller Version Data H63b1p from OS Version Data Storage Area H63b1 (Paragraph [0355]), and sends the data to Communication Device 200 (S2). Upon receiving Speaker Controller Version Data H63b1p from Host H (S3), CPU 211 compares Speaker Controller Version Data H63b1p with Speaker Controller Version Data 20663b1p stored in OS Version Data Storage Area 20663b1 (Paragraph [0349]) of Communication Device 200 (S4). Assuming that CPU 211 detects in S4 that Speaker Controller Version Data 20663b1p of Communication Device 200 is of an old version. CPU 211 sends a New Speaker Controller Sending Request, which is received by Host H (S5). Here, the New Speaker Controller Sending Request is a request to send Speaker Controller H63OSp (Paragraph [0352]) stored in Host H to Communication Device 200. Host H retrieves Speaker Controller H63OSp (Paragraph [0352]), which is of the latest version, from Operating System Storage Area H63OS (Paragraph [0352]), and sends the controller to Communication Device 200 (S6). Upon receiving Speaker Controller H63OSp from Host H (S7), CPU 211 stores Speaker Controller H63OSp as Speaker Controller 20663OSp in Operating System 20663OS (Paragraph [0345]) (S8). The old version of Speaker Controller 20663OSp (Paragraph [0345]) is deleted.

Paragraph [0389]—This Paragraph [0389] illustrates Vibrator Controller Updating Software H63c1q (Paragraph [0356]) of Host H (Paragraph [0025]) and Vibrator Controller Updating Software 20663c1q (Paragraph [0350]) of Communication Device 200, which update Vibrator Controller 20663OSq stored in Operating System 20663OS (Paragraph [0345]) of Communication Device 200. In this embodiment, CPU 211 (FIG. 1) of Communication Device 200 retrieves Vibrator Controller Version Data 20663b1q from OS Version Data Storage Area 20663b1 (Paragraph [0349]) and sends the data to Host H (S1). Upon receiving Vibrator Controller Version Data 20663b1q (Paragraph [0349]) from Communication Device 200 (S2), Host H compares Vibrator Controller Version Data 20663b1q (Paragraph [0349]) with Vibrator Controller Version Data H63b1q stored in OS Version Data Storage Area H63b1 (Paragraph [0355]) of Host H (S3). Assuming that Host H detects in S3 that Vibrator Controller Version Data 20663b1q of Communication Device 200 is of an old version. Host H retrieves Vibrator Controller H63OSq, which is of the latest version, from Operating System Storage Area H63OS (Paragraph [0352]), and sends the controller to Communication Device 200 (S4). Upon receiving Vibrator Controller H63OSq from Host H (S5), CPU 211 stores Vibrator Controller H63OSq as Vibrator Controller 20663OSq in Operating System 20663OS (Paragraph [0345]) (S6). The old version of Vibrator Controller 20663OSq (Paragraph [0345]) is deleted.

Paragraph [0390]—This Paragraph [0390] illustrates another embodiment of Vibrator Controller Updating Software H63c1q (Paragraph [0356]) of Host H (Paragraph [0025]) and Vibrator Controller Updating Software 20663c1q (Paragraph [0350]) of Communication Device 200, which update Vibrator Controller 20663OSq stored in Operating System 20663OS (Paragraph [0345]) of Communication Device 200. In this embodiment, CPU 211 (FIG. 1) of Communication Device 200 sends a Vibrator Controller Update Request, which is received by Host H (S1). Here, the Vibrator Controller Update Request is a request to send Vibrator Controller Version Data H63b1q (Paragraph [0355]) stored in Host H to Communication Device 200. In response to the request, Host H retrieves Vibrator Controller Version Data H63b1q from OS Version Data Storage Area H63b1 (Paragraph [0355]), and sends the data to Communication Device 200 (S2). Upon receiving Vibrator Controller Version Data H63b1q from Host H (S3), CPU 211 compares Vibrator Controller Version Data H63b1q with Vibrator Controller Version Data 20663b1q stored in OS Version Data Storage Area 20663b1 (Paragraph [0349]) of Communication Device 200 (S4). Assuming that CPU 211 detects in S4 that Vibrator Controller Version Data 20663b1q of Communication Device 200 is of an old version. CPU 211 sends a New Vibrator Controller Sending Request, which is received by Host H (S5). Here, the New Vibrator Controller Sending Request is a request to send Vibrator Controller H63OSq (Paragraph [0352]) stored in Host H to Communication Device 200. Host H retrieves Vibrator Controller H63OSq (Paragraph [0352]), which is of the latest version, from Operating System Storage Area H63OS (Paragraph [0352]), and sends the controller to Communication Device 200 (S6). Upon receiving Vibrator Controller H63OSq from Host H (S7), CPU 211 stores Vibrator Controller H63OSq as Vibrator Controller 20663OSq in Operating System 20663OS (Paragraph [0345]) (S8). The old version of Vibrator Controller 20663OSq (Paragraph [0345]) is deleted.

Paragraph [0391]—This Paragraph [0391] illustrates Video Processor Controller Updating Software H63c1r (Paragraph [0356]) of Host H (Paragraph [0025]) and Video Processor Controller Updating Software 20663c1r (Paragraph [0350]) of Communication Device 200, which update Video Processor Controller 20663OSr stored in Operating System 20663OS (Paragraph [0345]) of Communication Device 200. In this embodiment, CPU 211 (FIG. 1) of Communication Device 200 retrieves Video Processor Controller Version Data 20663b1 r from OS Version Data Storage Area 20663b1 (Paragraph [0349]) and sends the data to Host H (S1). Upon receiving Video Processor Controller Version Data 20663*b*1*r* (Paragraph [0349]) from Communication Device 200 (S2), Host H compares Video Processor Controller Version Data 20663*b*1*r* (Paragraph [0349]) with Video Processor Controller Version Data H63*b*1*r* stored in OS Version Data Storage Area H63*b*1 (Paragraph [0355]) of Host H (S3). Assuming that Host H detects in S3 that Video Processor Controller Version Data 20663*b*1*r* of Communication Device 200 is of an old version. Host H retrieves Video Processor Controller H63OS*r*, which is of the latest version, from Operating System Storage Area H63OS (Paragraph [0352]), and sends the controller to Communication Device 200 (S4). Upon receiving Video Processor Controller H63OS*r* from Host H (S5), CPU 211 stores Video Processor Controller H63OS*r* as Video Processor Controller 20663OS*r* in Operating System 20663OS (Paragraph [0345]) (S6). The old version of Video Processor Controller 20663OS*r* (Paragraph [0345]) is deleted.

Paragraph [0392]—This Paragraph [0392] illustrates another embodiment of Video Processor Controller Updating Software H63*c*1*r* (Paragraph [0356]) of Host H (Paragraph [0025]) and Video Processor Controller Updating Software 20663*c*1*r* (Paragraph [0350]) of Communication Device 200, which update Video Processor Controller 20663OS*r* stored in Operating System 20663OS (Paragraph [0345]) of Communication Device 200. In this embodiment, CPU 211 (FIG. 1) of Communication Device 200 sends a Video Processor Controller Update Request, which is received by Host H (S1). Here, the Video Processor Controller Update Request is a request to send Video Processor Controller Version Data H63*b*1*r* (Paragraph [0355]) stored in Host H to Communication Device 200. In response to the request, Host H retrieves Video Processor Controller Version Data H63*b*1*r* from OS Version Data Storage Area H63*b*1 (Paragraph [0355]), and sends the data to Communication Device 200 (S2). Upon receiving Video Processor Controller Version Data H63*b*1*r* from Host H (S3), CPU 211 compares Video Processor Controller Version Data H63*b*1*r* with Video Processor Controller Version Data 20663*b*1*r* stored in OS Version Data Storage Area 20663*b*1 (Paragraph [0349]) of Communication Device 200 (S4). Assuming that CPU 211 detects in S4 that Video Processor Controller Version Data 20663*b*1*r* of Communication Device 200 is of an old version. CPU 211 sends a New Video Processor Controller Sending Request, which is received by Host H (S5). Here, the New Video Processor Controller Sending Request is a request to send Video Processor Controller H63OS*r* (Paragraph [0352]) stored in Host H to Communication Device 200. Host H retrieves Video Processor Controller H63OS*r* (Paragraph [0352]), which is of the latest version, from Operating System Storage Area H63OS (Paragraph [0352]), and sends the controller to Communication Device 200 (S6). Upon receiving Video Processor Controller H63OS*r* from Host H (S7), CPU 211 stores Video Processor Controller H63OS*r* as Video Processor Controller 20663OS*r* in Operating System 20663OS (Paragraph [0345]) (S8). The old version of Video Processor Controller 20663OS*r* (Paragraph [0345]) is deleted.

Paragraph [0393]—This Paragraph [0393] illustrates Wireless Receiver Controller Updating Software H63*c*1*s* (Paragraph [0356]) of Host H (Paragraph [0025]) and Wireless Receiver Controller Updating Software 20663*c*1*s* (Paragraph [0350]) of Communication Device 200, which update Wireless Receiver Controller 20663OS*s* stored in Operating System 20663OS (Paragraph [0345]) of Communication Device 200. In this embodiment, CPU 211 (FIG. 1) of Communication Device 200 retrieves Wireless Receiver Controller Version Data 20663*b*1*s* from OS Version Data Storage Area 20663*b*1 (Paragraph [0349]) and sends the data to Host H (S1). Upon receiving Wireless Receiver Controller Version Data 20663*b*1*s* (Paragraph [0349]) from Communication Device 200 (S2), Host H compares Wireless Receiver Controller Version Data 20663*b*1*s* (Paragraph [0349]) with Wireless Receiver Controller Version Data H63*b*1*s* stored in OS Version Data Storage Area H63*b*1 (Paragraph [0355]) of Host H (S3). Assuming that Host H detects in S3 that Wireless Receiver Controller Version Data 20663*b*1*s* of Communication Device 200 is of an old version. Host H retrieves Wireless Receiver Controller H63OS*s*, which is of the latest version, from Operating System Storage Area H63OS (Paragraph [0352]), and sends the controller to Communication Device 200 (S4). Upon receiving Wireless Receiver Controller H63OS*s* from Host H (S5), CPU 211 stores Wireless Receiver Controller H63OS*s* as Wireless Receiver Controller 20663OS*s* in Operating System 20663OS (Paragraph [0345]) (S6). The old version of Wireless Receiver Controller 20663OS*s* (Paragraph [0345]) is deleted.

Paragraph [0394]—This Paragraph [0394] illustrates another embodiment of Wireless Receiver Controller Updating Software H63*c*1*s* (Paragraph [0356]) of Host H (Paragraph [0025]) and Wireless Receiver Controller Updating Software 20663*c*1*s* (Paragraph [0350]) of Communication Device 200, which update Wireless Receiver Controller 20663OS*s* stored in Operating System 20663OS (Paragraph [0345]) of Communication Device 200. In this embodiment, CPU 211 (FIG. 1) of Communication Device 200 sends a Wireless Receiver Controller Update Request#1, which is received by Host H (S1). Here, the Wireless Receiver Controller Update Request#1 is a request to send Wireless Receiver Controller Version Data H63*b*1*s* (Paragraph [0355]) stored in Host H to Communication Device 200. In response to the request, Host H retrieves Wireless Receiver Controller Version Data H63*b*1*s* from OS Version Data Storage Area H63*b*1 (Paragraph [0355]), and sends the data to Communication Device 200 (S2). Upon receiving Wireless Receiver Controller Version Data H63*b*1*s* from Host H (S3), CPU 211 compares Wireless Receiver Controller Version Data H63*b*1*s* with Wireless Receiver Controller Version Data 20663*b*1 s stored in OS Version Data Storage Area 20663*b*1 (Paragraph [0349]) of Communication Device 200 (S4). Assuming that CPU 211 detects in S4 that Wireless Receiver Controller Version Data 20663*b*1*s* of Communication Device 200 is of an old version. CPU 211 sends a New Wireless Receiver Controller Sending Request#1, which is received by Host H (S5). Here, the New Wireless Receiver Controller Sending Request#1 is a request to send Wireless Receiver Controller H63OS*s* (Paragraph [0352]) stored in Host H to Communication Device 200. Host H retrieves Wireless Receiver Controller H63OS*s* (Paragraph [0352]), which is of the latest version, from Operating System Storage Area H63OS (Paragraph [0352]), and sends the controller to Communication Device 200 (S6). Upon receiving Wireless Receiver Controller H63OS*s* from Host H (S7), CPU 211 stores Wireless Receiver Controller H63OS*s* as Wireless Receiver Controller 20663OS*s* in Operating System 20663OS (Paragraph [0345]) (S8). The old version of Wireless Receiver Controller 20663OS*s* (Paragraph [0345]) is deleted.

Paragraph [0395]—This Paragraph [0395] illustrates Wireless Receiver Controller Updating Software H63*c*1*t* (Paragraph [0356]) of Host H (Paragraph [0025]) and Wireless Receiver Controller Updating Software 20663*c*1*t* (Paragraph [0350]) of Communication Device 200, which update Wireless Receiver Controller 20663OS*t* stored in Operating System 20663OS (Paragraph [0345]) of Communication Device 200. In this embodiment, CPU 211 (FIG. 1) of Communication Device 200 retrieves Wireless Receiver Controller Version Data 20663b1t from OS Version Data Storage Area 20663b1 (Paragraph [0349]) and sends the data to Host H (S1). Upon receiving Wireless Receiver Controller Version Data 20663b1t (Paragraph [0349]) from Communication Device 200 (S2), Host H compares Wireless Receiver Controller Version Data 20663b1t (Paragraph [0349]) with Wireless Receiver Controller Version Data H63b1t stored in OS Version Data Storage Area H63b1 (Paragraph [0355]) of Host H (S3). Assuming that Host H detects in S3 that Wireless Receiver Controller Version Data 20663b1t of Communication Device 200 is of an old version. Host H retrieves Wireless Receiver Controller H63OSt, which is of the latest version, from Operating System Storage Area H63OS (Paragraph [0352]), and sends the controller to Communication Device 200 (S4). Upon receiving Wireless Receiver Controller H63OSt from Host H (S5), CPU 211 stores Wireless Receiver Controller H63OSt as Wireless Receiver Controller 20663OSt in Operating System 20663OS (Paragraph [0345]) (S6). The old version of Wireless Receiver Controller 20663OSt (Paragraph [0345]) is deleted.

Paragraph [0396]—This Paragraph [0396] illustrates another embodiment of Wireless Receiver Controller Updating Software H63c1t (Paragraph [0356]) of Host H (Paragraph [0025]) and Wireless Receiver Controller Updating Software 20663c1t (Paragraph [0350]) of Communication Device 200, which update Wireless Receiver Controller 20663OSt stored in Operating System 20663OS (Paragraph [0345]) of Communication Device 200. In this embodiment, CPU 211 (FIG. 1) of Communication Device 200 sends a Wireless Receiver Controller Update Request#2, which is received by Host H (S1). Here, the Wireless Receiver Controller Update Request#2 is a request to send Wireless Receiver Controller Version Data H63b1t (Paragraph [0355]) stored in Host H to Communication Device 200. In response to the request, Host H retrieves Wireless Receiver Controller Version Data H63b1t from OS Version Data Storage Area H63b1 (Paragraph [0355]), and sends the data to Communication Device 200 (S2). Upon receiving Wireless Receiver Controller Version Data H63b1t from Host H (S3), CPU 211 compares Wireless Receiver Controller Version Data H63b1t with Wireless Receiver Controller Version Data 20663b1t stored in OS Version Data Storage Area 20663b1 (Paragraph [0349]) of Communication Device 200 (S4). Assuming that CPU 211 detects in S4 that Wireless Receiver Controller Version Data 20663b1t of Communication Device 200 is of an old version. CPU 211 sends a New Wireless Receiver Controller Sending Request#2, which is received by Host H (S5). Here, the New Wireless Receiver Controller Sending Request#2 is a request to send Wireless Receiver Controller H63OSt (Paragraph [0352]) stored in Host H to Communication Device 200. Host H retrieves Wireless Receiver Controller H63OSt (Paragraph [0352]), which is of the latest version, from Operating System Storage Area H63OS (Paragraph [0352]), and sends the controller to Communication Device 200 (S6). Upon receiving Wireless Receiver Controller H63OSt from Host H (S7), CPU 211 stores Wireless Receiver Controller H63OSt as Wireless Receiver Controller 20663OSt in Operating System 20663OS (Paragraph [0345]) (S8). The old version of Wireless Receiver Controller 20663OSt (Paragraph [0345]) is deleted.

Paragraph [0397]—This Paragraph [0397] illustrates Wireless Receiver Controller Updating Software H63c1u (Paragraph [0356]) of Host H (Paragraph [0025]) and Wireless Receiver Controller Updating Software 20663c1u (Paragraph [0350]) of Communication Device 200, which update Wireless Receiver Controller 20663OSu stored in Operating System 20663OS (Paragraph [0345]) of Communication Device 200. In this embodiment, CPU 211 (FIG. 1) of Communication Device 200 retrieves Wireless Receiver Controller Version Data 20663b1u from OS Version Data Storage Area 20663b1 (Paragraph [0349]) and sends the data to Host H (S1). Upon receiving Wireless Receiver Controller Version Data 20663b1u (Paragraph [0349]) from Communication Device 200 (S2), Host H compares Wireless Receiver Controller Version Data 20663b1u (Paragraph [0349]) with Wireless Receiver Controller Version Data H63b1u stored in OS Version Data Storage Area H63b1 (Paragraph [0355]) of Host H (S3). Assuming that Host H detects in S3 that Wireless Receiver Controller Version Data 20663b1u of Communication Device 200 is of an old version. Host H retrieves Wireless Receiver Controller H63OSu, which is of the latest version, from Operating System Storage Area H63OS (Paragraph [0352]), and sends the controller to Communication Device 200 (S4). Upon receiving Wireless Receiver Controller H63OSu from Host H (S5), CPU 211 stores Wireless Receiver Controller H63OSu as Wireless Receiver Controller 20663OSu in Operating System 20663OS (Paragraph [0345]) (S6). The old version of Wireless Receiver Controller 20663OSu (Paragraph [0345]) is deleted.

Paragraph [0398]—This Paragraph [0398] illustrates another embodiment of Wireless Receiver Controller Updating Software H63c1u (Paragraph [0356]) of Host H (Paragraph [0025]) and Wireless Receiver Controller Updating Software 20663c1u (Paragraph [0350]) of Communication Device 200, which update Wireless Receiver Controller 2066305u stored in Operating System 20663OS (Paragraph [0345]) of Communication Device 200. In this embodiment, CPU 211 (FIG. 1) of Communication Device 200 sends a Wireless Receiver Controller Update Request#3, which is received by Host H (S1). Here, the Wireless Receiver Controller Update Request#3 is a request to send Wireless Receiver Controller Version Data H63b1u (Paragraph [0355]) stored in Host H to Communication Device 200. In response to the request, Host H retrieves Wireless Receiver Controller Version Data H63b1u from OS Version Data Storage Area H63b1 (Paragraph [0355]), and sends the data to Communication Device 200 (S2). Upon receiving Wireless Receiver Controller Version Data H63b1u from Host H (S3), CPU 211 compares Wireless Receiver Controller Version Data H63b1u with Wireless Receiver Controller Version Data 20663b1u stored in OS Version Data Storage Area 20663b1 (Paragraph [0349]) of Communication Device 200 (S4). Assuming that CPU 211 detects in S4 that Wireless Receiver Controller Version Data 20663b1u of Communication Device 200 is of an old version. CPU 211 sends a New Wireless Receiver Controller Sending Request#3, which is received by Host H (S5). Here, the New Wireless Receiver Controller Sending Request#3 is a request to send Wireless Receiver Controller H63OSu (Paragraph [0352]) stored in Host H to Communication Device 200. Host H retrieves Wireless Receiver Controller H63OSu (Paragraph [0352]), which is of the latest version, from Operating System Storage Area H63OS (Paragraph [0352]), and sends the controller to Communication Device 200 (S6). Upon receiving Wireless Receiver Controller H63OSu from Host H (S7), CPU 211 stores Wireless Receiver Controller H63OSu as Wireless Receiver Controller 20663OSu in Operating System 2066305 (Paragraph [0345]) (S8). The old version of Wireless Receiver Controller 20663OSu (Paragraph [0345]) is deleted.

Paragraph [0399]—This Paragraph [0399] illustrates Wireless Transmitter Controller Updating Software H63c1v (Paragraph [0356]) of Host H (Paragraph [0025]) and Wireless Transmitter Controller Updating Software 20663c1v (Paragraph [0350]) of Communication Device 200, which update Wireless Transmitter Controller 20663OSv stored in Operating System 2066305 (Paragraph [0345]) of Communication Device 200. In this embodiment, CPU 211 (FIG. 1) of Communication Device 200 retrieves Wireless Transmitter Controller Version Data 20663b1v from OS Version Data Storage Area 20663b1 (Paragraph [0349]) and sends the data to Host H (S1). Upon receiving Wireless Transmitter Controller Version Data 20663b1v (Paragraph [0349]) from Communication Device 200 (S2), Host H compares Wireless Transmitter Controller Version Data 20663b1v (Paragraph [0349]) with Wireless Transmitter Controller Version Data H63b1v stored in OS Version Data Storage Area H63b1 (Paragraph [0355]) of Host H (S3). Assuming that Host H detects in S3 that Wireless Transmitter Controller Version Data 20663b1v of Communication Device 200 is of an old version. Host H retrieves Wireless Transmitter Controller H63OSv, which is of the latest version, from Operating System Storage Area H63OS (Paragraph [0352]), and sends the controller to Communication Device 200 (S4). Upon receiving Wireless Transmitter Controller H63OSv from Host H (S5), CPU 211 stores Wireless Transmitter Controller H63OSv as Wireless Transmitter Controller 20663OSv in Operating System 20663OS (Paragraph [0345]) (S6). The old version of Wireless Transmitter Controller 20663OSv (Paragraph [0345]) is deleted.

Paragraph [0400]—This Paragraph [0400] illustrates another embodiment of Wireless Transmitter Controller Updating Software H63c1v (Paragraph [0356]) of Host H (Paragraph [0025]) and Wireless Transmitter Controller Updating Software 20663c1v (Paragraph [0350]) of Communication Device 200, which update Wireless Transmitter Controller 20663OSv stored in Operating System 20663OS (Paragraph [0345]) of Communication Device 200. In this embodiment, CPU 211 (FIG. 1) of Communication Device 200 sends a Wireless Transmitter Controller Update Request#1, which is received by Host H (S1). Here, the Wireless Transmitter Controller Update Request#1 is a request to send Wireless Transmitter Controller Version Data H63b1v (Paragraph [0355]) stored in Host H to Communication Device 200. In response to the request, Host H retrieves Wireless Transmitter Controller Version Data H63b1v from OS Version Data Storage Area H63b1 (Paragraph [0355]), and sends the data to Communication Device 200 (S2). Upon receiving Wireless Transmitter Controller Version Data H63b1v from Host H (S3), CPU 211 compares Wireless Transmitter Controller Version Data H63b1v with Wireless Transmitter Controller Version Data 20663b1v stored in OS Version Data Storage Area 20663b1 (Paragraph [0349]) of Communication Device 200 (S4). Assuming that CPU 211 detects in S4 that Wireless Transmitter Controller Version Data 20663b1v of Communication Device 200 is of an old version. CPU 211 sends a New Wireless Transmitter Controller Sending Request#1, which is received by Host H (S5). Here, the New Wireless Transmitter Controller Sending Request#1 is a request to send Wireless Transmitter Controller H63OSv (Paragraph [0352]) stored in Host H to Communication Device 200. Host H retrieves Wireless Transmitter Controller H63OSv (Paragraph [0352]), which is of the latest version, from Operating System Storage Area H63OS (Paragraph [0352]), and sends the controller to Communication Device 200 (S6). Upon receiving Wireless Transmitter Controller H63OSv from Host H (S7), CPU 211 stores Wireless Transmitter Controller H63OSv as Wireless Transmitter Controller 20663OSv in Operating System 20663OS (Paragraph [0345]) (S8). The old version of Wireless Transmitter Controller 20663OSv (Paragraph [0345]) is deleted.

Paragraph [0401]—This Paragraph [0401] illustrates Wireless Transmitter Controller Updating Software H63c1w (Paragraph [0356]) of Host H (Paragraph [0025]) and Wireless Transmitter Controller Updating Software 20663c1w (Paragraph [0350]) of Communication Device 200, which update Wireless Transmitter Controller 20663OSw stored in Operating System 20663OS (Paragraph [0345]) of Communication Device 200. In this embodiment, CPU 211 (FIG. 1) of Communication Device 200 retrieves Wireless Transmitter Controller Version Data 20663b1w from OS Version Data Storage Area 20663b1 (Paragraph [0349]) and sends the data to Host H (S1). Upon receiving Wireless Transmitter Controller Version Data 20663b1w (Paragraph [0349]) from Communication Device 200 (S2), Host H compares Wireless Transmitter Controller Version Data 20663b1w (Paragraph [0349]) with Wireless Transmitter Controller Version Data H63b1w stored in OS Version Data Storage Area H63b1 (Paragraph [0355]) of Host H (S3). Assuming that Host H detects in S3 that Wireless Transmitter Controller Version Data 20663b1w of Communication Device 200 is of an old version. Host H retrieves Wireless Transmitter Controller H63OSw, which is of the latest version, from Operating System Storage Area H63OS (Paragraph [0352]), and sends the controller to Communication Device 200 (S4). Upon receiving Wireless Transmitter Controller H63OSw from Host H (S5), CPU 211 stores Wireless Transmitter Controller H63OSw as Wireless Transmitter Controller 20663OSw in Operating System 20663OS (Paragraph [0345]) (S6). The old version of Wireless Transmitter Controller 20663OSw (Paragraph [0345]) is deleted.

Paragraph [0402]—This Paragraph [0402] illustrates another embodiment of Wireless Transmitter Controller Updating Software H63c1w (Paragraph [0356]) of Host H (Paragraph [0025]) and Wireless Transmitter Controller Updating Software 20663c1w (Paragraph [0350]) of Communication Device 200, which update Wireless Transmitter Controller 20663OSw stored in Operating System 20663OS (Paragraph [0345]) of Communication Device 200. In this embodiment, CPU 211 (FIG. 1) of Communication Device 200 sends a Wireless Transmitter Controller Update Request#2, which is received by Host H (S1). Here, the Wireless Transmitter Controller Update Request#2 is a request to send Wireless Transmitter Controller Version Data H63b1w (Paragraph [0355]) stored in Host H to Communication Device 200. In response to the request, Host H retrieves Wireless Transmitter Controller Version Data H63b1w from OS Version Data Storage Area H63b1 (Paragraph [0355]), and sends the data to Communication Device 200 (S2). Upon receiving Wireless Transmitter Controller Version Data H63b1w from Host H (S3), CPU 211 compares Wireless Transmitter Controller Version Data H63b1w with Wireless Transmitter Controller Version Data 20663b1w stored in OS Version Data Storage Area 20663b1 (Paragraph [0349]) of Communication Device 200 (S4). Assuming that CPU 211 detects in S4 that Wireless Transmitter Controller Version Data 20663b1w of Communication Device 200 is of an old version. CPU 211 sends a New Wireless Transmitter Controller Sending Request#2, which is received by Host H (S5). Here, the New Wireless Transmitter Controller Sending Request#2 is a request to send Wireless Transmitter Controller H63OSw (Paragraph [0352]) stored in Host H to Communication Device 200. Host H retrieves Wireless Transmitter Controller H63OSw (Paragraph [0352]), which is of the latest version, from Operating System Storage Area H63OS (Paragraph [0352]), and sends the controller to Communication Device 200 (S6). Upon receiving Wireless Transmitter Controller H63OSw from Host H (S7), CPU 211 stores Wireless Transmitter Controller H63OSw as Wireless Transmitter Controller 20663OSw in Operating System 20663OS (Paragraph [0345]) (S8). The old version of Wireless Transmitter Controller 20663OSw (Paragraph [0345]) is deleted.

Paragraph [0403]—This Paragraph [0403] illustrates Wireless Transmitter Controller Updating Software H63c1x (Paragraph [0356]) of Host H (Paragraph [0025]) and Wireless Transmitter Controller Updating Software 20663c1x (Paragraph [0350]) of Communication Device 200, which update Wireless Transmitter Controller 20663OSx stored in Operating System 20663OS (Paragraph [0345]) of Communication Device 200. In this embodiment, CPU 211 (FIG. 1) of Communication Device 200 retrieves Wireless Transmitter Controller Version Data 20663b1x from OS Version Data Storage Area 20663b1 (Paragraph [0349]) and sends the data to Host H (S1). Upon receiving Wireless Transmitter Controller Version Data 20663b1x (Paragraph [0349]) from Communication Device 200 (S2), Host H compares Wireless Transmitter Controller Version Data 20663b1x (Paragraph [0349]) with Wireless Transmitter Controller Version Data H63b1x stored in OS Version Data Storage Area H63b1 (Paragraph [0355]) of Host H (S3). Assuming that Host H detects in S3 that Wireless Transmitter Controller Version Data 20663b1x of Communication Device 200 is of an old version. Host H retrieves Wireless Transmitter Controller H63OSx, which is of the latest version, from Operating System Storage Area H63OS (Paragraph [0352]), and sends the controller to Communication Device 200 (S4). Upon receiving Wireless Transmitter Controller H63OSx from Host H (S5), CPU 211 stores Wireless Transmitter Controller H63OSx as Wireless Transmitter Controller 20663OSx in Operating System 20663OS (Paragraph [0345]) (S6). The old version of Wireless Transmitter Controller 20663OSx (Paragraph [0345]) is deleted.

Paragraph [0404]—This Paragraph [0404] illustrates another embodiment of Wireless Transmitter Controller Updating Software H63c1x (Paragraph [0356]) of Host H (Paragraph [0025]) and Wireless Transmitter Controller Updating Software 20663c1x (Paragraph [0350]) of Communication Device 200, which update Wireless Transmitter Controller 20663OSx stored in Operating System 20663OS (Paragraph [0345]) of Communication Device 200. In this embodiment, CPU 211 (FIG. 1) of Communication Device 200 sends a Wireless Transmitter Controller Update Request#3, which is received by Host H (S1). Here, the Wireless Transmitter Controller Update Request#3 is a request to send Wireless Transmitter Controller Version Data H63b1x (Paragraph [0355]) stored in Host H to Communication Device 200. In response to the request, Host H retrieves Wireless Transmitter Controller Version Data H63b1x from OS Version Data Storage Area H63b1 (Paragraph [0355]), and sends the data to Communication Device 200 (S2). Upon receiving Wireless Transmitter Controller Version Data H63b1x from Host H (S3), CPU 211 compares Wireless Transmitter Controller Version Data H63b1x with Wireless Transmitter Controller Version Data 20663b1x stored in OS Version Data Storage Area 20663b1 (Paragraph [0349]) of Communication Device 200 (S4). Assuming that CPU 211 detects in S4 that Wireless Transmitter Controller Version Data 20663b1x of Communication Device 200 is of an old version. CPU 211 sends a New Wireless Transmitter Controller Sending Request#3, which is received by Host H (S5). Here, the New Wireless Transmitter Controller Sending Request#3 is a request to send Wireless Transmitter Controller H63OSx (Paragraph [0352]) stored in Host H to Communication Device 200. Host H retrieves Wireless Transmitter Controller H63OSx (Paragraph [0352]), which is of the latest version, from Operating System Storage Area H63OS (Paragraph [0352]), and sends the controller to Communication Device 200 (S6). Upon receiving Wireless Transmitter Controller H63OSx from Host H (S7), CPU 211 stores Wireless Transmitter Controller H63OSx as Wireless Transmitter Controller 20663OSx in Operating System 20663OS (Paragraph [0345]) (S8). The old version of Wireless Transmitter Controller 20663OSx (Paragraph [0345]) is deleted.

Paragraph [0405]—As another embodiment, each and all data and software programs described in this specification stored in Communication Device 200 may be updated in the manner described hereinbefore.

Paragraph [0406]—For the avoidance of doubt, the present function may be utilized to repair the operating system of Communication Device 200, i.e., Operating System 20663OS (Paragraph [0345] and Paragraph [0345]) in the form of downloading updates.

Paragraph [0407]—<<OCR Function>>

Paragraph [0408]—This Paragraph [0408] illustrates the storage area included in RAM 206 (FIG. 1). In this embodiment, RAM 206 includes OCR Information Storage Area 20666a of which the data and the software programs stored therein are described in Paragraph [0410].

Paragraph [0409]—The data and/or the software programs stored in OCR Information Storage Area 20666a (Paragraph [0408]) may be downloaded from Host H (Paragraph [0025]).

Paragraph [0410]—This Paragraph [0410] illustrates the storage areas included in OCR Information Storage Area 20666a (Paragraph [0408]). In this embodiment, OCR Information Storage Area 20666a includes OCR Data Storage Area 20666b and OCR Software Storage Area 20666c. OCR Data Storage Area 20666b stores the data necessary to implement the present function, such as the ones described in Paragraph [0411] through Paragraph [0416]. OCR Software Storage Area 20666c stores the software programs necessary to implement the present function, such as the ones described in Paragraph [0417].

Paragraph [0411]—This Paragraph [0411] illustrates the storage areas included in OCR Data Storage Area 20666b (Paragraph [0410]). In this embodiment, OCR Data Storage Area 20666b includes Web Address Data Storage Area 20666b1, Email Address Data Storage Area 20666b2, Phone Data Storage Area 20666b3, Alphanumeric Data Storage Area 20666b4, Image Data Storage Area 20666b5, and Work Area 20666b6. Web Address Data Storage Area 20666b1 stores the data described in Paragraph [0412]. Email Address Data Storage Area 20666b2 stores the data described in Paragraph [0413]. Phone Data Storage Area 20666b3 stores the data described in Paragraph [0414]. Alphanumeric Data Storage Area 20666b4 stores the data described in Paragraph [0415]. Image Data Storage Area 20666b5 stores the data described in Paragraph [0416]. Work Area 20666b6 is utilized as a work area to perform calculation and temporarily store data.

Paragraph [0412]—This Paragraph [0412] illustrates the data stored in Web Address Data Storage Area 20666b1 (Paragraph [0411]). In this embodiment, Web Address Data Storage Area 20666b1 comprises two columns, i.e., 'Web Address ID' and Web Address Data'. Column 'Web Address ID' stores the web address IDs, and each web address ID is the title of the corresponding web address data stored in column 'Web Address Data' utilized for identification purposes. Column 'Web Address Data' stores the web address data, and each web address data represents a web address composed of alphanumeric data of which the first portion thereof is 'http://

'. In this embodiment, Web Address Data Storage Area 20666b1 stores the following data: the web address ID 'Web Address#1' and the corresponding web address data 'Web Address Data#1'; the web address ID 'Web Address#2' and the corresponding web address data 'Web Address Data#2'; the web address ID 'Web Address#3' and the corresponding web address data 'Web Address Data#3'; and the web address ID 'Web Address#4' and the corresponding web address data 'Web Address Data#4'.

Paragraph [0413]—This Paragraph [0413] illustrates the data stored in Email Address Data Storage Area 20666b2 (Paragraph [0411]). In this embodiment, Email Address Data Storage Area 20666b2 comprises two columns, i.e., 'Email Address ID' and 'Email Address Data'. Column 'Email Address ID' stores the email address IDs, and each email address ID is the title of the corresponding email address data stored in column 'Email Address Data' utilized for identification purposes. Column 'Email Address Data' stores the email address data, and each email address data represents an email address composed of alphanumeric data which includes '@' mark therein. In this embodiment, Email Address Data Storage Area 20666b2 stores the following data: the email address ID 'Email Address#1' and the corresponding email address data 'Email Address Data#1'; the email address ID 'Email Address#2' and the corresponding email address data 'Email Address Data#2'; the email address ID 'Email Address#3' and the corresponding email address data 'Email Address Data#3'; and the email address ID 'Email Address#4' and the corresponding email address data 'Email Address Data#4'.

Paragraph [0414]—This Paragraph [0414] illustrates the data stored in Phone Data Storage Area 20666b3 (Paragraph [0411]). In this embodiment, Phone Data Storage Area 20666b3 comprises two columns, i.e., 'Phone ID' and 'Phone Data'. Column 'Phone ID' stores the phone IDs, and each phone ID is the title of the corresponding phone data stored in column 'Phone Data' utilized for identification purposes. Column 'Phone Data' stores the phone data, and each phone data represents a phone number composed of numeric figure of which the format is 'xxx-xxx-xxxx'. In this embodiment, Phone Data Storage Area 20666b3 stores the following data: the phone ID 'Phone#1' and the corresponding phone data 'Phone Data#1'; the phone ID 'Phone#2' and the corresponding phone data 'Phone Data#2'; the phone ID 'Phone#3' and the corresponding phone data 'Phone Data#3'; and the phone ID 'Phone#4' and the corresponding phone data 'Phone Data#4'.

Paragraph [0415]—This Paragraph [0415] illustrates the data stored in Alphanumeric Data Storage Area 20666b4 (Paragraph [0411]). In this embodiment, Alphanumeric Data Storage Area 20666b4 comprises two columns, i.e., 'Alphanumeric ID' and 'Alphanumeric Data'. Column 'Alphanumeric ID' stores alphanumeric IDs, and each alphanumeric ID is the title of the corresponding alphanumeric data stored in column 'Alphanumeric Data' utilized for identification purposes. Column 'Alphanumeric Data' stores the alphanumeric data, and each alphanumeric data represents alphanumeric figure primarily composed of numbers, texts, words, and letters. In this embodiment, Alphanumeric Data Storage Area 20666b4 stores the following data: the alphanumeric ID 'Alphanumeric#1' and the corresponding alphanumeric data 'Alphanumeric Data#1'; the alphanumeric ID 'Alphanumeric#2' and the corresponding alphanumeric data 'Alphanumeric Data#2'; the alphanumeric ID 'Alphanumeric#3' and the corresponding alphanumeric data 'Alphanumeric Data#3'; and the alphanumeric ID 'Alphanumeric#4' and the corresponding alphanumeric data 'Alphanumeric Data#4'.

Paragraph [0416]—This Paragraph [0416] illustrates the data stored in Image Data Storage Area 20666b5 (Paragraph [0411]). In this embodiment, Image Data Storage Area 20666b5 comprises two columns, i.e., 'Image ID' and Image Data'. Column 'Image ID' stores the image IDs, and each image ID is the title of the corresponding image data stored in column 'Image Data' utilized for identification purposes. Column 'Image Data' stores the image data, and each image data is a data composed of image such as the image input via CCD Unit 214 (FIG. 1). In this embodiment, Image Data Storage Area 20666b5 stores the following data: the Image ID 'Image#1' and the corresponding Image Data 'Image Data#1'; the Image ID 'Image#2' and the corresponding Image Data 'Image Data#2'; the Image ID 'Image#3' and the corresponding Image Data Image Data#3[1]; and the Image ID 'Image#4' and the corresponding Image Data 'Image Data#4'.

Paragraph [0417]—This Paragraph [0417] illustrates the software programs stored in OCR Software Storage Area 20666c (Paragraph [0410]). In this embodiment, OCR Software Storage Area 20666c stores Image Data Scanning Software 20666c1, Image Data Storing Software 20666c2, OCR Software 20666c3, Alphanumeric Data Storing Software 20666c4, Web Address Data Identifying Software 20666c5a, Web Address Data Correcting Software 20666c5b, Web Address Data Storing Software 20666c5c, Address Accessing Software 20666c5d, Email Address Data Identifying Software 20666c6a, Email Address Data Correcting Software 20666c6b, Email Address Data Storing Software 20666c6c, Email Editing Software 20666c6d, Phone Data Identifying Software 20666c7a, Phone Data Correcting Software 20666c7b, Phone Data Storing Software 20666c7c, and Dialing Software 20666c7d. Image Data Scanning Software 20666c1 is the software program described in Paragraph [0418]. Image Data Storing Software 20666c2 is the software program described in Paragraph [0419]. OCR Software 20666c3 is the software program described in Paragraph [0420]. Alphanumeric Data Storing Software 20666c4 is the software program described in Paragraph [0421]. Web Address Data Identifying Software 20666c5a is the software program described in Paragraph [0422]. Web Address Data Correcting Software 20666c5b is the software program described in Paragraph [0423]. Web Address Data Storing Software 20666c5c is the software program described in Paragraph [0424]. Web Address Accessing Software 20666c5d is the software program described in Paragraph [0425]. Email Address Data Identifying Software 20666c6a is the software program described in Paragraph [0426]. Email Address Data Correcting Software 20666c6b is the software program described in Paragraph [0427]. Email Address Data Storing Software 20666c6c is the software program described in Paragraph [0428]. Email Editing Software 20666c6d is the software program described in Paragraph [0429]. Phone Data Identifying Software 20666c7a is the software program described in Paragraph [0430]. Phone Data Correcting Software 20666c7b is the software program described in Paragraph [0431]. Phone Data Storing Software 20666c7c is the software program described in Paragraph [0432]. Dialing Software 20666c7d is the software program described in Paragraph [0433].

Paragraph [0418]—This Paragraph [0418] illustrates Image Data Scanning Software 20666c1 (not shown) of Communication Device 200, which scans an image by utilizing CCD Unit (FIG. 1). In this embodiment, CPU 211 (FIG. 1)

scans an image by utilizing CCD Unit (FIG. 1) (S1), and stores the extracted image data in Work Area 20666b6 (Paragraph [0411]) (S2). CPU 211 then retrieves the image data from Work Area 20666b6 (Paragraph [0411]) and displays the data on LCD 201 (FIG. 1) (S3).

Paragraph [0419]—This Paragraph [0419] illustrates Image Data Storing Software 20666c2 (not shown) of Communication Device 200, which stores the image data scanned by CCD Unit (FIG. 1). In this embodiment, CPU 211 (FIG. 1) retrieves the image data from Work Area 20666b6 (Paragraph [0411]) and displays the data On LCD 201 (FIG. 1) (S1). The user of Communication Device 200 inputs an image ID, i.e., a title of the image data by utilizing Input Device 210 (FIG. 1) or via voice recognition system (S2). CPU 211 then stores the image ID and the image data in Image Data Storage Area 20666b5 (Paragraph [0416]) (S3).

Paragraph [0420]—This Paragraph [0420] illustrates OCR Software 20666c3 (not shown) of Communication Device 200, which extracts alphanumeric data from image data by utilizing the method so-called 'optical character recognition' or 'OCR'. In this embodiment, CPU 211 (FIG. 1) retrieves the image IDs from Image Data Storage Area 20666b5 (Paragraph [0416]) and displays the data on LCD 201 (FIG. 1) (S1). The user of Communication Device 200 selects one of the image IDs by utilizing Input Device 210 (FIG. 1) or via voice recognition system (S2). CPU 211 then retrieves the image data of the image ID selected in S2 from Image Data Storage Area 20666b5 (Paragraph [0416]) and displays the image data on LCD 201 (FIG. 1) (S3). CPU 211 executes the OCR process, i.e., extracts alphanumeric data from the image data (S4), and stores the extracted alphanumeric data in Work Area 20666b6 (Paragraph [0411]) (S5).

Paragraph [0421]—This Paragraph [0421] illustrates Alphanumeric Data Storing Software 20666c4 (not shown) of Communication Device 200, which stores the extracted alphanumeric data in Alphanumeric Data Storage Area 20666b4 (Paragraph [0415]). In this embodiment, the user of Communication Device 200 inputs an alphanumeric ID (i.e., the title of the alphanumeric data) (S1). CPU 211 (FIG. 1) then retrieves the alphanumeric data from Work Area 20666b6 (Paragraph [0411]) (S2), and stores the data in Alphanumeric Data Storage Area 20666b4 (Paragraph [0415]) with the Alphanumeric ID (S3).

Paragraph [0422]—This Paragraph [0422] illustrates Web Address Data Identifying Software 20666c5a (not shown) of Communication Device 200, which identifies the web address data among the Alphanumeric Data. In this embodiment, CPU 211 (FIG. 1) retrieves the alphanumeric IDs from Alphanumeric Data Storage Area 20666b4 (Paragraph [0415]) and displays the alphanumeric IDs on LCD 201 (FIG. 1) (S1). The user of Communication Device 200 selects one of the Alphanumeric IDs by utilizing Input Device 210 (FIG. 1) or via voice recognition system (S2). CPU 211 retrieves the corresponding alphanumeric data from Alphanumeric Data Storage Area 20666b4 (Paragraph [0415]) and displays the data on LCD 201 (FIG. 1) (S3). CPU 211 stores the alphanumeric data retrieved in S3 in Work Area 20666b6 (Paragraph [0411]) for the web address data identification explained in the next step (S4). CPU 211 scans the alphanumeric data, i.e., applies the web address criteria (for example, 'http://', 'www.', '.com', '.org', '.edu') to each alphanumeric data, and identifies the web address data included therein (S5). CPU 211 emphasizes the identified web address data by changing the font color (for example, blue) and drawing underlines to the identified web address data (S6). CPU 211 displays the alphanumeric data with the identified web address data emphasized on LCD 201 (FIG. 1) thereafter (S7).

Paragraph [0423]—This Paragraph [0423] illustrates Web Address Data Correcting Software 20666c5b (not shown) of Communication Device 200, which corrects the misidentified web address data by manually selecting the start point and the end point of the web address data. For example, if the web address data is misidentified as 'www.yahoo' and leaves out the remaining '.com', the user of Communication Device 200 may manually correct the web address data by selecting the start point and the end point of 'www.yahoo.com'. In this embodiment, CPU 211 (FIG. 1) displays the alphanumeric data with web address data emphasized (S1). The user of Communication Device 200 selects the start point of the web address data (S2) and the end point of the web address data by utilizing Input Device 210 (FIG. 1) or via voice recognition system (S3). CPU 211 then identifies the alphanumeric data located between the start point and the end point as web address data (S4), and emphasizes the web address data by changing the font color (for example, blue) and drawing underlines thereto (S5). The alphanumeric data with the web address data emphasized are displayed on LCD 201 (FIG. 1) thereafter (S6).

Paragraph [0424]—This Paragraph [0424] illustrates Web Address Data Storing Software 20666c5c (not shown) of Communication Device 200, which stores the web address data in Web Address Data Storage Area 20666b1 (Paragraph [0412]). In this embodiment, CPU 211 (FIG. 1) displays the alphanumeric data with web address data emphasized (S1). The user of Communication Device 200 selects one of the web address data by utilizing Input Device 210 (FIG. 1) or via voice recognition system, and CPU 211 emphasizes the data (for example, change to bold font) (S2). The user then inputs the web address ID (the title of the web address data) (S3). CPU 211 stores the web address ID and the web address data in Web Address Data Storage Area 20666b1 (Paragraph [0412]) (S4).

Paragraph [0425]—This Paragraph [0425] illustrates Web Address Accessing Software 20666c5d (not shown) of Communication Device 200, which accesses the web site represented by the web address data. In this embodiment, CPU 211 (FIG. 1) displays the alphanumeric data with web address data emphasized (S1). The user of Communication Device 200 selects one of the web address data by utilizing Input Device 210 (FIG. 1) or via voice recognition system (for example, click one of the web address data) (S2). CPU 211 then opens an internet browser (for example, the Internet Explorer) and enters the web address data selected in S2 therein (S3). CPU 211 accesses the web site thereafter (S4).

Paragraph [0426]—This Paragraph [0426] illustrates Email Address Data Identifying Software 20666c6a (not shown) of Communication Device 200, which identifies the email address data among the alphanumeric data. In this embodiment, CPU 211 (FIG. 1) retrieves the alphanumeric IDs from Alphanumeric Data Storage Area 20666b4 (Paragraph [0415]) and displays the alphanumeric IDs on LCD 201 (FIG. 1) (S1). The user of Communication Device 200 selects one of the alphanumeric IDs by utilizing Input Device 210 (FIG. 1) or via voice recognition system (S2). CPU 211 retrieves the corresponding alphanumeric data from Alphanumeric Data Storage Area 20666b4 (Paragraph [0415]) and displays the data on LCD 201 (FIG. 1) (S3). CPU 211 stores the alphanumeric data retrieved in S3 in Work Area 20666b6 (Paragraph [0411]) for the email address data identification explained in the next step (S4). CPU 211 scans the alphanumeric data, i.e., applies the email address criteria (for example, '@') to each alphanumeric data, and identifies the email address data included therein (S5). CPU 211 emphasizes the identified email address data by changing the font color (for example, green) and drawing underlines to the identified email address data (S6). CPU 211 displays the alphanumeric data with the identified email address data emphasized on LCD 201 (FIG. 1) thereafter (S7).

Paragraph [0427]—This Paragraph [0427] illustrates Email Address Data Correcting Software 20666c6b (not shown) of Communication Device 200, which corrects the misidentified email address data by manually selecting the start point and the end point of the email address data. For example, if the email address data is misidentified as 'iwaofujisaki@yahoo' and leaves out the remaining '.com', the user of Communication Device 200 may manually correct the email address data by selecting the start point and the end point of 'iwaofujisaki@yahoo.com'. In this embodiment, CPU 211 (FIG. 1) displays the alphanumeric data with email address data emphasized (S1). The user of Communication Device 200 selects the start point of the email address data (S2) and the end point of the email address data by utilizing Input Device 210 (FIG. 1) or via voice recognition system (S3). CPU 211 then identifies the alphanumeric data located between the start point and the end point as email address data (S4), and emphasizes the email address data by changing the font color (for example, green) and drawing underlines thereto (S5). The alphanumeric data with the email address data emphasized are displayed on LCD 201 (FIG. 1) thereafter (S6).

Paragraph [0428]—This Paragraph [0428] illustrates Email Address Data Storing Software 20666c6c (not shown) of Communication Device 200, which stores the email address data to Email Address Data Storage Area 20666b2 (Paragraph [0413]). In this embodiment, CPU 211 (FIG. 1) displays the alphanumeric data with the email address data emphasized (S1). The user of Communication Device 200 selects one of the email address data, and CPU 211 emphasizes the data (for example, change to bold font) (S2). The user then inputs the email address ID (the title of the email address data) by utilizing Input Device 210 (FIG. 1) or via voice recognition system (S3). CPU 211 stores the email address ID and the email address data in Email Address Data Storage Area 20666b2 (Paragraph [0413]) (S4).

Paragraph [0429]—This Paragraph [0429] illustrates Email Editing Software 20666c6d (not shown) of Communication Device 200, which opens an email editor (for example, the Outlook Express) wherein the email address data is set as the receiver's address. In this embodiment, CPU 211 (FIG. 1) displays the alphanumeric data with the email address data emphasized (S1). The user of Communication Device 200 selects one of the email address data (for example, click one of the email address data) by utilizing Input Device 210 (FIG. 1) or via voice recognition system (S2). CPU 211 then opens an email editor (for example, the Outlook Express) (S3), and sets the email address data selected in S2 as the receiver's address (S4).

Paragraph [0430]—This Paragraph [0430] illustrates Phone Data Identifying Software 20666c7a (not shown) of Communication Device 200, which identifies the phone data among the alphanumeric data. In this embodiment, CPU 211 (FIG. 1) retrieves the alphanumeric IDs from Alphanumeric Data Storage Area 20666b4 (Paragraph [0415]) and displays the alphanumeric IDs on LCD 201 (FIG. 1) (S1). The user of Communication Device 200 selects one of the alphanumeric IDs (S2). CPU 211 retrieves the corresponding alphanumeric data from Alphanumeric Data Storage Area 20666b4 (Paragraph [0415]) and displays the data on LCD 201 (FIG. 1) (S3). CPU 211 stores the alphanumeric data retrieved in S3 in Work Area 20666b6 (Paragraph [0411]) for the phone data identification explained in the next step (S4). CPU 211 scans the alphanumeric data, i.e., applies the phone criteria (for example, numeric data with 'xxx-xxx-xxxx' format) to each alphanumeric data, and identifies the phone data included therein (S5). CPU 211 emphasizes the identified phone data by changing the font color (for example, yellow) and drawing underlines to the identified phone data (S6). CPU 211 displays the alphanumeric data with the identified phone data emphasized on LCD 201 (FIG. 1) thereafter (S7).

Paragraph [0431]—This Paragraph [0431] illustrates Phone Data Correcting Software 20666c7b (not shown) of Communication Device 200, which corrects the misidentified phone data by manually selecting the start point and the end point of the phone data. For example, if the phone data is misidentified as '916-455' and leaves out the remaining '1293', the user of Communication Device 200 may manually correct the phone data by selecting the start point and the end point of '916-455-1293'. In this embodiment, CPU 211 (FIG. 1) displays the alphanumeric data with phone data emphasized (S1). The user of Communication Device 200 selects the start point of the phone data (S2) and the end point of the phone data by utilizing Input Device 210 (FIG. 1) or via voice recognition system (S3). CPU 211 then identifies the alphanumeric data located between the start point and the end point as phone data (S4), and emphasizes the phone data by changing the font color (for example, yellow) and drawing underlines thereto (S5). The alphanumeric data with the phone data emphasized are displayed on LCD 201 (FIG. 1) thereafter (S6).

Paragraph [0432]—This Paragraph [0432] illustrates Phone Data Storing Software 20666c7c (not shown) of Communication Device 200, which stores the phone data to Phone Data Storage Area 20666b3 (Paragraph [0414]). In this embodiment, CPU 211 (FIG. 1) displays the alphanumeric data with the phone data emphasized (S1). The user of Communication Device 200 selects one of the phone data, and CPU 211 emphasizes the data (for example, change to bold font) (S2). The user then inputs the phone ID (the title of the phone data) (S3). CPU 211 stores the phone ID and the phone data in Phone Data Storage Area 20666b3 (Paragraph [0414]) (S4).

Paragraph [0433]—This Paragraph [0433] illustrates Dialing Software 20666c7d (not shown) of Communication Device 200, which opens a phone dialer and initiates a dialing process by utilizing the phone data. In this embodiment, CPU 211 (FIG. 1) displays the alphanumeric data with the phone data emphasized (S1). The user of Communication Device 200 selects one of the phone data by utilizing Input Device 210 (FIG. 1) or via voice recognition system (for example, click one of the phone data) (S2). CPU 211 then opens a phone dialer (S3), and inputs the phone data selected in S2 (S4). A dialing process is initiated thereafter.

Paragraph [0434]—<<Multiple Mode Implementing Function>>

Paragraph [0435]—Paragraph [0436] through Paragraph [0440] illustrate the multiple mode implementing function of Communication Device 200 which enables to activate and implement a plurality of modes, functions, and/or systems described in this specification simultaneously.

Paragraph [0436]—This Paragraph [0436] illustrates the software programs stored in RAM 206 (FIG. 1) to implement the multiple mode implementing function (FIG. 1). In this embodiment, RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690*b* administers the overall implementation of the present function. One of the major tasks of Multiple Mode Implementer 20690*b* is to administer and control the timing and sequence of Mode List Displaying Software 20690*c*, Mode Selecting Software 20690*d*, Mode Activating Software 20690*e*, and Mode Implementation Repeater 20690*f*. For example, Multiple Mode Implementer 20690*b* executes them in the following order: Mode List Displaying Software 20690*c*, Mode Selecting Software 20690*d*, Mode Activating Software 20690*e*, and Mode Implementation Repeater 20690*f*. Mode List Displaying Software 20690*c* displays on LCD 201 (FIG. 1) a list of a certain amount or all modes, functions, and/or systems explained in this specification of which the sequence is explained in Paragraph [0438]. Mode Selecting Software 20690*d* selects a certain amount or all modes, functions, and/or systems explained in this specification of which the sequence is explained in Paragraph [0438]. Mode Activating Software 20690*e* activates a certain amount or all modes, functions, and/or systems selected by the Mode Selecting Software 20690*d* of which the sequence is explained in Paragraph [0439]. Mode Implementation Repeater 20690*f* executes Multiple Mode Implementer 20690*b* which reactivates Mode List Displaying Software 20690*c*, Mode Selecting Software 20690*d*, Mode Activating Software 20690*e* of which the sequence is explained in Paragraph [0440].

Paragraph [0437]—This Paragraph [0437] illustrates the sequence of Mode List Displaying Software 20690*c* (Paragraph [0436]). In this embodiment, CPU 211 (FIG. 1), under the command of Mode List Displaying Software 20690*c*, displays a list of a certain amount or all modes, functions, and/or systems described in this specification on LCD 201 (FIG. 1).

Paragraph [0438]—This Paragraph [0438] illustrates the sequence of Mode Selecting Software 20690*d* (Paragraph [0436]). In this embodiment, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690*d*, interprets the input signal and selects the corresponding mode, function, or system (S2).

Paragraph [0439]—This Paragraph [0439] illustrates the sequence of Mode Activating Software 20690*e* (Paragraph [0436]). In this embodiment, CPU 211 (FIG. 1), under the command of Mode Activating Software 20690*e*, activates the mode, function, or, system selected in S2 of Paragraph [0438]. CPU 211 thereafter implements the activated mode, function, or system as described in the relevant paragraphs in this specification.

Paragraph [0440]—This Paragraph [0440] illustrates the sequence of Mode Implementation Repeater 20690*f* (Paragraph [0436]). In this embodiment, the user of Communication Device 200 inputs an input signal by utilizing Input Device 210 (FIG. 1) or via voice recognition system (S1). Once the activation of the selected mode, function, or system described in Paragraph [0439] hereinbefore is completed, and if the input signal indicates to repeat the process to activate another mode, function, or system (S2), CPU 211 (FIG. 1), under the command of Mode Implementation Repeater 20690*f*, executes Multiple Mode Implementer 20690*b* (Paragraph [0436]), which reactivates Mode List Displaying Software 20690*c* (Paragraph [0436]), Mode Selecting Software 20690*d* (Paragraph [0436]), and Mode Activating Software 20690*e* (Paragraph [0436]) to activate the second mode, function, or system while the first mode, function, or system is implemented by utilizing the method of so-called 'time sharing' (S3). Mode List Displaying Software 20690*c*, Mode Selecting Software 20690*d*, and Mode Activating Software 20690*e* can be repeatedly executed until all modes, function, and systems displayed on LCD 201 (FIG. 1) are selected and activated. The activation of modes, functions, and/or systems is not repeated if the input signal explained in S2 so indicates.

Paragraph [0441]—<<Incorporation By Reference>>

Paragraph [0442]—The following paragraphs and drawings described in U.S. Ser. No. 10/710,600, filed 2004, Jul. 23, are incorporated to this application by reference: the preamble described in paragraph [1806] (no drawings); Communication Device 200 (Voice Communication Mode) described in paragraphs [1807] through [1812] (FIGS. 1 through 2c); Voice Recognition System described in paragraphs [1813] through [1845] (FIGS. 3 through 19); Positioning System described in paragraphs [1846] through [1877] (FIGS. 20a through 32e); Auto Backup System described in paragraphs [1878] through [1887] (FIGS. 33 through 37); Signal Amplifier described in paragraphs [1888] through [1893] (FIG. 38); Audio/Video Data Capturing System described in paragraphs [1894] through [1906] (FIGS. 39 through 44b); Digital Mirror Function (1) described in paragraphs [1907] through [1915] (FIGS. 44c through 44e); Caller ID System described in paragraphs [1916] through [1923] (FIGS. 45 through 47); Stock Purchasing Function described in paragraphs [1924] through [1933] (FIGS. 48 through 52); Timer Email Function described in paragraphs [1934] through [1940] (FIGS. 53a and 53b); Call Blocking Function described in paragraphs [1941] through [1954] (FIGS. 54 through 59); Online Payment Function described in paragraphs [1955] through [1964] (FIGS. 60 through 64); Navigation System described in paragraphs [1965] through [1987] (FIGS. 65 through 74a); Remote Controlling System described in paragraphs [1988] through [2006] (FIGS. 75 through 85); Auto Emergency Calling System described in paragraphs [2007] through [2015] (FIGS. 86 and 87); Cellular TV Function described in paragraphs [2016] through [2100] (FIGS. 88 through 135); 3D Video Game Function described in paragraphs [2101] through [2113] (FIGS. 136 through 144); Digital Mirror Function (2) described in paragraphs [2114] through [2123] (FIGS. 145 through 155); Voice Recognition Sys—E-mail (2) described in paragraphs [2124] through [2132] (FIGS. 156 through 160); Positioning System—GPS Search Engine described in paragraphs [2133] through [2175] (FIGS. 161 through 182); Mobile Ignition Key Function described in paragraphs [2176] through [2198] (FIGS. 183 through 201); Voice Print Authentication System described in paragraphs [2199] through [2209] (FIGS. 202 through 211); Fingerprint Authentication System described in paragraphs [2210] through [2222] (FIGS. 212 through 221); Auto Time Adjust Function described in paragraphs through [2227] (FIGS. 222 through 224); Video/Photo Mode described in paragraphs [2228] through [2256] (FIGS. 225 through 242); Call Taxi Function described in paragraphs [2257] through [2297] (FIGS. 243 through 269); Shooting Video Game Function described in paragraphs through [2314] (FIGS. 270 through 283); Driving Video Game Function described in paragraphs [2315] through [2328] (FIGS. 284 through 294); Address Book Updating Function described in paragraphs [2329] through [2349] (FIGS. 295 through 312); Batch Address Book Updating Function—With Host described in paragraphs [2350] through [2371] (FIGS. 313 through 329); Batch Address Book Updating Function—Peer-To-Peer Connection described in paragraphs through [2376] (FIGS. 329a through 329c); Batch Scheduler Updating Function—With Host described in paragraphs [2377] through [2400] (FIGS. 330 through 350); Batch Scheduler Updating Function—Peer-To-Peer Connection described in paragraphs [2401] through [2405] (FIGS. 351 and 352); Calculator Function described in paragraphs [2406] through [2411] (FIGS. 353 through 356); Spreadsheet Function described in paragraphs [2412] through [2419] (FIGS. 357 through 360); Word Processing Function described in paragraphs [2420] through [2435] (FIGS. 361 through 373); TV Remote Controller Function described in paragraphs [2436] through [2458] (FIGS. 374 through 394); CD/PC Inter-communicating Function described in paragraphs [2459] through [2483] (FIGS. 413 through 427); PDWR Sound Selecting Function described in paragraphs [2484] through [2520] (FIGS. 428 through 456); Start Up Software Function described in paragraphs [2521] through [2537] (FIGS. 457 through 466); Another Embodiment Of Communication Device 200 described in paragraphs [2538] through [2542] (FIGS. 467a through 467d); Stereo Audio Data Output Function described in paragraphs [2543] through [2562] (FIGS. 468 through 479); Stereo Visual Data Output Function described in paragraphs [2563] through (FIGS. 480 through 491); Multiple Signal Processing Function described in paragraphs through [2655] (FIGS. 492 through 529); Positioning System—Pin-pointing Function described in paragraphs [2656] through [2689] (FIGS. 530 through 553); Artificial Satellite Host described in paragraphs [2690] through [2708] (FIGS. 554 through 567); CCD Bar Code Reader Function described in paragraphs [2709] through [2730] (FIGS. 568 through 579); Online Renting Function described in paragraphs [2731] through [2808] (FIGS. 580 through 633); SOS Calling Function described in paragraphs [2809] through [2829] (FIGS. 634 through 645); Input Device described in paragraphs [2830] through [2835] (FIGS. 646 through 650); PC Remote Controlling Function described in paragraphs [2836] through [0105] (FIGS. 651 through 670); PC Remote Downloading Function described in paragraphs [0106] through [2921] (FIGS. 671 through 701); Audiovisual Playback Function described in paragraphs [2922] through [2947] (FIGS. 702 through 716); Audio Playback Function described in paragraphs [2948] through [2972] (FIGS. 717 through 731); Ticket Purchasing Function described in paragraphs [2973] through [3002] (FIGS. 732 through 753); Remote Data Erasing Function described in paragraphs [3003] through [3032] (FIGS. 754 through 774); Business Card Function described in paragraphs [3033] through [3049] (FIGS. 775 through 783); Game Vibrating Function described in paragraphs [3050] through [3060] (FIGS. 784 through 786); Part-time Job Finding Function described in paragraphs [3061] through [3081] (FIGS. 787 through 801); Parking Lot Finding Function described in paragraphs [3082] through (FIGS. 802 through 832); Parts Upgradable Communication Device described in paragraphs through [3147] (FIGS. 833a through 833x); On Demand TV Function described in paragraphs [3148] through [3178] (FIGS. 834 through 855); Inter-communicating TV Function described in paragraphs [3179] through [3213] (FIGS. 856 through 882); Display Controlling Function described in paragraphs [3214] through [3231] (FIGS. 883 through 894); Multiple Party Communicating Function described in paragraphs [3232] through [3265] (FIGS. 894a through 917); Display Brightness Controlling Function described in paragraphs [3266] through [3275] (FIGS. 918 through 923); Multiple Party Pin-pointing Function described in paragraphs [3276] through [3323] (FIGS. 924 through 950f); Digital Camera Function described in paragraphs [3324] through [3351] (FIGS. 951 through 968); Phone Number Linking Function described in paragraphs through [3375] (FIGS. 968a through 983); Multiple Window Displaying Function described in paragraphs [3376] through [0159] (FIGS. 984 through 995); Mouse Pointer Displaying Function described in paragraphs [0160] through [3432] (FIGS. 996 through 1021); House Item Pin-pointing Function described in paragraphs [3433] through [3592] (FIGS. 1022 through 1152); Membership Administrating Function described in paragraphs [3593] through [3635] (FIGS. 1153 through 1188); Keyword Search Timer Recording Function described in paragraphs [3636] through [0193] (FIGS. 1189 through 1254); Weather Forecast Displaying Function described in paragraphs [0194] through [3769] (FIGS. 1255 through 1288); Multiple Language Displaying Function described in paragraphs [3770] through [3827] (FIGS. 1289 through 1331); Caller's Information Displaying Function described in paragraphs [3828] through [3880] (FIGS. 1332 through 1375); Communication Device Remote Controlling Function (By Phone) described in paragraphs [3881] through [3921] (FIGS. 1394 through 1415); Communication Device Remote Controlling Function (By Web) described in paragraphs [3922] through [3962] (FIGS. 1416 through 1437); Shortcut Icon Displaying Function described in paragraphs [3963] through [3990] (FIGS. 1438 through 1455); Task Tray Icon Displaying Function described in paragraphs [3991] through [4013] (FIGS. 1456 through 1470); Multiple Channel Processing Function described in paragraphs [4014] through [4061] (FIGS. 1471 through 1498); Solar Battery Charging Function described in paragraphs [4062] through [4075] (FIGS. 1499 through 1509); OS Updating Function described in paragraphs [4076] through [0262] (FIGS. 1510 through 1575); Device Managing Function described in paragraphs [0263] through [4161] (FIGS. 1576 through 1587); Automobile Controlling Function described in paragraphs [4162] through [0304] (FIGS. 1588 through 1627); OCR Function described in paragraphs [0305] through [4246] (FIGS. 1628 through 1652); Multiple Mode Implementing Function described in paragraphs [4248] through [4255] (FIGS. 395 through 400); Multiple Software Download Function described in paragraphs [4256] through (FIGS. 401 through 407); Selected Software Distributing Function described in paragraphs through [4285] (FIGS. 1376 through 1393d); Multiple Software Download And Mode Implementation Function described in paragraphs [4286] through [4293] (FIGS. 408 through 412); and the last sentence described in paragraph [4295] (no drawings).

Paragraph [0442.1]—The paragraphs and drawings described in U.S. Ser. No. 10/710,600 filed 2004-07-23 incorporated to this application by reference are, based on U.S. Pat. No. 8,090,402: the preamble (col 57 line 64-col 58 line 15; no drawings); Communication Device 200 (Voice Communication Mode) (col 58 line 16-col 60 line 2; FIGS. 1 through 2c); Voice Recognition System (col 60 line 3-col 65 line 3; FIGS. 3 through 19); Positioning System (col 65 line 4-col 69 line 46; FIGS. 20a through 32g); Auto Backup System (col 69 line 47-col 70 line 51; FIGS. 33 through 37); Signal Amplifier (col 70 line 52-col 71 line 13; FIG. 38); Audio/Video Data Capturing System (col 71 line 14-col 72 line 67; FIGS. 39 through 44b); Digital Mirror Function (1) (col 73 line 1-col 74 line 45; FIGS. 44c through 44e); Caller ID System (col 74 line 46-col 75 line 18; FIGS. 45 through 47); Stock Purchasing Function (col 75 line 19-col 76 line 23; FIGS. 48 through 52); Timer Email Function (col 76 line 24-col 76 line 67; FIGS. 53a and 53b); Call Blocking Function (col 77 line 1-col 78 line 35; FIGS. 54 through 59); Online Payment Function (col 78 line 36-col 79 line 67; FIGS. 60 through 64); Navigation System (col 80 line 1-col 84 line 3; FIGS. 65 through 74a); Remote Controlling System (col 84 line 4-col 87 line 10; FIGS. 75 through 85); Auto Emergency Calling System (col 87 line 11-col 87 line 62; FIGS. 86 and 87); Cellular TV Function (col 87 line 63-col 101 line 54; FIGS. 88 through 135); 3D Video Game Function (col 101 line 55-col 104 line 18; FIGS. 136 through 144); Digital Mirror Function (2) (col 104 line 19-col 106 line 6; FIGS. 145 through 155); Voice Recognition Sys—E-mail (2) (col 106 line 7-col 107 line 38; FIGS. 156 through 160); Positioning System—GPS Search Engine (col 107 line 39-col 117 line 12; FIGS. 161 through 182); Mobile Ignition Key Function (col 117 line 13-col 121 line 35; FIGS. 183 through 201); Voice Print Authentication System (col 121 line 36-col 123 line 44; FIGS. 202 through 211); Fingerprint Authentication System (col 123 line 45-col 126 line 7; FIGS. 212 through 221); Auto Time Adjust Function (col 126 line 8-col 126 line 48; FIGS. 222 through 224); Video/Photo Mode (col 126 line 49-col 131 line 63; FIGS. 225 through 242); Call Taxi Function (col 131 line 64-col 140 line 52; FIGS. 243 through 269); Shooting Video Game Function (col 140 line 53-col 143 line 42; FIGS. 270 through 283); Driving Video Game Function (col 143 line 43-col 146 line 7; FIGS. 284 through 294); Address Book Updating Function (col 146 line 8-col 149 line 13; FIGS. 295 through 312); Batch Address Book Updating Function—With Host (col 149 line 14-col 152 line 4; FIGS. 313 through 329); Batch Address Book Updating Function—Peer-To-Peer Connection (col 152 line 5-col 152 line 49; FIGS. 329a through 329c); Batch Scheduler Updating Function—With Host (col 152 line 50-col 156 line 16; FIGS. 330 through 350); Batch Scheduler Updating Function—Peer-To-Peer Connection (col 156 line 17-col 156 line 67; FIGS. 351 and 352); Calculator Function (col 157 line 1-col 157 line 59; FIGS. 353 through 356); Spreadsheet Function (col 157 line 60-col 159 line 9; FIGS. 357 through 360); Word Processing Function (col 159 line 10-col 162 line 61; FIGS. 361 through 373); TV Remote Controller Function (col 162 line 62-col 167 line 19; FIGS. 374 through 394); CD/PC Inter-communicating Function (col 167 line 20-col 171 line 49; FIGS. 413 through 427); PDWR Sound Selecting Function (col 171 line 50-col 179 line 3; FIGS. 428 through 456); Start Up Software Function (col 179 line 4-col 180 line 67; FIGS. 457 through 466); Another Embodiment Of Communication Device 200 (col 181 line 1-col 183 line 13; FIGS. 467a through 467d); Stereo Audio Data Output Function (col 183 line 14-col 185 line 67; FIGS. 468 through 479); Stereo Visual Data Output Function (col 186 line 1-col 188 line 51; FIGS. 480 through 491); Multiple Signal Processing Function (col 188 line 52-col 199 line 13; FIGS. 492 through 529); Positioning System—Pinpointing Function (col 199 line 14-col 204 line 67; FIGS. 530 through 553); Artificial Satellite Host (col 205 line 1-col 208 line 22; FIGS. 554 through 567); CCD Bar Code Reader Function (col 208 line 23-col 211 line 27; FIGS. 568 through 579); Online Renting Function (col 211 line 28-col 225 line 57; FIGS. 580 through 633); SOS Calling Function (col 225 line 58-col 228 line 31; FIGS. 634 through 645); Input Device (col 228 line 32-col 229 line 50; FIGS. 646 through 650); PC Remote Controlling Function (col 229 line 51-col 235 line 27; FIGS. 651 through 670); PC Remote Downloading Function (col 235 line 28-col 244 line 15; FIGS. 671 through 701); Audiovisual Playback Function (col 244 line 16-col 249 line 15; FIGS. 702 through 716); Audio Playback Function (col 249 line 16-col 253 line 58; FIGS. 717 through 731); Ticket Purchasing Function (col 253 line 59-col 259 line 5; FIGS. 732 through 753); Remote Data Erasing Function (col 259 line 6-col 263 line 43; FIGS. 754 through 774); Business Card Function (col 263 line 44-col 266 line 6; FIGS. 775 through 783); Game Vibrating Function (col 266 line 7-col 267 line 17; FIGS. 784 through 786); Part-time Job Finding Function (col 267 line 18-col 270 line 57; FIGS. 787 through 801); Parking Lot Finding Function (col 270 line 58-col 277 line 47; FIGS. 802 through 832); Parts Upgradable Communication Device (col 277 line 48-col 280 line 67; FIGS. 833a through 833x); On Demand TV Function (col 281 line 1-col 287 line 3; FIGS. 834 through 855); Inter-communicating TV Function (col 287 line 4-col 292 line 6; FIGS. 856 through 882); Display Controlling Function (col 292 line 7-col 295 line 4; FIGS. 883 through 894); Multiple Party Communicating Function (col 295 line 5-col 301 line 34; FIGS. 894a through 917); Display Brightness Controlling Function (col 301 line 35-col 302 line 50; FIGS. 918 through 923); Multiple Party Pin-pointing Function (col 302 line 51-col 311 line 12; FIGS. 924 through 950f); Digital Camera Function (col 311 line 13-col 316 line 15; FIGS. 951 through 968); Phone Number Linking Function (col 316 line 16-col 320 line 5; FIGS. 968a through 983); Multiple Window Displaying Function (col 320 line 6-col 323 line 32; FIGS. 984 through 995); Mouse Pointer Displaying Function (col 323 line 33-col 328 line 64; FIGS. 996 through 1021); House Item Pinpointing Function (col 328 line 65-col 356 line 64; FIGS. 1022 through 1152); Membership Administrating Function (col 356 line 65-col 363 line 67; FIGS. 1153 through 1188); Keyword Search Timer Recording Function (col 364 line 1-col 385 line 55; FIGS. 1189 through 1254); Weather Forecast Displaying Function (col 385 line 56-col 394 line 56; FIGS. 1255 through 1288); Multiple Language Displaying Function (col 394 line 57-col 411 line 63; FIGS. 1289 through 1331); Caller's Information Displaying Function (col 411 line 64-col 423 line 52; FIGS. 1332 through 1375); Communication Device Remote Controlling Function (By Phone) (col 423 line 53-col 430 line 46; FIGS. 1394 through 1415); Communication Device Remote Controlling Function (By Web) (col 430 line 47-col 437 line 61; FIGS. 1416 through 1437); Shortcut Icon Displaying Function (col 437 line 62-col 442 line 29; FIGS. 1438 through 1455); Task Tray Icon Displaying Function (col 442 line 30-col 445 line 62; FIGS. 1456 through 1470); Multiple Channel Processing Function (col 445 line 63-col 455 line 27; FIGS. 1471 through 1498); Solar Battery Charging Function (col 455 line 28-col 458 line 26; FIGS. 1499 through 1509); OS Updating Function (col 458 line 27-col 489 line 3; FIGS. 1510 through 1575); Device Managing Function (col 489 line 4-col 492 line 59; FIGS. 1576 through 1587); Automobile Controlling Function (col 492 line 60-col 505 line 55; FIGS. 1588 through 1627); OCR Function (col 505 line 56-col 512 line 51; FIGS. 1628 through 1652); Multiple Mode Implementing Function (col 512 line 52-col 515 line 56; FIGS. 395 through 400); Multiple Software Download Function (col 515 line 57-col 518 line 3; FIGS. 401 through 407); Selected Software Distributing Function (col 518 line 4-col 523 line 54; FIGS. 1376 through 1393d); Multiple Software Download And Mode Implementation Function (col 523 line 55-col 525 line 33; FIGS. 408 through 412); and the last sentence (col 525 line 34-col 525 line 51; no drawings). If there is ever discrepancy between the disclosures of this application and U.S. Pat. No. 8,090,402, the latter prevails.

Paragraph [0443]—<<Overall Functions>>

Paragraph [0444]—Communication Device 200 is capable to implement the following functions, modes, and systems: a voice communication function which transfers a 1st voice data input from the microphone via the wireless communication system and outputs a 2nd voice data received via the wireless communication system from the speaker; a voice recognition system which retrieves alphanumeric information from the user's voice input via the microphone; a voice recognition system which retrieves alphanumeric information from the user's voice input via the microphone, and a voice recognition refraining system which refrains from implementing the voice recognition system while a voice communication is implemented by the communication device; a tag function and a phone number data storage area, the phone number data storage area includes a plurality of phone numbers, a voice tag is linked to each of the plurality of phone number, when a voice tag is detected in the voice data retrieved via the microphone, the corresponding phone number is retrieved from the phone number data storage area; a voice recognition noise filtering mode, wherein a background noise is identified, a filtered voice data is produced by removing the background noise from the voice data input via the microphone, and the communication device is operated by the filtered voice data; a sound/beep auto off function wherein the communication device refrains from outputting a sound data stored in a sound data storage area while a voice recognition system is implemented; a voice recognition system auto off implementor, wherein the voice recognition system auto off implementor identifies the lapsed time since a voice recognition system is activated and deactivates the voice recognition system after a certain period of time has lapsed; a voice recognition email function which produces a voice produced email which is an email produced by alphanumeric information retrieved from the user's voice input via the microphone, and the voice produced email is stored in the data storage area; a voice communication text converting function, wherein a 1st voice data which indicates the voice data of the caller and a 2nd voice data which indicates the voice data of the callee are retrieved, and the 1st voice data and the 2nd voice data are converted to a 1st text data and a 2nd text data respectively, which are displayed on the display; a target device location indicating function, wherein a target device location data identifying request is transferred to a host computing system in a wireless fashion, a map data and a target device location data is received from the host computing system in a wireless fashion, and the map data with the location corresponding to the target device location data indicated thereon is displayed on the display; an auto backup function, wherein the data identified by the user is automatically retrieved from a data storage area and transferred to another computing system in a wireless fashion periodically for purposes of storing a backup data therein; an audio/video data capturing system which stores an audiovisual data retrieved via the microphone and a camera installed in the communication device in the data storage area, retrieves the audiovisual data from the data storage area, and sends the audiovisual data to another device in a wireless fashion; a digital mirror function which displays an inverted visual data of the visual data input via a camera of the communication device on the display; a caller ID function which retrieves a predetermined color data and/or sound data which is specific to the caller of the incoming call received by the communication device from the data storage area and outputs the predetermined color data and/or sound data from the communication device; a stock purchase function which outputs a notice signal from the communication device when the communication device receives a notice data wherein the notice data is produced by a computing system and sent to the communication device when a stock price of a predetermined stock brand meets a predetermined criteria; a timer email function which sends an email data stored in the data storage area to a predetermined email address at the time indicated by an email data sending time data stored in the data storage area; a call blocking function which blocks the incoming call if the identification thereof is included in a call blocking list; an online payment function which sends a payment data indicating a certain amount of currency to a certain computing system in a wireless fashion in order for the certain computing system to deduct the amount indicated by the payment data from a certain account stored in the certain computing system; a navigation system which produces a map indicating the shortest route from a first location to a second location by referring to an attribution data; a remote controlling system which sends a 1st remote control signal in a wireless fashion by which a 1st device is controlled via a network, a 2nd remote control signal in a wireless fashion by which a 2nd device is controlled via a network, and a 3rd remote control signal in a wireless fashion by which a 3rd device is controlled via a network; an auto emergency calling system wherein the communication device transfers an emergency signal to a certain computing system when an impact of a certain level is detected in a predetermined automobile; a cellular TV function which receives a TV data, which is a series of digital data indicating a TV program, via the wireless communication system in a wireless fashion and outputs the TV data from the communication device; a 3D video game function which retrieves a 3D video game object, which is controllable by a video game object controlling command input via the input device, from the data storage area and display the 3D video game object on the display; a GPS search engine function, wherein a specific criteria is selected by the input device and one or more of geographic locations corresponding to the specific criteria are indicated on the display; a mobile ignition key function which sends a mobile ignition key signal via the wireless communication system in a wireless fashion in order to ignite an engine of an automobile; a voice print authentication system which implements authentication process by utilizing voice data of the user of the communication device; a fingerprint authentication system which implements authentication process by utilizing fingerprint data of the user of the communication device; an auto time adjusting function which automatically adjusts the clock of the communication device by referring to a wireless signal received by the wireless communication system; a video/photo function which implements a video mode and a photo mode, wherein the video/photo function displays moving image data under the video mode and the video/photo function displays still image data under the photo mode on the display; a taxi calling function, wherein a 1st location which indicates the geographic location of the communication device is identified, a 2nd location which indicates the geographic location of the taxi closest to the 1st location is identified, and the 1st location and the 2nd location are indicated on the display; a 3D shooting video game function, wherein the input device utilized for purposes of implementing a voice communication mode is configured as an input means for performing a 3D shooting video game, a user controlled 3D game object which is the three-dimensional game object controlled by the user and a CPU controlled 3D game object which is the three-dimensional game object controlled by the CPU of the communication device are displayed on the display, the CPU controlled 3D game object is programmed to attack the user controlled 3D game object, and a user fired bullet object which indicates a bullet fired by the user controlled 3D game object is displayed on the display when a bullet firing command is input via the input device; a 3D driving video game function, wherein the input device utilized for purposes of implementing a voice communication mode is configured as an input means for performing a 3D driving video game, a user controlled 3D automobile which is the three-dimensional game object indicating an automobile controlled by the user and a CPU controlled 3D automobile which is the three-dimensional game object indicating another automobile controlled by the CPU of the communication device are displayed on the display, the CPU controlled 3D automobile is programmed to compete with the user controlled 3D automobile, and the user controlled 3D automobile is controlled by a user controlled 3D automobile controlling command input via the input device; an address book updating function which updates the address book stored in the communication device by personal computer via network; a batch address book updating function which updates all address books of a plurality of devices including the communication device in one action; a batch scheduler updating function which updates all schedulers of a plurality of devices including the communication device in one action; a calculating function which implements mathematical calculation by utilizing digits input via the input device; a spreadsheet function which displays a spreadsheet on the display, wherein the spreadsheet includes a plurality of cells which are aligned in a matrix fashion; a word processing function which implements a bold formatting function, an italic formatting function, and/or a font formatting function, wherein the bold formatting function changes alphanumeric data to bold, the italic formatting function changes alphanumeric data to italic, and the font formatting function changes alphanumeric data to a selected font; a TV remote controlling function wherein a TV control signal is transferred via the wireless communication system, the TV control signal is a wireless signal to control a TV tuner; a CD/PC inter-communicating function which retrieves the data stored in a data storage area and transfers the data directly to another computer by utilizing infra-red signal in a wireless fashion; a pre-dialing/dialing/waiting sound selecting function, wherein a selected pre-dialing sound which is one of the plurality of pre-dialing sound is registered, a selected dialing sound which is one of the plurality of dialing sound is registered, and a selected waiting sound which is one of the plurality of waiting sound is registered by the user of the communication device, and during the process of implementing a voice communication mode, the selected pre-dialing sound is output from the speaker before a dialing process is initiated, the selected dialing sound is output from the speaker during the dialing process is initiated, and the selected waiting sound is output from the speaker after the dialing process is completed; a startup software function, wherein a startup software identification data storage area stores a startup software identification data which is an identification of a certain software program selected by the user, when the power of the communication device is turned on, the startup software function retrieves the startup software identification data from the startup software identification data storage area and activates the certain software program; the display includes a 1st display and a 2nd display which display visual data in a stereo fashion, the microphone includes a 1st microphone and a 2nd microphone which input audio data in a stereo fashion, and the communication device further comprises a vibrator which vibrates the communication device, an infra-red transmitting device which transmits infra-red signals, a flash light unit which emits strobe light, a removable memory which stores a plurality of digital data and removable from the communication device, and a photometer which a sensor to detect light intensity; a stereo audio data output function which enables the communication device to output audio data in a stereo fashion; a stereo visual data output function, wherein a left visual data storage area stores a left visual data, a right visual data storage area stores a right visual data, stereo visual data output function retrieves the left visual data from the left visual data storage area and displays on a left display and retrieves the right visual data from the right visual data storage area and displays on a right display; a multiple signal processing function, wherein the communication implements wireless communication under a 1st mode and a 2nd mode, the wireless communication is implemented by utilizing cdma2000 signal under the 1st mode, and the wireless communication is implemented by utilizing W-CDMA signal under the 2nd mode; a pin-pointing function, wherein a plurality of in-door access points are installed in an artificial structure, a target device location data which indicates the current geographic location of another device is identified by the geographical relation between the plurality of in-door access points and the another device, and the target device location data is indicated on the display; a CCD bar code reader function, wherein a bar code data storage area stores a plurality of bar code data, each of the plurality of bar code data corresponds to a specific alphanumeric data, the CCD bar code reader function identifies the bar code data corresponding to a bar code retrieved via a camera and identifies and displays the alphanumeric data corresponding to the identified bar code data; an online renting function which enables the user of communication device to download from another computing system and rent digital information for a certain period of time; an SOS calling function, wherein when a specific call is made from the communication device, the SOS calling function retrieves a current geographic location data from a current geographic location data storage area and retrieves a personal information data from a personal information data storage area and transfers the current geographic location data and the personal information data to a specific device in a wireless fashion; a PC remote controlling function, wherein an image data is produced by a personal computer, the image data is displayed on the personal computer, the image data is transferred to the communication device, the image data is received via the wireless communication system in a wireless fashion and stored in a data storage area, the image data is retrieved from the data storage area and displayed on the display, a remote control signal input via the input device is transferred to the personal computer via the wireless communication system in a wireless fashion, and the personal computer is controlled in accordance with the remote control signal; a PC remote downloading function, wherein the communication device sends a data transferring instruction signal to a 1st computer via the wireless communication system in a wireless fashion, wherein the data transferring instruction signal indicates an instruction to the 1st computer to transfer a specific data stored therein to a 2nd computer; an audiovisual playback function, wherein an audiovisual data storage area stores a plurality of audiovisual data, an audiovisual data is selected from the audiovisual data storage area, the audiovisual playback function replays the audiovisual data if a replaying command is input via the input device, the audiovisual playback function pauses to replay the audiovisual data if a replay pausing command is input via the input device, the audiovisual playback function resumes to replay the audiovisual data if a replay resuming command is input via the input device, the audiovisual playback function terminates to replay the audiovisual data if a replay terminating command is input via the input device, the audiovisual playback function fast-forwards to replay the audiovisual data if a replay fast-forwarding command is input via the input device, and the audiovisual playback function fast-rewinds to replay the audiovisual data if a replay fast-rewinding command is input via the input device; an audio playback function which enables the communication device to playback audio data selected by the user of the communication device; a ticket purchasing function which enables the communication device to purchase tickets in a wireless fashion; a remote data erasing function, wherein a data storage area stores a plurality of data, the remote data erasing function deletes a portion or all data stored in the data storage area in accordance with a data erasing command received from another computer via the wireless communication system in a wireless fashion, the data erasing command identifies the data to be erased selected by the user; a business card function which retrieves a 1st business card data indicating the name, title, phone number, email address, and office address of the user of the communication device from the data storage area and sends via the wireless communication system in a wireless fashion and receives a 2nd business card data indicating the name, title, phone number, email address, and office address of the user of another device via the wireless communication system in a wireless fashion and stores the 2nd business card data in the data storage area; a game vibrating function which activates a vibrator of the communication device when a 1st game object contacts a 2nd game object displayed on the display; a part-timer finding function which enables the user of the communication device to find a part-time job in a specified manner by utilizing the communication device; a parking lot finding function which enables the communication device to display the closest parking lot with vacant spaces on the display with the best route thereto; an on demand TV function which enables the communication device to display TV program on the display in accordance with the user's demand; an inter-communicating TV function which enables the communication device to send answer data to host computing system at which the answer data from a plurality of communication devices including the communication device are counted and the counting data is produced; a display controlling function which enables the communication device to control the brightness and/or the contrast of the display per file opened or software program executed; a multiple party communicating function which enables the user of the communication device to voice communicate with more than one person via the communication device; a display brightness controlling function which controls the brightness of the display in accordance with the brightness detected by a photometer of the surrounding area of the user of the communication device; a multiple party pin-pointing function which enables the communication device to display the current locations of a plurality of devices in artificial structure; a digital camera function, wherein a photo quality identifying command is input via the input device, when a photo taking command is input via the input device, a photo data retrieved via a camera is stored in a photo data storage area with the quality indicated by the photo quality identifying command; a phone number linking function which displays a phone number link and dials a phone number indicated by the phone number link when the phone number link is selected; a multiple window displaying function which displays a plurality of windows simultaneously on the display; a mouse pointer displaying function which displays on the display a mouse pointer which is capable to be manipulated by the user of the communication device; a house item pin-pointing function which enables the user of the communication device to find the location of the house items for which the user is looking in a house, wherein the house items are the tangible objects placed in a house which are movable by human being; a membership administrating function in which host computing system allows only the users of the communication device who have paid the monthly fee to access host computing system to implement a certain function; a keyword search timer recording function which enables to timer record TV programs which meet a certain criteria set by the user of the communication device; a weather forecast displaying function which displays on the display the weather forecast of the current location of the communication device; a multiple language displaying function, wherein a selected language is selected from a plurality of languages, and the selected language is utilized to operate the communication device; and a caller's information displaying function which displays personal information regarding caller on the display when the communication device receives a phone call.

The invention claimed is:
1. A communication device, which is a handheld device, comprising:
   a microphone;
   a speaker;
   an input device;
   a display;
   a camera;
   an antenna;
   a voice communicating implementer, wherein voice communication is implemented with another device in a wireless fashion;
   a camera image displaying implementer, wherein an image data retrieved via said camera is processed to be displayed on said display;
   a calculating implementer, wherein a mathematical calculation is implemented by utilizing numeric data input via said input device;
   a bold font displaying implementer, wherein one or more of alphanumeric data is/are processed and displayed with bold font;
   a start up software implementer, wherein the software program selected via said input device is automatically executed when the power of said communication device is turned on;
   a stereo audio data output implementer, wherein a stereo audio data is processed to be output in a stereo fashion;
   a device vibration implementer, wherein said communication device is vibrated when a certain event is determined to be occurred;
   a photo quality setting implementer, wherein a still image data is stored in said communication device with the quality identified via said input device;
   a multiple language implementer, wherein the user interface of said communication device is displayed with the language selected via said input device from a list of multiple language candidates displayed;
   a caller's information displaying implementer, wherein upon receiving a phone call, a caller's information which indicates the phone number and/or name of the caller is displayed;
   an icon displaying implementer, wherein a first icon corresponding to a first software and a second icon corresponding to a second software are displayed;
   a software updating implementer, wherein the software stored in said communication device is updated via said antenna; and
   an OCR implementer, wherein an image data is retrieved via said camera and alphanumeric data is extracted from said image data.
2. The communication device of claim 1, wherein said image data retrieved via said camera is displayed in a real-time manner.
3. The communication device of claim 1, wherein said speaker includes a first speaker and a second speaker, and said stereo audio data is output from said first speaker and second speaker in a stereo fashion.

4. The communication device of claim 1, wherein the quality with which said still image data is stored in said communication device is identified by selecting from a plurality of quality candidates.

5. The communication device of claim 1, wherein said list of multiple language candidates includes English.

6. The communication device of claim 1, wherein the software stored in said communication device is updated to its latest version.

7. A system comprising:
a communication device, which is a handheld device, comprising a microphone, a speaker, an input device, a display, a camera, and an antenna;
a voice communicating implementer, wherein voice communication is implemented with another device in a wireless fashion;
a camera image displaying implementer, wherein an image data retrieved via said camera is processed to be displayed on said display;
a calculating implementer, wherein a mathematical calculation is implemented by utilizing numeric data input via said input device;
a bold font displaying implementer, wherein one or more of alphanumeric data is/are processed and displayed with bold font;
a start up software implementer, wherein the software program selected via said input device is automatically executed when the power of said communication device is turned on;
a stereo audio data output implementer, wherein a stereo audio data is processed to be output in a stereo fashion;
a device vibration implementer, wherein said communication device is vibrated when a certain event is determined to be occurred;
a photo quality setting implementer, wherein a still image data is stored in said communication device with the quality identified via said input device;
a multiple language implementer, wherein the user interface of said communication device is displayed with the language selected via said input device from a list of multiple language candidates displayed;
a caller's information displaying implementer, wherein upon receiving a phone call, a caller's information which indicates the phone number and/or name of the caller is displayed;
an icon displaying implementer, wherein a first icon corresponding to a first software and a second icon corresponding to a second software are displayed;
a software updating implementer, wherein the software stored in said communication device is updated via said antenna; and
an OCR implementer, wherein an image data is retrieved via said camera and alphanumeric data is extracted from said image data.

8. The system of claim 7, wherein said image data retrieved via said camera is displayed in a real-time manner.

9. The system of claim 7, wherein said speaker includes a first speaker and a second speaker, and said stereo audio data is output from said first speaker and second speaker in a stereo fashion.

10. The system of claim 7, wherein the quality with which said still image data is stored in said communication device is identified by selecting from a plurality of quality candidates.

11. The system of claim 7, wherein said list of multiple language candidates includes English.

12. The system of claim 7, wherein the software stored in said communication device is updated to its latest version.

13. A method for a communication device, which is a handheld device, comprising a microphone, a speaker, an input device, a display, a camera, and an antenna, said method comprising:
a voice communicating implementing step, wherein voice communication is implemented with another device in a wireless fashion;
a camera image displaying implementing step, wherein an image data retrieved via said camera is processed to be displayed on said display;
a calculating implementing step, wherein a mathematical calculation is implemented by utilizing numeric data input via said input device;
a bold font displaying implementing step, wherein one or more of alphanumeric data is/are processed and displayed with bold font;
a start up software implementing step, wherein the software program selected via said input device is automatically executed when the power of said communication device is turned on;
a stereo audio data output implementing step, wherein a stereo audio data is processed to be output in a stereo fashion;
a device vibration implementing step, wherein said communication device is vibrated when a certain event is determined to be occurred;
a photo quality setting implementing step, wherein a still image data is stored in said communication device with the quality identified via said input device;
a multiple language implementing step, wherein the user interface of said communication device is displayed with the language selected via said input device from a list of multiple language candidates displayed;
a caller's information displaying implementing step, wherein upon receiving a phone call, a caller's information which indicates the phone number and/or name of the caller is displayed;
an icon displaying implementing step, wherein a first icon corresponding to a first software and a second icon corresponding to a second software are displayed;
a software updating implementing step, wherein the software stored in said communication device is updated via said antenna; and
an OCR implementing step, wherein an image data is retrieved via said camera and alphanumeric data is extracted from said image data.

14. The method of claim 13, wherein said image data retrieved via said camera is displayed in a real-time manner.

15. The method of claim 13, wherein said speaker includes a first speaker and a second speaker, and said stereo audio data is output from said first speaker and second speaker in a stereo fashion.

16. The method of claim 13, wherein the quality with which said still image data is stored in said communication device is identified by selecting from a plurality of quality candidates.

17. The method of claim 13, wherein said list of multiple language candidates includes English.

18. The method of claim 13, wherein the software stored in said communication device is updated to its latest version.

* * * * *